(12) United States Patent
Constantz et al.

(10) Patent No.: US 8,137,455 B1
(45) Date of Patent: Mar. 20, 2012

(54) METHODS AND COMPOSITIONS USING CALCIUM CARBONATE

(75) Inventors: Brent R. Constantz, Portola Valley, CA (US); Kasra Farsad, San Jose, CA (US); Chris Camire, San Jose, CA (US); Joshua Patterson, Freedom, CA (US); Matthew Ginder-Vogel, Los Gatos, CA (US); Karin Yaccato, San Jose, CA (US); John Stagnaro, Santa Clara, CA (US); Martin Devenney, Mountain View, CA (US); Justin Ries, Chapel Hill, NC (US)

(73) Assignee: Calera Corporation, Los Gatos, CA (US)

( * ) Notice: Subject to any disclaimer, the term of this patent is extended or adjusted under 35 U.S.C. 154(b) by 0 days.

(21) Appl. No.: 13/278,567

(22) Filed: Oct. 21, 2011

Related U.S. Application Data

(62) Division of application No. 12/857,289, filed on Aug. 16, 2010, now Pat. No. 8,062,418.

(60) Provisional application No. 61/291,811, filed on Dec. 31, 2009, provisional application No. 61/360,829, filed on Jul. 1, 2010, provisional application No. 61/371,606, filed on Aug. 6, 2010.

(51) Int. Cl.
| | |
|---|---|
| *C04B 14/00* | (2006.01) |
| *C04B 7/00* | (2006.01) |
| *C04B 2/10* | (2006.01) |
| *C09C 1/02* | (2006.01) |
| *C01F 5/24* | (2006.01) |
| *C01F 11/18* | (2006.01) |
| *B28B 3/00* | (2006.01) |

(52) U.S. Cl. ........ 106/738; 106/713; 106/761; 106/817; 106/463; 423/430; 264/DIG. 43; 264/333

(58) Field of Classification Search ................. 106/738, 106/713, 761, 817, 463; 423/430; 264/333
See application file for complete search history.

(56) References Cited

U.S. PATENT DOCUMENTS

| | | | |
|---|---|---|---|
| 6,036,933 | A | 3/2000 | Ramsay |
| 6,264,736 | B1 | 7/2001 | Knopf et al. |
| 6,387,174 | B2 | 5/2002 | Knopf et al. |
| 7,735,274 | B2 | 6/2010 | Constantz et al. |
| 7,736,430 | B2 | 6/2010 | Barron et al. |
| 7,744,761 | B2 | 6/2010 | Constantz et al. |
| 7,749,476 | B2 | 7/2010 | Constantz et al. |
| 7,753,618 | B2 | 7/2010 | Constantz et al. |
| 7,754,169 | B2 | 7/2010 | Constantz et al. |
| 7,771,684 | B2 | 8/2010 | Constantz et al. |
| 7,790,012 | B2 | 9/2010 | Kirk et al. |

(Continued)

FOREIGN PATENT DOCUMENTS

EP 2253600 A1 11/2010
(Continued)

OTHER PUBLICATIONS

Combes, C., et al. 2005. Preparation, physical-chemical characterisation and cytocompatibility of calcium carbonate cements. *Biomaterials*. 27(9): 1945-1954.

(Continued)

*Primary Examiner* — Anthony J Green
*Assistant Examiner* — Karam Hijji
(74) *Attorney, Agent, or Firm* — Calera Corporation

(57) ABSTRACT

Provided herein are compositions and methods including hydraulic cement, supplementary cementitious material, and/or self-cementing material. Methods for making the compositions and using the compositions are provided.

15 Claims, 39 Drawing Sheets

U.S. PATENT DOCUMENTS

| | | |
|---|---|---|
| 7,815,880 B2 | 10/2010 | Constantz et al. |
| 7,829,053 B2 | 11/2010 | Constantz et al. |
| 7,875,163 B2 | 1/2011 | Gilliam et al. |
| 7,887,694 B2 | 2/2011 | Constantz et al. |
| 7,906,028 B2 | 3/2011 | Constantz et al. |
| 7,914,685 B2 | 3/2011 | Constantz et al. |
| 7,922,809 B1 | 4/2011 | Constantz et al. |
| 7,931,809 B2 | 4/2011 | Constantz et al. |
| 7,939,336 B2 | 5/2011 | Constantz et al. |
| 7,966,250 B2 | 6/2011 | Constantz et al. |
| 7,993,500 B2 | 8/2011 | Gilliam et al. |
| 8,006,446 B2 | 8/2011 | Constantz et al. |
| 2009/0001020 A1 | 1/2009 | Constantz et al. |
| 2009/0020044 A1 | 1/2009 | Constantz et al. |
| 2009/0169452 A1 | 7/2009 | Constantz et al. |
| 2009/0202410 A1 | 8/2009 | Kawatra et al. |
| 2009/0301352 A1 | 12/2009 | Constantz et al. |
| 2010/0000444 A1 | 1/2010 | Constantz et al. |
| 2010/0024686 A1 | 2/2010 | Constantz et al. |
| 2010/0051859 A1 | 3/2010 | House et al. |
| 2010/0063902 A1 | 3/2010 | Constantz et al. |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0084280 A1 | 4/2010 | Gilliam et al. |
| 2010/0111810 A1 | 5/2010 | Constantz et al. |
| 2010/0116683 A1 | 5/2010 | Gilliam et al. |
| 2010/0132556 A1 | 6/2010 | Constantz et al. |
| 2010/0132591 A1 | 6/2010 | Constantz et al. |
| 2010/0135865 A1 | 6/2010 | Constantz et al. |
| 2010/0135882 A1 | 6/2010 | Constantz et al. |
| 2010/0140103 A1 | 6/2010 | Gilliam et al. |
| 2010/0144521 A1 | 6/2010 | Constantz et al. |
| 2010/0150802 A1 | 6/2010 | Gilliam et al. |
| 2010/0154679 A1 | 6/2010 | Constantz et al. |
| 2010/0155258 A1 | 6/2010 | Kirk et al. |
| 2010/0158786 A1 | 6/2010 | Constantz et al. |
| 2010/0196104 A1 | 8/2010 | Constantz et al. |
| 2010/0200419 A1 | 8/2010 | Gilliam et al. |
| 2010/0219373 A1 | 9/2010 | Seeker et al. |
| 2010/0224503 A1 | 9/2010 | Kirk et al. |
| 2010/0229725 A1 | 9/2010 | Farsad et al. |
| 2010/0230293 A1 | 9/2010 | Gilliam et al. |
| 2010/0230830 A1 | 9/2010 | Farsad et al. |
| 2010/0236242 A1 | 9/2010 | Farsad et al. |
| 2010/0239467 A1 | 9/2010 | Constantz et al. |
| 2010/0239487 A1 | 9/2010 | Constantz et al. |
| 2010/0247410 A1 | 9/2010 | Constantz et al. |
| 2010/0258035 A1 | 10/2010 | Constantz et al. |
| 2010/0276299 A1 | 11/2010 | Kelly et al. |
| 2010/0290967 A1 | 11/2010 | Detournay et al. |
| 2010/0313793 A1 | 12/2010 | Constantz et al. |
| 2010/0313794 A1 | 12/2010 | Constantz et al. |
| 2010/0319586 A1 | 12/2010 | Blount et al. |
| 2010/0326328 A1 | 12/2010 | Constantz et al. |
| 2011/0030586 A1 | 2/2011 | Constantz et al. |
| 2011/0030957 A1 | 2/2011 | Constantz et al. |
| 2011/0033239 A1 | 2/2011 | Constantz et al. |
| 2011/0035154 A1 | 2/2011 | Kendall et al. |
| 2011/0036728 A1 | 2/2011 | Farsad et al. |
| 2011/0042230 A1 | 2/2011 | Gilliam et al. |
| 2011/0054084 A1 | 3/2011 | Constantz et al. |
| 2011/0059000 A1 | 3/2011 | Constantz et al. |
| 2011/0067600 A1 | 3/2011 | Constantz et al. |
| 2011/0067603 A1 | 3/2011 | Constantz et al. |
| 2011/0067605 A1 | 3/2011 | Constantz et al. |
| 2011/0071309 A1 | 3/2011 | Constantz et al. |
| 2011/0079515 A1 | 4/2011 | Gilliam et al. |
| 2011/0083968 A1 | 4/2011 | Gilliam et al. |
| 2011/0091366 A1 | 4/2011 | Kendall et al. |
| 2011/0091955 A1 | 4/2011 | Constantz et al. |
| 2011/0132234 A1 | 6/2011 | Constantz et al. |
| 2011/0147227 A1 | 6/2011 | Gilliam et al. |
| 2011/0203489 A1 | 8/2011 | Constantz et al. |
| 2011/0226989 A9 | 9/2011 | Seeker et al. |
| 2011/0240916 A1 | 10/2011 | Constantz et al. |
| 2011/0247336 A9 | 10/2011 | Farsad et al. |

FOREIGN PATENT DOCUMENTS

| | | |
|---|---|---|
| JP | 2000302500 A2 | 10/2000 |
| WO | WO 2008/018928 A2 | 2/2008 |
| WO | WO 2008/148055 A1 | 12/2008 |
| WO | WO 2009/006295 A2 | 1/2009 |
| WO | WO 2009/086460 A1 | 7/2009 |
| WO | WO 2009/146436 A1 | 12/2009 |
| WO | WO 2009/155378 A1 | 12/2009 |
| WO | WO 2010/006242 A1 | 1/2010 |
| WO | WO 2010/008896 A1 | 1/2010 |
| WO | WO 2010/009273 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/048457 A1 | 4/2010 |
| WO | WO 2010/051458 A1 | 5/2010 |
| WO | WO 2010/068924 A1 | 6/2010 |
| WO | WO 2010/074686 A1 | 7/2010 |
| WO | WO 2010/074687 A1 | 7/2010 |
| WO | WO 2010/087823 A1 | 8/2010 |
| WO | WO 2010/091029 A1 | 8/2010 |
| WO | WO 2010/093713 A1 | 8/2010 |
| WO | WO 2010/093716 A1 | 8/2010 |
| WO | WO 2010/101953 A1 | 9/2010 |
| WO | WO 2010/104989 A1 | 9/2010 |
| WO | WO 2010/132863 A1 | 11/2010 |
| WO | WO 2010/136744 A1 | 12/2010 |
| WO | WO 2011/008223 A1 | 1/2011 |
| WO | WO 2011/017609 A1 | 2/2011 |
| WO | WO 2011/038076 A1 | 3/2011 |
| WO | WO 2011/049996 A1 | 4/2011 |
| WO | WO 2011/066293 A1 | 6/2011 |
| WO | WO 2011/075680 A1 | 6/2011 |
| WO | WO 2011/081681 A1 | 7/2011 |
| WO | WO 2011/097468 A2 | 8/2011 |
| WO | WO 2011/102868 A1 | 8/2011 |

OTHER PUBLICATIONS

International Search Report dated Oct. 1, 2010 of PCT/US2010/45620.

Constantz, B. 2009. The Risk of Implementing New Regulations on Game-Changing Technology: Sequestering CO2 in the Built Environment. AGU, 90(22), Jt. Assem, Suppl., Abstract.

ACI Manual of Concrete Practice. Part 3—2010. Building Code Requirements for Structural Concrete (ACI 318-08) and Commentary, Chapter 4—Durability Requirements. American Concrete Institute, Farmington Hills, MI. pp. 318-55 to 318-61.

Ajikumar, P.K. et al. 2005. Synthesis and Characterization of Monodispersed Spheres of Amorphous Calcium Carbonate and Calcite Spherules. *Crystal Growth & Design.* 5(3): 1129-1134.

Architecture 2030 Ad Campaign. Think You're Making a Difference? Think Again. Issued by: 2030, Inc. / Architecture 2030 /The 2030 Research Center, http://www.architecture2030.org/news/multimedia.html. Accessed on Mar. 2, 2010.

ASTM Standard C305-99, 1999. "Standard Practice for Mechanical Mixing of Hydraulic Cement Pastes and Mortars of Plastic Consistency," ASTM International, West Conshohocken, PA, 1999, www.astm.org.

ASTM Standard C191-04b, 2004, "Standard Test Methods for Time of Setting of Hydraulic Cement by Vicat Needle," ASTM International, West Conshohocken, PA, 2004, www.astm.org.

ASTM C1437-01, 2001, "Standard Test Method for Flow of Hydraulic Cement Mortar," ASTM International, West Conshohocken, PA, 2001, www.astm.org.

Boerner, B.J. et al. 1987. Trona and Sodium Bicarbonate in Beef Cattle Diets: Effects on pH and Volatile Fatty Acid Concentrations. *Journal of Animal Science.* 65: 309-316.

Cement Association of Canada. 2009. Portland-Limestone Cement. *Backgrounder,* Aug. 2009. www.cement.ca.

Constantz, B. 2009. Sequestering CO2 in the Built Environment, Trans. American Geophysical Union Fall Meeting, Poster session 90(52), Fall Meet. Suppl., Abstract U11A-0013 San Francisco.

Dandeu, A. et al. 2006. Raman Spectroscopy—A Powerful Tool for the Quantitative Determination of the Composition of Polymorph Mixtures: Application to $CaCO_3$ Polymorph Mixtures. *Chem. Eng. Technol.* 29(2): 221-225.

Feldman, R.F. et al. 1965. Influence of $CaCO_3$ on the Hydration of $3CaO.Al_2O_3$, *Journal of the American Ceramic Society*. 48(1): 25-30.

Hawkins, P. et al. 2003. The Use of Limestone in Portland Cement: A State-of-the-art Review, EB227, Portland Cement Association, Skokie, Illinois, USA, 44 pages.

Hooton, R.D. et al. 2007. Portland-Limestone Cement: State-of-the-Art Report and Gap Analysis for CSA A 3000. Cement Association of Canada. University of Toronto.

Kontoyannis, C.G. et al. 2000. Calcium carbonate phase analysis using XRD and FT-Raman spectroscopy. *Analyst*. 125: 251-255.

Kralj, D. et al. 1997. Vaterite growth and dissolution in aqueous solution III. Kinetics of transformation. *Journal of Crystal Growth*. 177: 248-257.

Lam, R.S.K. et al. 2007. Synthesis-dependant structural variations in amorphous calcium carbonate. *CrystEngComm*. 9: 1226-1236.

Loste, E. et al. 2003. The role of magnesium in stabilising amorphous calcium carbonate and controlling calcite morphologies. *Journal of Crystal Growth*. 254: 206-218.

Lothenbach, B. et al. 2008. Influence of limestone on the hydration of Portland cements. *Cement and Concrete Research*. 38: 848-860.

Matschei, T. et al. 2007. The role of calcium carbonate in cement hydration. *Cement and Concrete Research*. 37: 551-558.

Metz, B. et al. Intergovernmental Panel on Climate Change, 2005—Carbon Dioxide Capture and Storage, IPCC Special Report. Bert Metz, Ogunlade Davidson, Heleen de Coninck, Manuela Loos and Leo Meyer (Eds.) Cambridge University Press, UK. pp. 431. http://www.ipcc.ch/publications_and_data/publications_and_data_reports.htm. Accessed on Mar. 2, 2010.

Mook, W.G. et al. 1986. $^{13}C$ in Atmospheric $CO_2$. *Netherlands Journal of Sea Research*. 20(2/3): 211-223.

Ogino, T. et al. 1987. The formation and transformation mechanism of calcium carbonate in water. *Geochimica et Cosmochimica Acta*. 51: 2757-2767.

Raz, S. et al. 2002. Stable Amorphous Calcium Carbonate Is the Main Component of the Calcium Storage Structures of the Crustacean *Orchestia cavimana*. *Biol. Bull*. 203: 269-274.

Shen, Q. et al. 2006. Properties of Amorphous Calcium Carbonate and the Template Action of Vaterite Spheres. *J. Phys. Chem. B*. 110: 2994-3000.

Spanos, N. et al. 1998. The transformation of vaterite to calcite: effect of the conditions of the solutions in contact with the mineral phase. *Journal of Crystal Growth*. 191: 783-790.

Tang, H. et al. 2008. Creation of calcite hollow microspheres with attached bundles of aragonite needles. *Cryst. Res. Technol*. 43(5): 473-478.

Turnbull, A.G. 1973. A thermochemical study of vaterite. *Geochimica et Cosmochimica Acta*. 37: 1593-1601.

U.S. Energy Information Administration, Emissions of Greenhouse Gases in the United States 2008, Report #: DOE/EIA-0573(2008), Release on Dec. 3, 2009. http://www.eia.doe.gov/oiaf/1605/ggrpt/carbon.html . Accessed on Feb. 27, 2010.

Voglis, N. et al. 2005. Portland-limestone cements. Their properties and hydration compared to those of other composite cements. *Cement & Concrete Composites*. 27: 191-196.

Weiner, S. et al. 2003. Biologically Formed Amorphous Calcium Carbonate. *Connective Tissue Research*. 44(Suppl. 1): 214-218.

Winn, R.T. 2003. Stable Isotope Geochemistry of Aeolian Sediment at Owens Lake, California. A thesis in Geoscience. Submitted to the Graduate Faculty of Texas Tech University.

Wolf, G. et al. 2000. Thermodynamic Aspects of the Vaterite-Calcite Phase Transition. *Journal of Thermal Analysis and Calorimetry*. 60: 463-472.

Wolf et. al. 2001. Thermophysical Investigations of the Polymorphous Phases of Calcium Carbonate. *Journal of Thermal Analysis and Calorimetry*, 65: 687-698.

METHODS AND COMPOSITIONS USING CALCIUM CARBONATE

CROSS-REFERENCE TO RELATED APPLICATIONS

This application is a divisional application of U.S. application Ser. No. 12/857,289, filed Aug. 16, 2010 now U.S. Pat. No. 8,062,418 which claims priority to U.S. Provisional Application No. 61/291,811, filed Dec. 31, 2009; U.S. Provisional Application No. 61/360,829, filed Jul. 1, 2010; and U.S. Provisional Application No. 61/371,606, filed Aug. 6, 2010, all of which are incorporated herein by reference in their entireties.

GOVERNMENT SUPPORT

Work described herein was made in whole or in part with Government support under Award Number: DE-FE0002472 awarded by the Department of Energy. The Government has certain rights in this invention.

BACKGROUND

Calcium carbonates are used in numerous industries from papermaking, to adhesives production, to construction. Calcium carbonates that are formed as a result of a carbon dioxide sequestering process can be used in many of the aforementioned applications and in effect serve two purposes: to sequester carbon dioxide and to function as a calcium carbonate material. One area where this dual purpose is doubly beneficial to the environment is in construction materials, specifically cements and concretes. As the production of conventional cements is one of the contributors to the emission of carbon dioxide into the atmosphere through the calcination of conventional cements as well as the energy needed to heat the kilns, reductions in the amount of conventional cements used can help to reduce the amount of carbon dioxide in the earth's atmosphere.

SUMMARY

In one aspect, there is provided a self-cementing composition, comprising at least 1% w/w vaterite in saltwater, wherein the composition upon rinsing with fresh water, setting, and hardening has a compressive strength of at least 14 MPa. In one aspect, there is provided a self-cementing composition, comprising 1% w/w to 99% w/w vaterite in saltwater, wherein the composition upon rinsing with fresh water, setting, and hardening has a compressive strength of at least 14 MPa.

In some embodiments, the composition is oven dried at 40° C. while setting. In some embodiments, the composition is cured at 60° C. in humid atmosphere after drying. In some embodiments, the composition is dewatered before rinsing with water.

In some embodiments, the composition upon combination with water, setting, and hardening has a compressive strength in a range of 14-35 MPa or 20-40 MPa.

In some embodiments, the composition has a $\delta^{13}C$ of between −12‰ to −25‰. In some embodiments, the composition has a $\delta^{13}C$ of less than −20‰. In some embodiments, the composition has a $\delta^{13}C$ of less than −25‰.

In some embodiments, the vaterite is in a range of 1% w/w to 99% w/w. In some embodiments, the vaterite is in a range of 40% w/w to 85% w/w. In some embodiments, the vaterite is in a range of 47% w/w to 99% w/w. In some embodiments, the composition further comprises ACC. In some embodiments, the vaterite is in a range of 10% w/w to 99% w/w and the ACC is in a range of 1% w/w to 90% w/w. In some embodiments, the vaterite is at least 75% w/w. In some embodiments, the vaterite is at least 90% w/w. In some embodiments, the vaterite is at least 95% w/w. In some embodiments, the vaterite is at least 99% w/w. In some embodiments, the ACC is at least 5% w/w. In some embodiments, the ACC is 5%-30% w/w.

In some embodiments, the composition further comprises a polymorph selected from the group consisting of amorphous calcium carbonate, aragonite, calcite, ikaite, a precursor phase of vaterite, a precursor phase of aragonite, an intermediary phase that is less stable than calcite, polymorphic forms in between these polymorphs, and combination thereof. In some embodiments, the vaterite and the polymorph are in a vaterite:polymorph ratio of 1:1 to 20:1. In some embodiments, the vaterite and the polymorph are in a vaterite:polymorph ratio of greater than 1:1, 2:1, 3:1, 4:1, or 5:1. In some embodiments, the vaterite and the polymorph are in a vaterite:polymorph ratio of 9:1-20:1.

In some embodiments, the composition further comprises one or more of polymorph selected from the group consisting of aragonite, calcite, and ikaite, wherein the aragonite, the calcite and/or the ikaite are present in at least 1% w/w. In some embodiments, the composition further comprises at least 1% w/w aragonite or between 1% w/w to 80% w/w aragonite. In some embodiments, the composition further comprises at least 1% w/w calcite or between 1% w/w to 80% w/w calcite. In some embodiments, the composition further comprises 1% w/w to 25% w/w calcite. In some embodiments, the composition further comprises at least 1% w/w ikaite or between 1% w/w to 80% w/w ikaite. In some embodiments, the composition further comprises at least 1% w/w ACC or between 1% w/w to 90% w/w ACC and one or more of polymorph selected from the group consisting of aragonite, calcite, and ikaite, wherein the aragonite, the calcite and/or the ikaite are present in at least 1% w/w or between 1% w/w to 80% w/w. In some embodiments, the composition further comprises one or more of polymorph selected from the group consisting of aragonite, calcite, ikaite, and combination thereof, wherein the aragonite, the calcite, the ikaite, or the combination thereof are independently in a range between 1% w/w to 80% w/w. In some embodiments, the composition further comprises 1%-80% w/w aragonite and 1%-80% w/w calcite.

In some embodiments, the composition further comprises strontium (Sr). In some embodiments, the Sr is present in an amount of 1-50,000 parts per million (ppm).

In some embodiments, the composition further comprises magnesium (Mg). In some embodiments, the Mg is present as a carbonate.

In some embodiments, the vaterite and the magnesium carbonate are in a vaterite:magnesium carbonate ratio of greater than 1:1 or between 1:1-500:1.

In some embodiments, the composition is a particulate composition with an average particle size of 0.1-100 microns. In some embodiments, the composition is a particulate composition with an average particle size of 1-50 microns. In some embodiments, the composition is a particulate composition with an average particle size of 1-10 microns.

In some embodiments, the composition has a bulk density of between 75 lb/ft³-170 lb/ft³. In some embodiments, the composition has a bulk density of between 75 lb/ft³-125 lb/ft³.

In some embodiments, the composition has an average surface area of from 0.5 m²/gm-50 m²/gm. In some embodiments, the composition has an average surface area of from 2 m²/gm-10 m²/gm.

In some embodiments, the composition further comprises nitrogen oxide, sulfur oxide, mercury, metal, derivative of any of nitrogen oxide, sulfur oxide, mercury, and/or metal, or combination thereof.

In some embodiments, the composition has a zeta potential of greater than −25 mV. In some embodiments, the composition has a zeta potential of between −25 to 45 mV or between −25 to 10 mV. In some embodiments, the composition has a zeta potential in a range of −25 mV to 1 mV.

In some embodiments, a ratio of a calcium ion:carbonate ion in the composition is greater than 1:1. In some embodiments, a ratio of a calcium ion:carbonate ion in the composition is 1.5:1 or 2:1.

In some embodiments, the composition is synthetic. In some embodiments, the composition is non-naturally occurring. In some embodiments, the composition is in a powdered form. In some embodiments, the composition is in a dry powdered form. In some embodiments, the composition is disordered or is not in an ordered array.

In one aspect, there is provided a formed building material, comprising the above recited composition of the invention or the set and hardened form thereof. In some embodiments, the building material is selected from the group consisting of building, driveway, foundation, kitchen slab, furniture, pavement, road, bridges, motorway, overpass, parking structure, brick, block, wall, footing for a gate, fence, or pole, and combination thereof. In one aspect, there is provided a formed building material, comprising the above recited composition of the invention or the set and hardened form thereof. In one aspect, there is provided an aggregate, comprising the above recited composition of the invention or the set and hardened form thereof. In one aspect, there is provided a package, comprising the above recited composition of the invention and a packaging material adapted to contain the composition.

In one aspect, there is provided a method for making the above recited composition of the invention, comprising (a) contacting an alkaline earth-metal containing water with a a $CO_2$ source; and (b) subjecting the alkaline earth-metal containing water of step (a) to one or more conditions to make the above recited composition of the invention.

In some embodiments, the $CO_2$ source is an industrial waste stream comprising flue gas from combustion; a flue gas from a chemical processing plant; a flue gas from a plant that produces $CO_2$ as a byproduct; or combination thereof. In some embodiments, the alkaline earth-metal containing water is sea water, brine, or combination thereof. In some embodiments, the one or more conditions comprise one or more of precipitation and dewatering of the precipitate to make the composition. In some embodiments, the one or more conditions comprise contacting the alkaline earth-metal containing water with a proton removing agent. In some embodiments, the proton removing agent is selected from the group consisting of oxide, hydroxide, carbonate, coal ash, naturally occurring mineral, and combination thereof. In some embodiments, the one or more conditions comprise subjecting the alkaline earth-metal containing water to electrochemical condition.

In one aspect, there is provided a composition made by the method described as above.

In one aspect, there is provided a system for making the above recited composition of the invention, comprising (a) an input for an alkaline earth-metal containing water; (b) an input for a $CO_2$ source; and (c) a reactor connected to the inputs of step (a) and step (b) that is configured to make the composition of the invention.

In one aspect, there is provided a method for making a cement product from the above recited composition of the invention, comprising (a) combining the composition of the invention with water under one or more suitable conditions; and (b) allowing the composition to set and harden into a cement product.

In some embodiments, the one or more suitable conditions are selected from the group consisting of dewatering, rinsing with water, setting, drying, curing, and combination thereof.

In some embodiments, the method further comprises transporting the product to a subterranean location.

In one aspect, there is provided a system for making a cement product from the above recited composition of the invention, comprising (a) an input for the composition of the invention; (b) an input for water; and (c) a reactor connected to the inputs of step (a) and step (b) configured to mix the above recited composition of the invention with water under one or more suitable conditions to make a cement product.

In one aspect, there is provided a method for making formed building material from the above recited composition of the invention, comprising (a) combining the above recited composition of the invention with an aqueous medium under one or more suitable conditions; and (b) allowing the composition to set and harden into the formed building material.

In some embodiments, the aqueous medium comprises fresh water. In some embodiments, the composition is poured into molds before or after step (a) of combination. In some embodiments, the mold is for the formed building material.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 7A illustrates precipitation of calcite on the surface of vaterite spheres. By the dissolution of the more soluble vaterite phase, hollow calcite microspheres develop.

FIG. 7B illustrates precipitation of aragonite bundles on the surface of the continually hollowing microspheres.

FIG. 10A illustrates transformation of vaterite in NaCl solution at room temperature. FIG. 10B illustrates transformation of vaterite in NaCl solution at 110° C.

DETAILED DESCRIPTION

Figure 1:
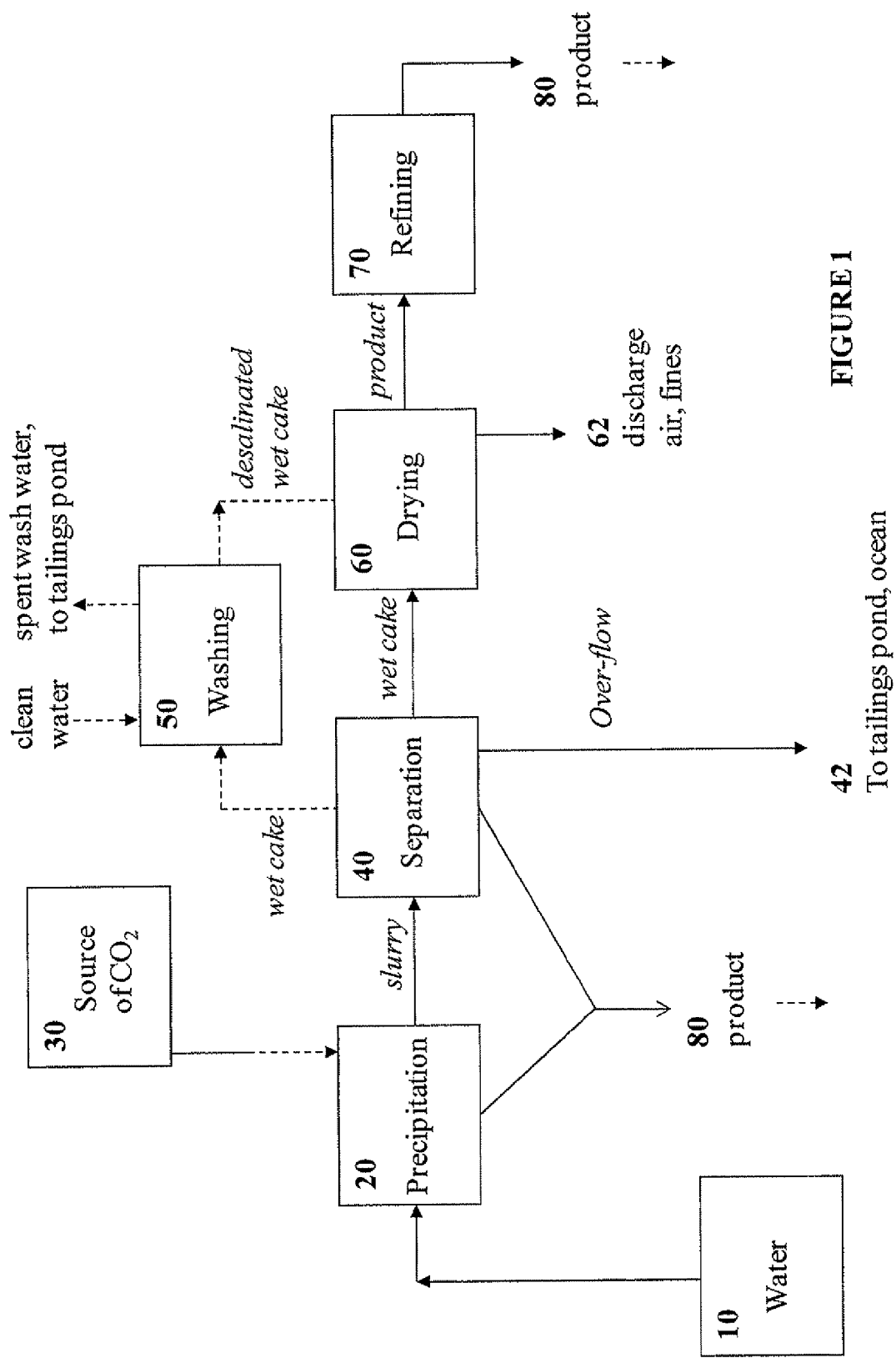
FIG. 1 illustrates a flow diagram of a precipitation process according to an embodiment of the invention.

This invention provides compositions, methods, and systems of polymorphs, such as amorphous calcium carbonate, vaterite, aragonite, calcite, and/or ikaite; methods and systems for making and using the compositions; and the materials formed from such compositions, such as aggregates and formed or pre-formed building materials.

The compositions include hydraulic cement, supplementary cementitious material, or self-cementing compositions that include polymorph forms of calcium carbonate, such as, but not limited to, vaterite ($CaCO_3$) alone or vaterite in combination with amorphous calcium carbonate ($CaCO_3.nH_2O$), aragonite ($CaCO_3$), calcite ($CaCO_3$), ikaite ($CaCO_3.6H_2O$), a precursor phase of vaterite, a precursor phase of aragonite, an intermediary phase that is less stable than calcite, polymorphic forms in between these polymorphs, or combination thereof. Also provided herein are the formed building materials and aggregates that are made from these compositions. Further provided herein are methods of making and using the hydraulic cements, supplementary cementitious material, or self-cementing compositions. Further provided herein are methods of making cement products, such as, aggregates and pre-formed building materials from the hydraulic cement, supplementary cementitious material, or self-cementing compositions. The compositions find use in a variety of applications, including use in a variety of building materials and building applications.

Typically, Ordinary Portland Cement (OPC) is made primarily from limestone, certain clay minerals, and gypsum, in a high temperature process that drives off carbon dioxide and chemically combines the primary ingredients into new compounds. The energy required to fire the mixture consumes about 4 GJ per ton of cement produced. Because the carbon dioxide is generated by both the cement production process itself, as well as by energy plants that generate power to run the production process, cement production may be a leading source of current carbon dioxide atmospheric emissions. In addition to the pollution problems associated with Portland cement production, the structures produced with Portland cements may have a repair and maintenance expense because of the instability of the cured product produced from Portland cement.

The compositions provided herein, may reduce the carbon foot print by using the carbon dioxide emitted from the power plants or other industrial sources and sequestering them into the formation of the compositions of the invention. Alternatively, the compositions provided herein may reduce the carbon foot print by using the subterranean carbonated brines to prepare the compositions of the invention. Further alternatively, the compositions provided herein may reduce the carbon foot print by producing the cement compositions that partially or completely replace the carbon emitting cements, such as OPC. The compositions of the invention may be mixed with OPC to give the cement material with equal or higher strength, thereby reducing the amount of OPC to make cement.

The compositions provided herein also show surprising and unexpected properties as the products obtained from the compositions (either alone or in combination with OPC) have high compressive strength resulting in products with high durability and less maintenance costs. The compositions of the invention may also be optimized to result in materials with desired compressive strengths and thereby, further increasing the efficiency of the process and reducing the cost of production. For example, the compressive strength required for a roof-tile may not be as high as the compressive strength required for pillars. The compositions of the invention and the process to make the cement products from the compositions of the invention may be optimized to result in cement products with desired compressive strength.

Additionally, the methods of the invention may be optimized to give compositions that differ in their reactivity with water or with other cement. For example, the compositions of the invention may either be formed as hydraulic cement compositions or as a supplementary cementitious material or as a self-cementing material depending on their reactivity with water. In some embodiments, the SCM compositions of the invention may be mixed with Portland cement to result in the cement with an equal or higher compressive strength than the Portland cement itself or the Portland cement in combination with other SCM known in the art.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

I. Compositions

Aspects of the invention include compositions including hydraulic cement, supplementary cemetitious material (SCM), and self-cementing composition, where the hydraulic cement or the SCM or the self-cementing composition includes metastable and stable carbonate forms such as, vaterite, amorphous calcium carbonate (ACC), aragonite, calcite, ikaite, a precursor phase of vaterite, a precursor phase of aragonite, an intermediary phase that is less stable than calcite, polymorphic forms in between these polymorphs, and combination thereof. The precursor of vaterite, vaterite, precursor of aragonite, and aragonite can be utilized as a reactive metastable calcium carbonate forms for reaction purposes and stabilization reactions, such as cementing.

The metastable forms such as vaterite and precursor to vaterite and stable carbonate forms, such as, calcite, may have varying degrees of solubility so that they may dissolve when hydrated in aqueous solutions and reprecipitate stable carbonate minerals, such as calcite and/or aragonite.

The compositions of the invention including metastable forms, such as vaterite, surprisingly and unexpectedly are stable compositions in a dry powdered form or in a slurry containing saltwater. The metastable forms in the compositions of the invention may not completely convert to the stable forms, such as calcite, for cementation until contacted with fresh water.

Vaterite may be present in monodisperse or agglomerated form, and may be in spherical, ellipsoidal, plate like shape, or hexagonal system. Vaterite typically has a hexagonal crystal structure and forms polycrystalline spherical particles upon growth. The precursor form of vaterite comprises nanoclusters of vaterite and the precursor form of aragonite comprises sub-micron to nanoclusters of aragonite needles. Aragonite, if present in the composition, may be needle shaped, columnar, or crystals of the rhombic system. Calcite, if present, may be cubic, spindle, or crystals of hexagonal system. An intermediary phase that is less stable than calcite may be a phase that is between vaterite and calcite, a phase between precursor of vaterite and calcite, a phase between aragonite and calcite, and/or a phase between precursor of aragonite and calcite.

In some embodiments, the compositions of the invention are synthetic compositions and are not naturally occurring. In some embodiments, the composition of the invention is in a powder form. In some embodiments, the composition of the invention is in a dry powder form. In some embodiments, the composition of the invention is disordered or is not in an ordered array or is in the powdered form. In still some embodiments, the composition of the invention is in a partially or wholly hydrated form. In still some embodiments, the composition of the invention is in saltwater or fresh water. In still some embodiments, the composition of the invention is in water containing sodium chloride. In still some embodiments, the composition of the invention is in water containing alkaline earth metal ions, such as, but are not limited to, calcium, magnesium, etc.

The compositions provided herein show unexpected properties, such as, high compressive strength, high durability, and less maintenance costs. In addition, in some embodiments, when the $CO_2$ is sequestered from flue gas or from carbonated brines into the calcium carbonate forms of the invention, it reduces carbon footprint and provides cleaner environment. In some embodiments, the compositions upon combination with water, setting, and hardening, have a compressive strength of at least 14 MPa (megapascal) or in some embodiments, between 14-80 MPa or 14-35 MPa. In some embodiments, the vaterite containing compositions provided herein are formed from $CO_2$ source that has a fossil fuel origin. Accordingly, in some embodiments, the compositions provided herein have a carbon isotopic fractionation value ($\delta^{13}C$) of less than −12‰. In some embodiments, the compositions of the invention are non-medical or are not for medical procedures. In some embodiments, the compositions of the invention are synthetic compositions and are not naturally occurring.

In a first aspect, there is provided a composition including hydraulic cement where the hydraulic cement includes at least 47% w/w vaterite, wherein the composition upon combination with water, setting, and hardening has a compressive strength of at least 14 MPa. In a second aspect, there is provided a composition including a hydraulic cement where the hydraulic cement includes at least 47% w/w vaterite, wherein the composition has a $\delta^{13}C$ of less than −12‰. As used herein, "hydraulic cement" includes a composition which sets and hardens after combining with water or a solution where the solvent is water, e.g., an admixture solution. After hardening, the compositions retain strength and stability even under water. As a result of the immediately starting reactions, stiffening can be observed which may increase with time. After reaching a certain level, this point in time may be referred to as the start of setting. The consecutive further consolidation may be called setting, after which the phase of hardening begins. The compressive strength of the material may then grow steadily, over a period which ranges from a few days in the case of "ultra-rapid-hardening" cements, to several months or years in the case of other cements. Setting and hardening of the product produced by combination of the composition of the invention with an aqueous liquid may or may not result from the production of hydrates that may be formed from the composition upon reaction with water, where the hydrates are essentially insoluble in water. Cements may be employed by themselves or in combination with aggregates, both coarse and fine, in which case the compositions may be referred to as concretes or mortars. Cements may also be cut and chopped to form aggregates.

In a third aspect, there is provided a composition including a supplementary cementitious material (SCM) where the SCM includes at least 47% w/w vaterite, wherein the composition upon combination with water or water and cement; setting; and hardening, has a compressive strength of at least 14 MPa. In a fourth aspect, there is provided a composition including a SCM where the SCM includes at least 47% w/w vaterite, wherein the composition has a carbon isotopic fractionation value ($\delta^{13}C$) of less than −12‰.

As used herein, "supplementary cementitious material" (SCM) includes SCM as is well known in the art. For example, when SCM of the invention is mixed with Portland cement, one or more properties of that Portland cement after interaction with SCM substantially remain unchanged or are enhanced as compared to the Portland cement itself without SCM or the Portland cement mixed with conventional SCM (such as fly ash). The properties include, but are not limited to, fineness, soundness, consistency, setting time of cement, hardening time of cement, rheological behavior, hydration reaction, specific gravity, loss of ignition, and/or hardness, such as compressive strength of the cement. For example, when 20% of SCM of the invention is added to 80% of OPC (ordinary Portland cement), the one or more properties, such as, e.g., compressive strength, of OPC either remain unchanged, decrease by no more than 10%, or are enhanced. The properties of Portland cement may vary depending on the type of Portland cement. The substitution of Portland cement with the SCM of the invention may reduce the $CO_2$ emissions without compromising the performance of the cement or the concrete as compared to regular Portland cement.

In some embodiments, maximum replacement volume of Portland cement with the SCM of the invention can be determined by carrying out various performance tests on cement and/or concrete, after mixing the SCM with OPC (for cement) and aggregate and/or sand (for concrete). Such tests can be used as parameters for testing the amount of the SCM of the invention that can be used to replace the OPC. The property, such as, fineness of the cement, for example, may affect the rate of hydration. Greater fineness may increase the surface available for hydration, causing greater early strength and more rapid generation of heat. The Wagner Turbidimeter and the Blaine air permeability test for measuring cement fineness are both required by the American Society for Testing Materials (ASTM) and the American Association for State Highway Transportation Officials (AASHTO). Soundness, which is the ability of hardened cement paste to retain its volume after setting, can be characterized by measuring the expansion of mortar bars in an autoclave. The compressive strength of 2-inch (50-mm) mortar cubes after 7 days may not be less than 2,800 psi (19.3 MPa) for Type I cement.

In some embodiments, Portland clinker may be interground with the SCM of the invention to give Portland cement blend. The amount of SCM added to the Portland clinker may be optimized based on the size and the distribution of the particles in the blend. In some embodiments, on an average, the finely ground SCM of the invention is half the size of the particle of the clinker which in turn is smaller than the clinker particle size in regular Portland cement. This may provide the blend with a particle packing effect, which may increase the strength of the concrete.

In some embodiments, the vaterite in the SCM composition of the invention may react with the Portland cement or Portland clinker. In some embodiments, the aluminates from the clinker fraction may combine with the carbonate of the SCM to form carboaluminates which may reduce the porosity of the concrete and increase its strength. In some embodiments, the SCM composition of the invention may act as a filler. In some embodiments, the size of the particles and/or the surface area of the particles may affect the interaction of the SCM composition of the invention with the Portland cement or Portland clinker. In some embodiments, the SCM composition of the invention may provide nucleation sites for the Portland cement or the Portland clinker. In some embodiments, the SCM composition of the invention may possess a combination of the foregoing embodiments.

Examples of such tests for concrete include, but are not limited to, concrete compressive strength, concrete flexural strength, conceret splitting tensile strength, concrete modulus of elasticity, concrete shrinkage, concrete resistance to alkali-silica reactivity, concrete resistance to sulfate attack, concrete resistance to freezing and thawing, concrete resistance to scaling, and concrete resistance to passage of chloride ions.

In some embodiments, the SCM composition of the invention may differ from the hydraulic cement composition of the invention in reactivity. In some embodiments, the SCM composition of the invention may not be an effective hydraulic cement composition and vice versa. For example, in some embodiments, the SCM composition of the invention alone upon combination with water, setting and hardening may not result in the same compressive strength as the hydraulic cement composition of the invention upon combination with water, setting and hardening. However, such SCM composition upon mixing with other cement, such as, Portland cement gives surprisingly and unexpectedly high compressive strengths, as described below.

In some embodiments, there is provided a composition including a supplementary cementitious material (SCM) where the SCM includes at least 50% w/w calcite, wherein the composition upon combination with water or water and cement; setting; and hardening, has a compressive strength of at least 14 MPa. In a fourth aspect, there is provided a composition including a SCM where the SCM includes at least 50% w/w calcite, wherein the composition has a carbon isotopic fractionation value ($\delta^{13}C$) of less than −12‰. In some embodiments, the calcite in the foregoing embodiments is between 50-100% w/w; or between 50-99% w/w; or between 50-95% w/w; or between 50-90% w/w; or between 50-85% w/w; or between 50-80% w/w; or between 50-70% w/w; or between 50-60% w/w; or between 50-55% w/w. In some embodiments, the foregoing SCM composition containing at least 50% w/w calcite, further comprises vaterite, aragonite, or ACC in at least 1% w/w, or 10% w/w, or 50% w/w, or between 1-50% w/w.

In a fifth aspect, there is provided a composition including a SCM, wherein at least 16% by wt of SCM mixed with OPC results in no more than 10% reduction in compressive strength of OPC at 28 days as compared to OPC alone. In a sixth aspect, there is provided a composition including a SCM, wherein at least 16% by wt of SCM mixed with OPC results in more than 5% increase in compressive strength of OPC at 28 days as compared to OPC alone.

In some embodiments, at least 17% by wt of SCM; or at least 18% by wt of SCM; or at least 19% by wt of SCM; or at least 20% by wt of SCM; or at least 21% by wt of SCM; or at least 22% by wt of SCM; or at least 23% by wt of SCM; or at least 24% by wt of SCM; or at least 25% by wt of SCM; or at least 30% by wt of SCM; or at least 40% by wt of SCM; or at least 50% by wt of SCM; or between 16-50% by wt of SCM; or between 16-40% by wt of SCM; or between 16-30% by wt of SCM; or between 16-25% by wt of SCM; or between 16-22% by wt of SCM; or between 16-20% by wt of SCM; or between 16-18% by wt of SCM; or between 18-50% by wt of SCM; or between 18-40% by wt of SCM; or between 18-30% by wt of SCM; or between 18-20% by wt of SCM; or between 20-50% by wt of SCM; or between 20-40% by wt of SCM; or between 20-30% by wt of SCM; or between 30-50% by wt of SCM; or between 30-40% by wt of SCM; or between 40-50% by wt of SCM; or 16% by wt of SCM; or 17% by wt of SCM; or 18% by wt of SCM; or 19% by wt of SCM; or 20% by wt of SCM; or 22% by wt of SCM; or 25% by wt of SCM; mixed with OPC results in no more than 10% reduction in compressive strength of OPC at 28 days, as compared to OPC alone or results in more than 5% increase in compressive strength of OPC at 28 days as compared to OPC alone. For example, at least 17-20% by wt of SCM or 20% by wt of SCM mixed with OPC results in no more than 10% reduction in the compressive strength of OPC at 28 days, as compared to OPC alone or results in more than 5% increase in compressive strength of OPC at 28 days as compared to OPC alone.

In some embodiments, the compressive strength of Portland cement is in a range of 17-45 MPa. Accordingly, in some embodiments, there is provided a composition including a SCM, wherein at least 16% by wt of SCM mixed with OPC results in no more than 10% reduction in compressive strength of OPC at 28 days wherein the compressive strength of OPC is in a range of 17-45 MPa. In some embodiments, there is provided a composition including a SCM, wherein at least 16% by wt of SCM mixed with OPC results in more than 5% increase in compressive strength of OPC at 28 days wherein the compressive strength of OPC is in a range of 17-45 MPa. In some embodiments, the compressive strength of Portland cement is in a range of 17-40 MPa; or in a range of 17-35 MPa; or in a range of 17-30 MPa; or in a range of 17-25 MPa; or in a range of 17-23 MPa; or in a range of 17-22 MPa; or in a range of 17-21 MPa; or in a range of 17-20 MPa; or in a range of 17-19 MPa; or in a range of 17-18 MPa; or in a range of 18-35 MPa; or in a range of 20-35 MPa; or in a range of 18-25 MPa. For example, in some embodiments, the compressive strength of Portland cement is in a range of 17-35 MPa.

The compressive strength of OPC may vary depending on the type of OPC. The types of OPC include, Type I, Type II, Type III, Type IV, Type V, Type IA, Type IIA, and Type IIIA. Table I illustrates the compressive strength (in MPa) of various types of Portland cement at 1 day, 3 days, 7 days, and 28 days of curing time.

TABLE I

| Curing time | Portland cement type | | | | | | | |
|---|---|---|---|---|---|---|---|---|
| | I | IA | II | IIA | III | IIIA | IV | V |
| 1 day | — | — | — | — | 12.4 | 10.0 | — | — |
| 3 days | 12.4 | 10.0 | 10.3 | 8.3 | 24.1 | 19.3 | — | 8.3 |
| 7 days | 19.3 | 15.5 | 17.2 | 13.8 | — | — | 6.9 | 15.2 |
| 28 days | — | — | — | — | — | — | 17.2 | 20.7 |

In some embodiments, at least 16% by wt of SCM mixed with OPC results in no more than 10%; or no more than 9%; or no more than 8%; or no more than 7%; or no more than 6%; or no more than 5%; or no more than 4%; or no more than 3%; or no more than 2%; or no more than 1%; or no more than 1-5%; or no more than 5-10%; or no more than 6-10%; or no more than 8-10%; reduction in compressive strength of OPC at 28 days as compared to OPC alone or as compared to the compressive strength of Portland cement in a range of 17-45 MPa. In some embodiments, at least 16% by wt of SCM mixed with OPC results in no more than 5 MPa; or no more than 4 MPa; or no more than 3 MPa; or no more than 2 MPa; or no more than 1 MPa; or no more than 0.5 MPa; or no more than 0.5-1 MPa; or no more than 0.5-2 MPa; or no more than 0.5-3 MPa, or no more than 0.5-5 MPa, reduction in compressive strength of OPC at 28 days as compared to OPC alone or as compared to the compressive strength of Portland cement in a range of 17-45 MPa.

In some embodiments, there is provided a composition including a SCM, wherein at least 16% by wt of SCM mixed with OPC results in more than 5%; or more than 8%; or more than 10%; or more than 15%; or more than 20%; or more than 25%; or more than 30%; or more than 5-10%; or more than 5-15%; or more than 5-8%; or more than 5-20%; or more than 5-30%, increase in compressive strength of OPC at 28 days as compared to OPC alone or as compared to the compressive strength of Portland cement in a range of 17-45 MPa. In some embodiments, there is provided a composition including a SCM, wherein the at least 16% by wt of SCM mixed with OPC results in between 1-20 MPa; or between 1-15 MPa; or between 1-12 MPa; or between 1-10 MPa; or between 1-8 MPa; or between 1-5 MPa; or between 1-4 MPa; or between 1-3 MPa; or between 1-2 MPa; or 1 or 2 or 3 MPa; or more than 1 MPa, increase in compressive strength of OPC at 28 days when compared to OPC alone or as compared to the compressive strength of Portland cement in a range of 17-45 MPa.

In a seventh aspect, there is provided a self-cementing composition including at least 1% w/w vaterite in saltwater, wherein the composition upon rinsing with fresh water, setting, and hardening has a compressive strength of at least 14 MPa. The self-cementing composition of the invention is in saltwater. As used herein, the "saltwater" is employed in its conventional sense to include a number of different types of aqueous medium other than fresh water, including, but not limited to brackish water, sea water, brine (including man-made brines, e.g., geothermal plant wastewaters, desalination waste waters, etc), as well as other salines having a salinity that is greater than that of freshwater. Brine is water saturated or nearly saturated with salt and has a salinity that is 50 ppt (parts per thousand) or greater. Brackish water is water that is saltier than fresh water, but not as salty as seawater, having a salinity ranging from 0.5 to 35 ppt. Seawater is water from a sea or ocean and has a salinity ranging from 35 to 50 ppt. The saltwater source from which the composition of the invention is derived may be a naturally occurring source, such as a sea, ocean, lake, swamp, estuary, lagoon, etc., or a man-made source. In some embodiments, the saltwater includes water containing more than 1% chloride content, such as, NaCl; or more than 10% NaCl; or more than 20% NaCl; or more than 30% NaCl; or more than 40% NaCl; or more than 50% NaCl; or more than 60% NaCl; or more than 70% NaCl; or more than 80% NaCl; or more than 90% NaCl; or between 1-95% NaCl; or between 10-95% NaCl; or between 20-95% NaCl; or between 30-95% NaCl; or between 40-95% NaCl; or between 50-95% NaCl; or between 60-95% NaCl; or between 70-95% NaCl; or between 80-95% NaCl; or between 90-95% NaCl.

In some embodiments, the self-cementing composition that is in saltwater includes less than 90% by wt solid material; or less than 80% by wt solid material; or less than 70% by wt solid material; or less than 60% by wt solid material; or less than 50% by wt solid material; or less than 40% by wt solid material; or less than 30% by wt solid material; or less than 20% by wt solid material; or less than 10% by wt solid material; or between 10-90% by wt solid material; or between 10-80% by wt solid material; or between 10-70% by wt solid material; or between 10-50% by wt solid material; or between 10-30% by wt solid material; or between 40-90% by wt solid material; or between 50-90% by wt solid material.

The self-cementing composition need not be dewatered and dried to make the hydraulic cement. Such composition can be simply dewatered, washed with water to partially or completely remove chloride, such as, sodium chloride, optionally dewatered again, and poured into molds where it sets and hardens to form a rock, pre-cast or pre-formed building materials. The rock can be further processed to make aggregates. Such absence of the step of drying saves energy, reduces the carbon foot print, and provides a cleaner environment. This composition may or may not include a binder. In some embodiments, the self-cementing composition does not include a binder. In some embodiments, the invention provides a self-cementing composition that does not contain binders and leads to a self-cementing synthetic rock. The methods of the invention allow for production of a hard, durable rock through processes that involve physical reactions without the need for extrinsic or intrinsic binders. Thus, in some embodiments the invention provides self-cementing composition that contains less than 10, 5, 2, 1, 0.5, 0.2, 0.1, 0.05, 0.02, 0.01, 0.005, 0.001, 0.0005, 0.0001% w/w of binder, where binder includes compounds or substances that are added to a self-cementing composition in order to cause or promote chemical reactions that cause components of the self-cementing composition to bind together during a synthetic process. Examples of binders include, but are not limited to, acrylic polymer liquid, lime, volcanic ash, etc. In some embodiments, the self-cementing composition of the invention includes substantially no binder.

Such self-cementing composition can be artificially lithified in processes that mimic geologic processes in which physical, rather than chemical, processes are the processes by which rocks are formed, e.g., dissolution and reprecipitation of compounds in new forms that serve to bind the composition together. Such self-cementing composition, in certain embodiments, contains one or more carbonate compounds, e.g., carbonate compounds derived from a fossil fuel source. The self-cementing composition may in some embodiments have a carbon isotopic fractionation ($\delta^{13}C$) value more negative than (less than) −12‰, or −13‰, or −14‰, or −15‰ or −18‰, or −22‰, or −26‰ or −30‰, or −32‰, or −36‰, as described herein in detail.

The self-cementing composition when rinsed with water may lead to a synthetic rock in a process in which polymorphs recited herein, such as, vaterite, is converted to more stable components, such as aragonite, calcite, or combination thereof. For example, in some embodiments, the synthetic rock is produced from the self-cementing composition in a process where aragonite is converted to calcite, and/or vaterite is converted to aragaonite and/or calcite.

In some embodiments of the foregoing aspects, the composition includes at least 47% w/w vaterite; or at least 50% w/w vaterite; or at least 60% w/w vaterite; or at least 70% w/w vaterite; or at least 75% w/w vaterite; or at least 80% w/w vaterite; or at least 85% w/w vaterite; or at least 90% w/w vaterite; or at least 95% w/w vaterite; or from 47% w/w to 100% w/w vaterite; or from 47% w/w to 99% w/w vaterite; or from 47% w/w to 95% w/w vaterite; or from 47% w/w to 90% w/w vaterite; or from 47% w/w to 85% w/w vaterite; or from 47% w/w to 80% w/w vaterite; or from 47% w/w to 75% w/w vaterite; or from 47% w/w to 70% w/w vaterite; or from 47% w/w to 65% w/w vaterite; or from 47% w/w to 60% w/w vaterite; or from 47% w/w to 55% w/w vaterite; or from 47% w/w to 50% w/w vaterite; or from 50% w/w to 100% w/w vaterite; or from 50% w/w to 90% w/w vaterite; or from 50% w/w to 80% w/w vaterite; or from 50% w/w to 75% w/w vaterite; or from 50% w/w to 70% w/w vaterite; or from 50% w/w to 60% w/w vaterite; or from 60% w/w to 100% w/w vaterite; or from 60% w/w to 90% w/w vaterite; or from 60% w/w to 80% w/w vaterite; or from 60% w/w to 70% w/w vaterite; or from 70% w/w to 100% w/w vaterite; or from 70% w/w to 95% w/w vaterite; or from 70% w/w to 90% w/w vaterite; or from 70% w/w to 85% w/w vaterite; or from 70% w/w to 80% w/w vaterite; or from 70% w/w to 75% w/w vaterite; or from 80% w/w to 100% w/w vaterite; or from 80% w/w to 95% w/w vaterite; or from 80% w/w to 90% w/w vaterite; or from 80% w/w to 85% w/w vaterite; or from 90% w/w to 100% w/w vaterite; or from 90% w/w to 99% w/w vaterite; or from 90% w/w to 98% w/w vaterite; or from 90% w/w to 95% w/w vaterite; or from 90% w/w to 92% w/w vaterite; or 47% w/w vaterite; or 50% w/w vaterite; or 55% w/w vaterite; or 60% w/w vaterite; or 65% w/w vaterite; or 70% w/w vaterite; or 75% w/w vaterite; or 80% w/w vaterite; or 85% w/w vaterite; or 90% w/w vaterite; or 92% w/w vaterite; or 95% w/w vaterite; or 98% w/w vaterite; or 99% w/w vaterite.

In some embodiments of the foregoing aspects and the foregoing embodiment, the composition further includes ACC. In such compositions, the amount of ACC is at least 1% w/w; or at least 2% w/w ACC; or at least 5% w/w ACC; or at least 10% w/w ACC; or at least 20% w/w ACC; or at least 30% w/w ACC; or at least 40% w/w ACC; or at least 50% w/w ACC; or at least 53% w/w ACC; or from 1% w/w to 53% w/w ACC; or from 1% w/w to 50% w/w ACC; or from 1% w/w to 40% w/w ACC; or from 1% w/w to 30% w/w ACC; or from 1% w/w to 20% w/w ACC; or from 1% w/w to 10% w/w ACC; or from 5% w/w to 53% w/w ACC; or from 5% w/w to 50% w/w ACC; or from 5% w/w to 40% w/w ACC; or from 5% w/w to 30% w/w ACC; or from 5% w/w to 20% w/w ACC; or from 5% w/w to 10% w/w ACC; or from 10% w/w to 53% w/w ACC; or from 10% w/w to 50% w/w ACC; or from 10% w/w to 40% w/w ACC; or from 10% w/w to 30% w/w ACC; or from 10% w/w to 20% w/w ACC; or from 20% w/w to 53% w/w ACC; or from 20% w/w to 50% w/w ACC; or from 20% w/w to 40% w/w ACC; or from 20% w/w to 30% w/w ACC; or from 30% w/w to 53% w/w ACC; or from 30% w/w to 50% w/w ACC; or from 30% w/w to 40% w/w ACC; or from 40% w/w to 53% w/w ACC; or from 40% w/w to 50% w/w ACC; or from 50% w/w to 53% w/w ACC.

In an eighth aspect, there is provided a composition including a hydraulic cement where the hydraulic cement includes at least 10% w/w vaterite and at least 1% w/w amorphous calcium carbonate (ACC), wherein the composition upon combination with water, setting, and hardening has a compressive strength of at least 14 MPa. In a ninth aspect, there is provided a composition including a hydraulic cement where the hydraulic cement includes at least 10% w/w vaterite and at least 1% w/w ACC, wherein the composition has a $\delta^{13}C$ of less than −12‰.

In a tenth aspect, there is provided a composition including a SCM where the SCM includes at least 10% w/w vaterite and at least 1% w/w ACC, wherein the composition upon combination with water or water and cement; setting; and hardening has a compressive strength of at least 14 MPa. In an eleventh aspect, there is provided a composition including a SCM where the SCM includes at least 10% w/w vaterite and at least 1% w/w amorphous calcium carbonate (ACC), wherein the composition has a $\delta^{13}C$ of less than −12‰.

In some embodiments of the foregoing aspects and embodiments, the composition includes at least 10% w/w vaterite; or at least 20% w/w vaterite; or at least 30% w/w vaterite; or at least 40% w/w vaterite; or at least 50% w/w vaterite; or at least 60% w/w vaterite; or at least 70% w/w vaterite; or at least 80% w/w vaterite; or at least 90% w/w vaterite; or at least 95% w/w vaterite; or at least 99% w/w vaterite; or from 10% w/w to 99% w/w vaterite; or from 10% w/w to 95% w/w vaterite; or from 10% w/w to 90% w/w vaterite; or from 10% w/w to 80% w/w vaterite; or from 10% w/w to 70% w/w vaterite; or from 10% w/w to 60% w/w vaterite; or from 10% w/w to 50% w/w vaterite; or from 10% w/w to 40% w/w vaterite; or from 10% w/w to 30% w/w vaterite; or from 10% w/w to 20% w/w vaterite; or from 20% w/w to 99% w/w vaterite; or from 20% w/w to 95% w/w vaterite; or from 20% w/w to 90% w/w vaterite; or from 20% w/w to 80% w/w vaterite; or from 20% w/w to 70% w/w vaterite; or from 20% w/w to 60% w/w vaterite; or from 20% w/w to 50% w/w vaterite; or from 20% w/w to 40% w/w vaterite; or from 20% w/w to 30% w/w vaterite; or from 20% w/w to 25% w/w vaterite; or from 30% w/w to 99% w/w vaterite; or from 30% w/w to 95% w/w vaterite; or from 30% w/w to 90% w/w vaterite; or from 30% w/w to 80% w/w vaterite; or from 30% w/w to 70% w/w vaterite; or from 30% w/w to 60% w/w vaterite; or from 30% w/w to 50% w/w vaterite; or from 30% w/w to 40% w/w vaterite; or from 40% w/w to 99% w/w vaterite; or from 40% w/w to 95% w/w vaterite; or from 40% w/w to 90% w/w vaterite; or from 40% w/w to 80% w/w vaterite; or from 40% w/w to 70% w/w vaterite; or from 40% w/w to 60% w/w vaterite; or from 40% w/w to 50% w/w vaterite; or from 50% w/w to 99% w/w vaterite; or from 50% w/w to 95% w/w vaterite; or from 50% w/w to 90% w/w vaterite; or from 50% w/w to 80% w/w vaterite; or from 50% w/w to 70% w/w vaterite; or from 50% w/w to 60% w/w vaterite; or from 60% w/w to 99% w/w vaterite; or from 60% w/w to 95% w/w vaterite; or from 60% w/w to 90% w/w vaterite; or from 60% w/w to 80% w/w vaterite; or from 60% w/w to 70% w/w vaterite; or from 70% w/w to 99% w/w vaterite; or from 70% w/w to 95% w/w vaterite; or from 70% w/w to 90% w/w vaterite; or from 70% w/w to 80% w/w vaterite; or from 80% w/w to 99% w/w vaterite; or from 80% w/w to 95% w/w vaterite; or from 80% w/w to 90% w/w vaterite; or from 90% w/w to 99% w/w vaterite; or from 90% w/w to 95% w/w vaterite; or 10% w/w vaterite; or 20% w/w vaterite; or 30% w/w vaterite; or 40% w/w vaterite; or 50% w/w vaterite; or 60% w/w vaterite; or 70% w/w vaterite; or 75% w/w vaterite; or 80% w/w vaterite; or 85% w/w vaterite; or 90% w/w vaterite; or 95% w/w vaterite; or 99% w/w vaterite.

In some embodiments of the foregoing aspects and the foregoing embodiments, the hydraulic cement includes at least 1% w/w amorphous calcium carbonate (ACC); or at least 2% w/w ACC; or at least 5% w/w ACC; or at least 10% w/w ACC; or at least 20% w/w ACC; or at least 30% w/w ACC; or at least 40% w/w ACC; or at least 50% w/w ACC; or at least 60% w/w ACC; or at least 70% w/w ACC; or at least 80% w/w ACC; or at least 90% w/w ACC; or from 1% w/w to 90% w/w ACC; or from 1% w/w to 80% w/w ACC; or from 1% w/w to 70% w/w ACC; or from 1% w/w to 60% w/w ACC; or from 1% w/w to 50% w/w ACC; or from 1% w/w to 40% w/w ACC; or from 1% w/w to 30% w/w ACC; or from 1% w/w to 20% w/w ACC; or from 1% w/w to 10% w/w ACC; or from 5% w/w to 90% w/w ACC; or from 5% w/w to 80% w/w ACC; or from 5% w/w to 70% w/w ACC; or from 5% w/w to 60% w/w ACC; or from 5% w/w to 50% w/w ACC; or from 5% w/w to 40% w/w ACC; or from 5% w/w to 30% w/w ACC; or from 5% w/w to 20% w/w ACC; or from 5% w/w to 10% w/w ACC; or from 10% w/w to 90% w/w ACC; or from 10% w/w to 80% w/w ACC; or from 10% w/w to 70% w/w ACC; or from 10% w/w to 60% w/w ACC; or from 10% w/w to 50% w/w ACC; or from 10% w/w to 40% w/w ACC; or from 10% w/w to 30% w/w ACC; or from 10% w/w to 20% w/w ACC; or from 20% w/w to 90% w/w ACC; or from 20% w/w to 80% w/w ACC; or from 20% w/w to 70% w/w ACC; or from 20% w/w to 60% w/w ACC; or from 20% w/w to 50% w/w ACC; or from 20% w/w to 40% w/w ACC; or from 20% w/w to 30% w/w ACC; or from 30% w/w to 90% w/w ACC; or from 30% w/w to 80% w/w ACC; or from 30% w/w to 70% w/w ACC; or from 30% w/w to 60% w/w ACC; or from 30% w/w to 50% w/w ACC; or from 30% w/w to 40% w/w ACC; or from 40% w/w to 90% w/w ACC; or from 40% w/w to 80% w/w ACC; or from 40% w/w to 70% w/w ACC; or from 40% w/w to 60% w/w ACC; or from 40% w/w to 50% w/w ACC; or from 50% w/w to 90% w/w ACC; or from 50% w/w to 80% w/w ACC; or from 50% w/w to 70% w/w ACC; or from 50% w/w to 60% w/w ACC; or from 60% w/w to 90% w/w ACC; or from 60% w/w to 80% w/w ACC; or from 60% w/w to 70% w/w ACC; or from 60% w/w to 65% w/w ACC; or from 70% w/w to 90% w/w ACC; or from 70% w/w to 80% w/w ACC; or from 70% w/w to 75% w/w ACC; or from 80% w/w to 90% w/w ACC; or from 80% w/w to 85% w/w ACC; or from 85% w/w to 90% w/w ACC; or 1% w/w ACC; or 2% w/w ACC; or 5% w/w ACC; or 10% w/w ACC; or 20% w/w ACC; or 30% w/w ACC; or 40% w/w ACC; or 50% w/w ACC; or 60% w/w ACC; or 70% w/w ACC; or 80% w/w ACC; or 90% w/w ACC.

In some embodiments of the foregoing aspects and the foregoing embodiments, the composition includes the vaterite in a range of 10% w/w to 99% w/w and the ACC in a range of 1% w/w to 90% w/w; or the vaterite is in a range of 10% w/w to 90% w/w and the ACC is in a range of 10% w/w to 90% w/w; or the vaterite is in a range of 10% w/w to 80% w/w and the ACC is in a range of 20% w/w to 90% w/w; or the vaterite is in a range of 10% w/w to 70% w/w and the ACC is in a range of 30% w/w to 90% w/w; or the vaterite is in a range of 10% w/w to 60% w/w and the ACC is in a range of 40% w/w to 90% w/w; or the vaterite is in a range of 10% w/w to 50% w/w and the ACC is in a range of 50% w/w to 90% w/w; or the vaterite is in a range of 10% w/w to 40% w/w and the ACC is in a range of 60% w/w to 90% w/w; or the vaterite is in a range of 10% w/w to 30% w/w and the ACC is in a range of 70% w/w to 90% w/w; or the vaterite is in a range of 10% w/w to 20% w/w and the ACC is in a range of 80% w/w to 90% w/w. It is to be understood that the percentage of each of the components in the composition will be in such a way that the total percentage of the components in the composition may not exceed a total of 100% by wt.

In some embodiments of the foregoing aspects and the foregoing embodiments, the composition after setting, and hardening has a compressive strength of at least 14 MPa; or at least 16 MPa; or at least 18 MPa; or at least 20 MPa; or at least 25 MPa; or at least 30 MPa; or at least 35 MPa; or at least 40 MPa; or at least 45 MPa; or at least 50 MPa; or at least 55 MPa; or at least 60 MPa; or at least 65 MPa; or at least 70 MPa; or at least 75 MPa; or at least 80 MPa; or at least 85 MPa; or at least 90 MPa; or at least 95 MPa; or at least 100 MPa; or from 14-100 MPa; or from 14-80 MPa; or from 14-75 MPa; or from 14-70 MPa; or from 14-65 MPa; or from 14-60 MPa; or from 14-55 MPa; or from 14-50 MPa; or from 14-45 MPa; or from 14-40 MPa; or from 14-35 MPa; or from 14-30 MPa; or from 14-25 MPa; or from 14-20 MPa; or from 14-18 MPa; or from 14-16 MPa; or from 17-35 MPa; or from 17-30 MPa; or from 17-25 MPa; or from 17-20 MPa; or from 17-18 MPa; or from 20-100 MPa; or from 20-90 MPa; or from 20-80 MPa; or from 20-75 MPa; or from 20-70 MPa; or from 20-65 MPa; or from 20-60 MPa; or from 20-55 MPa; or from 20-50 MPa; or from 20-45 MPa; or from 20-40 MPa; or from 20-35 MPa; or from 20-30 MPa; or from 20-25 MPa; or from 30-100 MPa; or from 30-90 MPa; or from 30-80 MPa; or from 30-75 MPa; or from 30-70 MPa; or from 30-65 MPa; or from 30-60 MPa; or from 30-55 MPa; or from 30-50 MPa; or from 30-45 MPa; or from 30-40 MPa; or from 30-35 MPa; or from 40-100 MPa; or from 40-90 MPa; or from 40-80 MPa; or from 40-75 MPa; or from 40-70 MPa; or from 40-65 MPa; or from 40-60 MPa; or from 40-55 MPa; or from 40-50 MPa; or from 40-45 MPa; or from 50-100 MPa; or from 50-90 MPa; or from 50-80 MPa; or from 50-75 MPa; or from 50-70 MPa; or from 50-65 MPa; or from 50-60 MPa; or from 50-55 MPa; or from 60-100 MPa; or from 60-90 MPa; or from 60-80 MPa; or from 60-75 MPa; or from 60-70 MPa; or from 60-65 MPa; or from 70-100 MPa; or from 70-90 MPa; or from 70-80 MPa; or from 70-75 MPa; or from 80-100 MPa; or from 80-90 MPa; or from 80-85 MPa; or from 90-100 MPa; or from 90-95 MPa; or 14 MPa; or 16 MPa; or 18 MPa; or 20 MPa; or 25 MPa; or 30 MPa; or 35 MPa; or 40 MPa; or 45 MPa. For example, in some embodiments of the foregoing aspects and the foregoing embodiments, the composition after setting, and hardening has a compressive strength of 14 MPa to 40 MPa; or 17 MPa to 40 MPa; or 20 MPa to 40 MPa; or 30 MPa to 40 MPa; or 35 MPa to 40 MPa. In some embodiments, the compressive strengths described herein are the compressive strengths after 1 day, or 3 days, or 7 days, or 28 days, or 56 days, or longer.

The calcium carbonate in the compositions of the invention may contain carbon dioxide from any number of sources including, but not limited to, an industrial waste stream including flue gas from combustion; a flue gas from a chemical processing plant; a flue gas from a plant that produces $CO_2$ as a byproduct; or combination thereof. In some embodiments, the carbon dioxide sequestered into the calcium carbonate in the compositions of the invention, originates from the burning of fossil fuel, and thus some (e.g., at least 10, 50, 60, 70, 80, 90, 95%) or substantially all (e.g., at least 99, 99.5, or 99.9%) of the carbon in the carbonates is of fossil fuel origin, i.e., of plant origin. Typically, carbon of plant origin has a different ratio of stable isotopes ($^{13}C$ and $^{12}C$) than carbon of inorganic origin. The plants from which fossil fuels are derived preferentially utilize $^{12}C$ over $^{13}C$, thus fractionating the carbon isotopes so that the value of their ratio differs from that in the atmosphere in general. This value, when compared to a standard value (PeeDee Belemnite, or PDB, standard), is termed the carbon isotopic fractionation ($\delta^{13}C$) value. Typically, $\delta^{13}C$ values for coal are in the range −30 to −20‰; $\delta^{13}C$ values for methane may be as low as −20‰ to −40‰ or even −40‰ to −80‰; $\delta^{13}C$ values for atmospheric $CO_2$ are −10‰ to −7‰; for limestone +3‰ to −3‰; and for marine bicarbonate, 0‰.

In some embodiments, the carbon in the vaterite and/or other polymorphs in the composition of the invention, has a $\delta^{13}C$ of less than −12‰, −13‰, −14‰, −15‰, −20‰, or less than −25‰‰, or less than −30‰, or less than −35‰, or less than −45‰, or less than −50‰, as described in further detail herein. In some embodiments, the composition of the invention includes a $CO_2$-sequestering additive including carbonates, such as, vaterite, bicarbonates, or a combination thereof, in which the carbonates, bicarbonates, or a combination thereof have a carbon isotopic fractionation ($\delta^{13}C$) value less than −12‰.

The relative carbon isotope composition ($\delta^{13}C$) value with units of ‰ (per mille) is a measure of the ratio of the concentration of two stable isotopes of carbon, namely $^{12}C$ and $^{13}C$, relative to a standard of fossilized belemnite (the PDB standard).

$$\delta^{13}C‰ = [(^{13}C/^{12}C_{sample} - ^{13}C/^{12}C_{PDB\ standard})/^{13}C/^{12}C_{PDB\ standard}] \times 1000$$

$^{12}C$ is preferentially taken up by plants during photosynthesis and in other biological processes that use inorganic carbon because of its lower mass. The lower mass of $^{12}C$ allows for kinetically limited reactions to proceed more efficiently than with $^{13}C$. Thus, materials that are derived from plant material, e.g., fossil fuels, have relative carbon isotope composition values that are less than those derived from inorganic sources. The carbon dioxide in flue gas produced from burning fossil fuels reflects the relative carbon isotope composition values of the organic material that was fossilized.

Material incorporating carbon from fossil fuels reflects $\delta^{13}C$ values that are like those of plant derived material, i.e. less than that which incorporates carbon from atmospheric or non-plant marine sources. The $\delta^{13}C$ value of the material produced by the carbon dioxide from the burning fossil fuels can be verified by measuring the $\delta^{13}C$ value of the material and confirming that it is not similar to the values for atmospheric carbon dioxide or marine sources of carbon. Table II below lists relative carbon isotope composition ($\delta^{13}C$) value ranges for various carbon sources for comparison.

TABLE II

| Carbon Source | δ¹³C Range [‰] | δ¹³C Average Value [‰] |
|---|---|---|
| C3 Plants (most higher plants) | −23 to −33 | −27 |
| C4 Plants (most tropical and marsh plants) | −9 to −16 | −13 |
| Atmosphere | −6 to −7 | −6 |
| Marine Carbonate (CO₃) | −2 to +2 | 0 |
| Marine Bicarbonate (HCO₃) | −3 to +1 | −1 |
| Coal from Yallourn Seam in Australia[1] | −27.1 to −23.2 | −25.5 |
| Coal from Dean Coal Bed in Kentucky, USA[2] | −24.47 to −25.14 | −24.805 |

[1]Holdgate, G. R. et al., *Global and Planetary Change*, 65 (2009) pp. 89-103.
[2]Elswick, E. R. et al., *Applied Geochemistry*, 22 (2007) pp. 2065-2077.

In some embodiments, the invention provides a method of characterizing the composition of the invention by measuring its $\delta^{13}C$ value. Any suitable method may be used for measuring the $\delta^{13}C$ value, such as mass spectrometry or off-axis integrated-cavity output spectroscopy (off-axis ICOS). Any mass-discerning technique sensitive enough to measure the amounts of carbon, can be used to find ratios of the $^{13}C$ to $^{12}C$ isotope concentrations. The $\delta^{13}C$ values can be measured by the differences in the energies in the carbon-oxygen double bonds made by the $^{12}C$ and $^{13}C$ isotopes in carbon dioxide. The $\delta^{13}C$ value of a carbonate may serve as a fingerprint for a $CO_2$ gas source, as the value can vary from source to source. In some embodiments, the amount of carbon in the vaterite and/or polymorphs in the compositions of the invention, may be determined any suitable technique known in the art. Such techniques include, but are not limited to, coulometry.

In some embodiments of the foregoing aspects and the foregoing embodiments, the composition has a $\delta^{13}C$ of less than −12‰; or less than −13‰; or less than −14‰; or less than −15‰; or less than −16‰; or less than −17‰; or less than −18‰; or less than −19‰; or less than −20‰; or less than −21‰; or less than −22‰; or less than −25‰; or less than −30‰; or less than −40‰; or less than −50‰; or less than −60‰; or less than −70‰; or less than −80‰; or less than −90‰; or less than −100‰; or from −12‰ to −80‰; or from −12‰ to −70‰; or from −12‰ to −60‰; or from −12‰ to −50‰; or from −12‰ to −45‰; or from −12‰ to −40‰; or from −12‰ to −35‰; or from −12‰ to −30‰; or from −12‰ to −25‰; or from −12‰ to −20‰; or from −12‰ to −15‰; or from −13‰ to −80‰; or from −13‰ to −70‰; or from −13‰ to −60‰; or from −13‰ to −50‰; or from −13‰ to −45‰; or from −13‰ to −40‰; or from −13‰ to −35‰; or from −13‰ to −30‰; or from −13‰ to −25‰; or from −13‰ to −20‰; or from −13‰ to −15‰; from −14‰ to −80‰; or from −14‰ to −70‰; or from −14‰ to −60‰; or from −14‰ to −50‰; or from −14‰ to −45‰; or from −14‰ to −40‰; or from −14‰ to −35‰; or from −14‰ to −30‰; or from −14‰ to −25‰; or from −14‰ to −20‰; or from −14‰ to −15‰; or from −15‰ to −80‰; or from −15‰ to −70‰; or from −15‰ to −60‰; or from −15‰ to −50‰; or from −15‰ to −45‰; or from −15‰ to −40‰; or from −15‰ to −35‰; or from −15‰ to −30‰; or from −15‰ to −25‰; or from −15‰ to −20‰; or from −16‰ to −80‰; or from −16‰ to −70‰; or from −16‰ to −60‰; or from −16‰ to −50‰; or from −16‰ to −45‰; or from −16‰ to −40‰; or from −16‰ to −35‰; or from −16‰ to −30‰; or from −16‰ to −25‰; or from −16‰ to −20‰; or from −20‰ to −80‰; or from −20‰ to −70‰; or from −20‰ to −60‰; or from −20‰ to −50‰; or from −20‰ to −40‰; or from −20‰ to −35‰; or from −20‰ to −30‰; or from −20‰ to −25‰; or from −30‰ to −80‰; or from −30‰ to −70‰; or from −30‰ to −60‰; or from −30‰ to −50‰; or from −30‰ to −40‰; or from −40‰ to −80‰; or from −40‰ to −70‰; or from −40‰ to −60‰; or from −40‰ to −50‰; or from −50‰ to −80‰; or from −50‰ to −70‰; or from −50‰ to −60‰; or from −60‰ to −80‰; or from −60‰ to −70‰; or from −70‰ to −80‰; or −12‰; or −13‰; or −14‰; or −15‰; or −16‰; or −17‰; or −18‰; or −19‰; or −20‰; or −21‰; or −22‰; or −25‰; or −30‰; or −40‰; or −50‰; or −60‰; or −70‰; or −80‰; or −90‰; or −100‰.

In some embodiments of the compositions provided herein, the composition further includes a polymorph including, but not limited to, amorphous calcium carbonate, aragonite, calcite, ikaite, a precursor phase of vaterite, a precursor phase of aragonite, an intermediary phase that is less stable than calcite, polymorphic forms in between these polymorphs, and combination thereof. It is to be understood that the composition may also include any other polymorphic form of calcium carbonate and such polymorphic forms are well within the scope of the invention. Some embodiments of the composition provided herein include vaterite or vaterite in combination with other polymorphs, are as shown below in Table III.

TABLE III

| Composition | Vaterite | ACC | Aragonite | Calcite | Ikaite |
|---|---|---|---|---|---|
| 1 | x | | | | |
| 2 | x | x | | | |
| 3 | x | x | x | | |
| 4 | x | x | x | x | |
| 5 | x | x | x | x | x |
| 6 | x | | x | | |
| 7 | x | | x | x | |
| 8 | x | | x | x | x |
| 9 | x | | x | | x |
| 10 | x | | | x | |
| 11 | x | x | | x | |
| 12 | x | | x | x | |
| 13 | x | | | x | x |
| 14 | x | x | | x | x |
| 15 | x | | x | x | x |
| 16 | x | | | | x |
| 17 | x | x | | | x |
| 18 | x | | x | | x |
| 19 | x | | | x | x |
| 20 | x | | x | x | x |
| 21 | x | x | | x | x |
| 22 | x | x | x | | x |

In some embodiments, the vaterite and the one or more polymorphs, in the compositions provided herein, are in a vaterite:one or more polymorph ratio of greater than 1:1; or a ratio of greater than 2:1; or a ratio of greater than 3:1; or a ratio of greater than 4:1; or a ratio of greater than 5:1; or a ratio of greater than 6:1; or a ratio of greater than 7:1; or a ratio of greater than 8:1; or a ratio of greater than 9:1; or a ratio of greater than 10:1; or a ratio of greater than 11:1; or a ratio of greater than 12:1; or a ratio of greater than 13:1; or a ratio of greater than 14:1; or a ratio of greater than 15:1; or a ratio of greater than 16:1; or a ratio of greater than 17:1; or a ratio of greater than 18:1; or a ratio of greater than 19:1; or a ratio of greater than 20:1; or a ratio of 1:1 to 20:1; or a ratio of 1:1 to 18:1; or a ratio of 1:1 to 15:1; or a ratio of 1:1 to 10:1; or a ratio of 1:1 to 9:1; or a ratio of 1:1 to 8:1; or a ratio of 1:1 to 7:1; or a ratio of 1:1 to 6:1; or a ratio of 1:1 to 5:1; or a ratio of 1:1 to 4:1; or a ratio of 1:1 to 3:1; or a ratio of 1:1 to 2:1; or a ratio of 2:1 to 20:1; or a ratio of 2:1 to 15:1; or a ratio of 2:1 to 10:1; or a ratio of 2:1 to 9:1; or a ratio of 2:1 to 8:1; or a ratio of 2:1 to 7:1; or a ratio of 2:1 to 6:1; or a ratio of 2:1 to 5:1; or a ratio of 2:1 to 4:1; or a ratio of 2:1 to 3:1; or a ratio of 5:1 to 20:1;

or a ratio of 5:1 to 15:1; or a ratio of 5:1 to 10:1; or a ratio of 5:1 to 8:1; or a ratio of 7:1 to 20:1; or a ratio of 7:1 to 15:1; or a ratio of 7:1 to 10:1; or a ratio of 7:1 to 9:1; or a ratio of 10:1 to 20:1; or a ratio of 10:1 to 15:1; or a ratio of 10:1 to 12:1; or a ratio of 15:1 to 20:1; or a ratio of 15:1 to 18:1; or a ratio of 1:1; or a ratio of 2:1; or a ratio of 3:1; or a ratio of 4:1; or a ratio of 5:1; or a ratio of 6:1; or a ratio of 7:1; or a ratio of 8:1; or a ratio of 9:1; or a ratio of 10:1; or a ratio of 11:1; or a ratio of 12:1; or a ratio of 13:1; or a ratio of 14:1; or a ratio of 15:1; or a ratio of 16:1; or a ratio of 17:1; or a ratio of 18:1; or a ratio of 19:1; or a ratio of 20:1.

In some embodiments, the vaterite and the polymorph in the compositions provided herein are in a vaterite:one or more polymorph ratio of less than 1:1; or 0.1:1; or 0.2:1; or 0.3:1; or 0.4:1; or 0.5:1; or 0.6:1; or 0.7:1; or 0.8:1; or 0.9:1; or 0.1:1-10:1; or 0.2:1-10:1; or 0.3:1-10:1; or 0.4:1-10:1; or 0.5:1-10:1; or 0.6:1-10:1; or 0.7:1-10:1; or 0.8:1-10:1; or 0.9:1-10:1.

In some embodiments of all of the above recited aspects and embodiments, the composition further includes 1% w/w to 85% w/w aragonite, 1% w/w to 85% w/w calcite, 1% w/w to 85% w/w ikaite, or combination thereof.

In some embodiments, the compositions in the above recited aspects and embodiments, further include at least 1% w/w ACC and at least 1% w/w aragonite; at least 1% w/w ACC and at least 1% w/w calcite; at least 1% w/w ACC and at least 1% w/w ikaite; at least 1% w/w aragonite and at least 1% w/w calcite; at least 1% w/w aragonite and at least 1% w/w ikaite; at least 1% w/w calcite and at least 1% w/w ikaite; at least 1% w/w ACC, at least 1% w/w aragonite, and at least 1% w/w calcite; at least 1% w/w ACC, at least 1% w/w aragonite, and at least 1% w/w ikaite; at least 1% w/w ACC, at least 1% w/w ikaite, and at least 1% w/w calcite; at least 1% w/w aragonite, at least 1% w/w calcite, and at least 1% w/w ikaite; at least 1% w/w ACC, at least 1% w/w aragonite, at least 1% w/w calcite, and at least 1% w/w ikaite.

In some embodiments, the compositions in the above recited aspects and embodiments, further includes at least 1% w/w to 90% w/w ACC and at least 1% w/w to 85% w/w aragonite; at least 1% w/w to 90% w/w ACC and at least 1% w/w to 85% w/w calcite; at least 1% w/w to 90% w/w ACC and at least 1% w/w to 85% w/w ikaite; at least 1% w/w to 85% w/w aragonite and at least 1% w/w to 85% w/w calcite; at least 1% w/w to 85% w/w aragonite and at least 1% w/w to 85% w/w ikaite; at least 1% w/w to 85% w/w calcite and at least 1% w/w to 85% w/w ikaite; at least 1% w/w to 90% w/w ACC, at least 1% w/w to 85% w/w aragonite, and at least 1% w/w to 85% w/w calcite; at least 1% w/w to 90% w/w ACC, at least 1% w/w to 85% w/w aragonite, and at least 1% w/w to 85% w/w ikaite; at least 1% w/w to 90% w/w ACC, at least 1% w/w to 85% w/w ikaite, and at least 1% w/w to 85% w/w calcite; at least 1% w/w to 85% w/w aragonite, at least 1% w/w to 85% w/w calcite, and at least 1% w/w to 85% w/w ikaite; at least 1% w/w to 90% w/w ACC, at least 1% w/w to 85% w/w aragonite, at least 1% w/w to 85% w/w calcite, and at least 1% w/w to 85% w/w ikaite.

In some embodiments of all of the above recited aspects and embodiments, the compositions further includes at least 1% w/w aragonite; or at least 2% w/w aragonite; or at least 5% w/w aragonite; or at least 10% w/w aragonite; or at least 20% w/w aragonite; or at least 30% w/w aragonite; or at least 40% w/w aragonite; or at least 50% w/w aragonite; or at least 60% w/w aragonite; or at least 70% w/w aragonite; or at least 80% w/w aragonite; or at least 85% w/w aragonite; or from 1% w/w to 85% w/w aragonite; or from 1% w/w to 80% w/w aragonite; or from 1% w/w to 70% w/w aragonite; or from 1% w/w to 60% w/w aragonite; or from 1% w/w to 50% w/w aragonite; or from 1% w/w to 40% w/w aragonite; or from 1% w/w to 30% w/w aragonite; or from 1% w/w to 20% w/w aragonite; or from 1% w/w to 10% w/w aragonite; or from 5% w/w to 85% w/w aragonite; or from 5% w/w to 80% w/w aragonite; or from 5% w/w to 70% w/w aragonite; or from 5% w/w to 60% w/w aragonite; or from 5% w/w to 50% w/w aragonite; or from 5% w/w to 40% w/w aragonite; or from 5% w/w to 30% w/w aragonite; or from 5% w/w to 20% w/w aragonite; or from 5% w/w to 10% w/w aragonite; or from 10% w/w to 85% w/w aragonite; or from 10% w/w to 80% w/w aragonite; or from 10% w/w to 70% w/w aragonite; or from 10% w/w to 60% w/w aragonite; or from 10% w/w to 50% w/w aragonite; or from 10% w/w to 40% w/w aragonite; or from 10% w/w to 30% w/w aragonite; or from 10% w/w to 20% w/w aragonite; or from 20% w/w to 85% w/w aragonite; or from 20% w/w to 80% w/w aragonite; or from 20% w/w to 70% w/w aragonite; or from 20% w/w to 60% w/w aragonite; or from 20% w/w to 50% w/w aragonite; or from 20% w/w to 40% w/w aragonite; or from 20% w/w to 30% w/w aragonite; or from 30% w/w to 85% w/w aragonite; or from 30% w/w to 80% w/w aragonite; or from 30% w/w to 70% w/w aragonite; or from 30% w/w to 60% w/w aragonite; or from 30% w/w to 50% w/w aragonite; or from 30% w/w to 40% w/w aragonite; or from 40% w/w to 85% w/w aragonite; or from 40% w/w to 80% w/w aragonite; or from 40% w/w to 70% w/w aragonite; or from 40% w/w to 60% w/w aragonite; or from 40% w/w to 50% w/w aragonite; or from 50% w/w to 85% w/w aragonite; or from 50% w/w to 80% w/w aragonite; or from 50% w/w to 70% w/w aragonite; or from 50% w/w to 60% w/w aragonite; or from 60% w/w to 85% w/w aragonite; or from 60% w/w to 80% w/w aragonite; or from 60% w/w to 70% w/w aragonite; or from 60% w/w to 65% w/w aragonite; or from 70% w/w to 85% w/w aragonite; or from 70% w/w to 80% w/w aragonite; or from 70% w/w to 75% w/w aragonite; or from 80% w/w to 85% w/w aragonite; or 1% w/w aragonite; or 2% w/w aragonite; or 5% w/w aragonite; or 10% w/w aragonite; or 20% w/w aragonite; or 30% w/w aragonite; or 40% w/w aragonite; or 50% w/w aragonite; or 60% w/w aragonite; or 70% w/w aragonite; or 80% w/w aragonite; or 85% w/w aragonite.

In some embodiments of all of the above recited aspects and embodiments, the compositions further includes at least 1% w/w calcite; or at least 2% w/w calcite; or at least 5% w/w calcite; or at least 10% w/w calcite; or at least 20% w/w calcite; or at least 30% w/w calcite; or at least 40% w/w calcite; or at least 50% w/w calcite; or at least 60% w/w calcite; or at least 70% w/w calcite; or at least 80% w/w calcite; or at least 85% w/w calcite; or from 1% w/w to 85% w/w calcite; or from 1% w/w to 80% w/w calcite; or from 1% w/w to 75% w/w calcite; or from 1% w/w to 70% w/w calcite; or from 1% w/w to 65% w/w calcite; or from 1% w/w to 60% w/w calcite; or from 1% w/w to 55% w/w calcite; or from 1% w/w to 50% w/w calcite; or from 1% w/w to 45% w/w calcite; or from 1% w/w to 40% w/w calcite; or from 1% w/w to 35% w/w calcite; or from 1% w/w to 30% w/w calcite; or from 1% w/w to 25% w/w calcite; or from 1% w/w to 20% w/w calcite; or from 1% w/w to 15% w/w calcite; or from 1% w/w to 10% w/w calcite; or from 5% w/w to 85% w/w calcite; or from 5% w/w to 80% w/w calcite; or from 5% w/w to 70% w/w calcite; or from 5% w/w to 60% w/w calcite; or from 5% w/w to 50% w/w calcite; or from 5% w/w to 40% w/w calcite; or from 5% w/w to 30% w/w calcite; or from 5% w/w to 20% w/w calcite; or from 5% w/w to 10% w/w calcite; or from 10% w/w to 85% w/w calcite; or from 10% w/w to 80% w/w calcite; or from 10% w/w to 70% w/w calcite; or from 10% w/w to 60% w/w calcite; or from 10% w/w to 50% w/w calcite; or from 10% w/w to 40% w/w calcite; or from 10% w/w to 30% w/w calcite; or from 10% w/w to 20% w/w calcite; or from 20% w/w to 85% w/w calcite; or from 20% w/w to 80% w/w calcite; or from 20% w/w to 70% w/w calcite; or from 20% w/w to 60% w/w calcite; or from 20% w/w to 50% w/w calcite; or from 20% w/w to 40% w/w calcite; or from 20% w/w to 30% w/w calcite; or from 30% w/w to 85% w/w calcite; or from 30% w/w to 80% w/w calcite; or from 30% w/w to 70% w/w calcite; or from 30% w/w to 60% w/w calcite; or from 30% w/w to 50% w/w calcite; or from 30% w/w to 40% w/w calcite; or from 40% w/w to 85% w/w calcite; or from 40% w/w to 80% w/w calcite; or from 40% w/w to 70% w/w calcite; or from 40% w/w to 60% w/w calcite; or from 40% w/w to 50% w/w calcite; or from 50% w/w to 85% w/w calcite; or from 50% w/w to 80% w/w calcite; or from 50% w/w to 70% w/w calcite; or from 50% w/w to 60% w/w calcite; or from 60% w/w to 85% w/w calcite; or from 60% w/w to 80% w/w calcite; or from 60% w/w to 70% w/w calcite; or from 60% w/w to 65% w/w calcite; or from 70% w/w to 85% w/w calcite; or from 70% w/w to 80% w/w calcite; or from 70% w/w to 75% w/w calcite; or from 80% w/w to 85% w/w calcite; or 1% w/w calcite; or 2% w/w calcite; or 5% w/w calcite; or 10% w/w calcite; or 20% w/w calcite; or 30% w/w calcite; or 40% w/w calcite; or 50% w/w calcite; or 60% w/w calcite; or 70% w/w calcite; or 80% w/w calcite; or 85% w/w calcite.

In some embodiments of all of the above recited aspects and embodiments, the compositions further includes at least 1% w/w ikaite; or at least 2% w/w ikaite; or at least 5% w/w ikaite; or at least 10% w/w ikaite; or at least 20% w/w ikaite; or at least 30% w/w ikaite; or at least 40% w/w ikaite; or at least 50% w/w ikaite; or at least 60% w/w ikaite; or at least 70% w/w ikaite; or at least 80% w/w ikaite; or at least 85% w/w ikaite; or from 1% w/w to 85% w/w ikaite; or from 1% w/w to 80% w/w ikaite; or from 1% w/w to 70% w/w ikaite; or from 1% w/w to 60% w/w ikaite; or from 1% w/w to 50% w/w ikaite; or from 1% w/w to 40% w/w ikaite; or from 1% w/w to 30% w/w ikaite; or from 1% w/w to 20% w/w ikaite; or from 1% w/w to 10% w/w ikaite; or from 5% w/w to 85% w/w ikaite; or from 5% w/w to 80% w/w ikaite; or from 5% w/w to 70% w/w ikaite; or from 5% w/w to 60% w/w ikaite; or from 5% w/w to 50% w/w ikaite; or from 5% w/w to 40% w/w ikaite; or from 5% w/w to 30% w/w ikaite; or from 5% w/w to 20% w/w ikaite; or from 5% w/w to 10% w/w ikaite; or from 10% w/w to 85% w/w ikaite; or from 10% w/w to 80% w/w ikaite; or from 10% w/w to 70% w/w ikaite; or from 10% w/w to 60% w/w ikaite; or from 10% w/w to 50% w/w ikaite; or from 10% w/w to 40% w/w ikaite; or from 10% w/w to 30% w/w ikaite; or from 10% w/w to 20% w/w ikaite; or from 20% w/w to 85% w/w ikaite; or from 20% w/w to 80% w/w ikaite; or from 20% w/w to 70% w/w ikaite; or from 20% w/w to 60% w/w ikaite; or from 20% w/w to 50% w/w ikaite; or from 20% w/w to 40% w/w ikaite; or from 20% w/w to 30% w/w ikaite; or from 30% w/w to 85% w/w ikaite; or from 30% w/w to 80% w/w ikaite; or from 30% w/w to 70% w/w ikaite; or from 30% w/w to 60% w/w ikaite; or from 30% w/w to 50% w/w ikaite; or from 30% w/w to 40% w/w ikaite; or from 40% w/w to 85% w/w ikaite; or from 40% w/w to 80% w/w ikaite; or from 40% w/w to 70% w/w ikaite; or from 40% w/w to 60% w/w ikaite; or from 40% w/w to 50% w/w ikaite; or from 50% w/w to 85% w/w ikaite; or from 50% w/w to 80% w/w ikaite; or from 50% w/w to 70% w/w ikaite; or from 50% w/w to 60% w/w ikaite; or from 60% w/w to 85% w/w ikaite; or from 60% w/w to 80% w/w ikaite; or from 60% w/w to 70% w/w ikaite; or from 60% w/w to 65% w/w ikaite; or from 70% w/w to 85% w/w ikaite; or from 70% w/w to 80% w/w ikaite; or from 70% w/w to 75% w/w ikaite; or from 80% w/w to 85% w/w ikaite; or 1% w/w ikaite; or 2% w/w ikaite; or 5% w/w ikaite; or 10% w/w ikaite; or 20% w/w ikaite; or 30% w/w ikaite; or 40% w/w ikaite; or 50% w/w ikaite; or 60% w/w ikaite; or 70% w/w ikaite; or 80% w/w ikaite; or 85% w/w ikaite.

The compositions of the invention may include a number of different cations, such as, but are not limited to, calcium, magnesium, sodium, potassium, sulfur, boron, silicon, strontium, and combinations thereof, where carbonate minerals include, but are not limited to: calcium carbonate minerals, magnesium carbonate minerals and calcium magnesium carbonate minerals. Calcium carbonate minerals in the composition of the invention include, but are not limited to: vaterite alone or in combination with calcite, aragonite, ikaite, amorphous calcium carbonate, a precursor phase of vaterite, a precursor phase of aragonite, an intermediary phase that is less stable than calcite, polymorphic forms in between these polymorphs, or combination thereof. These carbonate minerals may also be present in combination with magnesium carbonate minerals. Magnesium carbonate minerals include, but are not limited to, magnesite ($MgCO_3$), barringtonite ($MgCO_3.2H_2O$), nesquehonite ($MgCO_3.3H_2O$), lanfordite ($MgCO_3.5H_2O$) and amorphous magnesium calcium carbonate ($MgCO_3.nH_2O$). The carbonate minerals in the composition of the invention may also be present in combination with calcium magnesium carbonate minerals which include, but are not limited to, dolomite ($CaMgCO_3$), huntitte ($CaMg(CO_3)_4$) and sergeevite ($Ca_2Mg_{11}(CO_3)_{13}.H_2O$). Other calcium mineral that may be present in the composition of the invention, is portlandite ($Ca(OH)_2$), and amorphous hydrated analogs thereof. Other magnesium mineral that may be present in the composition of the invention, is brucite ($Mg(OH)_2$), and amorphous hydrated analogs thereof.

In some embodiments of all of the above recited aspects and embodiments, the composition further includes strontium (Sr). In some embodiments, the Sr is present in the composition in an amount of 1-50,000 parts per million (ppm); or 1-10,000 ppm; or 1-5,000 ppm; or 1-1,000 ppm; or 3-50,000 ppm; or 3-10,000 ppm; or 3-9,000 ppm; or 3-8,000 ppm; or 3-7,000 ppm; or 3-6,000 ppm; or 3-5,000 ppm; or 3-4,000 ppm; or 3-3,000 ppm; or 3-2,000 ppm; or 3-1,000 ppm; or 3-900 ppm; or 3-800 ppm; or 3-700 ppm; or 3-600 ppm; or 3-500 ppm; or 3-400 ppm; or 3-300 ppm; or 3-200 ppm; or 3-100 ppm; or 3-50 ppm; or 3-10 ppm; or 10-50,000 ppm; or 10-10,000 ppm; or 10-9,000 ppm; or 10-8,000 ppm; or 10-7,000 ppm; or 10-6,000 ppm; or 10-5,000 ppm; or 10-4,000 ppm; or 10-3,000 ppm; or 10-2,000 ppm; or 10-1,000 ppm; or 10-900 ppm; or 10-800 ppm; or 10-700 ppm; or 10-600 ppm; or 10-500 ppm; or 10-400 ppm; or 10-300 ppm; or 10-200 ppm; or 10-100 ppm; or 10-50 ppm; or 100-50,000 ppm; or 100-10,000 ppm; or 100-9,000 ppm; or 100-8,000 ppm; or 100-7,000 ppm; or 100-6,000 ppm; or 100-5,000 ppm; or 100-4,000 ppm; or 100-3,000 ppm; or 100-2,000 ppm; or 100-1,000 ppm; or 100-900 ppm; or 100-800 ppm; or 100-700 ppm; or 100-600 ppm; or 100-500 ppm; or 100-400 ppm; or 100-300 ppm; or 100-200 ppm; or 200-50,000 ppm; or 200-10,000 ppm; or 200-1,000 ppm; or 200-500 ppm; or 500-50,000 ppm; or 500-10,000 ppm; or 500-1,000 ppm; or 10 ppm; or 100 ppm; or 200 ppm; or 500 ppm; or 1000 ppm; or 5000 ppm; or 8000 ppm; or 10,000 ppm.

In some embodiments, the above recited Sr is present in a crystal lattice of the vaterite. In some embodiments, the above recited Sr is present in a crystal lattice of the aragonite. In some embodiments, the above recited Sr is present in a crystal lattice of the calcite. In some embodiments, the above recited Sr is present in a crystal lattice of the ikaite. In some embodiments, the above recited Sr is present in a crystal lattice of one or more of vaterite, aragonite, calcite, and ikaite.

The water employed in the invention may be fresh water, saltwater, or an alkaline-earth-metal-containing water, depending on the method employing the water. In some embodiments, the water employed in the process includes one or more alkaline earth metals, e.g., magnesium, calcium, etc. The various types of water that may be employed in the invention are described below. In some embodiments, the water contains calcium in amounts ranging from 50 to 20,000 ppm; or 50 to 10,000 ppm; or 50 to 5,000 ppm; or 50 to 1,000 ppm; or 50 to 500 ppm; or 50 to 100 ppm; or 100 to 20,000 ppm; or 100 to 10,000 ppm; or 100 to 5,000 ppm; or 100 to 1,000 ppm; or 100 to 500 ppm; or 500 to 20,000 ppm; or 500 to 10,000 ppm; or 500 to 5,000 ppm; or 500 to 1,000 ppm; or 1,000 to 20,000 ppm; or 1,000 to 10,000 ppm; or 1,000 to 5,000 ppm; or 5,000 to 20,000 ppm; or 5,000 to 10,000 ppm; or 10,000 to 20,000 ppm.

In some embodiments, the water contains magnesium in amounts ranging from 50 to 20,000 ppm; or 50 to 10,000 ppm; or 50 to 5,000 ppm; or 50 to 1,000 ppm; or 50 to 500 ppm; or 50 to 100 ppm; or 100 to 20,000 ppm; or 100 to 10,000 ppm; or 100 to 5,000 ppm; or 100 to 1,000 ppm; or 100 to 500 ppm; or 500 to 20,000 ppm; or 500 to 10,000 ppm; or 500 to 5,000 ppm; or 500 to 1,000 ppm; or 1,000 to 20,000 ppm; or 1,000 to 10,000 ppm; or 1,000 to 5,000 ppm; or 5,000 to 20,000 ppm; or 5,000 to 10,000 ppm; or 10,000 to 20,000 ppm.

The composition has, in certain embodiments, a calcium/magnesium ratio that is influenced by, and therefore reflects, the water source from which it has been precipitated, e.g., seawater, which contains more magnesium than calcium, or, e.g., certain brines, which often contain one-hundred-fold the calcium content as seawater; the calcium/magnesium ratio also reflects factors such as the addition of calcium and/or magnesium-containing substances during the production process, e.g., the use of flyash, red mud, slag, or other calcium and/or magnesium-containing industrial wastes, or the use of calcium and/or magnesium-containing minerals such as mafic and ultramafic minerals, such as serpentine, olivine, and the like. Because of the large variation in raw materials as well as materials added during production, the calcium/magnesium molar ratio may vary widely in various embodiments of the compositions and methods of the invention, and indeed in certain embodiment the ratio may be adjusted according to the intended use of the composition.

In some embodiments of all of the above recited aspects and embodiments, the composition further includes magnesium (Mg). In some embodiments, Mg is present as magnesium carbonate. In some embodiments, a ratio of calcium to magnesium (Ca:Mg) or the ratio of vaterite:magnesium carbonate is greater than 1:1; or a ratio of greater than 2:1; or a ratio of greater than 3:1; or a ratio of greater than 4:1; or a ratio of greater than 5:1; or a ratio of greater than 6:1; or a ratio of greater than 7:1; or a ratio of greater than 8:1; or a ratio of greater than 9:1; or a ratio of greater than 10:1; or a ratio of greater than 15:1; or a ratio of greater than 20:1; or a ratio of greater than 30:1; or a ratio of greater than 40:1; or a ratio of greater than 50:1; or a ratio of greater than 60:1; or a ratio of greater than 70:1; or a ratio of greater than 80:1; or a ratio of greater than 90:1; or a ratio of greater than 100:1; or a ratio of greater than 150:1; or a ratio of greater than 200:1; or a ratio of greater than 250:1; or a ratio of greater than 300:1; or a ratio of greater than 350:1; or a ratio of greater than 400:1; or a ratio of greater than 450:1; or a ratio of greater than 500:1; or a ratio of 1:1 to 500:1; or a ratio of 1:1 to 450:1; or a ratio of 1:1 to 400:1; or a ratio of 1:1 to 350:1; or a ratio of 1:1 to 300:1; or a ratio of 1:1 to 250:1; or a ratio of 1:1 to 200:1; or a ratio of 1:1 to 150:1; or a ratio of 1:1 to 100:1; or a ratio of 1:1 to 50:1; or a ratio of 1:1 to 25:1; or a ratio of 1:1 to 10:1; or a ratio of 5:1 to 500:1; or a ratio of 5:1 to 450:1; or a ratio of 5:1 to 400:1; or a ratio of 5:1 to 350:1; or a ratio of 5:1 to 300:1; or a ratio of 5:1 to 250:1; or a ratio of 5:1 to 200:1; or a ratio of 5:1 to 150:1; or a ratio of 5:1 to 100:1; or a ratio of 5:1 to 50:1; or a ratio of 5:1 to 25:1; or a ratio of 5:1 to 10:1; or a ratio of 10:1 to 500:1; or a ratio of 10:1 to 450:1; or a ratio of 10:1 to 400:1; or a ratio of 10:1 to 350:1; or a ratio of 10:1 to 300:1; or a ratio of 10:1 to 250:1; or a ratio of 10:1 to 200:1; or a ratio of 10:1 to 150:1; or a ratio of 10:1 to 100:1; or a ratio of 10:1 to 50:1; or a ratio of 10:1 to 25:1; or a ratio of 20:1 to 500:1; or a ratio of 20:1 to 450:1; or a ratio of 20:1 to 400:1; or a ratio of 20:1 to 350:1; or a ratio of 20:1 to 300:1; or a ratio of 20:1 to 250:1; or a ratio of 20:1 to 200:1; or a ratio of 20:1 to 150:1; or a ratio of 20:1 to 100:1; or a ratio of 20:1 to 50:1; or a ratio of 20:1 to 25:1; or a ratio of 50:1 to 500:1; or a ratio of 50:1 to 450:1; or a ratio of 50:1 to 400:1; or a ratio of 50:1 to 350:1; or a ratio of 50:1 to 300:1; or a ratio of 50:1 to 250:1; or a ratio of 50:1 to 200:1; or a ratio of 50:1 to 150:1; or a ratio of 50:1 to 100:1; or a ratio of 100:1 to 500:1; or a ratio of 100:1 to 450:1; or a ratio of 100:1 to 400:1; or a ratio of 100:1 to 350:1; or a ratio of 100:1 to 300:1; or a ratio of 100:1 to 250:1; or a ratio of 100:1 to 200:1; or a ratio of 100:1 to 150:1; or a ratio of 200:1 to 500:1; or a ratio of 200:1 to 450:1; or a ratio of 200:1 to 400:1; or a ratio of 200:1 to 350:1; or a ratio of 200:1 to 300:1; or a ratio of 200:1 to 250:1; or a ratio of 300:1 to 500:1; or a ratio of 300:1 to 450:1; or a ratio of 300:1 to 400:1; or a ratio of 300:1 to 350:1; or a ratio of 400:1 to 500:1; or a ratio of 400:1 to 450:1; or a ratio of 1:1; or a ratio of 2:1; or a ratio of 3:1; or a ratio of 4:1; or a ratio of 5:1; or a ratio of 6:1; or a ratio of 7:1; or a ratio of 8:1; or a ratio of 9:1; or a ratio of 10:1; or a ratio of 11:1; or a ratio of 15:1; or a ratio of 20:1; or a ratio of 30:1; or a ratio of 40:1; or a ratio of 50:1; or a ratio of 60:1; or a ratio of 70:1; or a ratio of 80:1; or a ratio of 90:1; or a ratio of 100:1; or a ratio of 150:1; or a ratio of 200:1; or a ratio of 250:1; or a ratio of 300:1; or a ratio of 350:1; or a ratio of 400:1; or a ratio of 450:1; or a ratio of 500:1. In some embodiments, the ratio of calcium to magnesium (Ca:Mg) is between 2:1 to 5:1, or greater than 4:1, or 4:1. In some embodiments, the ratios herein are molar ratios or weight (such as, grams, mg or ppm) ratios.

In some embodiments, a ratio of magnesium to calcium (Mg:Ca) or the ratio of magnesium carbonate:vaterite is between 1:1 to 10:1; or between 2:1 to 10:1; or between 3:1 to 10:1; or between 4:1 to 10:1; or between 5:1 to 10:1; or between 6:1 to 10:1; or between 7:1 to 10:1; or between 8:1 to 10:1; or between 9:1 to 10:1.

In some embodiments, the amount of Mg present in the compositions provided herein is less than 2% w/w; or less than 1.5% w/w; or less than 1% w/w; or less than 0.5% w/w; or less than 0.1% w/w; or between 0.1% w/w Mg to 5% w/w Mg; or between 0.1% w/w Mg to 2% w/w Mg; or between 0.1% w/w Mg to 1.5% w/w Mg; or between 0.1% w/w Mg to 1% w/w Mg; or between 0.1% w/w Mg to 0.5% w/w Mg.

Alternatively, in some embodiments, the ratio of calcium to magnesium (Ca:Mg) is 0.1; or 0.2; or 0.3; or 0.4; or 0.5.

In some embodiments, the compositions provided herein further include sodium. In such compositions the sodium is present in an amount less than 100,000 ppm; or less than 80,000 ppm; or less than 50,000 ppm; or less than 20,000 ppm; or less than 15,000 ppm; or less than 10,000 ppm; or less than 5,000 ppm; or less than 1,000 ppm; or less than 500 ppm; or less than 400 ppm; or less than 300 ppm; or less than 200 ppm; or less than 100 ppm; or between 100 ppm to 100,000 ppm; or between 100 ppm to 50,000 ppm; or between 100 ppm to 30,000 ppm; or between 100 ppm to 20,000 ppm; or between 100 ppm to 15,000 ppm; or between 100 ppm to 10,000 ppm; or between 100 ppm to 5,000 ppm; or between 100 ppm to 1,000 ppm; or between 100 ppm to 500 ppm; or between 100 ppm to 400 ppm; or between 100 ppm to 300 ppm; or between 100 ppm to 200 ppm; or between 500 ppm to 100,000 ppm; or between 500 ppm to 50,000 ppm; or between 500 ppm to 30,000 ppm; or between 500 ppm to 20,000 ppm; or between 500 ppm to 15,000 ppm; or between 500 ppm to 10,000 ppm; or between 500 ppm to 5,000 ppm; or between 500 ppm to 1,000 ppm; or between 1000 ppm to 100,000 ppm; or between 1000 ppm to 50,000 ppm; or between 1000 ppm to 30,000 ppm; or between 1000 ppm to 20,000 ppm; or between 1000 ppm to 15,000 ppm; or between 1000 ppm to 10,000 ppm; or between 1000 ppm to 5,000 ppm; or between 5000 ppm to 100,000 ppm; or between 5000 ppm to 50,000 ppm; or between 10,000 ppm to 100,000 ppm; or between 10,000 ppm to 50,000 ppm; or between 50,000 ppm to 100,000 ppm; or 20,000 ppm; or 15,000 ppm; or 10,000 ppm; or 5,000 ppm; or 1,000 ppm; or 500 ppm; or 400 ppm; or 300 ppm; or 200 ppm; or 100 ppm.

In some embodiments, the compositions of the invention do not include calcium phosphate. In some embodiments, the compositions of the invention include calcium phosphate. In such compositions, the calcium phosphate is in an amount of less than 20,000 ppm; or less than 15,000 ppm; or less than 10,000 ppm; or less than 5,000 ppm; or less than 1,000 ppm; or less than 500 ppm; or less than 400 ppm; or less than 300 ppm; or less than 200 ppm; or less than 100 ppm; or between 100 ppm to 20,000 ppm; or between 100 ppm to 15,000 ppm; or between 100 ppm to 10,000 ppm; or between 100 ppm to 5,000 ppm; or between 100 ppm to 1,000 ppm; or between 100 ppm to 500 ppm; or between 100 ppm to 400 ppm; or between 100 ppm to 300 ppm; or between 100 ppm to 200 ppm; or 20,000 ppm; or 15,000 ppm; or 10,000 ppm; or 5,000 ppm; or 1,000 ppm; or 500 ppm; or 400 ppm; or 300 ppm; or 200 ppm; or 100 ppm.

In some embodiments, the composition provided herein is a particulate composition with an average particle size of 0.1-100 microns. The average particle size may be determined using any conventional particle size determination method, such as, but is not limited to, multi-detector laser scattering or sieving (i.e. <38 microns). In certain embodiments, unimodel or multimodal, e.g., bimodal or other, distributions are present. Bimodal distributions allow the surface area to be minimized, thus allowing a lower liquids/solids mass ratio for the cement yet providing smaller reactive particles for early reaction. In such instances, the average particle size of the larger size class can be upwards of 1000 microns (1 mm). In some embodiments, the composition provided herein is a particulate composition with an average particle size of 0.1-1000 microns; or 0.1-900 microns; or 0.1-800 microns; or 0.1-700 microns; or 0.1-600 microns; or 0.1-500 microns; or 0.1-400 microns; or 0.1-300 microns; or 0.1-200 microns; or 0.1-100 microns; or 0.1-90 microns; or 0.1-80 microns; or 0.1-70 microns; or 0.1-60 microns; or 0.1-50 microns; or 0.1-40 microns; or 0.1-30 microns; or 0.1-20 microns; or 0.1-10 microns; or 0.1-5 microns; or 0.5-100 microns; or 0.5-90 microns; or 0.5-80 microns; or 0.5-70 microns; or 0.5-60 microns; or 0.5-50 microns; or 0.5-40 microns; or 0.5-30 microns; or 0.5-20 microns; or 0.5-10 microns; or 0.5-5 microns; or 1-100 microns; or 1-90 microns; or 1-80 microns; or 1-70 microns; or 1-60 microns; or 1-50 microns; or 1-40 microns; or 1-30 microns; or 1-20 microns; or 1-10 microns; or 1-5 microns; or 3-100 microns; or 3-90 microns; or 3-80 microns; or 3-70 microns; or 3-60 microns; or 3-50 microns; or 3-40 microns; or 3-30 microns; or 3-20 microns; or 3-10 microns; or 3-8 microns; or 5-100 microns; or 5-90 microns; or 5-80 microns; or 5-70 microns; or 5-60 microns; or 5-50 microns; or 5-40 microns; or 5-30 microns; or 5-20 microns; or 5-10 microns; or 5-8 microns; or 8-100 microns; or 8-90 microns; or 8-80 microns; or 8-70 microns; or 8-60 microns; or 8-50 microns; or 8-40 microns; or 8-30 microns; or 8-20 microns; or 8-10 microns; or 10-100 microns; or 10-90 microns; or 10-80 microns; or 10-70 microns; or 10-60 microns; or 10-50 microns; or 10-40 microns; or 10-30 microns; or 10-20 microns; or 10-15 microns; or 15-100 microns; or 15-90 microns; or 15-80 microns; or 15-70 microns; or 15-60 microns; or 15-50 microns; or 15-40 microns; or 15-30 microns; or 15-20 microns; or 20-100 microns; or 20-90 microns; or 20-80 microns; or 20-70 microns; or 20-60 microns; or 20-50 microns; or 20-40 microns; or 20-30 microns; or 30-100 microns; or 30-90 microns; or 30-80 microns; or 30-70 microns; or 30-60 microns; or 30-50 microns; or 30-40 microns; or 40-100 microns; or 40-90 microns; or 40-80 microns; or 40-70 microns; or 40-60 microns; or 40-50 microns; or 50-100 microns; or 50-90 microns; or 50-80 microns; or 50-70 microns; or 50-60 microns; or 60-100 microns; or 60-90 microns; or 60-80 microns; or 60-70 microns; or 70-100 microns; or 70-90 microns; or 70-80 microns; or 80-100 microns; or 80-90 microns; or 0.1 microns; or 0.5 microns; or 1 microns; or 2 microns; or 3 microns; or 4 microns; or 5 microns; or 8 microns; or 10 microns; or 15 microns; or 20 microns; or 30 microns; or 40 microns; or 50 microns; or 60 microns; or 70 microns; or 80 microns; or 100 microns. For example, in some embodiments, the composition provided herein is a particulate composition with an average particle size of 0.1-20 micron; or 0.1-15 micron; or 0.1-10 micron; or 0.1-8 micron; or 0.1-5 micron; or 1-5 micron; or 5-10 micron.

In some embodiments, the composition includes one or more different sizes of the particles in the composition. In some embodiments, the composition includes two or more, or three or more, or four or more, or five or more, or ten or more, or 20 or more, or 3-20, or 4-10 different sizes of the particles in the composition. For example, the composition may include two or more, or three or more, or between 3-20 particles ranging from 0.1-10 micron, 10-50 micron, 50-100 micron, 100-200 micron, 200-500 micron, 500-1000 micron, and/or sub-micron sizes of the particles.

In some embodiments, the composition of the invention may include different morphologies of the particles, such as, but not limited to, fine or disperse and large or agglomerated.

The bulk density of the composition in the powder form or after the setting and/or hardening of the cement may vary. In some embodiments, the composition provided herein has a bulk density of between 75 lb/ft$^3$-170 lb/ft$^3$; or between 75 lb/ft$^3$-160 lb/ft$^3$; or between 75 lb/ft$^3$-150 lb/ft$^3$; or between 75 lb/ft$^3$-140 lb/ft$^3$; or between 75 lb/ft$^3$-130 lb/ft$^3$; or between 75 lb/ft$^3$-125 lb/ft$^3$; or between 75 lb/ft$^3$-120 lb/ft$^3$; or between 75 lb/ft$^3$-110 lb/ft$^3$; or between 75 lb/ft$^3$-100 lb/ft$^3$; or between 75 lb/ft$^3$-90 lb/ft$^3$; or between 75 lb/ft$^3$-80 lb/ft$^3$; or between 80 lb/ft$^3$-170 lb/ft$^3$; or between 80 lb/ft$^3$-160 lb/ft$^3$; or between 80 lb/ft$^3$-150 lb/ft$^3$; or between 80 lb/ft$^3$-140 lb/ft$^3$; or between 80 lb/ft$^3$-130 lb/ft$^3$; or between 80 lb/ft$^3$-125 lb/ft$^3$; or between 80 lb/ft$^3$-120 lb/ft$^3$; or between 80 lb/ft$^3$-110 lb/ft$^3$; or between 80 lb/ft$^3$-100 lb/ft$^3$; or between 80 lb/ft$^3$-90 lb/ft$^3$; or between 90 lb/ft$^3$-170 lb/ft$^3$; or between 90 lb/ft$^3$-160 lb/ft$^3$; or between 90 lb/ft$^3$-150 lb/ft$^3$; or between 90 lb/ft$^3$-140 lb/ft$^3$; or between 90 lb/ft$^3$-130 lb/ft$^3$; or between 90 lb/ft$^3$-125 lb/ft$^3$; or between 90 lb/ft$^3$-120 lb/ft$^3$; or between 90 lb/ft$^3$-110 lb/ft$^3$; or between 90 lb/ft$^3$-100 lb/ft$^3$; or between 90 lb/ft$^3$-90 lb/ft$^3$; or between 100 lb/ft$^3$-170 lb/ft$^3$; or between 100 lb/ft$^3$-160 lb/ft$^3$; or between 100 lb/ft$^3$-150 lb/ft$^3$; or between 100 lb/ft$^3$-140 lb/ft$^3$; or between 100 lb/ft$^3$-130 lb/ft$^3$; or between 100 lb/ft$^3$-

125 lb/ft³; or between 100 lb/ft³-120 lb/ft³; or between 100 lb/ft³-110 lb/ft³; or between 110 lb/ft³-170 lb/ft³; or between 110 lb/ft³-160 lb/ft³; or between 110 lb/ft³-150 lb/ft³; or between 110 lb/ft³-140 lb/ft³; or between 110 lb/ft³-130 lb/ft³; or between 110 lb/ft³-125 lb/ft³; or between 110 lb/ft³-120 lb/ft³; or between 120 lb/ft³-170 lb/ft³; or between 120 lb/ft³-160 lb/ft³; or between 120 lb/ft³-150 lb/ft³; or between 120 lb/ft³-140 lb/ft³; or between 120 lb/ft³-130 lb/ft³; or between 120 lb/ft³-125 lb/ft³; or between 130 lb/ft³-170 lb/ft³; or between 130 lb/ft³-160 lb/ft³; or between 130 lb/ft³-150 lb/ft³; or between 130 lb/ft³-140 lb/ft³; or between 140 lb/ft³-170 lb/ft³; or between 140 lb/ft³-160 lb/ft³; or between 140 lb/ft³-150 lb/ft³; or between 150 lb/ft³-170 lb/ft³; or between 150 lb/ft³-160 lb/ft³; or between 160 lb/ft³-170 lb/ft³; or 75 lb/ft³; or 80 lb/ft³; or 85 lb/ft³; or 90 lb/ft³; or 95 lb/ft³; or 100 lb/ft³; or 110 lb/ft³; or 120 lb/ft³; or 130 lb/ft³; or 140 lb/ft³; or 150 lb/ft³; or 160 lb/ft³; or 170 lb/ft³.

The surface area of the components making up the cement may vary. In some embodiments, the compositions of the invention have an average surface area sufficient to provide for a liquid to solids ratio (as described herein) upon combination with a liquid to produce a settable composition. In some embodiments, an average surface area ranges from 0.5 $m^2/gm$-50 $m^2/gm$. The surface area may be determined using the surface area determination protocol described in Breunner, Emmit and Teller (BET) surface area analysis. In some embodiments, the composition provided herein has an average surface area of from 0.5 $m^2/gm$-50 $m^2/gm$; or from 0.5 $m^2/gm$-45 $m^2/gm$; or from 0.5 $m^2/gm$-40 $m^2/gm$; or from 0.5 $m^2/gm$-35 $m^2/gm$; or from 0.5 $m^2/gm$-30 $m^2/gm$; or from 0.5 $m^2/gm$-25 $m^2/gm$; or from 0.5 $m^2/gm$-20 $m^2/gm$; or from 0.5 $m^2/gm$-15 $m^2/gm$; or from 0.5 $m^2/gm$-10 $m^2/gm$; or from 0.5 $m^2/gm$-5 $m^2/gm$; or from 0.5 $m^2/gm$-4 $m^2/gm$; or from 0.5 $m^2/gm$-2 $m^2/gm$; or from 0.5 $m^2/gm$-1 $m^2/gm$; or from 1 $m^2/gm$-50 $m^2/gm$; or from 1 $m^2/gm$-45 $m^2/gm$; or from 1 $m^2/gm$-40 $m^2/gm$; or from 1 $m^2/gm$-35 $m^2/gm$; or from 1 $m^2/gm$-30 $m^2/gm$; or from 1 $m^2/gm$-25 $m^2/gm$; or from 1 $m^2/gm$-20 $m^2/gm$; or from 1 $m^2/gm$-15 $m^2/gm$; or from 1 $m^2/gm$-10 $m^2/gm$; or from 1 $m^2/gm$-5 $m^2/gm$; or from 1 $m^2/gm$-4 $m^2/gm$; or from 1 $m^2/gm$-2 $m^2/gm$; or from 2 $m^2/gm$-50 $m^2/gm$; or from 2 $m^2/gm$-45 $m^2/gm$; or from 2 $m^2/gm$-40 $m^2/gm$; or from 2 $m^2/gm$-35 $m^2/gm$; or from 2 $m^2/gm$-30 $m^2/gm$; or from 2 $m^2/gm$-25 $m^2/gm$; or from 2 $m^2/gm$-20 $m^2/gm$; or from 2 $m^2/gm$-15 $m^2/gm$; or from 2 $m^2/gm$-10 $m^2/gm$; or from 2 $m^2/gm$-5 $m^2/gm$; or from 2 $m^2/gm$-4 $m^2/gm$; or from 5 $m^2/gm$-50 $m^2/gm$; or from 5 $m^2/gm$-45 $m^2/gm$; or from 5 $m^2/gm$-40 $m^2/gm$; or from 5 $m^2/gm$-35 $m^2/gm$; or from 5 $m^2/gm$-30 $m^2/gm$; or from 5 $m^2/gm$-25 $m^2/gm$; or from 5 $m^2/gm$-20 $m^2/gm$; or from 5 $m^2/gm$-15 $m^2/gm$; or from 5 $m^2/gm$-10 $m^2/gm$; or from 8 $m^2/gm$-50 $m^2/gm$; or from 8 $m^2/gm$-45 $m^2/gm$; or from 8 $m^2/gm$-40 $m^2/gm$; or from 8 $m^2/gm$-35 $m^2/gm$; or from 8 $m^2/gm$-30 $m^2/gm$; or from 8 $m^2/gm$-25 $m^2/gm$; or from 8 $m^2/gm$-20 $m^2/gm$; or from 8 $m^2/gm$-15 $m^2/gm$; or from 8 $m^2/gm$-10 $m^2/gm$; or from 10 $m^2/gm$-50 $m^2/gm$; or from 10 $m^2/gm$-45 $m^2/gm$; or from 10 $m^2/gm$-40 $m^2/gm$; or from 10 $m^2/gm$-35 $m^2/gm$; or from 10 $m^2/gm$-30 $m^2/gm$; or from 10 $m^2/gm$-25 $m^2/gm$; or from 10 $m^2/gm$-20 $m^2/gm$; or from 10 $m^2/gm$-15 $m^2/gm$; or from 15 $m^2/gm$-50 $m^2/gm$; or from 15 $m^2/gm$-45 $m^2/gm$; or from 15 $m^2/gm$-40 $m^2/gm$; or from 15 $m^2/gm$-35 $m^2/gm$; or from 15 $m^2/gm$-30 $m^2/gm$; or from 15 $m^2/gm$-25 $m^2/gm$; or from 15 $m^2/gm$-20 $m^2/gm$; or from 20 $m^2/gm$-50 $m^2/gm$; or from 20 $m^2/gm$-45 $m^2/gm$; or from 20 $m^2/gm$-40 $m^2/gm$; or from 20 $m^2/gm$-35 $m^2/gm$; or from 20 $m^2/gm$-30 $m^2/gm$; or from 20 $m^2/gm$-25 $m^2/gm$; or from 30 $m^2/gm$-50 $m^2/gm$; or from 30 $m^2/gm$-45 $m^2/gm$; or from 30 $m^2/gm$-40 $m^2/gm$; or from 30 $m^2/gm$-35 $m^2/gm$; or from 40 $m^2/gm$-50 $m^2/gm$; or from 40 $m^2/gm$-45 $m^2/gm$; or 0.5 $m^2/gm$; or 1 $m^2/gm$; or 2 $m^2/gm$; or 5 $m^2/gm$; or 10 $m^2/gm$; or 15 $m^2/gm$; or 20 $m^2/gm$; or 30 $m^2/gm$; or 40 $m^2/gm$; or 50 $m^2/gm$. In some embodiments, the composition of the invention includes a mix of particles, such as, but not limited to, two or more, three or more, or four or more, or 5-10, or 10-20, or 1-20, or 1-50 particles with different surface area.

In some embodiments, in the foregoing aspects and the foregoing embodiments, the composition has a zeta potential of greater than −25 millivolts (mV). Zeta potential is the potential difference between the dispersion medium and the stationary layer of fluid attached to the dispersed particle. The zeta potential indicates a degree of repulsion between adjacent similar particles in the dispersion. When the zeta potential is high, the particles may repel and resist aggregation resulting in high dispersion of the particles in the medium. When the zeta potential is low, the attraction may exceed repulsion causing the dispersion to break and particles to flocculate. Without being bound by any theory, it is proposed that the high dispersion of the particles in the compositions of the invention may facilitate the SCM properties of the composition where the SCM composition may not flocculate readily and may be added to Portland cement as SCM. The low dispersion of the particles in the composition may cause setting and hardening of the composition making the cement suitable as the hydraulic cement. The low dispersion of the particles in the composition may also cause setting and hardening of the composition making the cement suitable as the self-cementing material. The experimental techniques to determine the zeta potential are well known in the art and include, but are not limited to, electrophoresis such as microelectrophoresis and electrophoretic light scattering.

In some embodiments, the foregoing aspects and the foregoing embodiments, the composition includes a zeta potential of greater than −20 mV; or greater than −15 mV; or greater than −10 mV; or greater than −5 mV; or greater than −1 mV; or greater than 1 mV; or greater than 2 mV; or greater than 3 mV; or greater than 5 mV; or greater than 10 mV; or greater than 15 mV; or greater than 20 mV; or greater than 25 mV; or greater than 30 mV; or greater than 35 mV; or greater than 40 mV; or greater than 45 mV; or greater than 50 mV; or less than 45 mV; or less than 40 mV; or less than 35 mV; or less than 30 mV; or less than 25 mV; or less than 20 mV; or less than 15 mV; or less than 10 mV; or less than 5 mV; or less than 1 mV; or less than −1 mV; or less than −5 mV; or less than −10 mV; or less than −20 mV; or less than −25 mV; or between +50 mV to −25 mV; or between +45 mV to −25 mV; or between +40 mV to −25 mV; or between +35 mV to −25 mV; or between +30 mV to −25 mV; or between +25 mV to −25 mV; or between +20 mV to −25 mV; or between +15 mV to −25 mV; or between +10 mV to −25 mV; or between +5 mV to −25 mV; or between +1 mV to −25 mV; or between −1 mV to −25 mV; or between −5 mV to −25 mV; or between −10 mV to −25 mV; or between −15 mV to −25 mV; or between −20 mV to −25 mV; or between +20 mV to −20 mV; or between +15 mV to −20 mV; or between +10 mV to −20 mV; or between +5 mV to −20 mV; or between +1 mV to −20 mV; or between −1 mV to −20 mV; or between −5 mV to −20 mV; or between −10 mV to −20 mV; or between −15 mV to −20 mV; or between +25 mV to −10 mV; or between +20 mV to −10 mV; or between +15 mV to −10 mV; or between +10 mV to −10 mV; or between +5 mV to −10 mV; or between +1 mV to −10 mV; or between −1 mV to −10 mV; or between −5 mV to −10 mV; or between −15 mV to −10 mV; or between −25 mV to −10 mV; or between +25 mV to −5 mV; or between +20 mV to −5 mV; or between +15 mV to −5 mV; or between +10 mV to −5 mV; or between +5 mV to −5 mV; or between +1 mV to −5 mV; or between −1 mV to −5 mV; or between −10 mV to −5 mV; or between −15 mV to −5 mV; or between −20 mV to −5 mV; or between −25 mV to −5 mV; or between +25 mV to −1 mV; or between +20 mV to −1 mV; or between +15 mV to −1 mV; or between +10 mV to −1 mV; or between +5 mV to −1 mV; or between +1 mV to −1 mV; or between −5 mV to −1 mV; or between −10 mV to −1 mV; or between −15 mV to −1 mV; or between −20 mV to −1 mV; or between −25 mV to −1 mV; or between 25 mV to 5 mV; or between 20 mV to 5 mV; or between 15 mV to 5 mV; or between 10 mV to 5 mV; or between 1 mV to 5 mV; or between −1 mV to +5 mV; or between −5 mV to +5 mV; or between −10 mV to +5 mV; or between −15 mV to +5 mV; or between −20 mV to +5 mV; or between −25 mV to +5 mV; or between 25 mV to 10 mV; or between 20 mV to 10 mV; or between 15 mV to 10 mV; or between 5 mV to 10 mV; or between 1 mV to 10 mV; or between −1 mV to +10 mV; or between −5 mV to +10 mV; or between −10 mV to +10 mV; or between −15 mV to +10 mV; or between −20 mV to +10 mV; or between −25 mV to +10 mV; or between 25 mV to 20 mV; or between 15 mV to 20 mV; or between 10 mV to 20 mV; or between 5 mV to 20 mV; or between 1 mV to 20 mV; or between −1 mV to +20 mV; or between −5 mV to +20 mV; or between −10 mV to +20 mV; or between −15 mV to +20 mV; or between −20 mV to +20 mV; or between −25 mV to +20 mV; or between 20 mV to 25 mV; or between 15 mV to 25 mV; or between 10 mV to 25 mV; or between 5 mV to 25 mV; or between 1 mV to 25 mV; or between −1 mV to +25 mV; or between −5 mV to +25 mV; or between −10 mV to +25 mV; or between −15 mV to +25 mV; or between −20 mV to +25 mV. For example, the foregoing aspects and the foregoing embodiments, the composition includes a zeta potential of between 10 mV to 45 mV; or between 15 mV to 45 mV; or between 20 mV to 45 mV; or between 25 mV to 45 mV; or between 30 mV to 45 mV; or between 35 mV to 45 mV; or between 40 mV to 45 mV. In some embodiments, the composition of the invention includes a mix of particles with different zeta potential. For example, two or more, or three or more particles, or 3-20 particles in the composition may have different zeta potentials.

In some embodiments, a ratio of calcium to carbonate in the composition may affect the zeta potential of the composition. Without being limited by any theory, it is proposed that the higher ratio of calcium with the carbonate may result in a higher zeta potential or a positive zeta potential, and the lower ratio of the calcium with the carbonate may result in a lower zeta potential or a negative zeta potential. In some embodiments, the ratio of calcium or calcium ion with the carbonate or the carbonate ion in the composition (calcium:carbonate) is greater than 1:1; or greater than 1.5:1; or greater than 2:1; or greater than 2.5:1; or greater than 3:1; or greater than 3.5:1; or greater than 4:1; or greater than 4.5:1; or greater than 5:1; or is in a range of 1:1 to 5:1; or is in a range of 1.5:1 to 5:1; or is in a range of 2:1 to 5:1; or is in a range of 3:1 to 5:1; or is in a range of 4:1 to 5:1; or is in a range of 1:1 to 4:1; or is in a range of 1.5:1 to 4:1; or is in a range of 2:1 to 4:1; or is in a range of 3:1 to 4:1; or is in a range of 1:1 to 3:1; or is in a range of 1.5:1 to 3:1; or is in a range of 2:1 to 3:1; or is in a range of 1:1 to 2:1; or is in a range of 1.5:1 to 2:1; or is in a range of 1.5:1 to 1:1; or is in a range of 1.2:1 to 1.8:1; or is 1:1; or is 1.5:1; or is 2:1; or is 2.5:1; or is 3:1; or is 3.5:1; or is 4:1; or is 4.5:1; or is 5:1. In some embodiments, the ratio of calcium:carbonate in the composition is 1.5:1, or 1:1, or 2:1.

In some embodiments, the ratio of carbonate or the carbonate ion with the calcium or calcium ion in the composition (carbonate:calcium) is greater than 1:1; or greater than 1.5:1; or greater than 2:1; or greater than 2.5:1; or greater than 3:1; or greater than 3.5:1; or greater than 4:1; or greater than 4.5:1; or greater than 5:1; or is in a range of 1:1 to 5:1; or is in a range of 1.5:1 to 5:1; or is in a range of 2:1 to 5:1; or is in a range of 3:1 to 5:1; or is in a range of 4:1 to 5:1; or is in a range of 1:1 to 4:1; or is in a range of 1.5:1 to 4:1; or is in a range of 2:1 to 4:1; or is in a range of 3:1 to 4:1; or is in a range of 1:1 to 3:1; or is in a range of 1.5:1 to 3:1; or is in a range of 2:1 to 3:1; or is in a range of 1:1 to 2:1; or is in a range of 1.5:1 to 2:1; or is in a range of 1.5:1 to 1:1; or is 1:1; or is 1.5:1; or is 2:1; or is 2.5:1; or is 3:1; or is 3.5:1; or is 4:1; or is 4.5:1; or is 5:1. In some embodiments, the ratio of carbonate to calcium (carbonate:calcium) in the composition is 1.5:1, or 1:1, or 2:1.

In some embodiments, the composition of the invention includes a ratio of the carbonate to the hydroxide (carbonate:hydroxide) in a range of 100:1; or 10:1 or 1:1.

In some embodiments, the compositions contain polymorphs of carbonates in combination with bicarbonates, e.g., of divalent cations such as calcium or magnesium; in some cases the composition contains substantially all polymorphs of carbonates, or substantially all bicarbonates, or some ratio of polymorphs of carbonate to bicarbonate. The molar ratio of carbonates to bicarbonates may be any suitable ratio, such as carbonate:bicarbonate ratio of 500/1 to 100/1; 100/1 to 1/100, or 50/1 to 1/50, or 25/1 to 1/25, or 10/1 to 1/10, or 2/1 to 1/2, or about 1/1, or substantially all carbonate or substantially all bicarbonate.

In some embodiments, when the compositions of embodiments of the invention are derived from a saltwater source, they may include one or more components that are present in the saltwater source which may help in identifying the compositions that come from the saltwater source. These identifying components and the amounts thereof are collectively referred to herein as a saltwater source identifier or "markers". For example, if the saltwater source is sea water, identifying component that may be present in the composition include, but are not limited to: chloride, sodium, sulfur, potassium, bromide, silicon, strontium and the like. Any such source-identifying or marker elements are generally present in small amounts, e.g., in amounts of 20,000 ppm or less, such as amounts of 2000 ppm or less. In certain embodiments, the marker compounds are strontium or magnesium. The saltwater source identifier of the compositions may vary depending on the particular saltwater source employed to produce the saltwater-derived composition. In some embodiments, the composition is characterized by having a water source identifying carbonate to hydroxide compound ratio, where in certain embodiments the carbonate:hydroxide ratio ranges from 100 to 1, such as 10 to 1 and including 1 to 1.

In some embodiments, the compositions provided herein further include nitrogen oxide, sulfur oxide, mercury, metal, derivative of any of nitrogen oxide, sulfur oxide, mercury, and/or metal, or combination thereof. The derivatives of nitrogen oxide and sulfur oxide include, but not limited to, nitrates, nitrites, sulfates, and sulfites, etc. The mercury and/or the metal may be present in their derivatized form, such as, oxides and/or hydroxides, or the mercury and/or the metal may be encapsulated or present in the composition of the invention in un-derivatized form. In some embodiments, the compositions provided herein further includes one or more additional components including, but are not limited to, blast furnace slag, fly ash, diatomaceous earth, and other natural or artificial pozzolans, silica fumes, limestone, gypsum, hydrated lime, air entrainers, retarders, waterproofers and coloring agents. These components may be added to modify the properties of the cement, e.g., to provide desired strength attainment, to provide desired setting times, etc. The amount of such components present in a given composition of the invention may vary, and in certain embodiments the amounts of these components range from 1 to 50% w/w, or 10% w/w to 50% w/w, such as 2 to 10% w/w.

In some embodiments, silica minerals may co-occur with the vaterite compositions of the invention. These compounds may be amorphous in nature or crystalline. In certain embodiments, the silica may be in the form of opal-A, amorphous silica, typically found in chert rocks. Calcium magnesium carbonate silicate amorphous compounds may form, within crystalline regions of the polymorphs listed above. Non-carbonate, silicate minerals may also form. Sepiolite is a clay mineral, a complex magnesium silicate, a typical formula for which is $Mg_4Si_6O_{15}(OH)_2.6H_2O$. It can be present in fibrous, fine-particulate, and solid forms. Silcate carbonate minerals may also form. Carletonite, $KNa_4Ca_4(CO_3)_4Si_8O_{18}(F, OH).H_2O$, Hydrated potassium sodium calcium carbonate silicate, can form under these conditions. Like any member of the phyllosilicates subclass, carletonite's structure is layered with alternating silicate sheets and the potassium, sodium and calcium layers. Unlike other phyllosilicates, carletonite's silicate sheets are composed of interconnected four and eight-member rings. The sheets can be thought of as being like chicken wire with alternating octagon and square shaped holes. Both octagons and squares have a four fold symmetry and this is what gives carletonite its tetragonal symmetry; 4/m 2/m 2/m. Only carletonite and other members of the apophyllite group have this unique interconnected four and eight-member ring structure.

In some embodiments, the compositions provided herein further include geopolymers. As used herein, "geopolymers" are conventionally known in the art and include chains or networks of mineral molecules that include alumina silica chains, such as, —Si—O—Si—O— siloxo, poly(siloxo); —Si—O—Al—O— sialate, poly(sialate); —Si—O—Al—O—Si—O— sialate-siloxo, poly(sialate-siloxo); —Si—O—Al—O—Si—O—Si—O— sialate-disiloxo, poly(sialate-disiloxo); —P—O—P—O— phosphate, poly(phosphate); —P—O—Si—O—P—O— phospho-siloxo, poly(phospho-siloxo); —P—O—Si—O—Al—O—P—O— phospho-sialate, poly(phospho-sialate); and —(R)—Si—O—Si—O—(R) organo-siloxo, poly-silicone. Geopolymers include, but are not limited to, water-glass based geopolymer, kaolinite/hydrosodalite-based geopolymer, metakaolin MK-750-based geopolymer, calcium based geopolymer, rock-based geopolymer, silica-based geopolymer, fly-ash based geopolymer, phosphate based geopolymer, and organic mineral geopolymer. In some embodiments, the amount of geopolymer added to the composition of the invention is 1-50% by wt or 1-25% by wt or 1-10% by wt. The geopolymer can be blended into the composition of the invention which can then be used as a hydraulic cement or SCM. The addition of geopolymer to the composition of the invention may decrease the setting time and/or increase the compressive strength of cement when the composition in combination with water sets and hardens into the cement.

In some embodiments, the compositions provided herein further include Portland cement clinker, aggregate, or combination thereof. In some embodiments, the SCM compositions provided herein further include Portland cement clinker, aggregate, supplementary cementitious material (SCM) (such as conventional SCM), or combination thereof. In some embodiments, the SCM is slag, fly ash, silica fume, or calcined clay.

As is known in the art, Portland cements are powder compositions produced by grinding Portland cement clinker (more than 90%), a limited amount of calcium sulfate which controls the set time, and up to 5% minor constituents (as allowed by various standards). As defined by the European Standard EN197.1, "Portland cement clinker is a hydraulic material which shall consist of at least two-thirds by mass of calcium silicates ($3CaO.SiO_2$ and $2CaO.SiO_2$), the remainder consisting of aluminium- and iron-containing clinker phases and other compounds. The ratio of $CaO:SiO_2$ shall not be less than 2.0. The magnesium content (MgO) shall not exceed 5.0% by mass." In certain embodiments, the Portland cement constituent of the present invention is any Portland cement that satisfies the ASTM Standards and Specifications of C150 (Types I-VIII) of the American Society for Testing of Materials (ASTM C50-Standard Specification for Portland Cement). ASTM C150 covers eight types of Portland cement, each possessing different properties, and used specifically for those properties.

In some embodiments, the composition of the invention may further include Ordinary Portland Cement (OPC) or Portland cement clinker. The amount of Portland cement component may vary and range from 10 to 95% w/w; or 10 to 90% w/w; or 10 to 80% w/w; or 10 to 70% w/w; or 10 to 60% w/w; or 10 to 50% w/w; or 10 to 40% w/w; or 10 to 30% w/w; or 10 to 20% w/w; or 20 to 90% w/w; or 20 to 80% w/w; or 20 to 70% w/w; or 20 to 60% w/w; or 20 to 50% w/w; or 20 to 40% w/w; or 20 to 30% w/w; or 30 to 90% w/w; or 30 to 80% w/w; or 30 to 70% w/w; or 30 to 60% w/w; or 30 to 50% w/w; or 30 to 40% w/w; or 40 to 90% w/w; or 40 to 80% w/w; or 40 to 70% w/w; or 40 to 60% w/w; or 40 to 50% w/w; or 50 to 90% w/w; or 50 to 80% w/w; or 50 to 70% w/w; or 50 to 60% w/w; or 60 to 90% w/w; or 60 to 80% w/w; or 60 to 70% w/w; or 70 to 90% w/w; or 70 to 80% w/w. For example, the composition may include a blend of 75% OPC and 25% composition of the invention; or 80% OPC and 20% composition of the invention; or 85% OPC and 15% composition of the invention; or 90% OPC and 10% composition of the invention; or 95% OPC and 5% composition of the invention. In some embodiments, such composition of the invention is an SCM.

In certain embodiments, the composition may further include an aggregate. Aggregate may be included in the composition to provide for mortars which include fine aggregate and concretes which also include coarse aggregate. The fine aggregates are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed round marble, glass spheres, granite, limestone, calcite, feldspar, alluvial sands, sands or any other durable aggregate, and mixtures thereof. As such, the term "aggregate" is used broadly to refer to a number of different types of both coarse and fine particulate material, including, but are not limited to, sand, gravel, crushed stone, slag, and recycled concrete. The amount and nature of the aggregate may vary widely. In some embodiments, the amount of aggregate may range from 25 to 80%, such as 40 to 70% and including 50 to 70% w/w of the total composition made up of both the composition and the aggregate.

In some embodiments, the compositions further include a pH regulating agent which may influence the pH of the fluid component of the settable composition produced from the composition or composition mixed with aggregates (to form concrete), upon combination of the composition with water. Such pH regulating agents may provide for an alkaline environment upon combination with water, e.g., where the pH of the hydrated cement is 12 or higher, such as 13 or higher, and including 13.5 or higher. In certain embodiments, the pH regulating (i.e., modulating) agent is an oxide or hydroxide, e.g., calcium oxide, calcium hydroxide, magnesium oxide or magnesium hydroxide. When present, such agents may be present in amounts ranging from 1 to 10% w/w, such as 2 to 5% w/w.

In some embodiments, there is provided a settable composition prepared from the above recited compositions of the invention. Such settable compositions include, but are not limited to, cement, concrete, and mortar. Settable compositions may be produced by combining the composition of the invention with water or by combining the composition of the invention with an aggregate and water. The aggregate can be a fine aggregate to prepare mortar, such as sand, or a combination of fine and coarse aggregate or coarse aggregate alone for concrete. The composition, the aggregate, and the water may all be mixed at the same time or the composition may be pre-combined with the aggregate and the pre-combined mixture is then mixed with water. The coarse aggregate material for concrete mixes, using the compositions of the invention, may have a minimum size of about ⅜ inch and can vary in size from that minimum to up to one inch or larger, including gradations between these limits. Crushed limestone and other rocks, gravel, and the like are some examples of the coarse aggregates. Finely divided aggregate is smaller than ⅜ inch in size and may be graduated in much finer sizes down to 200-sieve size or so. Ground limestone and other rocks, sand, and the like are some examples of the fine aggregates. Fine aggregates may be present in both mortars and concretes of the invention. The weight ratio of the composition to the aggregate may vary, and in certain embodiments ranges from 1:10 to 4:10, such as 2:10 to 5:10 and including from 55:1000 to 70:100.

The aqueous medium, such as, water, with which the dry components are combined to produce the settable composition, may vary from pure water to water that includes one or more solutes, additives, co-solvents, etc., as desired. The ratio of the aqueous medium:dry components or aqueous medium: composition of the invention is 0.1-10; or 0.1-8; or 0.1-6; or 0.1-4; or 0.1-2; or 0.1-1; or 0.2-10; or 0.2-8; or 0.2-6; or 0.2-4; or 0.2-2; or 0.2-1; or 0.3-10; or 0.3-8; or 0.3-6; or 0.3-4; or 0.3-2; or 0.3-1; or 0.4-10; or 0.4-8; or 0.4-6; or 0.4-4; or 0.4-2; or 0.4-1; or 0.5-10; or 0.5-8; or 0.5-6; or 0.5-4; or 0.5-2; or 0.5-1; or 0.6-10; or 0.6-8; or 0.6-6; or 0.6-4; or 0.6-2; or 0.6-1; or 0.8-10; or 0.8-8; or 0.8-6; or 0.8-4; or 0.8-2; or 0.8-1; or 1-10; or 1-8; or 1-6; or 1-4; or 1-2; or 0.1; or 0.5; or 1; or 2. In some embodiments, the ratio is a weight ratio.

XRD Pattern of the Crystals of the Compositions

In some embodiments, the invention provides a composition that includes a calcium carbonate composition component in which the calcium carbonate component after being in air at 40° C. for at least 8 hours exhibits an x-ray diffraction pattern (XRD) with the peak of most intensity located at 32.55° to 32.95° 2θ. In some embodiments, the invention provides a composition that includes a calcium carbonate composition component in which the calcium carbonate component after being in air at 40° C. for at least 8 hours exhibits an x-ray diffraction pattern (XRD) with the peak of most intensity located at 32.55° to 32.95° 2θ in which the calcium carbonate composition component has a relative carbon isotope composition ($\delta^{13}C$) value less than −5.00‰, or less than −12‰, or less than −13‰, or less than −14‰, or less than −15‰, or between −12‰ or −25‰.

In some embodiments, the invention provides a composition including a calcium carbonate composition component wherein the calcium carbonate component after being in air at 40° C. for at least 8 hours exhibits an x-ray diffraction pattern (XRD) with the peak of most intensity located at 29.05° to 29.45° 2θ. In some embodiments, the invention provides a composition including a calcium carbonate composition component wherein the calcium carbonate component after being in air at 40° C. for at least 8 hours exhibits an x-ray diffraction pattern (XRD) with the peak of most intensity located at 29.05° to 29.45° 2θ in which the calcium carbonate composition component has a relative carbon isotope composition ($\delta^{13}C$) value less than −5.00‰, or less than −12‰, or less than −13‰, or less than −14‰, or less than −15‰, or between −12‰ or −25‰.

In some embodiments, the invention provides a composition including a calcium carbonate composition component wherein the calcium carbonate component after being in air at 40° C. for at least 8 hours exhibits an XRD pattern indicative of the calcium carbonate component including at least 2 polymorphs of calcium carbonate wherein the peak of most intensity located at 29.05° to 29.45° 2θ, the second most intense peak is located at 31.50 to 31.905° 2θ, and the next most intense peaks are located at 26.85° to 27.50° 2θ and 32.55° to 32.95° 2θ. In some embodiments, the invention provides a composition including a calcium carbonate composition component wherein the calcium carbonate component after being in air at 40° C. for at least 8 hours exhibits an XRD pattern indicative of the calcium carbonate component including at least 2 polymorphs of calcium carbonate wherein the peak of most intensity located at 29.05° to 29.45° 2θ, the second most intense peak is located at 31.50 to 31.905° 2θ, and the next most intense peaks are located at 26.85° to 27.50° 2θ and 32.55° to 32.95° 2θ in which the calcium carbonate composition component has a relative carbon isotope composition ($\delta^{13}C$) value less than −5.00‰, or less than −12‰, or less than −15‰, or between −12‰ or −25‰.

In some embodiments, the invention provides a composition including a calcium carbonate composition component wherein the calcium carbonate component after being in air at 40° C. for at least 8 hours exhibits an XRD pattern indicative of the calcium carbonate component including at least 2 polymorphs of calcium carbonate wherein the peak of most intensity located at 29.05° to 29.45° 2θ, the second most intense peak is located at 31.50 to 31.905° 2θ, and the next most intense peaks are located at 26.85° to 27.50° 2θ and 32.55° to 32.95° 2θ. In some embodiments, the invention provides a composition including a calcium carbonate composition component wherein the calcium carbonate component after being in air at 40° C. for at least 8 hours exhibits an XRD pattern indicative of the calcium carbonate component including at least 2 polymorphs of calcium carbonate wherein the peak of most intensity located at 29.05° to 29.45° 2θ, the second most intense peak is located at 31.50 to 31.905° 2θ, and the next most intense peaks are located at 26.85° to 27.50° 2θ and 32.55° to 32.95° 2θ in which the calcium carbonate composition component has a relative carbon isotope composition ($\delta^{13}C$) value less than −5.00‰, or less than −12‰, or less than −15‰, or between −12‰ or −25‰.

In some embodiments, the invention provides a composition including a calcium carbonate composition component having a relative carbon isotope composition ($\delta^{13}C$) value less than −5.00‰, or less than −12‰, or less than −15‰, or between −12‰ or −25‰, wherein the calcium carbonate composition comprises at least 2 polymorphs of calcium carbonate.

In some embodiments, the invention provides a composition including a calcium carbonate composition component wherein the calcium carbonate component after being in air at 40° C. for at least 8 hours exhibits an x-ray diffraction pattern (XRD) with the peak of most intensity located at 29.05° to 29.45° 2θ, the second most intense peak is located at 31.50 to 31.90° 2θ, and the next most intense peaks are located at 26.85° to 27.50° 2θ and 32.55° to 32.95° 2θ, and further wherein the calcium carbonate composition component having a relative carbon isotope composition ($\delta^{13}C$) value less than −5.00‰, or less than −12‰, or less than −15‰, or between −12‰ or −25‰.

In some embodiments, the invention provides a composition including a calcium carbonate composition component wherein: the calcium carbonate component comprises at least 2 polymorphs of calcium carbonate; the calcium carbonate component comprises spherical particulates of calcium carbonate less than 5 μm in diameter; and the calcium carbonate component has a relative carbon isotope composition ($\delta^{13}C$) value less than −5.00‰, or less than −12‰, or less than −15‰, or between −12‰ or −25‰. In some embodiments, the invention provides a composition including a calcium carbonate composition component wherein: the calcium carbonate component comprises at least 2 polymorphs of calcium carbonate; the calcium carbonate component comprises spherical particulates of calcium carbonate less than 5 μm in diameter; and the calcium carbonate component has a relative carbon isotope composition ($\delta^{13}C$) value less than −5.00‰, or less than −12‰, or less than −15‰, or between −12‰ or −25‰ in which the spherical particulates are part of an agglomeration of the spherical particulates.

In some embodiments, the invention provides a composition including a calcium carbonate component including at least two polymorphs of calcium carbonate wherein the calcium carbonate component has a relative carbon isotope composition ($\delta^{13}C$) value less than −5.00‰, or less than −12‰, or less than −15‰, or between −12‰ or −25‰ and wherein the calcium carbonate component after being in air at 40° C. for at least 8 hours exhibits an x-ray diffraction pattern (XRD) with the peaks of greatest intensity located at 26.85° to 27.50° 2θ and 32.55 to 32.95° 2θ, further wherein, upon mixing with water to form a paste and allowing the paste to harden over 7 days, the composition exhibits an x-ray diffraction pattern (XRD) with the peak of most intensity located at 29.05° to 29.45° 2θ.

In some embodiments, the invention provides a composition including a calcium carbonate component including at least two polymorphs of calcium carbonate wherein the calcium carbonate component has a relative carbon isotope composition ($\delta^{13}C$) value less than −5.00‰, or less than −12‰, or less than −15‰, or between −12‰ or −25‰ and wherein the calcium carbonate component after being in air at 40° C. for at least 8 hours exhibits an x-ray diffraction pattern (XRD) with the peaks of greatest intensity located at 26.85° to 27.50° 2θ and 32.55 to 32.95° 2θ, further wherein, upon mixing with water to form a paste and allowing the paste to harden over 7 days, the composition exhibits an x-ray diffraction pattern (XRD) with the peak of most intensity located at 29.05° to 29.45° 2θ.

In some embodiments, the invention provides a composition including calcium carbonate having a relative carbon isotope composition ($\delta^{13}C$) value less than −5.00‰, or less than −12‰, or less than −15‰, or between −12‰ or −25‰ wherein after being in air at 40° C. for at least 8 hours the composition exhibits an x-ray diffraction pattern (XRD) with the peaks of greatest intensity located at 26.85° to 27.50° 2θ and 32.55 to 32.95° 2θ and a spherical morphology.

In some embodiments, the invention provides a settable composition that includes a calcium carbonate component as previously described hereinabove.

In some embodiments, the invention provides a method including: contacting a gas including carbon dioxide with an aqueous solution; subjecting the aqueous solution to carbonate precipitation conditions; precipitating a carbonate composition; separating the carbonate composition from the aqueous solution; and further processing the aqueous solution and the carbonate composition.

Admixtures

In certain embodiments, the compositions of the invention further include one or more admixtures. Admixtures may be added to concrete to provide it with desirable characteristics or to modify properties of the concrete to make it more readily useable or more suitable for a particular purpose or for cost reduction. As is known in the art, an admixture is any material or composition, other than the composition of the invention, aggregate and water; that is used as a component of the concrete or mortar to enhance some characteristic or lower the cost, thereof. The amount of admixture that is employed may vary depending on the nature of the admixture. In certain embodiments the amounts of these components range from 1 to 50% w/w, such as 2 to 10% w/w.

The admixtures may provide one or more advantages, such as, (1) achieve certain structural improvements in the resulting cured concrete; (2) improve the quality of concrete through the successive stages of mixing, transporting, placing, and curing during adverse weather or traffic conditions; (3) overcome certain emergencies during concreting operations; and (4) reduce the cost of concrete construction.

Admixtures of interest include finely divided mineral admixtures, such as SCM. Finely divided mineral admixtures are materials in powder or pulverized form added to concrete before or during the mixing process to improve or change some of the plastic or hardened properties of concrete. The SCM can be classified according to their chemical or physical properties as: cementitious materials; pozzolans; pozzolanic and cementitious materials; and nominally inert materials. A pozzolan is a siliceous or aluminosiliceous material that possesses little or no cementitious value but may, in the presence of water and in finely divided form, chemically react with the calcium hydroxide released by the hydration of the cement to form materials with cementitious properties. Pozzolans can also be used to reduce the rate at which water under pressure is transferred through concrete. Diatomaceous earth, opaline cherts, clays, shales, fly ash, silica fume, volcanic tuffs and pumicites are some of the known pozzolans. Certain ground granulated blast-furnace slags and high calcium fly ashes possess both pozzolanic and cementitious properties. Nominally inert materials can also include finely divided raw quartz, dolomites, limestone, marble, granite, and others. Fly ash is defined in ASTM C618.

Plasticizer is another example of the admixture. Plasticizers can be added to the concrete to provide it with improved workability; ease of placement; reduced consolidating effort; and provide uniform flow in reinforced concretes without leaving void space under reinforcing bars. Other examples of admixtures include, but are not limited to, accelerators, retarders, air-entrainers, foaming agents, water reducers, corrosion inhibitors, and pigments. Accelerators may be used to increase the cure rate (hydration) of the concrete formulation and may be used in applications where it is desirable for the concrete to harden quickly and in low temperature applications. Retarders act to slow the rate of hydration and increase the time available to pour the concrete and to form it into a desired shape. Retarders may be of advantage in applications where the concrete is being used in hot climates. Air-entrainers are used to distribute tiny air bubbles throughout the concrete. Air-entrainers may be of advantage for utilization in regions that experience cold weather because the tiny entrained air bubbles may help to allow for some contraction and expansion to protect the concrete from freeze-thaw damage. Pigments can also be added to concrete to provide it with desired color characteristics for aesthetic purposes.

As such, admixtures of interest include, but are not limited to: set accelerators, set retarders, air-entraining agents, defoamers, alkali-reactivity reducers, bonding admixtures, dispersants, coloring admixtures, corrosion inhibitors, damp-proofing admixtures, gas formers, permeability reducers, pumping aids, shrinkage compensation admixtures, fungicidal admixtures, germicidal admixtures, insecticidal admixtures, rheology modifying agents, finely divided mineral admixtures, pozzolans, aggregates, wetting agents, strength enhancing agents, water repellents, and any other concrete or mortar admixture or additive. When using an admixture, the fresh composition, to which the admixture raw materials are introduced, is mixed for sufficient time to cause the admixture raw materials to be dispersed relatively uniformly throughout the fresh concrete.

Set accelerators may be used to accelerate the setting and early strength development of concrete. The set accelerator that can be used with the admixture system can be, but is not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulfate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxylalkylamine; a halide salt of an alkali metal or alkaline earth metal (e.g., chloride). Examples of set accelerators that may be used in the present dispensing method include, but are not limited to, POZZOLITH® NC534, nonchloride type set accelerator and/or RHEOCRETE® CNI calcium nitrite-based corrosion inhibitor, both sold under the above trademarks by BASF Admixtures Inc. of Cleveland, Ohio.

Also of interest are set retarding admixtures. Set retarding, also known as delayed-setting or hydration control, admixtures are used to retard, delay, or slow the rate of setting of concrete. They can be added to the concrete mix upon initial batching or sometime after the hydration process has begun. Set retarders may be used to offset the accelerating effect of hot weather on the setting of concrete, or delay the initial set of concrete or grout when difficult conditions of placement occur, or problems of delivery to the job site, or to allow time for special finishing processes. Most set retarders may also act as low level water reducers and can also be used to entrain some air into concrete. Retarders that can be used include, but are not limited to an oxy-boron compound, corn syrup, lignin, a polyphosphonic acid, a carboxylic acid, a hydroxycarboxylic acid, polycarboxylic acid, hydroxylated carboxylic acid, such as fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates and mixtures thereof. Illustrative examples of retarders are set forth in U.S. Pat. Nos. 5,427,617 and 5,203,919, which are incorporated herein by reference. A further example of a retarder suitable for use in the admixture system is a hydration control admixture sold under the trademark DELVO® by BASF Admixtures Inc. of Cleveland, Ohio.

Also of interest as admixtures are air entrainers. The air entrainer includes any substance that will entrain air in cementitious compositions. Some air entrainers can also reduce the surface tension of a composition at low concentration. Air-entraining admixtures are used to purposely entrain microscopic air bubbles into concrete. Air-entrainment may improves the durability of concrete exposed to moisture during cycles of freezing and thawing. In addition, entrained air may improve concrete's resistance to surface scaling caused by chemical deicers. Air entrainment may also increase the workability of fresh concrete while eliminating or reducing segregation and bleeding. Materials used to achieve these desired effects can be selected from wood resin, natural resin, synthetic resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof. Air entrainers are added in an amount to yield a desired level of air in a cementitious composition. Examples of air entrainers that can be utilized in the admixture system include, but are not limited to MB AE 90, MB VR and MICRO AIR®, all available from BASF Admixtures Inc. of Cleveland, Ohio.

Also of interest as admixtures are defoamers. Defoamers are used to decrease the air content in the cementitious composition. Examples of defoamers that can be utilized in the composition include, but are not limited to mineral oils, vegetable oils, fatty acids, fatty acid esters, hydroxyl functional compounds, amides, phosphoric esters, metal soaps, silicones, polymers containing propylene oxide moieties, hydrocarbons, alkoxylated hydrocarbons, alkoxylated polyalkylene oxides, tributyl phosphates, dibutyl phthalates, octyl alcohols, water-insoluble esters of carbonic and boric acid, acetylenic diols, ethylene oxide-propylene oxide block copolymers and silicones.

Also of interest as admixtures are dispersants. The dispersant includes, but is not limited to, polycarboxylate dispersants, with or without polyether units. The term dispersant is also meant to include those chemicals that also function as a plasticizer, water reducer such as a high range water reducer, fluidizer, antiflocculating agent, or superplasticizer for cementitious compositions, such as lignosulfonates, salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins for example LOMAR D® dispersant (Cognis Inc., Cincinnati, Ohio), polyaspartates, or oligomeric dispersants. Polycarboxylate dispersants can be used, by which is meant a dispersant having a carbon backbone with pendant side chains, wherein at least a portion of the side chains are attached to the backbone through a carboxyl group or an ether group.

Examples of polycarboxylate dispersants can be found in U.S. Pub. No. 2002/0019459, U.S. Pat. No. 6,267,814, U.S. Pat. No. 6,290,770, U.S. Pat. No. 6,310,143, U.S. Pat. No. 6,187,841, U.S. Pat. No. 5,158,996, U.S. Pat. No. 6,008,275, U.S. Pat. No. 6,136,950, U.S. Pat. No. 6,284,867, U.S. Pat. No. 5,609,681, U.S. Pat. No. 5,494,516; U.S. Pat. No. 5,674,929, U.S. Pat. No. 5,660,626, U.S. Pat. No. 5,668,195, U.S. Pat. No. 5,661,206, U.S. Pat. No. 5,358,566, U.S. Pat. No. 5,162,402, U.S. Pat. No. 5,798,425, U.S. Pat. No. 5,612,396, U.S. Pat. No. 6,063,184, U.S. Pat. No. 5,912,284, U.S. Pat. No. 5,840,114, U.S. Pat. No. 5,753,744, U.S. Pat. No. 5,728,207, U.S. Pat. No. 5,725,657, U.S. Pat. No. 5,703,174, U.S. Pat. No. 5,665,158, U.S. Pat. No. 5,643,978, U.S. Pat. No. 5,633,298, U.S. Pat. No. 5,583,183, and U.S. Pat. No. 5,393,343, which are all incorporated herein by reference as if fully written out below. The polycarboxylate dispersants of interest include, but are not limited to, dispersants or water reducers sold under the trademarks GLENIUM® 3030NS, GLENIUM® 3200 HES, GLENIUM 3000NS® (BASF Admixtures Inc., Cleveland, Ohio), ADVA® (W. R. Grace Inc., Cambridge, Mass.), VISCOCRETE® (Sika, Zurich, Switzerland), and SUPERFLUX® (Axim Concrete Technologies Inc., Middlebranch, Ohio).

Also of interest as admixtures are alkali reactivity reducers. Alkali reactivity reducers can reduce the alkali-aggregate reaction and limit the disruptive expansion forces that this reaction can produce in hardened concrete. The alkali-reactivity reducers include pozzolans (fly ash, silica fume), blast-furnace slag, salts of lithium and barium, and other air-entraining agents. Natural and synthetic admixtures are used to color concrete for aesthetic and safety reasons. These coloring admixtures are usually composed of pigments and include carbon black, iron oxide, phthalocyanine, umber, chromium oxide, titanium oxide, cobalt blue, and organic coloring agents.

Also of interest as admixtures are corrosion inhibitors. Corrosion inhibitors in concrete may serve to protect embedded reinforcing steel from corrosion due to its highly alkaline nature. The high alkaline nature of the concrete may cause a passive and non-corroding protective oxide film to form on steel. However, carbonation or the presence of chloride ions from deicers or seawater can destroy or penetrate the film and may result in corrosion. Corrosion-inhibiting admixtures may chemically arrest this corrosion reaction. The materials commonly used to inhibit corrosion are calcium nitrite, sodium nitrite, sodium benzoate, certain phosphates or fluorosilicates, fluoroaluminites, amines and related chemicals.

Also of interest are damp-proofing admixtures. Damp-proofing admixtures reduce the permeability of concrete that have low cement contents, high water-cement ratios, or a deficiency of fines in the aggregate. These admixtures retard moisture penetration into dry concrete and include certain soaps, stearates, and petroleum products. Also of interest are gas former admixtures. Gas formers, or gas-forming agents, are sometimes added to concrete and grout in very small quantities to cause a slight expansion prior to hardening. The amount of expansion is dependent upon the amount of gas-forming material used and the temperature of the fresh mixture. Aluminum powder, resin soap and vegetable or animal glue, saponin or hydrolyzed protein can be used as gas formers.

Also of interest are permeability reducers. Permeability reducers may be used to reduce the rate at which water under pressure is transmitted through concrete. Silica fume, fly ash, ground slag, natural pozzolans, water reducers, and latex may be employed to decrease the permeability of the concrete.

Also of interest are rheology modifying agent admixtures. Rheology modifying agents may be used to increase the viscosity of cementitious compositions. Suitable examples of rheology modifier include firmed silica, colloidal silica, hydroxyethyl cellulose, hydroxypropyl cellulose, fly ash (as defined in ASTM C618), mineral oils (such as light naphthenic), hectorite clay, polyoxyalkylenes, polysaccharides, natural gums, or mixtures thereof.

Also of interest are shrinkage compensation admixtures. The shrinkage compensation agent which can be used in the cementitious composition can include, but is not limited to, $RO(AO)_{1-10}H$, wherein R is a $C_{1-5}$ alkyl or $C_{5-6}$ cycloalkyl radical and A is a $C_{2-3}$ alkylene radical, alkali metal sulfate, alkaline earth metal sulfates, alkaline earth oxides, preferably sodium sulfate and calcium oxide. TETRAGUARD® is an example of a shrinkage reducing agent and is available from BASF Admixtures Inc. of Cleveland, Ohio.

Bacterial and fungal growth on or in hardened concrete may be partially controlled through the use of fungicidal and germicidal admixtures. The materials for these purposes include, but are not limited to, polyhalogenated phenols, dialdrin emulsions, and copper compounds.

Also of interest in some embodiments is workability improving admixtures. Entrained air, which acts like a lubricant, can be used as a workability improving agent. Other workability agents are water reducers and certain finely divided admixtures.

In some embodiments, the compositions of the invention are employed with fibers, e.g., where fiber-reinforced concrete is desirable. Fibers can be made of zirconia containing materials, steel, carbon, fiberglass, or synthetic materials, e.g., polypropylene, nylon, polyethylene, polyester, rayon, high-strength aramid, (i.e. Kevlar®), or mixtures thereof.

The components of the compositions of the invention can be combined using any suitable protocol. Each material may be mixed at the time of work, or part of or all of the materials may be mixed in advance. Alternatively, some of the materials are mixed with water with or without admixtures, such as high-range water-reducing admixtures, and then the remaining materials may be mixed therewith. As a mixing apparatus, any conventional apparatus can be used. For example, Hobart mixer, slant cylinder mixer, Omni Mixer, Henschel mixer, V-type mixer, and Nauta mixer can be employed.

Following the combination of the components to produce a settable composition (e.g., concrete), the settable composition will set after a given period of time. The setting time may vary, and in certain embodiments ranges from 30 minutes to 48 hours, such as 30 minutes to 24 hours and including from 1 hour to 4 hours. In certain embodiments, the cement products produced from compositions of the invention are extremely durable, e.g., as determined using the test method described at ASTM C1157.

Building Material

In one aspect, there is provided a structure or a building material comprising the composition of the invention or or the set and hardened form thereof. In some embodiments, the building material is formed from the compositions of the invention. Examples of such structures or the building materials include, but are not limited to, building, driveway, foundation, kitchen slab, furniture, pavement, road, bridges, motorway, overpass, parking structure, brick, block, wall, footing for a gate, fence, or pole, and combination thereof. Since these structures or building materials comprise and/or are produced from the compositions of the invention, they may include markers or components that identify them as being obtained from carbon dioxide of fossil fuel origin and/or being obtained from water having trace amounts of various elements present in the initial salt water source, as described above. For example, where the mineral component of the cement component of the concrete is one that has been produced from sea water, the set product will contain a seawater marker profile of different elements in identifying amounts, such as magnesium, potassium, sulfur, boron, sodium, and chloride, etc.

In one aspect, there is provided a formed building material comprising the composition of the invention or or the set and hardened form thereof. In some embodiments, the formed building material is formed from the compositions of the invention. The formed building material may be a pre-cast building material, such as, a pre-cast concrete product. The formed building materials and the methods of making and using the formed building materials are described in U.S. application Ser. No. 12/571,398, filed Sep. 30, 2009, which is incorporated herein by reference in its entirety. The formed building materials of the invention may vary greatly and include materials shaped (e.g., molded, cast, cut, or otherwise produced) into man-made structures with defined physical shape, i.e., configuration. Formed building materials are distinct from amorphous building materials (e.g., powder, paste, slurry, etc.) that do not have a defined and stable shape, but instead conform to the container in which they are held, e.g., a bag or other container. Formed building materials are also distinct from irregularly or imprecisely formed materials (e.g., aggregate, bulk forms for disposal, etc.) in that formed building materials are produced according to specifications that allow for use of formed building materials in, for example, buildings. Formed building materials may be prepared in accordance with traditional manufacturing protocols for such structures, with the exception that the composition of the invention is employed in making such materials. In some embodiments, the formed building materials made from the composition of the invention have a compressive strength of at least 14 MPa; or between about 14-100 MPa; or between about 14-45 MPa; or the compressive strength of the composition of the invention after setting, and hardening, as described herein. In some embodiments, the formed building materials made from the composition of the invention have a $\delta^{13}C$ of less than −12‰; or less than −13‰; or less than −14‰; or less than −15‰; or from −15‰ to −80‰; or the $\delta^{13}C$ of the composition of the invention, as described herein.

One example of the formed building materials is masonry units. Masonry units are formed building materials used in the construction of load-bearing and non-load-bearing structures that are generally assembled using mortar, grout, and the like. Exemplary masonry units formed from the compositions of the invention include bricks, blocks, and tiles. Bricks and blocks of the invention are polygonal structures possessing linear dimensions. Bricks are masonry units with dimensions (mm) not exceeding 337.5×225×112.5 (length×width×height). Any unit with dimensions (mm) between 337.5×225×112.5 to 2000×1000×500 (length×width×depth) is termed a "block." Structural units with dimensions (mm) exceeding 2000×1000×500 (length×width×depth) are termed "slabs." Tiles refer to masonry units that possess the same dimensions as bricks or blocks, but may vary considerably in shape, i.e., may not be polygonal (e.g., hacienda-style roof tiles).

One type of masonry unit provided by the invention is a brick, which refers to a structural unit of material used in masonry construction, generally laid using mortar. Bricks formed from the compositions of the invention are masonry units with dimensions (mm) not exceeding 337.5×225×112.5 (length×width×height). In some embodiments, the bricks may have lengths ranging from 175 to 300 mm, such as 200 to 250 mm, including 200 to 230 mm; widths ranging from 75 to 150 mm, such as 100 to 120 mm, including 100 to 110 mm; and heights ranging from 50 to 90 mm, such as 50 to 80 mm, including 55 to 75 mm. Bricks may vary in grade, class, color, texture, size, weight and can be solid, cellular, perforated, frogged, or hollow. Bricks formed from the compositions of the invention may include, but are not limited to, building brick, facing brick, load bearing brick, engineering brick, thin veneer brick, paving brick, glazed brick, firebox brick, chemical resistant brick, sewer and manhole brick, industrial floor brick, etc. The bricks may also vary in frost resistance (i.e., frost resistant, moderately frost resistant or non frost resistant), which relates to the durability of bricks in conditions where exposure to water may result in different levels of freezing and thawing. Frost resistant bricks are durable in conditions of constant exposure to water and freezing and thawing. Moderately frost resistant bricks are durable in conditions of sporadic exposure to water and freezing and thawing. Non-frost resistant bricks are not durable in conditions of exposure to water and freezing and thawing. These bricks are suitable only for internal use and are liable to damage by freezing and thawing except when protected by an impermeable cladding during construction. Bricks formed from the compositions of the invention may also vary in soluble salt content (i.e., low or normal). Percentage by mass of soluble ions in bricks with a low soluble salt content does not exceed 0.03% magnesium, 0.03% potassium, 0.03% sodium, and 0.5% sulfate. Percentage by mass of soluble ions in bricks with a normal salt content does not exceed 0.25% of magnesium, potassium, and sodium in total and sulfate content does not exceed 1.6%. The bricks may vary considerably in physical and mechanical properties. The compressive strength of bricks formed from the compositions of the invention may range, in certain instances, from 5 to 100 MPa; or 20-100 MPa; or 50-100 MPa; or 80-100 MPa; or 20-80 MPa; or 20-40 MPa; or 60-80 MPa.

The flexural strength of bricks formed from the compositions of the invention may vary, ranging from 0.5 to 10 MPa, including 2 to 7 MPa, such as 2 to 5 MPa. The maximum water absorption of bricks may vary, ranging from 5 to 25%, including 10 to 15%. Bricks formed from the compositions of the invention may also undergo moisture movement (expansion or contraction) due to the absorption or loss of water to its environment. The dimensional stability (i.e., linear shrinkage or expansion) due to moisture movement may vary, in certain instances ranging from 0.001 to 0.2%, including 0.05 to 0.1%. In some embodiments, the bricks may be used for paving a road. Bricks used to pave areas exposed to heavy traffic (e.g., pedestrian, vehicular, etc.) may have an abrasion resistance index ranging from 0.1 to 0.5, including 0.2 to 0.4, such as 0.3. In addition, bricks formed from the compositions of the invention may have a volume abrasion loss ranging from 1.0 to 4.0 $cm^3/cm^2$, including 1.5 to 2.5 $cm^3/cm^2$, or 2.0 $cm^3/cm^2$. The composition of the invention may be molded, extruded, or sculpted into the desired shape and size to form a brick. The shaped composition is then dried and further hardened by hydraulic pressure, autoclave or fired in a kiln at temperatures ranging between 900° to 1200° C., such as 900° to 1100° C. and including 1000° C.

Another type of masonry unit provided by the invention is blocks, (e.g., concrete, cement, foundation, etc.). Blocks are distinct from bricks based on their structural dimensions. Specifically, blocks exceed the dimensions (mm) of 337.5×225×112.5 (length×width×height). Blocks formed from the compositions of the invention may vary in color, texture, size, and weight and can be solid, cellular, and hollow or employ insulation (e.g., expanded polystyrene foam) in the block void volume. Blocks may be load-bearing, non-load-bearing or veneer (i.e., decorative) blocks. In some embodiments, the blocks may have lengths ranging from 300 to 500 mm, such as 350 to 450 mm, widths ranging from 150 to 250 mm, such as 180 to 215 mm and heights ranging from 100 to 250 mm, such as 150 to 200 mm. The blocks may also vary in faceshell thickness. In some instances, the blocks may have faceshell thicknesses ranging from 15 to 40 mm, including 20 to 30 mm, such as 25 mm. The blocks may also vary in web thickness. In some embodiments, the blocks may have web thicknesses ranging from 15 to 30 mm, including 15 to 25 mm, such as 20 mm. The blocks formed from the compositions of the invention may vary considerably in physical and mechanical properties. The compressive strength of blocks may vary, in certain instances ranging from 5 to 100 MPa, including 15 to 75 MPa, such as 20 to 40 MPa. The flexural strength of blocks formed from the compositions of the invention may also vary, ranging from 0.5 to 15 MPa, including 2 to 10 MPa, such as 4 to 6 MPa. The maximum water absorption of the blocks may vary, ranging from 7 to 20% by weight including 8 to 15%, such as 9 to 11%. Blocks formed from the compositions of the invention may also undergo moisture movement (expansion or contraction) due to the absorption or loss of water to its environment. Blocks may be Type I moisture-controlled units or Type II non-moisture-controlled units. The dimensional stability (i.e., linear shrinkage) of the blocks formed from the compositions of the invention may vary depending on their intended use and/or geographical location of use, in certain instances ranging from 0.02 to 0.15%, such as 0.03 to 0.05%. The composition of the invention may be molded, extruded, or sculpted into the desired shape and size to form a block. The shaped composition may be further compacted by roller compaction, hydraulic pressure, vibrational compaction, or resonant shock compaction. In some instances, the resultant composition may also be foamed using mechanically or chemically introduced gases prior to being shaped or while the composition is setting in order to form a lightweight concrete block. The composition is further cured in an environment with a controlled temperature and humidity.

Another type of building material provided by the invention is a tile. Tiles formed from the compositions of the invention refer to non-load-bearing building materials that are commonly employed on roofs and to pave exterior and interior floors of commercial and residential structures. Some examples where tiles may be employed include, but are not limited to, the roofs of commercial and residential buildings, decorative patios, bathrooms, saunas, kitchens, building foyer, driveways, pool decks, porches, walkways, sidewalks, and the like. Tiles may take on many forms depending on their intended use and/or intended geographical location of use, varying in shape, size, weight, and may be solid, webbed, cellular or hollow. Tiles formed from the compositions of the invention may vary in dimension, e.g., lengths ranging from 100 to 1000 mm, including 250 to 500 mm, such as 250 to 300 mm; widths ranging from 50 to 1000 mm, including 100 to 250 mm, such as 125 to 175 mm; and thickness ranging from 10 to 30 mm, including 15 to 25 mm, such as 15 to 20 mm. The compressive strengths of tiles formed from the compositions of the invention may also vary, in certain instances ranging from 5 to 75 MPa, including 15 to 40 MPa, such as 25 MPa. The flexural strength of tiles formed from the compositions of the invention may vary, ranging from 0.5 to 7.5 MPa, including 2 to 5 MPa, such as 2.5 MPa. The maximum water absorption of tiles may also vary, in certain instances ranging from 5 to 15%, including 7 to 12%. Tiles of the invention may also undergo moisture movement (expansion or contraction) due to the absorption or loss of water to its environment. The dimensional stability (i.e., linear shrinkage or expansion) due to moisture movement may vary, in certain instances ranging from 0.001 to 0.25%, including 0.025 to 0.075%, such as 0.05%. Tiles used to pave areas exposed to heavy traffic (e.g., pedestrian, vehicular, etc.) may have an abrasion resistance index that may vary considerably, ranging from 0.1 to 0.5, including 0.25. In addition, tiles may have a volume abrasion loss ranging from 1.0 to 4.0 $cm^3/cm^2$, including 1.5 to 3.0 $cm^3/cm^2$, such as, 2.7 $cm^3/cm^2$. Tiles may be polygonal, circular or take on any other desired shape.

As such, the composition of the invention may be molded or cast into the desired tile shape and size. The shaped composition may be further compacted by roller compaction, hydraulic pressure, vibrational compaction, or resonant shock compaction. The resultant composition may also be poured out into sheets or a roller may be used to form sheets of a desired thickness. The sheets are then cut to the desired dimensions of the tiles. In some instances, the resultant composition may also be foamed using mechanically or chemically introduced gases prior to being shaped or while the composition is setting in order to form a lightweight tile. The shaped composition is then allowed to set and further cured in an environment with a controlled temperature and humidity. Tiles may be further polished, colored, textured, shot blasted, inlaid with decorative components and the like.

Construction panels are formed building materials employed in a broad sense to refer to any non-load-bearing structural element that are characterized such that their length and width are substantially greater than their thickness. Exemplary construction panels formed from the compositions of the invention include cement boards, fiber-cement sidings, and drywall. Construction panels are polygonal structures with dimensions that vary greatly depending on their intended use. The dimensions of construction panels may range from 50 to 500 cm in length, including 100 to 300 cm, such as 250 cm; width ranging from 25 to 200 cm, including 75 to 150 cm, such as 100 cm; thickness ranging from 5 to 25 mm, including 7 to 20 mm, including 10 to 15 mm. Cement boards comprise construction panels conventionally prepared as a combination of cement and fiberglass and possess additional fiberglass reinforcement at both faces of the board. Fiber-cement sidings comprise construction panels conventionally prepared as a combination of cement, aggregate, interwoven cellulose, and/or polymeric fibers and possess a texture and flexibility that resembles wood. Drywall comprises construction panels conventionally prepared from gypsum plaster (i.e., semi-hydrous form of calcium sulfate), fibers (glass or paper) and is sandwiched between two sheets of outer material, e.g., paper or fiberglass mats.

One type of construction panel formed from the compositions of the invention is cement board. They are formed building materials where in some embodiments, are used as backer boards for ceramics that may be employed behind bathroom tiles, kitchen counters, backsplashes, etc. and may have lengths ranging from 100 to 200 cm, such as 125 to 175 cm, e.g., 150 to 160 cm; a breadth ranging from 75 to 100 cm, such as 80 to 100 cm, e.g., 90 to 95 cm, and a thickness ranging from 5 to 25 mm, e.g., 5 to 15 mm, including 5 to 10 mm. Cement boards of the invention may vary in physical and mechanical properties. In some embodiments, the flexural strength may vary, ranging between 1 to 7.5 MPa, including 2 to 6 MPa, such as 5 MPa. The compressive strengths may also vary, ranging from 5 to 50 MPa, including 10 to 30 MPa, such as 15 to 20 MPa. In some embodiments of the invention, cement boards may be employed in environments having extensive exposure to moisture (e.g., commercial saunas). The maximum water absorption of the cement boards of the invention may vary, ranging from 5 to 15% by weight, including 8 to 10%, such as 9%. Cement boards formed from the compositions of the invention may also undergo moisture movement (expansion or contraction) due to the absorption or loss of water to its environment. The dimensional stability (i.e., linear shrinkage or expansion) due to moisture movement may vary, in certain instances ranging from 0.035 to 0.1%, including 0.04 to 0.08%, such as 0.05 to 0.06%. The composition of the invention may be used to produce the desired shape and size to form a cement board. In addition, a variety of further components may be added to the cement boards which include, but are not limited to, plasticizers, foaming agents, accelerators, retarders and air entrainment additives. The composition is then poured out into sheet molds or a roller may be used to form sheets of a desired thickness. The shaped composition may be further compacted by roller compaction, hydraulic pressure, vibrational compaction, or resonant shock compaction. The sheets are then cut to the desired dimensions of the cement boards. In some instances, the resultant composition may also be foamed using mechanically or chemically introduced gases prior to being shaped or while the composition is setting in order to form a lightweight cement board. The shaped composition is then allowed to set and further cured in an environment with a controlled temperature and humidity. The cement boards formed from the compositions of the invention then may be covered in a fiberglass mat on both faces of the board. Where desired, the cement boards formed from the compositions of the invention may also be prepared using chemical admixtures such that they possess increased fire, water, and frost resistance as well as resistance to damage by bio-degradation and corrosion. The cement board may also be combined with components such as dispersed glass fibers, which may impart improved durability, increased flexural strength, and a smoother surface.

Another type of construction panel provided by the invention is fiber-cement siding. Fiber-cement sidings formed from the compositions of the invention are formed building materials used to cover the exterior or roofs of buildings and include, but are not limited to, building sheets, roof panels, ceiling panels, eternits, and the like. They may also find use as a substitute for timber fascias and barge boards in high fire areas. Fiber-cement sidings may have dimensions that vary, ranging from 200 to 400 cm in length, e.g., 250 cm and 50 to 150 cm in width, e.g., 100 cm and a thickness ranging from 4 to 20 mm, e.g., 5 to 15 mm, including 10 mm. Fiber-cement sidings formed from the compositions of the invention may possess physical and mechanical properties that vary. In some embodiments, the flexural strength may range between 0.5 to 5 MPa, including 1 to 3 MPa, such as 2 MPa. The compressive strengths may also vary, in some instances ranging from 2 to 25 MPa, including 10 to 15 MPa, such as 10 to 12 MPa. In some embodiments of the invention, fiber-cement sidings may be employed on buildings that are subject to varying weather conditions, in some embodiments ranging from extremely arid to wet (i.e., low to high levels of humidity). Accordingly, the maximum water absorption of the fiber-cement sidings of the invention may vary, ranging from 10 to 25% by mass, including 10 to 20%, such as 12 to 15%. The dimensional stability (i.e., linear shrinkage or expansion) due to moisture movement may vary, in certain instances ranging from 0.05 to 0.1%, including 0.07 to 0.09%. The composition of the invention may be used to produce the desired shape and size to form a fiber-cement siding. In addition, a variety of further components may be added to the fiber-cement sidings which include, but are not limited to, cellulose fibers, plasticizers, foaming agents, accelerators, retarders and air entrainment additives. The composition is then poured into sheet molds or a roller is used to form sheets of a desired thickness. The shaped composition may be further compacted by roller compaction, hydraulic pressure, vibrational compaction, or resonant shock compaction. The sheets are then cut to the desired dimensions of the fiber-cement sidings. In some instances, the resultant composition may also be foamed using mechanically or chemically introduced gases prior to being shaped or while the composition is setting in order to form a lightweight fiber-cement siding. The shaped composition is then allowed to set and further cured in an environment with a controlled temperature and humidity. The fiber-cement sidings of the invention may then be covered with a polymeric film, enamel or paint. Where desired, the fiber-cement sidings formed from the compositions of the invention may also be prepared using chemical admixtures such that they possess increased fire, water, and frost resistance as well as resistance to damage by bio-degradation and corrosion.

Another type of construction panel formed from the compositions of the invention is drywall. The term drywall refers to the commonly manufactured building material that is used to finish construction of interior walls and ceilings. In certain instances, drywall building materials are panels that are made of a paper liner wrapped around an inner core. The inner core of drywall of the invention will include at least some amount of the composition of the invention. The dimensions of the drywall building materials of the invention may vary, in certain instances ranging from 100 to 200 cm, such as 125 to 175 cm, e.g., 150 to 160 cm in length; ranging from 75 to 100 cm, such as 80 to 100 cm, e.g., 90 to 95 cm in breadth, and ranging from 5 to 50 mm, e.g., 5 to 30 mm, including 10 to 25 mm in thickness. Drywall provided by the invention may possess physical and mechanical properties that vary considerably, and may depend upon the amount of the conventional constituents of drywall preparation that are replaced with the composition of the invention. The flexural and compressive strengths of drywall provided by the invention are generally larger than conventional drywall prepared with gypsum plaster, which is known to be a soft construction material. In some embodiments, the flexural strength may range between 0.1 to 3 MPa, including 0.5 to 2 MPa, such as 1.5 MPa. The compressive strengths may also vary, in some instances ranging from 1 to 20 MPa, including 5 to 15 MPa, such as 8 to 10 MPa. The maximum water absorption of drywall of the invention may vary, ranging from 2 to 10% by mass, including 4 to 8%, such as 5%. In certain embodiments, the inner core will be analogous to a conventional drywall core which is made primarily from gypsum plaster (the semi-hydrous form of calcium sulfate ($CaSO_4 \cdot 1/2H_2O$), with at least a portion of the gypsum component replaced with the composition of the invention. In addition, the core may include a variety of further components, such as, but not limited to, fibers (e.g., paper and/or fiberglass), plasticizers, foaming agents, accelerators, e.g., potash, retarders, e.g., EDTA or other chelators, various additives that increase mildew and fire resistance (e.g., fiberglass or vermiculite), and water. The portion of components replaced with the composition of the invention may vary, and in certain instances is 5% by weight or more, including 10% by weight or more, 25% by weight or more, 50% by weight or more, 75% by weight or more, 90% by weight or more, or even 100% by weight. In producing the drywall, the core components may be combined and the resultant composition sandwiched between two sheets of outer material, e.g., heavy paper or fiberglass mats. When the core sets and is dried in a large drying chamber, the sandwich becomes rigid and strong enough for use as a building material.

Another building material formed from the compositions of the invention is a conduit. Conduits are tubes or analogous structures configured to convey a gas or liquid, from one location to another. Conduits of the invention can include any of a number of different structures used in the conveyance of a liquid or gas that include, but are not limited to, pipes, culverts, box culverts, drainage channels and portals, inlet structures, intake towers, gate wells, outlet structures, and the like. Conduits of the invention may vary considerably in shape, which is generally determined by hydraulic design and installation conditions. Shapes of conduits of the invention may include, but are not limited to circular, rectangular, oblong, horseshoe, square, etc. Multiple cell configurations of conduits are also possible. Conduit design may vary depending on its intended use. As such, conduits formed from the compositions of the invention may have dimensions that vary considerably. Conduits may have outer diameters which range in length from 5 to 500 cm or longer, such as 10 to 300 cm, e.g., 25 to 250 cm. The wall thicknesses may vary considerably, ranging in certain instances from 0.5 to 25 cm or thicker, such as 1 to 15 cm, e.g., 1 to 10 cm. In certain embodiments, conduits may be designed in order to support high internal pressure from water flow within the conduit. In yet other embodiments, conduits formed from the compositions of the invention may be designed to support high external loadings (e.g., earth loads, surface surcharge loads, vehicle loads, external hydrostatic pressures, etc.). Accordingly, the compressive strength of the walls of conduits of the invention may also vary, depending on the size and intended use of the conduit, in some instances ranging, from 5 to 75 MPa, such as 10 to 50 MPa, e.g., 15 to 40 MPa. Where desired, the conduits may be employed with various coatings or liners (e.g., polymeric), and may be configured for easy joining with each other to produce long conveyance structures made up of multiple conduits of the invention. In producing conduits of the invention, the composition after combining with water is poured into a mold in order to form the desired conduit shape and size. The shaped composition may be further compacted by roller compaction, hydraulic pressure, vibrational compaction, or resonant shock compaction. In some instances, the resultant composition may also be foamed using mechanically or chemically introduced gases prior to being shaped or while the composition is setting in order to form a lightweight conduit structure. The shaped composition is further allowed to set and is cured in an environment with a controlled temperature and humidity. In addition, the conduits of the invention may include a variety of further components, such as, but not limited to, plasticizers, foaming agents, accelerators, retarders and air entrainment additives. Where desired, the further components may include chemical admixtures such that the conduits of the invention possess increased resistance to damage by bio-degradation, frost, water, fire and corrosion. In some embodiments, the conduits formed from the compositions of the invention may employ structural support components such as, but not limited to, cables, wires and mesh composed of steel, polymeric materials, ductile iron, aluminum or plastic.

Another building material formed from the compositions of the invention is basins. The term basin may include any configured container used to hold a liquid, such as water. As such, a basin may include, but is not limited to structures such as wells, collection boxes, sanitary manholes, septic tanks, catch basins, grease traps/separators, storm drain collection reservoirs, etc. Basins may vary in shape, size, and volume capacity. Basins may be rectangular, circular, spherical, or any other shape depending on its intended use. In some embodiments, basins may possess a greater width than depth, becoming smaller toward the bottom. The dimensions of the basin may vary depending on the intended use of the structure (e.g., from holding a few gallons of liquid to several hundred or several thousand or more gallons of liquid). The wall thicknesses may vary considerably, ranging in certain instances from 0.5 to 25 cm or thicker, such as 1 to 15 cm, e.g., 1 to 10 cm. Accordingly, the compressive strength may also vary considerably, depending on the size and intended use of the basin, in some instances ranging, from 5 to 60 MPa, such as 10 to 50 MPa, e.g., 15 to 40 MPa. In some embodiments, the basin may be designed to support high external loadings (e.g., earth loads, surface surcharge loads, vehicle loads, etc.). In certain other embodiments, the basins may be employed with various coatings or liners (e.g., polymeric), and may be configured so that they may be combined with conveyance elements (e.g., drainage pipe). In other embodiments, basins may be configured so that they may be connected to other basins so that they may form a connected series of basins. In producing basins, the composition after combining with water may be poured into a mold to form the desired basin shape and size. The shaped composition may be further compacted by roller compaction, hydraulic pressure, vibrational compaction, or resonant shock compaction. The basins may also be prepared by pouring the composition into sheet molds and the basins further assembled by combining the sheets together to form basins with varying dimensions (e.g., polygonal basins, rhomboidal basins, etc.). In some instances, the resultant composition may also be foamed using mechanically or chemically introduced gases prior to being shaped or while the composition is setting in order to form a lightweight basin structure. The shaped composition is further allowed to set and is cured in an environment with a controlled temperature and humidity. In addition, the basins formed from the compositions of the invention may include a variety of further components, such as, but not limited to, plasticizers, foaming agents, accelerators, retarders and air entrainment additives. Where desired, the further components may include chemical admixtures such that the basins of the invention possess increased resistance to damage by bio-degradation, frost, water, fire and corrosion. In some embodiments, the basins of the invention may employ structural support components such as, but not limited to, cables, wires and mesh composed of steel, polymeric materials, ductile iron, aluminum or plastic.

Another building material formed from the compositions of the invention is a beam, which, in a broad sense, refers to a horizontal load-bearing structure possessing large flexural and compressive strengths. Beams may be rectangular cross-shaped, C-channel, L-section edge beams, I-beams, spandrel beams, H-beams, possess an inverted T-design, etc. Beams of the invention may also be horizontal load-bearing units, which include, but are not limited to joists, lintels, archways and cantilevers. Beams generally have a much longer length than their longest cross-sectional dimension, where the length of the beam may be 5-fold or more, 10-fold or more, 25-fold or more, longer than the longest cross-sectional dimension. Beams formed from the compositions of the invention may vary in their mechanical and physical properties. For example, unreinforced concrete beams may possess flexural capacities that vary, ranging from 2 to 25 MPa, including 5 to 15 MPa, such as 7 to 12 MPa and compressive strengths that range from 10 to 75 MPa, including 20 to 60 MPa, such as 40 MPa. Structurally reinforced concrete beams may possess considerably larger flexural capacities, ranging from 15 to 75 MPa, including as 25 to 50 MPa, such as 30 to 40 MPa and compressive strengths that range from 35 to 150 MPa, including 50 to 125 MPa, such as 75 to 100 MPa. The beams formed from the compositions of the invention may be internal or external, and may be symmetrically loaded or asymmetrically loaded. In some embodiments, beams may be composite, wherein it acts compositely with other structural units by the introduction of appropriate interface shear mechanisms. In other embodiments, beams may be non-composite, wherein it utilizes the properties of the basic beam alone. In producing beams of the invention, the composition of the invention after mixing with water may be poured into a beam mold or cast around a correlated steel reinforcing beam structure (e.g., steel rebar). In some embodiments, the steel reinforcement is pretensioned prior to casting the composition around the steel framework. In other embodiments, beams of the invention may be cast with a steel reinforcing cage that is mechanically anchored to the concrete beam. The beams of the invention may also employ additional structural support components such as, but not limited to cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the beams of the invention may include a variety of further components, such as but not limited to, plasticizers, foaming agents, accelerators, retarders and air entrainment additives. Where desired, the further components may include chemical admixtures such that the beams of the invention possess increased resistance to damage by bio-degradation, frost, water, fire and corrosion.

Another building material formed from the compositions of the invention is a column, which, in a broad sense, refers to a vertical load-bearing structure that carries loads chiefly through axial compression and includes structural elements such as compression members. Other vertical compression members of the invention may include, but are not limited to, pillars, piers, pedestals, or posts. Columns formed from the compositions of the invention may be rigid, upright supports, composed of relatively few pieces. Columns may also be decorative pillars having a cylindrical or polygonal, smooth or fluted, tapered or straight shaft with a capital and usually a base, among other configurations. The capital and base of the column may have a similar shape as the column or may be different. Any combination of shapes for the capital and base on a column are possible. Polygonal columns formed from the compositions of the invention possess a width that is not more than four times its thickness. Columns formed from the compositions of the invention may be constructed such that they are solid, hollow (e.g., decorative columns), reinforcement filled, or any combination thereof. Columns can be short columns (i.e., columns where strength is governed by construction components and the geometry of its cross section) or slender columns (i.e., cross-sectional dimensions that are less than 5 times its length). The dimensions of the column may vary greatly depending on the intended use of the structure, e.g., from being less than a single story high, to several stories high or more, and having a corresponding width. Columns may vary in their mechanical and physical properties.

Properties such as compressive and flexural strengths may vary depending on the design and intended use of the column. For example, unreinforced concrete columns may possess flexural strengths that range from 2 to 20 MPa, including 5 to 15 MPa, such as 7 to 12 MPa and compressive strengths that range from 10 to 100 MPa, including 25 to 75 MPa, such as 50 MPa. Structurally reinforced concrete columns of the invention may possess considerably larger flexural strengths, ranging from 15 to 50 MPa, including 20 to 40 MPa, such as 25 to 35 MPa and compressive strengths that range from 25 to 200 MPa, including 50 to 150 MPa, such as 75 to 125 MPa. In some embodiments, columns may be composite, wherein it may act compositely with other structural units by the introduction of interfacial shear mechanisms. In other embodiments, columns may be non-composite, wherein it utilizes the properties of the basic column alone. In producing columns of the invention, the composition after combination with water may be poured into a column form or cast around a correlated steel reinforcing column structure (e.g., steel rebar). In some embodiments, the steel reinforcement is pre-tensioned prior to casting the composition around the steel framework. In other embodiments, columns of the invention may be cast with a steel reinforcing cage that is mechanically anchored to the concrete column. The columns of the invention may also employ additional structural support components such as, but not limited to, cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the columns of the invention may include a variety of additional components, such as but not limited to, plasticizers, foaming agents, accelerators, retarders and air entrainment additives. Where desired, these additional components may include chemical admixtures such that the columns of the invention possess increased resistance to damage by bio-degradation, frost, water, fire and corrosion.

Another building material formed from the compositions of the invention is a concrete slab. Concrete slabs are those building materials used in the construction of prefabricated foundations, floors and wall panels. In some instances, a concrete slab may be employed as a floor unit (e.g., hollow plank unit or double tee design). In other instances, a precast concrete slab may be a shallow precast plank used as a foundation for in-situ concrete formwork. Wall panels are, in a broad sense, vertical load-bearing members of a building that are polygonal and possess a width that is more than four times its thickness. Precast concrete foundation, floors and wall panels may vary considerably in dimension depending on the intended use of the precast concrete slab (e.g., one or two storey building). As such, precast concrete slabs may have dimensions which range from 1 to 10 m in length or longer, including 3 to 8 m, such as 5 to 6 m; height that ranges from 1 to 10 m or taller, including 4 to 10 m, such as 4 to 5 m; and a thickness that may range from 0.005 to 0.25 m or thicker, including 0.1 to 0.2 m such as 0.1 to 0.15 m. Formed building materials such as slabs, and structures made therefrom, may be thicker than corresponding structures that lack components of the composition of the invention. In addition, structures made from amorphous building materials formed from the composition of the invention may be thicker than corresponding structures that are not formed from the composition of the invention.

In some embodiments, thickness of formed building materials or related structures is increased by 1.5 fold or more, 2-fold or more, or 5-fold or more. Concrete slabs formed from the compositions of the invention may vary in their mechanical and physical properties depending on their intended use. For example, a prefabricated slab that is employed in a floor unit may possess larger flexural strengths and lesser compressive strengths than a slab that is employed as a load-bearing wall. For example, unreinforced concrete slabs may possess flexural strengths that vary, ranging from 2 to 25 MPa, including 5 to 15 MPa, such as 7 to 12 MPa and compressive strengths that range from 10 to 100 MPa, including 25 to 75 MPa, such as 50 MPa. Structurally reinforced concrete slabs of the invention may possess considerably larger flexural strengths, ranging from 15 to 50 MPa, including 20 to 40 MPa, such as 25 to 35 MPa and compressive strengths that range from 25 to 200 MPa, including 50 to 150 MPa, such as 75 to 125 MPa. In producing concrete slabs, the composition after combination with water may be poured into a slab mold or cast around a correlated steel reinforcing structure (e.g., steel rebar). In some embodiments, the steel reinforcement is pretensioned prior to casting the composition around the steel framework. In other embodiments, slabs of the invention may be cast with a steel reinforcing cage that is mechanically anchored to the concrete slab. In some embodiments, the concrete slabs of the invention may improve its structural capacity by casting a second, supportive concrete layer that is mechanically anchored to the previously precast concrete slab. The slabs formed from the compositions of the invention may also employ additional structural support components such as, but not limited to, cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the slabs of the invention may include a variety of further components, such as but not limited to, plasticizers, foaming agents, accelerators, retarders and air entrainment additives. Where desired, the further components may include chemical admixtures such that the slabs formed from the compositions of the invention possess increased resistance to damage by bio-degradation, frost, water, fire and corrosion.

Another building material formed from the compositions of the invention is an acoustic barrier, which refers to a structure used as a barrier for the attenuation or absorption of sound. As such, an acoustic barrier may include, but is not limited to, structures such as acoustical panels, reflective barriers, absorptive barriers, reactive barriers, etc. Acoustic barriers formed from the compositions of the invention may widely vary in size and shape. Acoustic barriers may be polygonal, circular, or any other shape depending on its intended use. Acoustic barrier may be employed in the attenuation of sound from highways, roadways, bridges, industrial facilities, power plants, loading docks, public transportation stations, military facilities, gun ranges, housing complexes, entertainment venues (e.g., stadiums, concert halls) and the like. Acoustic barriers may also be employed for sound insulation for the interior of homes, music studios, movie theaters, classrooms, etc. The acoustic barriers formed from the compositions of the invention may have dimensions that vary greatly depending on its intended use, ranging from 0.5 to 10 m in length or longer, e.g., 5 m and 0.1 to 10 m in height/width or wider, e.g., 5 m and a thickness ranging from 10 to 100 cm, or thicker e.g., 25 to 50 cm, including 40 cm. Where desired, the acoustic barrier may be employed with various coatings or liners (e.g., polymeric), and may be configured for easy joining with each other or pillars separating additional acoustic barriers to produce long acoustic barrier structures made up of multiple acoustic barriers of the invention. In some embodiments, acoustic barriers formed from the compositions of the invention may employ sound absorptive material (e.g., wood shavings, textile fibers, glass wool, rock wool, polymeric foam, vermiculite, etc.) in addition to a structurally reinforcing framework. In some embodiments, acoustic barriers may be used as noise-reduction barriers in an outdoor environment (e.g., along a highway, near an airport, etc.) and may be employed with structural support components (e.g., columns, posts, beams, etc.). In producing acoustic barriers of the invention, the composition of the invention after combination with water is poured into a mold to form the desired acoustic barrier shape and size. Also the composition may be poured out into a sheet mold or a roller may be used to form sheets of a desired thickness. The shaped composition may be further compacted by roller compaction, hydraulic pressure, vibrational compaction, or resonant shock compaction. The sheets are then cut to the desired dimensions of the acoustic barriers. In some instances, the resultant composition may also be foamed using mechanically or chemically introduced gases prior to being shaped or while the composition is setting in order to form a lightweight acoustic panel structure. The shaped composition is further allowed to set and is cured in an environment with a controlled temperature and humidity. In addition, the acoustic barriers of the invention may include a variety of further components, such as but not limited to, plasticizers, foaming agents, accelerators, retarders and air entrainment additives. Where desired, the further components may include chemical admixtures such that they possess increased resistance to damage by bio-degradation, frost, water, fire and corrosion. In some embodiments, the acoustic barriers of the invention may employ structural support components such as, but not limited to, cables, wires and mesh composed of steel, ductile iron, polymeric fibers, aluminum or plastic.

Another building material formed from the compositions of the invention is an insulation material, which refers to a material used to attenuate or inhibit the conduction of heat. Insulation may also include those materials that reduce or inhibit radiant transmission of heat. Insulation material may consist of one or more of the following constituents: a cementitious forming material, a dispersing agent, an air entraining agent, inert densifying particulate, a mixture of ionic and non-ionic surfactants, plasticizers, accelerators, lightweight aggregate, organic and inorganic binding agents and glass particles. In certain embodiments of the invention, an amount of cementitious forming material may be replaced by the above described composition of the invention. Binding compositions for the insulation material of the invention include a component selected from the group consisting of carbides, Gypsum powder, Blakite, nitrides, calcium carbonate, oxides, titanates, sulfides, zinc selenide, zinc telluride, inorganic siloxane compound and their mixtures thereof. In certain embodiments of the invention, an amount of the binding composition may be replaced by the above described composition of the invention. Where desired, insulation material of the invention may also be prepared using a chemical admixture or any other convenient protocol such that they are resistant to damage by termites, insects, bacteria, fungus. Etc. Insulation materials of the invention may be prepared using any convenient protocol such that they are freeze/thaw, rain and fire resistant. Insulation material of the invention may be prepared in accordance with traditional manufacturing protocols for such materials, with the exception that the composition of the invention is employed. In producing the insulation materials of the invention, an amount of the composition of the invention may be combined with water and other components of the insulation material, which may include, but are not limited to a dispersing agent, an air entraining agent, inert densifying particulate, a mixture of ionic and non-ionic surfactants, plasticizers, accelerators, lightweight aggregate, organic and inorganic binding agents and glass particles. The resultant insulation material may then be molded into the desired shape (e.g., wall panel) or poured into the void space of concrete masonry units, flooring units, roof decks or cast around pipes, conduits and basins.

In some embodiments, the formed building material such as pre-cast concrete products include, but are not limited to, bunker silo; cattle feed bunk; cattle grid; agricultural fencing; H-bunks; J-bunks; livestock slats; livestock watering troughs; architectural panel walls; cladding (brick); building trim; foundation; floors, including slab on grade; walls; double wall precast sandwich panel; aqueducts; mechanically stabilized earth panels; box culverts; 3-sided culverts; bridge systems; RR crossings; RR ties; sound walls/barriers; Jersey barriers; tunnel segments; reinforced concrete box; utillity protection structure; hand holes; hollowcore product; light pole base; meter box; panel vault; pull box; telecom structure; transformer pad; transformer vault; trench; utility vault; utility pole; controlled environment vaults; underground vault; mausoleum; grave stone; coffin; haz mat storage container; detention vaults; catch basins; manholes; aeration system; distribution box; dosing tank; dry well; grease interceptor; leaching pit; sand-oil/oil-water interceptor; septic tank; water/sewage storage tank; wetwells; fire cisterns; floating dock; underwater infrastructure; decking; railing; sea walls; roofing tiles; pavers; community retaining wall; res. retaining wall; modular block systems; and segmental retaining walls.

Aggregate

In some embodiments the invention provides a synthetic rock or an aggregate comprising the composition of the invention or or the set and hardened form thereof. In some embodiments, the aggregate is made from the compositions of the invention. The aggregates and the methods of making and using the aggregates are described in U.S. application Ser. No. 12/475,378, filed May 29, 2009, which is incorporated herein by reference in its entirety. The aggregate may be formed from hydraulic cement or SCM or self-cementing composition of the invention. In some embodiments, aggregates are formed, in whole or in part, from compositions of the invention that have been exposed to freshwater and allowed to harden into stable compounds, which may then be further processed, if necessary, to form particles as appropriate to the type of aggregate desired. In some embodiments, aggregates are formed from compositions of the invention exposed to conditions of temperature and/or pressure that convert them into stable compounds. The invention further provides structures, such as roadways, buildings, dams, and other manmade structures, containing the synthetic rock or aggregates made from the compositions of the invention.

In some embodiments, some or all the embodiments recited above for the composition of the invention also apply to the aggregates made from the compositions of the invention.

The term aggregate is used herein in its art-accepted manner to include a particulate composition that finds use in concretes, mortars and other materials, e.g., roadbeds, asphalts, and other structures and is suitable for use in such structures. Aggregates of the invention are particulate compositions that may in some embodiments be classified as fine or coarse. Fine aggregates according to embodiments of the invention are particulate compositions that almost entirely pass through a Number 4 sieve (ASTM C 125 and ASTM C 33). Fine aggregate compositions according to embodiments of the invention have an average particle size ranging from 0.001 inch (in) to 0.25 in, such as 0.05 in to 0.125 in and including 0.01 in to 0.08 in. Coarse aggregates of the invention are compositions that are predominantly retained on a Number 4 sieve (ASTM C 125 and ASTM C 33). Coarse aggregate compositions according to embodiments of the invention are compositions that have an average particle size ranging from 0.125 in to 6 in, such as 0.187 in to 3.0 in and including 0.25 in to 1.0 in. As used herein, "aggregate" may also in some embodiments encompass larger sizes, such as 3 in to 12 in or even 3 in to 24 in, or larger, such as 12 in to 48 in, or larger than 48 in, e.g., such as sizes used in riprap and the like. In some embodiments, such as producing wave-resistant structures for the ocean, the sizes may be even larger, such as over 48 in, e.g., over 60 in, or over 72 in.

Significant properties of the compositions may include one or more of hardness, abrasion resistance, density, porosity, chemical composition, mineral composition, isotopic composition, size, shape, acid resistance, alkaline resistance, leachable chloride content, retention of $CO_2$, reactivity (or lack thereof).

Aggregates formed from the compositions of the invention have a density that may vary so long as the aggregate provides the desired properties for the use for which it will be employed, e.g., for the building material in which it is employed. In certain instances, the density of the aggregate particles ranges from 1.1 to 5 gm/cc, such as 1.3 gm/cc to 3.15 gm/cc, and including 1.8 gm/cc to 2.7 gm/cc. Other particle densities in embodiments of the invention, e.g., for lightweight aggregates, may range from 1.1 to 2.2 gm/cc, e.g, 1.2 to 2.0 g/cc or 1.4 to 1.8 g/cc. In some embodiments the invention provides aggregates that range in bulk density (unit weight) from 50 lb/ft$^3$ to 200 lb/ft$^3$, or 75 lb/ft$^3$ to 175 lb/ft$^3$, or 50 lb/ft$^3$ to 100 lb/ft$^3$, or 75 lb/ft$^3$ to 125 lb/ft$^3$, or 90 lb/ft$^3$ to 115 lb/ft$^3$, or 100 lb/ft$^3$ to 200 lb/ft$^3$, or 125 lb/ft$^3$ to 175 lb/ft$^3$, or 140 lb/ft$^3$ to 160 lb/ft$^3$, or 50 lb/ft$^3$ to 200 lb/ft$^3$. Some embodiments of the invention provide lightweight aggregate, e.g., aggregate that has a bulk density (unit weight) of 75 lb/ft$^3$ to 125 lb/ft$^3$. Some embodiments of the invention provide lightweight aggregate, e.g., aggregate that has a bulk density (unit weight) of 90 lb/ft$^3$ to 115 lb/ft$^3$.

The hardness of the aggregate particles making up the aggregate may also vary, and in certain instances the hardness, expressed on the Mohs scale, ranges from 1-9; or 1-7; or 1-6; or 1-5; or 1-4; or 2-9; or 2-8; or 2-7; or 2-6; or 2-5; or 2-4; or 2-3; or 3-9; or 3-8; or 3-7; or 3-6; or 3-5; or 3-4; or 4-9; or 4-8; or 4-7; or 4-6; or 4-5; or 5-9; or 5-8; or 5-7; or 5-6; or 6-9; or 6-8; or 6-7; or 7-9; or 7-8; or 8-9. Other hardness scales may also be used to characterize the aggregate, such as the Rockwell, Vickers, or Brinell scales, and equivalent values to those of the Mohs scale may be used to characterize the aggregates of the invention; e.g., a Vickers hardness rating of 250 corresponds to a Mohs rating of 3; conversions between the scales are known in the art.

The abrasion resistance of an aggregate may also be of significance, e.g., for use in a roadway surface, where aggregates of high abrasion resistance are useful to keep surfaces from polishing. Abrasion resistance is related to hardness but is not the same. Aggregates include aggregates that have an abrasion resistance similar to that of natural limestone, or aggregates that have an abrasion resistance superior to natural limestone, as well as aggregates having an abrasion resistance lower than natural limestone, as measured by art accepted methods, such as ASTM C131-03. In some embodiments, aggregates made from the compositions of the invention have an abrasion resistance of less than 50%, or less than 40%, or less than 35%, or less than 30%, or less than 25%, or less than 20%, or less than 15%, or less than 10%, when measured by ASTM C131-03.

Aggregates may also have a porosity within a particular ranges. As will be appreciated by those of skill in the art, in some cases a highly porous aggregate is desired, in others an aggregate of moderate porosity is desired, while in other cases aggregates of low porosity, or no porosity, are desired. Porosities of aggregates in some embodiments of the invention, as measured by water uptake after oven drying followed by full immersion for 60 minutes, expressed as % dry weight, can be in the range of 1-40%, such as 2-20%, or 2-15%, including 2-10% or even 3-9%.

In addition, aggregates formed from the compositions of the invention may further include or exclude substances such as chloride. These substances are considered undesirable in some applications; for example, chloride is undesirable in aggregates intended for use in concrete because of its tendency to corrode rebar. However, in some uses, such as base course for a roadway, aggregate containing chloride may be acceptable. Methods of making aggregates from the compositions of the invention may include one or more steps to minimize the chloride and/or sodium content of the aggregate, if chloride is a component of the starting materials; in some embodiments, such a step or steps is not necessary as the intended final use of the aggregate is relatively insensitive to the content of these materials. Thus, in some embodiments, the leachable chloride content of the aggregates of the invention is less than 5%. In some embodiments, the leachable chloride content of the aggregate ranges from 0.0001% to 0.05%. In some embodiments the leachable chloride content is less than 0.05%, in some embodiments the leachable chloride content is less than 0.1%, and in some embodiments the leachable chloride content is less than 0.5%.

The aggregate of the invention may be of any size and shape suitable for a particular use, as described further herein. As the aggregates are synthetic, both the size and the shape may be almost completely controlled, allowing for a great variety of specific aggregates as well as aggregate mixes, as described further. In some embodiments, the invention provides coarse aggregate, e.g., compositions that are predominantly retained on a Number 4 sieve (ASTM C 125 and ASTM C 33). Coarse aggregate according to embodiments of the invention has an average particle size ranging from 0.125 in to 6 in, such as 0.187 in to 3.0 in and including 0.25 in to 1.0 in. Fine aggregate according to embodiments of the invention has an average particle size ranging from 0.001 inch (in) to 0.25 in, such as 0.05 in to 0.125 in and including 0.01 in to 0.08 in.

Aggregates of the invention may be reactive or non-reactive. Reactive aggregate are those aggregate particles that upon initiation by a substance (e.g., water) undergo a reaction with constituents (e.g., compounds) in other aggregate particles to form a reaction product. In some instances, the reaction product may be a matrix between aggregate particles forming a stabilizing structure. In other instances the matrix formed may be an expansive gel that, depending on the environment, may act to destabilize the mass; in some cases where there is room for the expansive gel to expand, e.g., in aggregate that is laid as part of a road bed, with void spaces, a reactive aggregate of this type is acceptable. Aggregate of the invention may also be non-reactive.

In addition, in some instances the invention provides aggregates that are resistant to acid, resistant to base, or resistant to both acid and base. For example, in some instances the invention provides aggregates that, when exposed to a pH of 2, 3, 4, or 5, depending on the test desired (e.g., an $H_2SO_4$ solution that has been diluted to a pH of 2, 3, 4, or 5), release less than 1, 0.1, 0.01, or 0.001% of the $CO_2$ contained in the aggregate in a 48 hour period, or a 1-week period, or a 5-week period, or a 25-week period, while remaining intact and retaining a portion or substantially all of its hardness, abrasion resistance, and the like. Similar results may be obtained for aggregates of the invention that are resistant to base, e.g., when exposed to a pH of 12, 11, 10, or 9, release less than 1, 0.1, 0.01, or 0.001% of their $CO_2$ in a 48 hour, 1 week, 5 week, or 25 week period, while remaining intact and retaining a portion or substantially all of its hardness, abrasion resistance, and the like. The aggregates may be ground to a standard surface area or sieve size before conducting such tests. $CO_2$ content of the material may be monitored by, e.g., coulometry, or any other suitable method.

The compositions of the invention made from $CO_2$ source may result in the $CO_2$-sequestering aggregate that may provide for long term storage of $CO_2$ in a manner such that $CO_2$ is sequestered (i.e., fixed) in the aggregate, where the sequestered $CO_2$ does not become part of the atmosphere. "Long term storage" includes that the aggregate of the invention keeps its sequestered $CO_2$ fixed for extended periods of time (when the aggregate is maintained under conditions conventional for its intended use) without significant, if any, release of the $CO_2$ from the aggregate. Extended periods of time in the context of the invention may be 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer, depending on the particular nature and downstream use of the aggregate. With respect to the $CO_2$ sequestering aggregate, when employed for their intended use and over their lifetime, the amount of degradation, if any, as measured in terms of $CO_2$ gas release from the product will not exceed 10% per year, for example, will not exceed 5%/year, and in certain embodiments will not exceed 1%/year or even will not exceed 0.5% per year or even 0.1% per year.

Tests of the aggregate can be used as surrogate markers for the long-term storage capability of the aggregate. Any art-accepted test may be used, or any test that reasonably would be thought to predict long-term storage of $CO_2$ in a material under its intended conditions of use may be used, e.g., any test that reasonably would be thought to predict that the composition keeps a significant fraction, or substantially all, of its $CO_2$ fixed for a certain amount of time. For example, aggregate may be considered long term storage aggregate for sequestered $CO_2$ if, when exposed to 50, 75, 90, 100, 120, or 150° C. for 1, 2, 5, 25, 50, 100, 200, or 500 days at between 10% and 50% relative humidity, it loses less than 1%, 2%, 3%, 4%, 5%, 10%, 20%, 30%, or 50% of its carbon. Test conditions are chosen according to the intended use and environment of the material. $CO_2$ content of the material may be monitored by any suitable method, e.g., coulometry.

In some embodiments the invention provides a lightweight aggregate, e.g., an aggregate with a bulk density of 75-125 lb/ft$^3$, or 90-115 lb/ft$^3$. The lightweight aggregate in some embodiments contains carbonate and sulfate or sulfite, or a combination of sulfate and sulfite. In some embodiments the molar ration of carbonate to sulfate and/or sulfite is 1000:1 to 10:1, or 500:1 to 50:1, or 300:1 to 75:1. In some of these embodiments, the aggregate further contains mercury or a mercury compound, which may be of fossil fuel origin. In some embodiments, the aggregate contains dypingite.

In some embodiments, the invention provides a customized set of aggregates, e.g., a set of aggregates with a plurality of characteristics that is chosen to match a predetermined set of characteristics, such as at least two, three, four, or five of size, shape, surface texture, hardness, abrasion resistance, density, porosity, acid stability, base stability, $CO_2$ release stability, and color. In some embodiments the invention provides a set of aggregates with a plurality of characteristics that are chosen to match a predetermined set of characteristics, where the characteristics include size, shape, and hardness. In some embodiments, the invention provides a set of aggregates with a plurality of characteristics that are chosen to match a predetermined set of characteristics, where the characteristics include size, shape, hardness, and surface texture. In some embodiments the invention provides a set of aggregates with a plurality of characteristics that are chosen to match a predetermined set of characteristics, where the characteristics include size, shape, hardness, and density. In some embodiments, the invention provides a set of aggregates with a plurality of characteristics that are chosen to match a predetermined set of characteristics, where the characteristics include size, shape, and density.

The aggregate may have particle shapes selected from the group consisting of: rounded, irregular, flaky, angular, elongated, flaky-elongated, subangular, subrounded, well rounded and any mixtures thereof; in some cases the aggregate further has particle surface textures that are selected from the group consisting of: glassy, smooth, granular, rough, crystalline, honeycombed and mixtures thereof. In some embodiments, the aggregate has particle shapes selected from the group consisting of: polygonal, cylindrical, spherical, triangular, curved shapes, annulus, ellipsoidal, oval, star shaped, prisms or any mixtures thereof; and in some cases may further have particle surface textures that are selected from the group consisting of: glassy, smooth, granular, rough, crystalline, honeycombed and mixtures thereof. The aggregate may have a Mohs hardness that ranges from about 1 to 9, such as about 2 to 6, or equivalent hardness on the Rockwell, Vickers, or Brinell scales. Any of the above aggregates may further include one or more of: Portland cement, fly ash, lime and a binder, for example, Portland cement, such as where the weight ratio of the synthetic carbonate:Portland cement ranges from 0.1/1 to 5/1. The aggregate has a unit density of between 100 to 150 lb/ft$^3$, such as between 75-125 lb/ft$^3$.

In some embodiments, the invention provides an aggregate suitable for use in a building material wherein the aggregate has a unit density of less than 115 lb/cu ft and is a carbon negative aggregate.

In some embodiments, the invention provides road base including aggregate made from the compositions of the invention, described herein. In some embodiments, the invention provides an asphalt including aggregate made from the compositions of the invention, described herein.

In some embodiments, the invention provides a concoidally-fracturing aggregate.

II. Methods and Systems

Aspects of the invention include methods and systems for making the composition of the invention. The method to produce the compositions of the invention include a source of carbon, a source of water, a source of alkalinity, and a source for alkaline earth metal ions, depending upon the materials used for the process. In one aspect of the invention, there is provided a method for making the composition provided herein, by (a) contacting an alkaline earth-metal containing water with a flue gas from an industrial plant including carbon of a fossil fuel origin; and (b) subjecting the alkaline earth-metal containing water of step (a) to one or more conditions to make the composition of the invention.

In another aspect of the invention, there is provided a method for making a composition by (a) contacting an alkaline earth-metal containing water with a $CO_2$ source; and (b) subjecting the alkaline earth-metal containing water of step (a) to one or more conditions to make a composition, wherein the composition comprises at least 47% w/w vaterite and wherein the composition upon combination with water, setting, and hardening has a compressive strength of at least 14 MPa.

Source of Carbon

The $CO_2$ source may be a liquid, solid (e.g., dry ice) or gaseous $CO_2$ source. In certain embodiments, the $CO_2$ source is a gaseous $CO_2$ source. This gaseous $CO_2$ is, in certain instances, a waste stream or product from an industrial plant. The nature of the industrial plant may vary in these embodiments, where industrial plants of interest includes, but is not limited to, power plants (e.g., as described in further detail in International Application No. PCT/US08/88318, titled, "METHODS OF SEQUESTERING $CO_2$," filed 24 Dec. 2008, the disclosure of which is herein incorporated by reference), chemical processing plants, steel mills, paper mills, cement plants (e.g., as described in further detail in U.S. Provisional Application Ser. No. 61/088,340, the disclosure of which is herein incorporated by reference), and other industrial plants that produce $CO_2$ as a byproduct. By waste stream is meant a stream of gas (or analogous stream) that is produced as a byproduct of an active process of the industrial plant. The gaseous stream may be substantially pure $CO_2$ or a multi-component gaseous stream that includes $CO_2$ and one or more additional gases. Multi-component gaseous streams (containing $CO_2$) that may be employed as a $CO_2$ source in embodiments of the subject methods include both reducing, e.g., syngas, shifted syngas, natural gas, and hydrogen and the like, and oxidizing condition streams, e.g., flue gases from combustion. Exhaust gases containing NOx, SOx, VOCs, particulates and Hg would incorporate these compounds along with the carbonate in the precipitated product. Particular multi-component gaseous streams of interest that may be treated according to the subject invention include, but are not limited to, oxygen containing combustion power plant flue gas, turbo charged boiler product gas, coal gasification product gas, shifted coal gasification product gas, anaerobic digester product gas, wellhead natural gas stream, reformed natural gas or methane hydrates, and the like.

Thus, the waste streams may be produced from a variety of different types of industrial plants. Suitable waste streams for the invention include waste streams, such as, flue gas, produced by industrial plants that combust fossil fuels (e.g., coal, oil, natural gas) or anthropogenic fuel products of naturally occurring organic fuel deposits (e.g., tar sands, heavy oil, oil shale, etc.). In some embodiments, a waste stream suitable for systems and methods of the invention is sourced from a coal-fired power plant, such as a pulverized coal power plant, a supercritical coal power plant, a mass burn coal power plant, a fluidized bed coal power plant. In some embodiments, the waste stream is sourced from gas or oil-fired boiler and steam turbine power plants, gas or oil-fired boiler simple cycle gas turbine power plants, or gas or oil-fired boiler combined cycle gas turbine power plants. In some embodiments, waste streams produced by power plants that combust syngas (i.e., gas that is produced by the gasification of organic matter, for example, coal, biomass, etc.) are used. In some embodiments, waste streams from integrated gasification combined cycle (IGCC) plants are used. In some embodiments, waste streams produced by Heat Recovery Steam Generator (HRSG) plants are used to produce compositions in accordance with systems and methods of the invention.

Waste streams produced by cement plants are also suitable for systems and methods of the invention. Cement plant waste streams include waste streams from both wet process and dry process plants, which plants may employ shaft kilns or rotary kilns, and may include pre-calciners. These industrial plants may each burn a single fuel, or may burn two or more fuels sequentially or simultaneously.

In some embodiments, the source of carbon is synthetic or naturally occurring carbonate, such as sodium carbonate, or limestone.

Source of Water

As reviewed above, "saltwater" is employed in its conventional sense to include a number of different types of aqueous fluids other than fresh water, where the term "saltwater" includes brackish water, sea water and brine (including man-made brines, e.g., geothermal plant wastewaters, desalination waste waters, etc), as well as other salines having a salinity that is greater than that of freshwater. Brine is water saturated or nearly saturated with salt and has a salinity that is 50 ppt (parts per thousand) or greater. Brackish water is water that is saltier than fresh water, but not as salty as seawater, having a salinity ranging from 0.5 to 35 ppt. Seawater is water from a sea or ocean and has a salinity ranging from 35 to 50 ppt.

The saltwater source from which the composition of the invention is derived may be a naturally occurring source, such as a sea, ocean, lake, swamp, estuary, lagoon, etc., or a man-made source. The compositions of the invention may be produced by precipitation from alkaline-earth-metal-containing water, such as, a saltwater (may be called saltwater derived composition), or a freshwater with added alkaline earth metal ions. The saltwater employed in methods may vary.

In some embodiments, the water employed in the invention may be a mineral rich, e.g., calcium and/or magnesium rich, freshwater source. In some embodiments, calcium rich waters may be combined with magnesium silicate minerals, such as olivine or serpentine. The acidity in the solution, due to the addition of carbon dioxide to form carbonic acid, may dissolve the magnesium silicate, leading to the formation of calcium magnesium silicate carbonate compounds.

In some embodiments, the compositions are obtained from a saltwater in some manner, e.g., by treating a volume of a saltwater in a manner sufficient to produce the desired composition of the invention from the initial volume of saltwater. In certain embodiments, the compositions of the invention are derived from saltwater by precipitating them from the saltwater. In certain embodiments, the compositions of the invention are separated in a solid form from the saltwater. The compositions of the invention may be more stable in salt water than in freshwater, such that they may be viewed as saltwater metastable compositions.

In certain embodiments, the water may be obtained from the power plant that is also providing the gaseous waste stream. For example, in water cooled power plants, such as seawater cooled power plants, water that has been employed by the power plant may then be sent to the precipitation system and employed as the water in the precipitation reaction. In certain of these embodiments, the water may be cooled prior to entering the precipitation reactor.

Source of Alkalinity

In order to produce carbonate-containing precipitation material, protons are removed from various species (e.g. carbonic acid, bicarbonate, hydronium, etc.) in the divalent cation-containing solution to shift the equilibrium towards carbonate. The terms "source of alkalinity" or "proton removing agents" or "pH raising agent," or "base," are used interchangeably herein. As protons are removed, more $CO_2$ goes into solution. In some embodiments, proton-removing agents and/or methods are used while contacting a divalent cation-containing aqueous solution with $CO_2$ to increase $CO_2$ absorption in one phase of the precipitation reaction, wherein the pH may remain constant, increase, or even decrease, followed by a rapid removal of protons (e.g., by addition of a base) to cause rapid precipitation of carbonate-containing precipitation material. Protons may be removed from the various species (e.g. carbonic acid, bicarbonate, hydronium, etc.) by any suitable approach, including, but not limited to, use of naturally occurring proton-removing agents, use of microorganisms and fungi, use of synthetic chemical proton-removing agents, recovery of man-made waste streams, and using electrochemical means.

Naturally occurring proton-removing agents encompass any proton-removing agents that can be found in the wider environment that may create or have a basic local environment. Some embodiments provide for naturally occurring proton-removing agents including minerals that create basic environments upon addition to solution. Such minerals include, but are not limited to, lime (CaO); periclase (MgO); iron hydroxide minerals (e.g., goethite and limonite); and volcanic ash. Methods for digestion of such minerals and rocks including such minerals are well known in the art.

Many minerals provide sources of divalent cations and, in addition, some minerals are sources of base. Mafic and ultramafic minerals such as olivine, serpentine, and any other suitable mineral may be dissolved using any convenient protocol. Dissolution may be accelerated by increasing surface area, such as by milling by conventional means or by, e.g., jet milling, as well as by use of, e.g., ultrasonic techniques. In addition, mineral dissolution may be accelerated by exposure to acid or base. Metal silicates (e.g., magnesium silicates) and other minerals including cations of interest may be dissolved, e.g., in acid (e.g., HCl such as HCl from an electrochemical process) to produce, for example, magnesium and other metal cations for use in precipitation material, and, subsequently, compositions of the invention. In some embodiments, magnesium silicates and other minerals may be digested or dissolved in an aqueous solution that has become acidic due to the addition of carbon dioxide and other components of waste gas (e.g., combustion gas). Alternatively, other metal species such as metal hydroxide (e.g., $Mg(OH)_2$, $Ca(OH)_2$) may be made available for use in aggregate by dissolution of one or more metal silicates (e.g., olivine and serpentine) with aqueous alkali hydroxide (e.g., NaOH) or any other suitable caustic material. Any suitable concentration of aqueous alkali hydroxide or other caustic material may be used to decompose metal silicates, including highly concentrated and very dilute solutions. The concentration (by weight) of an alkali hydroxide (e.g., NaOH) in solution may be, for example, from 30% to 80% and from 70% to 20% water. Advantageously, metal silicates and the like digested with aqueous alkali hydroxide may be used directly to produce precipitation material, and, subsequently, aggregate from a waste gas stream. In addition, base value from the precipitation reaction mixture may be recovered and reused to digest additional metal silicates and the like.

Some embodiments provide for using naturally alkaline bodies of water as naturally occurring proton-removing agents. Examples of naturally alkaline bodies of water include, but are not limited to surface water sources (e.g. alkaline lakes such as Mono Lake in California) and ground water sources (e.g. basic aquifers such as the deep geologic alkaline aquifers located at Searles Lake in California). Other embodiments provide for use of deposits from dried alkaline bodies of water such as the crust along Lake Natron in Africa's Great Rift Valley.

In some embodiments, organisms that excrete basic molecules or solutions in their normal metabolism are used as proton-removing agents. Examples of such organisms are fungi that produce alkaline protease (e.g., the deep-sea fungus *Aspergillus ustus* with an optimal pH of 9) and bacteria that create alkaline molecules (e.g., cyanobacteria such as *Lyngbya* sp. from the Atlin wetland in British Columbia, which increases pH from a byproduct of photosynthesis). In some embodiments, organisms are used to produce proton-removing agents, wherein the organisms (e.g., *Bacillus pasteurii*, which hydrolyzes urea to ammonia) metabolize a contaminant (e.g. urea) to produce proton-removing agents or solutions including proton-removing agents (e.g., ammonia, ammonium hydroxide). In some embodiments, organisms are cultured separately from the precipitation reaction mixture, wherein proton-removing agents or solution including proton-removing agents are used for addition to the precipitation reaction mixture. In some embodiments, naturally occurring or manufactured enzymes are used in combination with proton-removing agents to invoke precipitation of precipitation material. Carbonic anhydrase, which is an enzyme produced by plants and animals, accelerates transformation of carbonic acid to bicarbonate in aqueous solution.

Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phophazene is used to remove protons from various species (e.g., carbonic acid, bicarbonate, hydronium, etc.) for precipitation of precipitation material. In some embodiments, ammonia is used to raise pH to a level sufficient to precipitate precipitation material from a solution of divalent cations and an industrial waste stream. Super bases suitable for use as proton-removing agents include sodium ethoxide, sodium amide ($NaNH_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used. Carbonates for use in the invention include, but are not limited to, sodium carbonate.

In addition to including cations of interest and other suitable metal forms, waste streams from various industrial processes may provide proton-removing agents. Such waste streams include, but are not limited to, mining wastes; fossil fuel burning ash (e.g., combustion ash such as fly ash, bottom ash, boiler slag); slag (e.g. iron slag, phosphorous slag); cement kiln waste; oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Mining wastes include any wastes from the extraction of metal or another precious or useful mineral from the earth. In some embodiments, wastes from mining are used to modify pH, wherein the waste is selected from red mud from the Bayer aluminum extraction process; waste from magnesium extraction from sea water (e.g., $Mg(OH)_2$ such as that found in Moss Landing, Calif.); and wastes from mining processes involving leaching. For example, red mud may be used to modify pH as described in U.S. Provisional Patent Application No. 61/161,369, titled, "NEUTRALIZING INDUSTRIAL WASTES UTILIZING $CO_2$ AND A DIVALENT CATION SOLUTION", filed 18 Mar. 2009, which is hereby incorporated by reference in its entirety. Fossil fuel burning ash, cement kiln dust, and slag, collectively waste sources of metal oxides, further described in U.S. patent application Ser. No. 12/486,692, titled, "METHODS AND SYSTEMS FOR UTILIZING WASTE SOURCES OF METAL OXIDES," filed 17 Jun. 2009, the disclosure of which is incorporated herein in its entirety, may be used in alone or in combination with other proton-removing agents to provide proton-removing agents for the invention. Agricultural waste, either through animal waste or excessive fertilizer use, may contain potassium hydroxide (KOH) or ammonia ($NH_3$) or both. As such, agricultural waste may be used in some embodiments of the invention as a proton-removing agent. This agricultural waste is often collected in ponds, but it may also percolate down into aquifers, where it can be accessed and used.

Where desired, the pH of the water is raised using any convenient and/or suitable approach. In certain embodiments, a pH raising agent may be employed, where examples of such agents include oxides, hydroxides (e.g., sodium hydroxide, potassium hydroxide, brucite), carbonates (e.g. sodium carbonate), coal ash, naturally occurring mineral, and the like. The amount of pH elevating agent that is added to the saltwater source will depend on the particular nature of the agent and the volume of saltwater being modified, and will be sufficient to raise the pH of the salt water source to the desired value. Alternatively, the pH of the saltwater source can be raised to the desired level by electrolysis of the water.

One such approach can be to use the coal ash from a coal-fired power plant, which contains many oxides, to elevate the pH of sea water. Other coal processes, like the gasification of coal, to produce syngas, also produce hydrogen gas and carbon monoxide, and may serve as a source of hydroxide as well. Some naturally occurring minerals, such as, serpentine contain hydroxide, and can be dissolved, yielding a hydroxide source. The amount of pH elevating agent that is added to the water will depend on the particular nature of the agent and the volume of saltwater being modified, and will be sufficient to raise the pH of the water to the desired value. Alternatively, the pH of the saltwater source can be raised to the desired level by electrolysis of the water. Where electrolysis is employed, a variety of different protocols may be taken, such as use of the Mercury cell process (also called the Castner-Kellner process); the Diaphragm cell process and the membrane cell process. Where desired, byproducts of the hydrolysis product, e.g., $H_2$, sodium metal, etc. may be harvested and employed for other purposes, as desired.

Electrochemical methods are another means to remove protons from various species in a solution, either by removing protons from solute (e.g., deprotonation of carbonic acid or bicarbonate) or from solvent (e.g., deprotonation of hydronium or water). Deprotonation of solvent may result, for example, if proton production from $CO_2$ dissolution matches or exceeds electrochemical proton removal from solute molecules. In some embodiments, low-voltage electrochemical methods are used to remove protons, for example, as $CO_2$ is dissolved in the precipitation reaction mixture or a precursor solution to the precipitation reaction mixture (i.e., a solution that may or may not contain divalent cations).

In some embodiments, $CO_2$ dissolved in an aqueous solution that does not contain divalent cations is treated by a low-voltage electrochemical method to remove protons from carbonic acid, bicarbonate, hydronium, or any species or combination thereof resulting from the dissolution of $CO_2$. A low-voltage electrochemical method operates at an average voltage of 2, 1.9, 1.8, 1.7, or 1.6 V or less, such as 1.5, 1.4, 1.3, 1.2, 1.1 V or less, such as 1 V or less, such as 0.9 V or less, 0.8 V or less, 0.7 V or less, 0.6 V or less, 0.5 V or less, 0.4 V or less, 0.3 V or less, 0.2 V or less, or 0.1 V or less. Low-voltage electrochemical methods that do not generate chlorine gas are convenient for use in systems and methods of the invention. Low-voltage electrochemical methods to remove protons that do not generate oxygen gas are also convenient for use in systems and methods of the invention. In some embodiments, low-voltage electrochemical methods generate hydrogen gas at the cathode and transport it to the anode where the hydrogen gas is converted to protons. Electrochemical methods that do not generate hydrogen gas may also be convenient. In some embodiments, electrochemical processes to remove protons do not generate a gas at the anode. In some instances, electrochemical methods to remove protons do not generate any gaseous by-byproduct.

Electrochemical methods for effecting proton removal are further described in U.S. patent application Ser. No. 12/344, 019, titled, "METHODS OF SEQUESTERING $CO_2$," filed 24 Dec. 2008; U.S. patent application Ser. No. 12/375,632, titled, "Low Energy Electrochemical Hydroxide System and Method," filed 23 Dec. 2008; International Patent Application No. PCT/US08/088,242, titled, "LOW ENERGY ELECTROMECHANICAL HYDROXIDE SYSTEM AND METHOD," filed 23 Dec. 2008; International Patent Application No. PCT/US09/32301, titled, "LOW-ENERGY ELECTROCHEMICAL BICARBONATE ION SOLUTION," filed 28 Jan. 2009; and International Patent Application No. PCT/US09/48511, titled, "LOW-ENERGY 4-CELL ELECTROCHEMICAL SYSTEM WITH CARBON DIOXIDE GAS," filed 24 Jun. 2009, each of which are incorporated herein by reference in their entirety.

Low voltage electrochemical processes may produce hydroxide at the cathode and protons at the anode; where such processes utilize a salt containing chloride, e.g. NaCl, a product of the process will be HCl.

Alternatively, electrochemical methods may be used to produce caustic molecules (e.g., hydroxide) through, for example, the chlor-alkali process, or modification thereof. Electrodes (i.e., cathodes and anodes) may be present in the apparatus containing the divalent cation-containing aqueous solution or gaseous waste stream-charged (e.g., $CO_2$-charged) solution, and a selective barrier, such as a membrane, may separate the electrodes. Electrochemical systems and methods for removing protons may produce by-products (e.g., hydrogen) that may be harvested and used for other purposes. Additional electrochemical approaches that may be used in systems and methods of the invention include, but are not limited to, those described in U.S. patent application Ser. No. 12/503,557, titled, "$CO_2$ UTILIZATION IN ELECTROCHEMICAL SYSTEMS," filed 15 Jul. 2009 and U.S. Provisional Application No. 61/091,729, titled, "LOW ENERGY ABSORPTION OF HYDROGEN ION FROM AN ELECTROLYTE SOLUTION INTO A SOLID MATERIAL," filed 11 Sep. 2008, the disclosures of which are herein incorporated by reference in their entirety.

Combinations of the above mentioned sources of proton removal may be employed. One such combination is the use of a microorganisms and electrochemical systems. Combinations of microorganisms and electrochemical systems include microbial electrolysis cells, including microbial fuel cells, and bio-electrochemically assisted microbial reactors. In such microbial electrochemical systems, microorganisms (e.g. bacteria) are grown on or very near an electrode and in the course of the metabolism of material (e.g. organic material) electrons are generated that are taken up by the electrode.

Additives other than pH elevating agents may also be introduced into the water in order to influence the nature of the precipitate that is produced. As such, certain embodiments of the methods include providing an additive in water before or during the time when the water is subjected to the precipitation conditions. Certain calcium carbonate polymorphs can be favored by trace amounts of certain additives, such as, but are not limited to, lanthanum as lanthanum chloride, transition metals, iron, nickel, and the like. For instance, iron may favor the formation of disordered dolomite (protodolomite).

In some embodiments, the source of alkalinity is a bicarbonate, carbonate, or a mixture of NaOH and carbon dioxide, and the alkaline solution is a "high carbonate" alkaline solution. By "high carbonate" alkaline solution is meant an aqueous composition which possesses carbonate in a sufficient amount so as to remove one or more protons from proton-containing species in solution such that carbonic acid is converted to bicarbonate. As such, the amount of carbonate present in alkaline solutions of the invention may be 5,000 ppm or greater, such as 10,000 ppm greater, such as 25,000 ppm or greater, such as 50,000 ppm or greater, such as 75,000 ppm or greater, including 100,000 ppm or greater.

Source of Cations, Such as, Alkaline Earth Metals

The source of cations, such as sodium, potassium, or alkaline earth metal ions etc., is any aqueous medium containing alkaline earth metals, such as, but are not limited to, calcium, magnesium, strontium, barium, etc. or combination thereof. In some embodiments, the alkaline earth metal is calcium, magnesium, or combination thereof and the source of alkaline earth metal is any aqueous medium containing calcium, magnesium or combination thereof. In some embodiments, alkaline earth metal source is also the source of water and/or source of alkalinity, as described herein. For example, the aqueous solution of alkaline earth metal ions may comprise cations derived from freshwater, brackish water, seawater, or brine (e.g., naturally occurring subterranean brines or anthropogenic subterranean brines such as geothermal plant wastewaters, desalination plant waste waters), as well as other salines having a salinity that is greater than that of freshwater, any of which may be naturally occurring or anthropogenic.

Divalent cations (e.g., alkaline earth metal cations such as $Ca^{2+}$ and $Mg^{2+}$), which are useful for producing precipitation material of the invention, may be found in industrial wastes, seawater, brines, hard water, minerals, and many other suitable sources.

In some locations, industrial waste streams from various industrial processes provide for convenient sources of cations (as well as in some cases other materials useful in the process, e.g., metal hydroxide). Such waste streams include, but are not limited to, mining wastes; fossil fuel burning ash (e.g., fly ash, bottom ash, boiler slag); slag (e.g., iron slag, phosphorous slag); cement kiln waste (e.g., cement kiln dust); oil refinery/petrochemical refinery waste (e.g., oil field and methane seam brines); coal seam wastes (e.g., gas production brines and coal seam brine); paper processing waste; water softening waste brine (e.g., ion exchange effluent); silicon processing wastes; agricultural waste; metal finishing waste; high pH textile waste; and caustic sludge.

In some locations, a convenient source of cations for use in systems and methods of the invention is water (e.g., an aqueous solution including cations such as seawater or subterranean brine), which may vary depending upon the particular location at which the invention is practiced. Suitable aqueous solutions of cations that may be used include solutions including one or more divalent cations, e.g., alkaline earth metal cations such as $Ca^{2+}$ and $Mg^{2+}$. In some embodiments, the aqueous source of cations comprises alkaline earth metal cations. In some embodiments, the alkaline earth metal cations include calcium, magnesium, or a mixture thereof. In some embodiments, the aqueous solution of cations comprises calcium in amounts ranging from 50 to 50,000 ppm, 50 to 40,000 ppm, 50 to 20,000 ppm, 100 to 10,000 ppm, 200 to 5000 ppm, or 400 to 1000 ppm, or 10,000 to 50,000 ppm, or 20,000 to 50,000 ppm, or 20,000 to 30,000 ppm.

In some embodiments, mineral rich freshwater may be a convenient source of cations (e.g., cations of alkaline earth metals such as $Ca^{2+}$ and $Mg^{2+}$). Any of a number of suitable freshwater sources may be used, including freshwater sources ranging from sources relatively free of minerals to sources relatively rich in minerals. Mineral-rich freshwater sources may be naturally occurring, including any of a number of hard water sources, lakes, or inland seas. Some mineral-rich freshwater sources such as alkaline lakes or inland seas (e.g., Lake Van in Turkey) also provide a source of pH-modifying agents. Mineral-rich freshwater sources may also be anthropogenic. For example, a mineral-poor (soft) water may be contacted with a source of cations such as alkaline earth metal cations (e.g., $Ca^{2+}$, $Mg^{2+}$, etc.) to produce a mineral-rich water that is suitable for methods and systems described herein. Cations or precursors thereof (e.g., salts, minerals) may be added to freshwater (or any other type of water described herein) using any convenient protocol (e.g., addition of solids, suspensions, or solutions). In some embodiments, divalent cations selected from $Ca^{2+}$ and $Mg^{2+}$ are added to freshwater. In some embodiments, monovalent cations selected from $Na^+$ and $K^+$ are added to freshwater. In some embodiments, freshwater including $Ca^{2+}$ is combined with magnesium silicates (e.g., olivine or serpentine), or products or processed forms thereof, yielding a solution including calcium and magnesium cations.

Many minerals provide sources of cations and, in addition, some minerals are sources of base. Divalent cation-containing minerals include mafic and ultramafic minerals such as olivine, serpentine, and other suitable minerals, which may be dissolved using any convenient protocol. In one embodiment, cations such as calcium may be provided for methods and compositions of this invention from feldspars such as anorthite. Cations may be obtained directly from mineral sources or from subterranean brines, high in calcium or other divalent cations. Other minerals such as wollastonite may also be used. Dissolution may be accelerated by increasing surface area, such as by milling by conventional means or by, for example, jet milling, as well as by use of, for example, ultrasonic techniques. In addition, mineral dissolution may be accelerated by exposure to acid or base.

Metal silicates (e.g., magnesium silicates) and other minerals including cations of interest may be dissolved, for example, in acid such as HCl (optionally from an electrochemical process) to produce, for example, magnesium and other metal cations for use in compositions of the invention. In some embodiments, magnesium silicates and other minerals may be digested or dissolved in an aqueous solution that has become acidic due to the addition of carbon dioxide and other components of waste gas (e.g., combustion gas). Alternatively, other metal species such as metal hydroxide (e.g., $Mg(OH)_2$, $Ca(OH)_2$) may be made available for use by dissolution of one or more metal silicates (e.g., olivine and serpentine) with aqueous alkali hydroxide (e.g., NaOH) or any other suitable caustic material. Any suitable concentration of aqueous alkali hydroxide or other caustic material may be used to decompose metal silicates, including highly concentrated and very dilute solutions. The concentration (by weight) of an alkali hydroxide (e.g., NaOH) in solution may be, for example, from 30% to 80% (w/w).

Brines

As used herein, "brines" includes synthetic brines or naturally occurring brines, such as, but are not limited to subterranean brines. The brines may provide the source of water, the source of alkaline earth metal ions, the source of carbon or carbonate, the source of alkalinity, or combinations thereof.

In some embodiments the subterranean brines of this invention may be a convenient source for divalent cations, monovalent cations, proton removing agents, or any combination thereof. The subterranean brine that is employed in embodiments of the invention may be from any convenient subterranean brine source. "Subterranean brine" is employed in its conventional sense to include naturally occurring or anthropogenic, concentrated aqueous saline compositions obtained from a geological location. The geological location of the subterranean brine can be found below ground (subterranean geological location), on the surface, or subsurface of the lakes. Concentrated aqueous saline composition includes an aqueous solution which has a salinity of 10,000 ppm total dissolved solids (TDS) or greater, such as 20,000 ppm TDS or greater and including 50,000 ppm TDS or greater. Subterranean geological location includes a geological location which is located below ground level, such as, a solid-fluid interface of the Earth's surface, such as a solid-gas interface as found on dry land where dry land meets the Earth's atmosphere, as well as a liquid-solid interface as found beneath a body of surface water (e.g., lack, ocean, stream, etc) where solid ground meets the body of water (where examples of this interface include lake beds, ocean floors, etc). For example, the subterranean location can be a location beneath land or a location beneath a body of water (e.g., oceanic ridge). For example, a subterranean location may be a deep geological alkaline aquifer or an underground well located in the sedimentary basins of a petroleum field, a subterranean metal ore, a geothermal field, or an oceanic ridge, among other underground locations.

Brines may be concentrated waste streams from wastewater treatment plants. In some embodiments, brines of this invention may be water resulting from dissolution of mineral sources (e.g., oil and gas exploration or extraction) that has been concentrated or otherwise treated. The waste streams from underground sources such as gas or petroleum mining may contain hydrocarbons, carbonates, cations or anions. Treatment of these waste streams to reduce hydrocarbons and the water volume may result in an aqueous mixture rich in carbonates, salinity, alkalinity or any combination thereof. This aqueous mixture may be used to sequester carbon dioxide or may be used to precipitate hydrated carbon species such as carbonic acid, bicarbonate, or carbonates.

The subterranean location may be a location that is 100 m or deeper below ground level, such as 200 m or deeper below ground level, such as 300 m or deeper below ground level, such as 400 m or deeper below ground level, such as 500 m or deeper below ground level, such as 600 m or deeper below ground level, such as 700 m or deeper below ground level, such as 800 m or deeper below ground level, such as 900 m or deeper below ground level, such as 1000 m or deeper below ground level, including 1500 m or deeper below ground level, 2000 m or deeper below ground level, 2500 m or deeper below ground level and 3000 m or deeper below ground level. In some embodiments of the invention, a subterranean location is a location that is between 100 m and 3500 m below ground level, such as between 200 m and 2500 m below ground level, such as between 200 m and 2000 m below ground level, such as between 200 m and 1500 m below ground level, such as between 200 m and 1000 m below ground level and including between 200 m and 800 m below ground level. Subterranean brines of the invention may include, but are not limited to, oil-field brines, basinal brines, basinal water, pore water, formation water, and deep sea hypersaline waters, among others.

Subterranean brines of the invention may be subterranean aqueous saline compositions and in some embodiments, may have circulated through crustal rocks and become enriched in substances leached from the surrounding mineral. As such, the composition of subterranean brines may vary. In some embodiments, the subterranean brines provide a source of cations. The cations may be monovalent cations, such as $Na^+$, $K^+$, etc. The cations may also be divalent cations, such as $Ca^{2+}$, $Mg^{2+}$, $Sr^{2+}$, $Ba^{2+}$ $Mn^{2+}$, $Zn^{2+}$, $Fe^{2+}$, etc. In some instances, the divalent cations of the subterranean brine are alkaline earth metal cations, e.g., $Ca^{2+}$, $Mg^{2+}$. Subterranean brines of interest may have $Ca^{2+}$ present in amounts that vary, ranging from 50 to 100,000 ppm, such as 100 to 75,000 ppm, including 500 to 50,000 ppm, for example 1000 to 25,000 ppm. Subterranean brines of interest may have $Mg^{2+}$ present in amounts that vary, ranging from 50 to 25,000 ppm, such as 100 to 15,000 ppm, including 500 to 10,000 ppm, for example 1000 to 5,000 ppm. In brines where both $Ca^{2+}$ and $Mg^{2+}$ are present, the molar ratio of $Ca^{2+}$ to $Mg^{2+}$ (i.e., $Ca^{2+}:Mg^{2+}$) in the subterranean brine may vary, and in one embodiment may range between 1:1 and 100:1. In some instance the $Ca^{2+}:Mg^{2+}$ may be between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, the molar ratio of $Ca^{2+}$ to $Mg^{2+}$ in subterranean brines of interest may range between 1:1 and 1:10; 1:5 and 1:25; 1:10 and 1:50; 1:25 and 1:100; 1:50 and 1:500; or 1:100 and 1:1000. In some embodiments, the ratio of $Mg^{2+}$ to $Ca^{2+}$ (i.e., $Mg^{2+}:Ca^{2+}$) in the subterranean brine ranges between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, the ratio of $Mg^{2+}$ to $Ca^{2+}$ in the subterranean brines of interest may range between 1:1 and 1:10; 1:5 and 1:25; 1:10 and 1:50; 1:25 and 1:100; 1:50 and 1:500; or 1:100 and 1:1000. In particular embodiments the $Mg^{2+}:Ca^{2+}$ of a brine may be lower than 1:1, such as 1:2, 1:4, 1:10, 1:100 or lower.

In some embodiments, subterranean brines of the invention provide a source of alkalinity and contain proton-removing agents. Proton-removing agent includes a substance or compound which possesses sufficient alkalinity or basicity to remove one or more protons from a proton-containing species in solution. In some embodiments, the amount of proton-removing agent is an amount such that the subterranean brine possesses a neutral pH (i.e., pH=7). In these embodiments, the stoichiometric sum of proton-removing agents is equal to the stoichiometric sum of proton-containing agents in the subterranean brine. The stoichiometric sum of proton-removing agents is the sum of all substances or compounds (e.g., halides, oxyanions, organic bases, etc.) which can remove one or more protons from a proton-containing species in solution. In other embodiments, the amount of proton-removing agents in the subterranean brine is an amount such that the subterranean brine is alkaline. By alkaline is meant the stoichiometric sum of proton-removing agents in the subterranean brine exceeds the stoichiometric sum of proton-containing agents. In some instances, the alkaline subterranean brine has a pH that is above neutral pH (i.e., pH>7), e.g., the brine has a pH ranging from 7.1 to 12, such as 8 to 12, such as 8 to 11, and including 9 to 11. In some embodiments, as described in greater detail below, while being basic the pH of the subterranean brine may be insufficient to cause precipitation of the carbonate-compound precipitation material. For example, the pH of the subterranean brine may be 9.5 or lower, such as 9.3 or lower, including 9 or lower.

Proton-removing agents present in subterranean brines of the invention may vary. In some embodiments, the proton-removing agents may be anions. Anions may be halides, such as $Cl^-$, $F^-$, $I^-$ and $Br^-$, among others and oxyanions, e.g., sulfate, carbonate, borate and nitrate, among others.

In some embodiments, the proton-removing agent is borate. Borates present in subterranean brines of the invention may be any oxyanion of boron, e.g., $BO_3^{3-}$, $B_2O_5^{4-}$, $B_3O_7^{5-}$, and $B_4O_9^{6-}$, among others. The amount of borate present in subterranean brines of the invention may vary. In some instances, the amount of borate present ranges from 50 to 100,000 ppm, such as 100 to 75,000 ppm, including 500 to 50,000 ppm, for example 1000 to 25,000 ppm. As such, in some embodiments, the proton removing agents present in the subterranean brines may comprise 5% or more of borates, such about 10% or more of borates, including about 25% or more of borates, for instance about 50% or more of borates, such as about 75% or more of borates, including about 90% or more of borates. Where both carbonate and borate are present, the molar ratio of carbonate to borate (i.e., carbonate:borate) in the subterranean brines may be between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, the molar ratio of carbonate to borate in subterranean brines of the invention may be between 1:1 and 1:10; 1:5 and 1:25; 1:10 and 1:50; 1:25 and 1:100; 1:50 and 1:500; or 1:100 and 1:1000. In other embodiments, the ratio of carbonate to borate (i.e., carbonate:borate) in the subterranean brine may be between 1:1 and 2.5:1; 2.5:1 and 5:1; 5:1 and 10:1; 10:1 and 25:1; 25:1 and 50:1; 50:1 and 100:1; 100:1 and 150:1; 150:1 and 200:1; 200:1 and 250:1; 250:1 and 500:1; 500:1 and 1000:1, or a range thereof. For example, the ratio of carbonate to borate in the subterranean brines of the invention may be between 1:1 and 10:1; 5:1 and 25:1; 10:1 and 50:1; 25:1 and 100:1; 50:1 and 500:1; or 100:1 and 1000:1.

In some embodiments, proton-removing agents present in subterranean brines may be an organic base. In some instances, the organic base may be a monocarboxylic acid anion, e.g., formate, acetate, propionate, butyrate, and valerate, among others. In other instances, the organic base may be a dicarboxylic acid anion, e.g., oxalate, malonate, succinate, and glutarate, among others. In other instances, the organic base may be phenolic compounds, e.g., phenol, methylphenol, ethylphenol, and dimethylphenol, among others. In some embodiments, the organic base may be a nitrogenous base, e.g., primary amines such as methyl amine, secondary amines such as diisopropylamine, tertiary amines such as diisopropylethylamine, aromatic amines such as aniline, heteroaromatics such as pyridine, imidazole, and benzimidazole, and various forms thereof. The amount of organic base present in subterranean brines of the invention may vary. In some instances, the amount of organic base present in the brine ranges from 1 to 200 mmol/liter, such as 1 to 175 mmol/liter, such as 1 to 100 mmol/liter, such as 10 to 100 mmol/liter, including 10 to 75 mmol/liter. Thus, in certain embodiments, proton removing agents present in the subterranean brines may make up 5% or more of organic base, such about 10% or more of organic base, including about 25% or more of organic base, for instance about 50% or more of organic base, such as about 75% or more of organic base, including about 90% or more of organic base.

In some embodiments, subterranean brines of the invention may have a bacterial content. Examples of the types of bacteria that may be present in subterranean brines include sulfur oxidizing bacteria (e.g., *Shewanella putrefaciens, Thiobacillus*), aerobic halophilic bacteria (e.g., *Salinivibrio costicola* and *Halomanos halodenitrificans*), high salinity bacteria (e.g., endospore-containing *Bacillus* and *Marinococcus halo-*

*philus*), among others. Bacteria may be present in subterranean brines of the invention in an amount that varies, such as where the concentration is $1\times10^8$ colony forming units/ml (cfu/ml) or less, such as $5\times10^6$ cfu/ml or less, such as $1\times10^5$ cfu/ml or less, such as $5\times10^4$ cfu/ml or less, such as $1\times10^3$ cfu/ml or less, and including $1\times10^2$ cfu/ml or less. In some embodiments, the concentration of bacteria in the subterranean brines may depend on the temperature of the brine. For example, at temperatures greater than about 80° C., subterranean brines of the invention may have very little bacterial content, such as where the bacterial concentration is $1\times10^5$ cfu/ml or less, such as $1\times10^4$ cfu/ml or less, such as $5\times10^3$ cfu/ml or less, such as $1\times10^3$ cfu/ml or less, such as $5\times10^2$ cfu/ml or less, including $1\times10^2$ cfu/ml or less.

In some embodiments, where subterranean brines have very little bacterial content, substantially (e.g., 80% or more) the entire alkalinity (i.e., basicity) of the subterranean brine may be derived from organic bases. In these embodiments, 80% or more, such as 90% or more, including 95% or more, up to 100% of the alkalinity of the subterranean brine may be derived from organic bases present in the subterranean brine. At temperatures ranging between 20-80° C., subterranean brines of the invention may have a high bacterial content. In these embodiments, the concentration of bacteria in the subterranean brine may be $1\times10^5$ cfu/ml or greater, such as $5\times10^5$ cfu/ml or greater, such as $1\times10^6$ cfu/ml or greater, such as $5\times10^6$ cfu/ml or greater, such as $8\times10^6$ cfu/ml or greater, including $1\times10^7$ cfu/ml or greater. In some embodiments, where subterranean brines have a high bacterial content, very little of the alkalinity (e.g., 20% or less) of the subterranean brine may be derived from organic bases. In these embodiments, 20% or less, such as 15% or less, such as 10% or less, including 5% or less of the alkalinity of the subterranean brine may be derived from organic bases present in the subterranean brine.

Subterranean brines may be found at higher temperatures and pressures than other naturally occurring bodies of water such as oceans or lakes. The internal pressures brines in subterranean formations of the invention may vary depending on the makeup of the brine as well as the depth and geographic location of the subterranean formation, e.g., ranging from 4-200 atm, such as 5 to 150 atm, such as 5 to 100 atm, such as 5 to 50 atm, such as 5 to 25 atm, such as 5 to 15 atm, and including 5 to 10 atm. In some embodiments, the subterranean brine is thermally active. The internal temperatures of subterranean brines of this invention may vary depending on the makeup of the composition as well as the depth and geographic location of the subterranean formation, ranging from −5 to 250° C., such as 0 to 200° C., such as 5 to 150° C., such as 10 to 100° C., such as 20 to 75° C., including 25 to 50° C. The elevated temperatures and pressures may be used to generate energy to drive one or more process related to the sequestration of carbon dioxide.

In some embodiments, subterranean brines of the invention may have distinct ranges or minimum or maximum levels of elements, ions, or other substances, for example, but not limited to: chloride, lithium, sodium, sulfur, fluoride, potassium, bromide, silicon, strontium, calcium, boron, magnesium, iron, barium and the like. In some embodiments, subterranean brines of the invention may include strontium, which may be present in the subterranean brine in an amount of up to 10,000 ppm or less, ranging in certain embodiments from 3 to 10,000 ppm, such as from 5 to 5000 ppm, such as from 5 to 1000 ppm, e.g., 5 to 500 ppm, including 5 to 100 ppm. In other embodiments, subterranean brines of the invention may include barium, which may be present in the subterranean brine in an amount of up to 2500 ppm or less, ranging in certain instances from 1 to 2500 ppm, such as from 5 to 2500 ppm, such as from 10 to 1000 ppm, e.g., 10 to 500 ppm, including 10 to 100 ppm.

In other embodiments, subterranean brines of the invention may include iron, which may be present in the subterranean brine in an amount of up to 5000 ppm or less, ranging in certain instances from 1 to 5000 ppm, such as from 5 to 5000 ppm, such as from 10 to 1000 ppm, e.g., 10 to 500 ppm, including 10 to 100 ppm. In other embodiments, subterranean brines of the invention may include sodium, which may be present in the subterranean brine in an amount of up to 100,000 ppm or less, ranging in certain instances from 1000 to 100,000 ppm, such as from 1000 to 10,000 ppm, such as from 1500 to 10,000 ppm, e.g., 2000 to 8000 ppm, including 2000 to 7500 ppm. In other embodiments, subterranean brines of the invention may include lithium, which may be present in the subterranean brine in an amount of up to 500 ppm or less, ranging in certain instances from 0.1 to 500 ppm, such as from 1 to 500 ppm, such as from 5 to 250 ppm, e.g., 10 to 100 ppm, including 10 to 50 ppm. In other embodiments, subterranean brines of the invention may include chloride, which may be present in the subterranean brine in an amount of up to 500,000 ppm or less, ranging in certain instances from 500 to 500,000 ppm, such as from 1000 to 250,000 ppm, such as from 1000 to 100,000 ppm, e.g., 2000 to 100,000 ppm, including 2000 to 50,000 ppm. In other embodiments, subterranean brines of the invention may include fluoride, which may be present in the subterranean brine in an amount of up to 100 ppm or less, ranging in certain instances from 0.1 to 100 ppm, such as from 1 to 50 ppm, such as from 1 to 25 ppm, e.g., 2 to 25 ppm, including 2 to 10 ppm. In other embodiments, subterranean brines of the invention may include potassium, which may be present in the subterranean brine in an amount of up to 100,000 ppm or less, ranging in certain instances from 10 to 100,000 ppm, such as from 100 to 100,000 ppm, such as from 1000 to 50,000 ppm, e.g., 1000 to 25,000 ppm, including 1000 to 10,000 ppm.

In other embodiments, subterranean brines of the invention may include bromide, which may be present in the subterranean brine in an amount of up to 5000 ppm or less, ranging in certain instances from 1 to 5000 ppm, such as from 5 to 5000 ppm, such as from 10 to 1000 ppm, e.g., 10 to 500 ppm, including 10 to 100 ppm. In other embodiments, subterranean brines of the invention may include silicon, which may be present in the subterranean brine in an amount of up to 5000 ppm or less, ranging in certain instances from 1 to 5000 ppm, such as from 5 to 5000 ppm, such as from 10 to 1000 ppm, e.g., 10 to 500 ppm, including 10 to 100 ppm. In other embodiments, subterranean brines of the invention may include calcium, which may be present in the subterranean brine in an amount of up to 100,000 ppm or less, ranging in certain instances from 100 to 100,000 ppm, such as from 100 to 50,000 ppm, such as from 200 to 10,000 ppm, e.g., 200 to 5000 ppm, including 200 to 1000 ppm. In other embodiments, subterranean brines of the invention may include boron, which may be present in the subterranean brine in an amount of up to 1000 ppm or less, ranging in certain instances from 1 to 1000 ppm, such as from 10 to 1000 ppm, such as from 20 to 500 ppm, e.g., 20 to 250 ppm, including 20 to 100 ppm. In other embodiments, subterranean brines of the invention may include magnesium, which may be present in the subterranean brine in an amount of up to 10,000 ppm or less, ranging in certain instances from 10 to 10,000 ppm, such as from 50 to 5000 ppm, such as from 50 to 1000 ppm, e.g., 100 to 1000 ppm, including 100 to 500 ppm.

In some embodiments, subterranean brines may be obtained from a subterranean location beneath or nearby a metal ore mine or petroleum field and as such, may be rich in one or more identifiable trace elements (e.g., zinc, aluminum, lead, manganese, copper, cadmium, strontium, barium mercury, selenium, arsenic etc.) depending on the type of metal ore mine or petroleum field and its vicinity to the subterranean location where the subterranean brine is obtained. The brine may be used in mining activities before or after its use in methods of this invention. The brine may be concentrated or otherwise processed after mining activities prior to use in methods of this invention.

The concentration and identity of a trace element may provide an identifiable physical profile of a particular brine. The trace element or the above recited ions may be found in the calcium carbonate precipitates prepared from such brines and as such may be used as markers for the calcium carbonate precipitates. In some embodiments, the trace metal element in the subterranean brine is zinc, which may be present in the subterranean brine in an amount of up to 250 ppm or less, ranging in certain instances from 1 to 250 ppm, such as 5 to 250 ppm, such as from 10 to 100 ppm, e.g., 10 to 75 ppm, including 10 to 50 ppm. In other embodiments, the identifying trace metal element in the subterranean brine is lead, which may be present in the subterranean brine in an amount of up to 100 ppm or less, ranging in certain instances from 1 to 100 ppm, such as 5 to 100 ppm, such as from 10 to 100 ppm, e.g., 10 to 75 ppm, including 10 to 50 ppm. In yet other embodiments, the identifying trace metal element in the subterranean brine is manganese, which may be present in the subterranean brine in an amount of up to 200 ppm or less, ranging in certain instances from 1 to 200 ppm, such as 5 to 200 ppm, such as from 10 to 200 ppm, e.g., 10 to 150 ppm, including 10 to 100 ppm. In some embodiments, the subterranean brine may have a molar ratio of different carbonates which varies, e.g., carbonates present in subterranean brines of the invention include, but are not limited to, carbonates of beryllium, magnesium, calcium, strontium, barium, radium or any combinations thereof.

In some embodiments, the subterranean brine may have an isotopic composition which varies depending on the factors which influenced its formation and the location from which it is obtained. Many elements have stable isotopes, and these isotopes may be preferentially used in various processes, e.g., biological processes and as a result, different isotopes may be present in each subterranean brine in distinctive amounts. An example is carbon, which will be used to illustrate one example of a subterranean brine described herein. However, it will be appreciated that these methods are also applicable to other elements with stable isotopes if their ratios can be measured in a similar fashion to carbon; such elements may include nitrogen, sulfur, and boron. Methods for characterizing a composition by measuring its relative isotope composition (e.g., $\delta^{13}C$) is described in U.S. patent application Ser. No. 12/163,205, filed Jun. 27, 2008; the disclosure of which is herein incorporated by reference. For example, the degree of water-rock exchange and the degree of mixing along fluid flow paths between water and minerals can modify the isotopic composition of the subterranean brine, in some instances the ratio of strontium-87 to strontium-86 ($^{87}Sr/^{86}Sr$). In one embodiment, a brine may have a high initial concentration of rubidium, such as brine found in granites formations. One aspect of this invention is that brines may be characterized by high strontium-87 to strontium-86 ratios. In some embodiments, the strontium-87:strontium-86 ratio of subterranean brines of the invention may vary, ranging between 0.71/1 and 0.85/1, such as between 0.71/1 and 0.825/1, such as between 0.71/1and 0.80/1, such as between 0.75/1 and 0.85/1, and including between 0.75/1 and 0.80/1. Any suitable method may be used for measuring the strontium-87 to strontium-86 ratio, methods including, but not limited to 90°-sector thermal ionization mass spectrometry.

In some embodiments, subterranean brines of the invention may have a composition which includes one or more identifying components which distinguish each subterranean brine from other subterranean brines. As such, the composition of each subterranean brine may be distinct from one another. In some embodiments, subterranean brines may be distinguished from one another by the amount and type of elements, ions or other substances present in the subterranean brine (e.g., trace metal ions, Hg, Se, As, etc). In other embodiments, subterranean brines may be distinguished from one another by the molar ratio of carbonates present in the subterranean brine. In other embodiments, subterranean brines may be distinguished from one another by the amount and type of different isotopes present in the subterranean brine (e.g., $\delta^{13}C$, $\delta^{18}O$, etc.). In other embodiments, subterranean brines may be distinguished from one another by the isotopic ratio of particular elements present in the subterranean brine (e.g., $^{87}Sr/^{86}Sr$).

Methods

A variety of different methods may be employed to prepare the $CO_2$ sequestering calcium carbonates of the compositions of the invention. $CO_2$ sequestration protocols of interest include, but are not limited to, those disclosed in U.S. patent application Ser. No. 12/126,776, titled, "Hydraulic cements including carbonate compound compositions," filed 23 May 2008; 12/163,205, titled "DESALINATION METHODS AND SYSTEMS THAT INCLUDE CARBONATE COMPOUND PRECIPITATION," filed 27 Jun. 2008; and 12/486,692, titled "METHODS AND SYSTEMS FOR UTILIZING WASTE SOURCES OF METAL OXIDES" filed 17 Jun. 2009; U.S. patent application Ser. No. 12/501,217, titled "PRODUCTION OF CARBONATE-CONTAINING COMPOSITIONS FROM MATERIAL COMPRISING METAL SILICATE," filed 10 Jul. 2009; and U.S. patent application Ser. No. 12/557,492, titled "$CO_2$ COMMODITY TRADING SYSTEM AND METHOD," filed 10 Sep. 2009; as well as International Application No. PCT/US08/88318, titled, "METHODS OF SEQUESTERING $CO_2$," filed 24 Dec. 2008; and PCT/US09/45722, titled "ROCK AND AGGREGATE, AND METHODS OF MAKING AND USING THE SAME," filed 29 May 2009; as well as pending U.S. Provisional Patent Application Ser. Nos. 61/081,299; 61/082,766; 61/088,347; 61/088,340; and 61/101,631; the disclosures of which are herein incorporated by reference in their entireties.

FIG. 1 provides an illustrative schematic flow diagram of a carbonate precipitation process according to some embodiments of the invention. In FIG. 1, any source of water, such as, for example only, saltwater from salt water source containing alkaline earth metal ions or an alkaline earth metal ion containing water 10 is subjected to one or more conditions at precipitation step 20. In some embodiments depicted in FIG. 1, the water from saltwater source or an alkaline earth-metal containing water 10 is first contacted with source of $CO_2$ 30 which may be a $CO_2$ gaseous stream to make $CO_2$ charged water. By $CO_2$ charged water is meant water that has had $CO_2$ gas contacted with it and/or where $CO_2$ molecules have combined with water molecules to produce, e.g., carbonic acid, bicarbonate and carbonate ion. Charging water in this step results in an increase in the $CO_2$ content of the water, e.g., in the form of carbonic acid, bicarbonate and carbonate ion, and a concomitant decrease in the $pCO_2$ of the waste stream that is contacted with the water. The $CO_2$ charged water may be acidic, having a pH of 6 or less, such as 5 or less and including 4 or less. In certain embodiments, the concentration of $CO_2$ of the gas that is used to charge the water is 10% or higher, 25% or higher, including 50% or higher, such as 75% or even higher.

In some embodiments, the water from saltwater source or the alkaline earth-metal containing water 10 is first contacted with a solution charged with the partially or fully dissolved $CO_2$, which $CO_2$ is then subjected to one or more carbonate compound precipitation conditions. As depicted in FIG. 1, the source of $CO_2$ 30 includes a gaseous stream or the solution containing the $CO_2$ which is contacted with the water at precipitation step 20.

In some embodiments, the solution charged with the partially or fully dissolved $CO_2$ is made by parging or diffusing the $CO_2$ gaseous stream through a solution to make a $CO_2$ charged water. In some embodiments, the solution with $CO_2$ includes a proton removing agent. In some embodiments, the $CO_2$ gas is bubbled or parged through a solution containing a proton removing agent, such as sodium or potassium hydroxide, in an absorber. In some embodiments, the absorber may include a bubble chamber where the $CO_2$ gas is bubbled through the solution containing the proton removing agent. In some embodiments, the absorber may include a spray tower where the solution containing the proton removing agent is sprayed or circulated through the $CO_2$ gas. In some embodiments, the absorber may include a pack bed to increase the surface area of contact between the $CO_2$ gas and the solution containing the proton removing agent. In some embodiments, a typical absorber fluid temperature is 32-37° C. The absorber for absorbing $CO_2$ in the solution is described in U.S. application Ser. No. 12/721,549, filed on Mar. 10, 2010, which is incorporated herein by reference in its entirety.

In some embodiments, an order for the addition of the source of $CO_2$ and the alkaline earth metal containing water to the reactor for the precipitation, may be varied. In some embodiments, the $CO_2$ gaseous stream or the solution containing the partially or fully dissolved $CO_2$ or the affluent from the absorber containing an alkaline solution of $CO_2$ is added to the reactor containing the alkaline earth-metal containing water for precipitation of the carbonate precipitate in the precipitation step 20. In some embodiments, the alkaline earth-metal containing water is added to the reactor containing the $CO_2$ gaseous stream or the solution containing the partially or fully dissolved $CO_2$ or the affluent from the absorber containing an alkaline solution of $CO_2$ for precipitation of the carbonate precipitate in the precipitation step 20. In some embodiments, the alkaline earth-metal containing water is added to the reactor containing less than 20%, or less than 15%, or less than 10%, or less than 5% of the $CO_2$ gaseous stream or the solution containing the partially or fully dissolved $CO_2$ or the affluent from the absorber containing an alkaline solution of $CO_2$ for precipitation of the carbonate precipitate in the precipitation step 20.

Contact protocols include, but are not limited to, direct contacting protocols, e.g., bubbling the gas through the volume of water; concurrent contacting means, e.g., contact between unidirectionally flowing gaseous and liquid phase streams; and countercurrent means, e.g., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient. In some embodiments, the contact is by spray. In some embodiments, the contact is through packed column.

In some embodiments, the methods include contacting the volume of water that is subjected to the mineral precipitation conditions with a source of $CO_2$. The contacting of the water with the source of $CO_2$ may occur before and/or during the time when the water is subject to $CO_2$ in one or more conditions or one or more precipitation conditions. Accordingly, embodiments of the invention include methods in which the volume of water is contacted with a source of $CO_2$ prior to subjecting the volume of saltwater to mineral precipitation conditions. Embodiments of the invention include methods in which the volume of salt water is contacted with a source of $CO_2$ while the volume of saltwater is being subjected to mineral precipitation conditions. Embodiments of the invention include methods in which the volume of water is contacted with a source of a $CO_2$ both prior to subjecting the volume of water to mineral precipitation conditions and while the volume of water is being subjected to carbonate compound precipitation conditions. In some embodiments, the same water may be cycled more than once, wherein a first cycle of precipitation removes primarily calcium carbonate and magnesium carbonate minerals, and leaves remaining alkaline water to which other alkaline earth ion sources may be added, that can have more carbon dioxide cycled through it, precipitating more carbonate compounds.

The $CO_2$ charging and carbonate compound precipitation may occur in a continuous process or at separate steps. As such, charging and precipitation may occur in the same reactor of a system, e.g., as illustrated in FIG. 1 at step 20, according to some embodiments of the invention. In yet other embodiments of the invention, these two steps may occur in separate reactors, such that the water is first charged with $CO_2$ in a charging reactor and the resultant $CO_2$ charged water is then subjected to precipitation conditions in a separate reactor.

In methods of making the composition of the invention, a volume of water is subjected to one or more conditions or precipitation conditions sufficient to produce a precipitated carbonate compound composition and mother liquor (i.e., the part of the water that is left over after precipitation of the carbonate compound(s) from water). At precipitation step 20, carbonate compounds, which may be amorphous or crystalline, are precipitated. This precipitate may be the self-cementing composition product 80 and may be stored as is or may be further processed to make the cement products. Alternatively, the precipitate may be subjected to further processing to give the hydraulic cement or the SCM compositions of the invention.

The one or more conditions or one or more precipitation conditions of interest include those that change the physical environment of the water to produce the desired precipitate product. The one or more conditions or precipitation conditions include, but are not limited to, one or more of temperature, pH, precipitation, residence time of the precipitate, dewatering or separation of the precipitate, drying, milling, and storage. For example, the temperature of the water may be within a suitable range for the precipitation of the desired composition to occur. For example, the temperature of the water may be raised to an amount suitable for precipitation of the desired carbonate compound(s) to occur. In such embodiments, the temperature of the water may be from 5 to 70° C., such as from 20 to 50° C., and including from 25 to 45° C. As such, while a given set of precipitation conditions may have a temperature ranging from 0 to 100° C., the temperature may be raised in certain embodiments to produce the desired precipitate. In certain embodiments, the temperature is raised using energy generated from low or zero carbon dioxide emission sources, e.g., solar energy source, wind energy source, hydroelectric energy source, etc.

The residence time of the precipitate in the reactor before the precipitate is removed from the solution, may vary. In some embodiments, the residence time of the precipitate in the solution is more than 5 seconds, or between 5 seconds-1 hour, or between 5 seconds-1 minute, or between 5 seconds to 20 seconds, or between 5 seconds to 30 seconds, or between 5 seconds to 40 seconds. Without being limited by any theory, it is contemplated that the residence time of the precipitate may affect the size of the particle. For example, a shorter residence time may give smaller size particles or more disperse particles whereas longer residence time may give agglomerated or larger size particles. In some embodiments, the residence time in the process of the invention may be used to make small size as well as large size particles in a single or multiple batches which may be separated or may remain mixed for later steps of the process. In some embodiments, the finely disperse particles may be processed further to give the SCM composition of the invention. In some embodiments, the large or agglomerated particles may be processed to give the hydraulic cement composition and/or the self-cementing composition of the invention.

While the pH of the water may range from 7 to 14 during a given precipitation process, in certain embodiments the pH is raised to alkaline levels in order to drive the precipitation of carbonate compound as desired. In some embodiments, the pH is raised to a level which minimizes if not eliminates $CO_2$ gas generation production during precipitation. In these embodiments, the pH may be raised to 10 or higher, such as 11 or higher. In some embodiments, the one or more conditions or the precipitation conditions include contacting the saltwater or the alkaline-earth metal containing water with a proton removing agent. The proton removing agent may be any proton removing agent, as described herein, for example, but not limited to, oxide, hydroxide, such as sodium hydroxide, carbonate, coal ash, naturally occurring mineral, and combination thereof. In some embodiments, the one or more conditions or the precipitation conditions include contacting the saltwater or the alkaline-earth metal containing water to electrochemical conditions. Such electrochemical conditions have been described herein. The nature of the precipitate may be affected by the pH of the precipitation process. In some embodiments, high pH may lead to rapid precipitation and agglomeration of the particles whereas lower pH or slow raise in the pH may lead to finer particles.

The nature of the precipitate may also be influenced by selection of appropriate major ion ratios. Major ion ratios may have influence on polymorph formation. For example, magnesium may stabilize the vaterite and/or amorphous calcium carbonate in the precipitate.

Rate of precipitation may also influence compound polymorphic phase formation and may be controlled in a manner sufficient to produce a desired precipitate product. The most rapid precipitation can be achieved by seeding the solution with a desired phase. Without seeding, rapid precipitation can be achieved by rapidly increasing the pH of the sea water. The higher the pH is, the more rapid the precipitation may be.

In some embodiments, a set of conditions to produce the desired precipitate from the water include, but are not limited to, the water's temperature and pH, and in some instances the concentrations of additives and ionic species in the water. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate compound precipitates according to the invention may be batch or continuous protocols. It will be appreciated that precipitation conditions may be different to produce a given precipitate in a continuous flow system compared to a batch system. The one or more of the precipitation conditions, as described herein, may be modulated to obtain a precipitate with a desired particle size, reactivity, and zeta potential. This may further affect the compressive strength of the cement formed when the composition is combined with fresh water, set and hardenend.

Following production of the carbonate compound precipitate from the water, the resultant precipitated carbonate compound composition may be separated from the mother liquor or dewatered to produce the precipitate product, as illustrated at step 40 of FIG. 1. Alternatively, the precipitate is left as is in the mother liquor or mother suprenate.

Separation of the precipitate can be achieved using any convenient approach, including a mechanical approach, e.g., where bulk excess water is drained from the precipitated, e.g., either by gravity alone or with the addition of vacuum, mechanical pressing, by filtering the precipitate from the mother liquor to produce a filtrate, or using centrifugation techniques, etc. Separation of bulk water produces a wet, dewatered precipitate.

The above protocol results in the production of slurry of a $CO_2$ sequestering precipitate and mother liquor. This precipitate in the mother liquor and/or in the slurry may give the self-cementing composition of the invention. In some embodiments, a portion or whole of the dewatered precipitate or the slurry is further prcessed to make the hydraulic cement or the SCM compositions of the invention.

Where desired, the compositions made up of the precipitate and the mother liquor may be stored for a period of time following precipitation and prior to further processing. For example, the composition may be stored for a period of time ranging from 1 to 1000 days or longer, such as 1 to 10 days or longer, at a temperature ranging from 1 to 40° C., such as 20 to 25° C.

The slurry components are then separated. Embodiments may include treatment of the mother liquor, where the mother liquor may or may not be present in the same composition as the product. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2. In certain embodiments, the treated brine may be contacted with a source of $CO_2$, e.g., as described above, to sequester further $CO_2$.

The resultant mother liquor of the reaction may be disposed of using any convenient protocol. In certain embodiments, it may be sent to a tailings pond for disposal. In certain embodiments, it may be disposed of in a naturally occurring body of water, e.g., ocean, sea, lake or river. In certain embodiments, the mother liquor is returned to the source of feedwater for the methods of invention, e.g., an ocean or sea. Alternatively, the mother liquor may be further processed, e.g., subjected to desalination protocols, as described further in U.S. application Ser. No. 12/163,205, filed Jun. 27, 2008; the disclosure of which is herein incorporated by reference.

The resultant dewatered precipitate is then dried to produce the composition of the invention, as illustrated at step 60 of FIG. 1. Drying can be achieved by air drying, spray drying, vacuum drying, and/or oven drying the precipitate. Where the precipitate is air dried, air drying may be at a temperature ranging from −70 to 120° C., as desired. In certain embodiments, drying is achieved by freeze-drying (i.e., lyophilization), where the precipitate is frozen, the surrounding pressure is reduced and enough heat is added to allow the frozen water in the material to sublime directly from the frozen precipitate phase to gas. In yet another embodiment, the precipitate is spray dried to dry the precipitate, where the liquid containing the precipitate is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc. The drying of the precipitate may include temperature between 150-180° C. or between 150-250° C., or between 150-200° C.

In some embodiments, the step of spray drying may include separation of different sized particles of the precipitate. For example, a first batch of larger sized particles may be collected from the spray dryer followed by the collection of the smaller sized particles. In some embodiments, a single batch may give one or more, such as, for example only two, three, four, or five different sizes of the particles (e.g., micron and sub-micron particles as defined herein) which may be separated for later use or which different sized particle may be mixed together to make the composition of the invention.

In some embodiments, the particles with different morphologies, such as fine or agglomerated, and/or the particles with different sizes may be mixed to make the compositions of the invention. For example, a composition of the invention may include a mix of fine disperse particles with larger agglomerated particles or the composition of the invention may include a mix of particles with different sizes, e.g., particles with sizes ranging between 0.1 micron to 100 micron. In some embodiments, the composition of the invention may be modulated by mixing the particles with different particle size, surface area, zeta potential, and/or morphologies.

Where desired, the dewatered precipitate product from the separation reactor 40 may be washed before drying, as illustrated at step 50 of FIG. 1. The precipitate may be washed with freshwater, e.g., to remove salts (such as NaCl) from the dewatered precipitate. The water used for washing may contain metals, such as, iron, nickel, etc. In some embodiments, the precipitate may be rinsed with fresh water to remove halite or the chloride content from the precipitate. The chloride may be undesirable in some applications, for example, in aggregates intended for use in concrete since the chloride has a tendency to corrode rebar. Further, the rinsing of the slurry or the precipitate with water may cause the vaterite in the composition to shift to more stable forms such as aragonite and calcite and result in the cemented material. In some embodiments, such rinsing may not be desirable as it may reduce the yield of the composition. In such embodiments, the precipitate may be washed with a solution having a low chloride concentration but high concentration of divalent cations (such as, calcium, magnesium, etc.). Such high concentration of the divalent ion may prevent the dissolution of the precipitate, thereby reducing the yield loss and the conversion to cemented material. In some embodiments, the precipitate may be washed or rinsed with water containing stabilizing additives, such as sodium stearate. The stabilizing additives may act as ligands that may alter the surface charge of the precipitate, thereby stabilizing it. The stabilization of the precipitate may prevent the dissolution of the precipitate, thereby reducing the yield loss and the conversion to cemented material. Used wash water may be disposed of as convenient, e.g., by disposing of it in a tailings pond, etc.

At step 70, the dried precipitate is refined, milled, aged, and/or cured, e.g., to provide for desired physical characteristics, such as particle size, surface area, zeta potential, etc., or to add one or more components to the precipitate, such as admixtures, aggregate, supplementary cementitious materials, etc., to produce a final composition of the invention 80. Refinement may include a variety of different protocols. In certain embodiments, the product is subjected to mechanical refinement, e.g., grinding, in order to obtain a product with desired physical properties, e.g., particle size, etc. The dried precipitate may be milled or ground to obtain a desired particle size.

Aspects of the invention further include systems, e.g., processing plants or factories, for producing the carbonate compound compositions, e.g., saltwater derived carbonate and hydroxide mineral compositions, and cements of the invention, as well as concretes and mortars that include the cements of the invention. Systems of the invention may have any configuration which enables practice of the particular production method of interest.

In one aspect, there is provided a system for making the composition of the invention, including (a) an input for an alkaline earth-metal containing water; (b) an input for a flue gas from an industrial plant including carbon of a fossil fuel origin; and (c) a reactor connected to the inputs of step (a) and step (b) that is configured to make the composition of the invention. In another aspect, there is provided a system for making a composition, including (a) an input for an alkaline earth-metal containing water; (b) an input for a $CO_2$ source; and (c) a reactor connected to the inputs of step (a) and step (b) that is configured to make a composition, wherein the composition comprises at least 47% w/w vaterite and wherein the composition upon combination with water, setting, and hardening has a compressive strength of at least 14 MPa.

Figure 2:
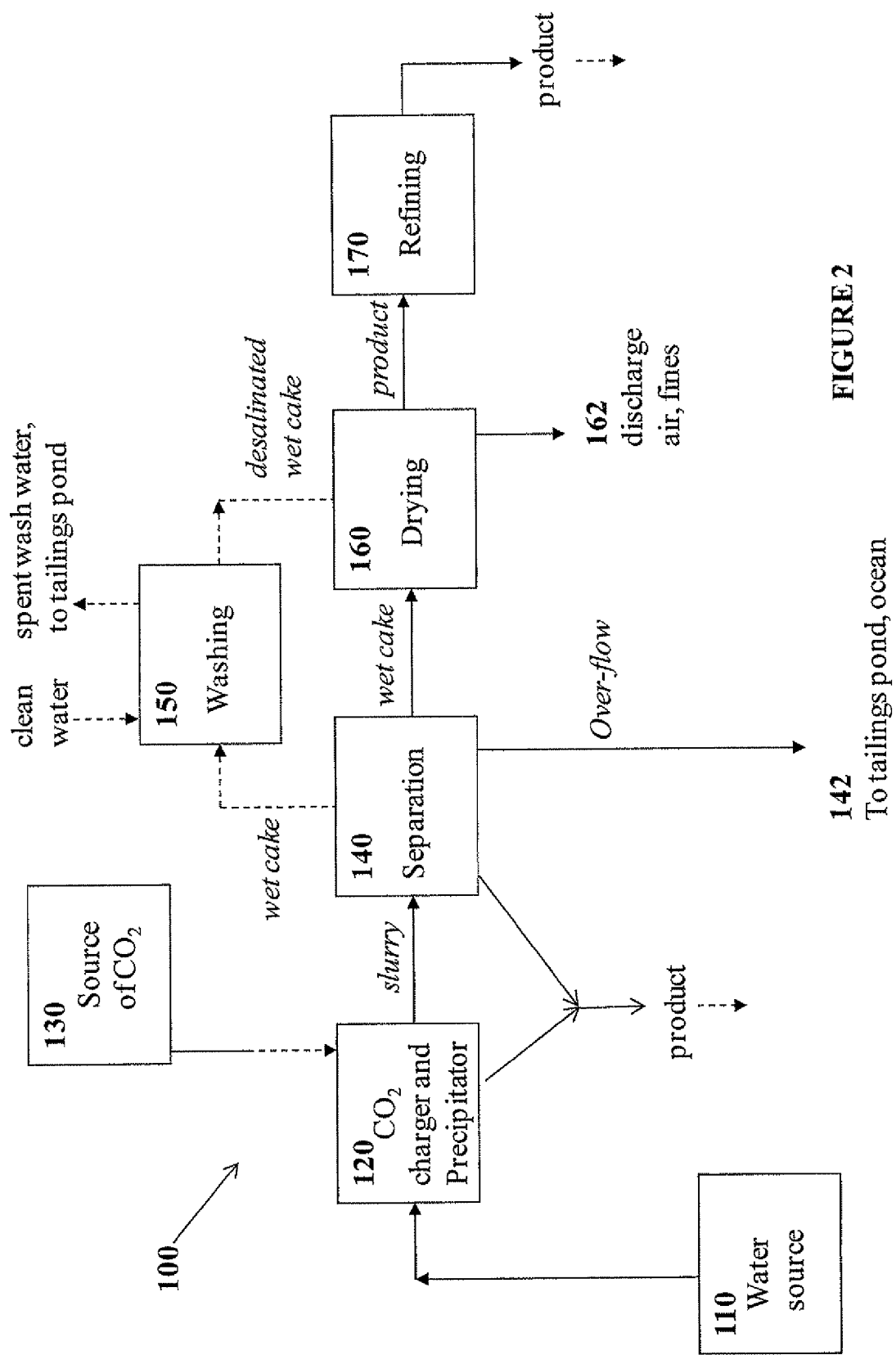
FIG. 2 illustrates a schematic of a system according to some embodiments of the invention.

FIG. 2 provides an illustrative schematic of a system to conduct the methods of some embodiments of the invention. In FIG. 2, system 100 includes water source 110, such as, alkaline earth-metal containing water. In some embodiments, water source 110 includes a structure having an input for salt water, such as a pipe or conduit from an ocean, etc. Where the salt water source is seawater, the input is in fluid communication with a source of sea water. For example, the input is a pipe line or feed from ocean water to a land based system or an inlet port in the hull of ship, e.g., where the system is part of a ship, e.g., in an ocean based system. Water may be removed and sent to the systems of the invention by any convenient protocol, such as, but not limited to, turbine motor pump, rotary lobe pump, hydraulic pump, fluid transfer pump, geothermal well pump, a water-submersible vacuum pump, among other protocols.

The methods and systems of the invention may also include one or more detectors configured for monitoring the source of water or the source of carbon dioxide (not illustrated in FIG. 1 or FIG. 2). Monitoring may include, but is not limited to, collecting data about the pressure, temperature and composition of the water or the carbon dioxide gas. The detectors may be any convenient device configured to monitor, for example, pressure sensors (e.g., electromagnetic pressure sensors, potentiometric pressure sensors, etc.), temperature sensors (resistance temperature detectors, thermocouples, gas thermometers, thermistors, pyrometers, infrared radiation sensors, etc.), volume sensors (e.g., geophysical diffraction tomography, X-ray tomography, hydroacoustic surveyers, etc.), and devices for determining chemical makeup of the water or the carbon dioxide gas (e.g, IR spectrometer, NMR spectrometer, UV-vis spectrophotometer, high performance liquid chromatographs, inductively coupled plasma emission spectrometers, inductively coupled plasma mass spectrometers, ion chromatographs, X-ray diffractometers, gas chromatographs, gas chromatography-mass spectrometers, flow-injection analysis, scintillation counters, acidimetric titration, and flame emission spectrometers, etc.).

In some embodiments, detectors for monitoring the subterranean carbonate brine may also include a computer interface which is configured to provide a user with the collected data about the water or the carbon dioxide gas. For example, a detector may determine the internal pressure of the water or the carbon dioxide gas and the computer interface may provide a summary of the changes in the internal pressure within the water or the carbon dioxide gas over time. In some embodiments, the summary may be stored as a computer readable data file or may be printed out as a user readable document.

In some embodiments, the detector may be a monitoring device such that it can collect real-time data (e.g., internal pressure, temperature, etc.) about the water or the carbon dioxide gas. In other embodiments, the detector may be one or more detectors configured to determine the parameters of the water or the carbon dioxide gas at regular intervals, e.g., determining the composition every 1 minute, every 5 minutes, every 10 minutes, every 30 minutes, every 60 minutes, every 100 minutes, every 200 minutes, every 500 minutes, or some other interval.

FIG. 2 also shows a $CO_2$ source 130. This source may vary, as described above. In some embodiments, the $CO_2$ source 130 includes a structure having an input for $CO_2$, such as a pipe or conduit. Where the $CO_2$ source is flue gas from the power plant, the input is in gaseous communication with the source of $CO_2$ in the plant. For example, the input is a pipe line or feed from power plant to the system. Alternatively, the $CO_2$ source may be a cylinder or series of cylinders connected to the input for the $CO_2$ source. In some embodiments, the $CO_2$ source is a solution containing $CO_2$, as described above.

The inputs for the water source and the $CO_2$ source are connected to the $CO_2$ charger and precipitator reactor 120. The precipitation reactor 120 is connected to the two inputs and is configured to make the carbonate precipitate. The charger and precipitation reactor 120 may be configured to include any number of different elements, such as temperature regulators (e.g., configured to heat the water to a desired temperature), chemical additive elements, e.g., for introducing chemical pH elevating agents (such as NaOH) into the water, electrolysis elements, e.g., cathodes/anodes, etc. This reactor 120 may operate as a batch process or a continuous process. It is to be understood that system in FIG. 2 is for illustration purposes only and that the system may be modified to achieve the same result. For example, the system may have more than one reactor, and/or more than one source of alkaline earth metal ions, and/or more than one source of $CO_2$ interconnected in the system. The charger and/or reactor can be a continuous stir tank reactor (CSTR), plug flow reactor (PFR), a tank, a batch reactor, or combination thereof. Such reactors, such as, CSTR, PFR, etc. are well known in the art. In some embodiments, the reactor is PFR. The PFR may have pipes optionally with inline mixing elements to mix the solutions. In some embodiments, the turbulence in the pipe mixes the solutions without the need for mixing elements. In some embodiments, static inline mixing elements may be present inside the pipes to mix the solutions. The length and the diameter of the pipes may be modulated that may affect the mixing of the solutions, the residence time of the precipitate, the morphology of the precipitate, the particle size of the precipitate, etc. In some embodiments, the inside of the pipes in the PFR may be coated with a material that resists the build up of the precipitate inside the pipes. Such coating can be Teflon or any other material. An average flow of the solution containing the partially or fully dissolved $CO_2$ or the affluent from the absorber containing an alkaline solution of $CO_2$ to the reactor may be 4-6 GPM (gallons per minute), or 5-6 GPM, or 4-5 GPM, or 3-8 GPM. An average flow of the alkaline earth metal ion containing water to the reactor may be 8-10 GPM (gallons per minute), or 8-9 GPM, or 9-10 GPM, or 5-15 GPM.

The product of the precipitation reaction, e.g., the slurry may be removed from the reactor and used to make the self-cementing composition of the invention. Alternatively, the product of the precipitation reaction, e.g., the slurry is then processed at a bulk dewatering station 140, as illustrated in FIG. 2. The dewatering station 140 may use a variety of different water removal processes, including processes such as continuous centrifugation, centrifugation, filter centrifugation, gravitational settling, and the like. The slurry obtained after bulk dewatering but still wetted in a mother supernate can be used to make the self-cementing composition of the invention. The dewatering station 140 may be any number of dewatering stations connected to each other to dewater the slurry (e.g., parallel, in series, or combination thereof).

In some embodiments, systems may also include a desalination station (not illustrated in FIG. 2). The desalination station may be in fluid communication with the liquid-solid separator 140 such that the liquid product may be conveyed from the liquid-solid separator to the desalination station directly. The systems may include a conveyance (e.g., pipe) where the output depleted brine may be directly pumped into the desalination station or may flow to desalination station by gravity. Desalination stations of the invention may employ any convenient protocol for desalination, and may include, but are not limited to distillers, vapor compressors, filtration devices, electrodialyzers, ion-exchange membranes, nano-filtration membranes, reverse osmosis desalination membranes, multiple effect evaporators or a combination thereof.

The system shown in FIG. 2 may also include a drying station 160 or a series of drying stations for drying the dewatered precipitate produced at station 140. Depending on the particular drying protocol of the system, the drying station 160 may include a filtration element, freeze drying structure, oven drying, spray drying structure, etc., as described above.

Also shown in FIG. 2, is an optional washing station 150, where bulk dewatered precipitate from separation station 140 is washed, e.g., to remove salts and other solutes from the precipitate, prior to drying at the drying station 160. Dried precipitate from station 160 is then sent to refining station 170, where the precipitate may be mechanically processed and/or one or more components may be added to the precipitate (e.g., as described above) to produce the hydraulic cement and SCM compositions of the invention. The refining station 170 may have grinders, millers, crushers, compressors, blender, etc. in order to obtain desired physical properties in the composition of the invention.

The system may further include outlet conveyers, e.g., conveyer belt, slurry pump, that allow for the removal of precipitate from one or more of the following: the contacting reactor, precipitation reactor, drying station, or from the refining station. In certain embodiments, the system may further include a station for preparing a building material, such as cement, from the precipitate. This station can be configured to produce a variety of cements, aggregates, or cementitious materials from the precipitate, such as described herein.

In some embodiments, the system of the invention includes a processing station that may include a compressor configured to pressurize the flue gas or the source of carbon dioxide, the source of alkaline earth metal ions, the reaction mixture in the reactor, the precipitate, the dewatered precipitate and/or the dried precipitate, as desired. Compressors of the invention may employ any convenient compression protocol, and may include, but are not limited to, positive displacement pumps (e.g., piston or gear pumps), static or dynamic fluid compression pumps, radial flow centrifugal-type compressors, helical blade-type compressors, rotary compressors, reciprocating compressors, liquid-ring compressors, among other devices for fluid compression. In some embodiments, the compressor may be configured to pressurize to a pressure of 5 atm or greater, such as 10 atm or greater, such as 25 atm or greater, including 50 atm or greater.

In some embodiments, the systems of the invention may include a control station, configured to control the amount of the carbon dioxide and/or the amount of alkaline earth metal ions conveyed to the precipitator or the charger; the amount of the precipitate conveyed to the separator; the amount of the precipitate conveyed to the drying station; and/or the amount of the precipitate conveyed to the refining station. A control station may include a set of valves or multi-valve systems which are manually, mechanically or digitally controlled, or may employ any other convenient flow regulator protocol. In some instances, the control station may include a computer interface, (where regulation is computer-assisted or is entirely controlled by computer) configured to provide a user with input and output parameters to control the amount, as described above.

As indicated above, the system may be present on land or sea. For example, the system may be a land based system that is in a coastal region, e.g., close to a source of sea water, or even an interior location, where water is piped into the system from a salt water source, e.g., ocean. Alternatively, the system may be a water based system, e.g., a system that is present on or in water. Such a system may be present on a boat, ocean based platform etc., as desired.

It is to be understood that the methods and the systems depicted in the figures are in no way limiting to the scope of the invention. One or more the steps in the methods may be skipped or the order of the steps may be altered to make the products and compositions of the invention. Similarly, one or more of the components in the systems may be avoided to make the products and compositions of the invention. For example, the source of cation may already be present in the reactor when the $CO_2$ source is added to the reactor, or vice versa.

III. Methods and Systems of Use

Aspects of the invention also provide methods and systems for making a cement product from the compositions of the invention. The compositions of the invention may be used to make cement products such as building materials or pre-cast or formed building materials, and/or aggregates.

In one aspect, there is provided a method for making a cement product from the composition of the invention, including (a) combining the composition of the invention with an aqueous medium under one or more suitable conditions; and (b) allowing the composition to set and harden into a cement product. In some embodiments, the methods comprise addition of Portland cement clinker, aggregate, SCM, or a combination thereof to the composition, before combining the composition with the aqueous medium.

In one aspect, there is provided a method for making formed building material from the compositions of the invention, such as, the hydraulic cement composition, the SCM composition, or the self-cementing composition, by combining the composition with an aqueous medium under one or more suitable conditions; and allowing the composition to set and harden into the formed building material. In some embodiments, the composition is poured into molds before or after step (a) of the combination. In some embodiments, the mold is for the formed building material. In some embodiments, the aqueous medium includes fresh water.

In some embodiments the invention provides a method of producing a cement product including the composition of the invention by obtaining the composition of the invention; and producing a cement product. In some embodiments the obtaining step comprises precipitating the composition from a divalent cation-containg water, e.g., an alkaline-earth-metal-ion containing water such as salt water, e.g., sea water. The obtaining step may further comprise contacting the divalent cation-containing water, e.g., alkaline-earth-metal-ion containing water, to an industrial gaseous waste stream including $CO_2$ prior to, and/or during, the precipitating step. The industrial gaseous waste stream may be any stream as described herein, such as from a power plant, foundry, cement plant, refinery, or smelter, e.g. a flue gas. In some embodiments the obtaining step further comprises raising the pH of the alkaline-earth-metal-ion containing water to 10 or higher prior to or during the precipitating step. The producing step may include allowing the composition to form a solid product, such as by mixing the composition with an aqueous medium including, but not limited to, one or more of fresh water, Portland cement, fly ash, lime and a binder, and optionally mechanically refining the solid product, such as by molding, extruding, pelletizing or crushing. The producing step may include contacting the composition with fresh water to convert the polymorphs in the composition to a freshwater stable product. In some embodiments, this may be done by spreading the composition in an open area; and contacting the spread composition with fresh water.

In some embodiments, the aggregate producer comprises a refining station to mechanically refine the aggregate made from the composition of the invention.

In some embodiments, the composition of the invention after mixing in the water is poured into the molds designed to make one or more of the pre-formed building material. The composition is then allowed to set and harden into the pre-formed or pre-cast material.

Figure 3:
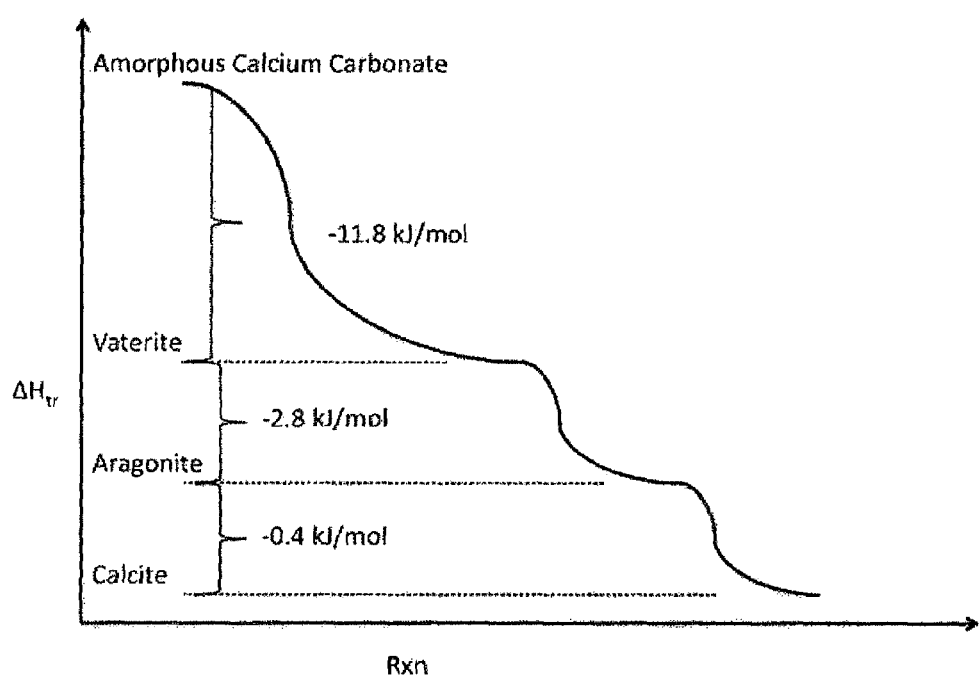
FIG. 3 illustrates a Gibbs free energy diagram of the transition from vaterite to aragonite and aragonite to calcite.

Upon precipitation of calcium carbonate as described herein, amorphous calcium carbonate (ACC) may initially precipitate and transform into one or more of its three more stable phases (vaterite, aragonite, or calcite). A thermodynamic driving force may exist for the transformation from unstable phases to more stable phases, as described by Ostwald in his Step Rule (Ostwald, W. *Zeitschrift fur Physikalische Chemie* 289 (1897)). For this reason, calcium carbonate phases transform in the order: ACC to vaterite, aragonite, and calcite where intermediate phases may or may not be present. For instance, ACC can transform to vaterite and may not transform to aragonite or calcite; or ACC can transform to vaterite and then directly to calcite, skipping the aragonite form; or alternatively, ACC can transform to vaterite and then to aragonite without transforming to calcite. During this transformation, excesses of energy are released, as exhibited by FIG. 3. This intrinsic energy may be harnessed to create a strong aggregation tendency and surface interactions that may lead to agglomeration and cementing. It is to be understood that the values reported in FIG. 3 are well known in the art and may vary.

The transformation between calcium carbonate polymorphs may occur via solid-state transition or may be solution mediated. In some embodiments, the transformation is solution-mediated because it may require less energy than the thermally activated solid-state transition. The solution-mediated transformation is environmentally conscious and more applicable to a cementing application. Vaterite is metastable and the difference in thermodynamic stability of calcium carbonate polymorphs may be manifested as a difference in solubility, where the least stable phases are the most soluble (Ostwald, supra.). Therefore, vaterite may dissolve readily in solution and transform favorably towards a more stable polymorph: aragonite or calcite. The driving force for the formation of a particular calcium carbonate polymorph or combination of polymorphs is the change in Gibbs free energy from a supersaturated solution to equilibrium (Spanos & Koutsoukos *Journal of Crystal Growth* (1998) 191, 783-790).

In a polymorphic system like calcium carbonate, two kinetic processes may exist simultaneously in solution: dissolution of the metastable phase and growth of the stable phase (Kralj et al. *Journal of Crystal Growth* (1997) 177, 248-257). In some embodiments, the aragonite or calcite crystals may be growing while vaterite is undergoing dissolution in the aqueous medium.

Crystallization of the polymorphs is a surface controlled process where heterogeneous nucleation may be responsible for the formation of multiple solid phases. When a single phase is present, the number of particles may decrease with time, while their size increases (Spanos & Koutsoukos, supra.). Vaterite may be framboidal (spherical aggregates of discrete micro/nano-crystallites) or non-framboidal.

In some embodiments, the composition of the invention, as prepared by the methods described above, is treated with the aqueous medium under one or more suitable conditions. The aqueous medium includes, but is not limited to, fresh water optionally containing sodium chloride, calcium chloride, magnesium chloride, or combination thereof or aqueous medium may be brine. In some embodiments, aqueous medium is fresh water.

In some embodiments, the one or more suitable conditions include, but are not limited to, temperature, pressure, time period for setting, a ratio of the aqueous medium to the composition, and combination thereof. The temperature may be related to the temperature of the aqueous medium. In some embodiments, the temperature is in a range of 0-110° C.; or 0-80° C.; or 0-60° C.; or 0-40° C.; or 25-100° C.; or 25-75° C.; or 25-50° C.; or 37-100° C.; or 37-60° C.; or 40-100° C.; or 40-60° C.; or 50-100° C.; or 50-80° C.; or 60-100° C.; or 60-80° C.; or 80-100° C. In some embodiments, the pressure is atmospheric pressure or above atm. pressure. In some embodiments, the time period for setting the cement product is 30 min. to 48 hrs; or 30 min. to 24 hrs; or 30 min. to 12 hrs; or 30 min. to 8 hrs; or 30 min. to 4 hrs; or 30 min. to 2 hrs; 2 to 48 hrs; or 2 to 24 hrs; or 2 to 12 hrs; or 2 to 8 hrs; or 2 to 4 hrs; 5 to 48 hrs; or 5 to 24 hrs; or 5 to 12 hrs; or 5 to 8 hrs; or 5 to 4 hrs; or 5 to 2 hrs; 10 to 48 hrs; or 10 to 24 hrs; or 24 to 48 hrs.

In some embodiments, the ratio of the aqueous medium to the dry components or to the composition of the invention (aqueous medium:dry components or aqueous medium:composition of the invention) is 0.1-10; or 0.1-8; or 0.1-6; or 0.1-4; or 0.1-2; or 0.1-1; or 0.2-10; or 0.2-8; or 0.2-6; or 0.2-4; or 0.2-2; or 0.2-1; or 0.3-10; or 0.3-8; or 0.3-6; or 0.3-4; or 0.3-2; or 0.3-1; or 0.4-10; or 0.4-8; or 0.4-6; or 0.4-4; or 0.4-2; or 0.4-1; or 0.5-10; or 0.5-8; or 0.5-6; or 0.5-4; or 0.5-2; or 0.5-1; or 0.6-10; or 0.6-8; or 0.6-6; or 0.6-4; or 0.6-2; or 0.6-1; or 0.8-10; or 0.8-8; or 0.8-6; or 0.8-4; or 0.8-2; or 0.8-1; or 1-10; or 1-8; or 1-6; or 1-4; or 1-2; or 1:1; or 2:1; or 3:1.

In some embodiments, the precipitate may be rinsed with fresh water to remove halite or the chloride content from the precipitate. The chloride may be undesirable in some applications, for example, in aggregates intended for use in concrete since the chloride has a tendency to corrode rebar. Further, the rinsing of the slurry or the precipitate with water may cause the vaterite in the composition to shift to more stable forms such as aragonite and calcite and result in the cemented material. For example, the self-cementing composition can be kept in the saltwater until before use and is rinsed with fresh water that may remove the halite from the precipitate and facilitate the formation of the cemented material.

In some embodiments, such rinsing may not be desirable as it may reduce the yield of the composition. In such embodiments, the precipitate may be washed with a solution having a low chloride concentration but high concentration of divalent cations (such as, calcium, magnesium, etc.). Such high concentration of the divalent ion may prevent the dissolution of the precipitate, thereby reducing the yield loss and the conversion to cemented material.

During the mixing of the composition with the aqueous medium, the precipitate may be subjected to high shear mixer. After mixing, the precipitate may be dewatered again and placed in pre-formed molds to make formed building materials. Alternatively, the precipitate may be mixed with water and is allowed to set. The precipitate sets over a period of days and is then placed in the oven for drying, e.g., at 40° C., or from 40° C.-60° C., or from 40° C.-50° C., or from 40° C.-100° C., or from 50° C.-60° C., or from 50° C.-80° C., or from 50° C.-100° C., or from 60° C.-80° C., or from 60° C.-100° C. The precipitate is then subjected to curing at high temperature, such as, from 50° C.-60° C., or from 50° C.-80° C., or from 50° C.-100° C., or from 60° C.-80° C., or from 60° C.-100° C., or 60° C., or 80° C.-100° C., in high humidity, such as, in 30%, or 40%, or 50%, or 60% humidity.

The cement product produced by the methods described above may be an aggregate or building material or a pre-cast material or a formed building material. These materials have been described herein.

In yet another aspect, there is provided a system for making the cement product from the composition of the invention including (a) an input for the composition of the invention; (b) an input for an aqueous medium; and (c) a reactor connected to the inputs of step (a) and step (b) configured to mix the composition of the invention with the aqueous medium under one or more of suitable conditions to make a cement product. In some embodiments, the system further comprises a filtration element to filter the composition after the mixing step (c). In still some embodiments, the system further comprises a drying step to dry the filtered composition to make the cement product.

Figure 4:
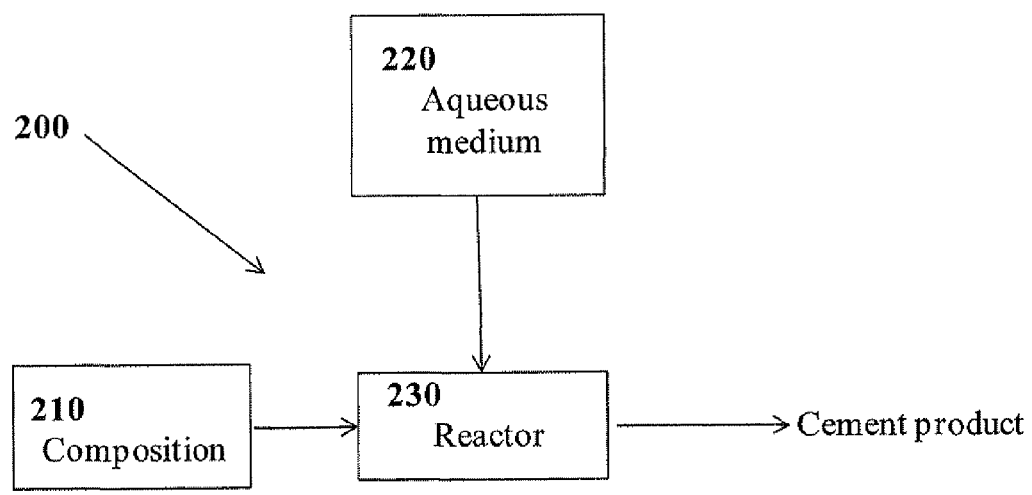
FIG. 4 illustrates a schematic of a system according to some embodiments of the invention.

FIG. 4 shows an illustrative system embodiment 200 to make the cement product from the composition of the invention. In some embodiments, system 200 includes a source for the composition of the invention 210. In some embodiments, the source for the composition includes a structure having an input for the composition. Such structure having an input includes, but is not limited to, a funnel, a tube, a pipe or a conduit, etc. Any input that can facilitate the administration of the composition to the reactor 230 is within the scope of the invention. It is well understood that in some embodiments, no such source for the composition or the structure with an input for the composition is needed, when the composition is already present in the reactor 230. In some embodiments, there is provided a source for aqueous medium 220 such as, water optionally containing sodium chloride, calcium chloride, magnesium chloride, or combination thereof or brine. In some embodiments, the source for the aqueous medium 220 contains an input for the aqueous medium, such as, but not limited to, a funnel, a tube, a pipe or a conduit, etc. Any input that can facilitate the administration of the aqueous medium to the reactor 230 is within the scope of the invention. It is well understood that in some embodiments, no such source for the aqueous medium or the structure with an input for the aqueous medium is needed, when the aqueous medium is already present in the reactor 230.

The reactor 230 is connected to the two inputs and is configured to mix the composition of the invention with the aqueous medium under one or more of suitable conditions to make a cement product. The one or more suitable conditions have been defined above. The reactor 230 may be configured to include any number of different elements, such as temperature regulators (e.g., configured to heat the water to a desired temperature), chemical additive elements, e.g., for introducing chemical pH elevating agents (such as NaOH) into the water. This reactor 230 may operate as a batch process or a continuous process. The system may optionally contain a filtration element to filter the composition after wetting (not shown in FIG. 4).

After the addition of water to the composition in the reactor, the composition sets and hardens into the cement product. The cement product may optionally be dried and cured.

In one aspect, there is provided a method to make a cement product of desired compressive strength, including combining a composition of the invention with an aqueous medium under one or more conditions including, but not limited to, temperature, pressure, time period for setting, a ratio of the aqueous medium to the composition, and combination thereof. In some embodiments, the composition includes at least 47% w/w vaterite or at least 10% w/w vaterite and at least 1% w/w ACC. In some embodiments, the composition includes a carbon isotopic fractionation value ($\delta^{13}C$) of less than −12‰. In some embodiments, the composition upon combination with water; setting; and hardening, has a compressive strength of at least 14 MPa. In some embodiments, the method includes optimizing one or more of the conditions; and allowing the composition to set and harden into a cement product of desired compressive strength.

The one or more conditions including, but not limited to, temperature, pressure, time period for setting, a ratio of the aqueous medium to the composition, and combination thereof, have been described herein. The optimization of these one or more conditions includes modifying the one or more conditions to achieve a cement product of desired compressive strength. For example, the ratio of the aqueous medium to the composition can affect the setting time, hardening time, hydration reaction, shrinkage, and the compressive strength of the cemented product. Therefore, optimization of the ratio of the aqueous medium to the composition can result in the cement product of desired compressive strength.

IV. Packages

In one aspect, there is provided a package including the composition of the invention. In some embodiments, there is provided a package including a pre-cast or a formed building material formed from the composition of the invention. These pre-cast or formed building materials are as described herein. The package further includes a packaging material that is adapted to contain the composition. The package may contain one or more of such packaging materials. The packaging material includes, but is not limited to, metal container; sacks; bags such as, but not limited to, paper bags or plastic bags; boxes; silo such as, but not limited to, tower silo, bunker silo, bag silo, low level mobile silo, or static upright cement silo; and bins. It is understood that any container that can be used for carrying or storing the composition of the invention is well within the scope of the invention.

In some embodiments, these packages are portable. In some embodiments, these packages and/or packaging materials are disposable or recyclable.

The packaging material are further adapted to store and/or preserve the composition of the invention for longer than few months to few years. In some embodiments, the packaging materials are further adapted to store and/or preserve the composition of the invention for longer than 1 week, or longer than 1 month, or longer than 2 months, or longer than 5 months, or longer than 1 year, or longer than 2 years, or longer than 5 years, or longer than 10 years, or between 1 week to 1 year, or between 1 month to 1 year, or between 1 month to 5 years, or between 1 week to 10 years.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

The abbreviations used in the application have an ordinary meaning unless indicated otherwise. Some of the abbreviations are defined below:

| | |
|---|---|
| ACC = | Amorphous calcium carbonate |
| $CaCl_2$ = | Calcium chloride |
| CaO = | Calcium oxide |
| $CaSO_4$ = | Calcium sulfate |
| DI = | Deionized water |
| FT-IR = | Fourier transform infrared spectroscopy |
| g = | gram |
| μm = | micrometer |
| mL = | milliliter |
| M = | molar |
| $MgCl_2$ = | Magnesium chloride |
| NaCl = | Sodium chloride |
| $Na_2CO_3$ = | Sodium carbonate |
| NaF = | Sodium fluoride |
| NaOH = | Sodium hydroxide |
| NaP = | Sodium phosphate |
| $Na_2SiO_4$ = | Sodium silicate |
| OPC = | Ordinary Portland cement |
| ppm = | Parts per million |
| RCM = | Reactive carbonate minerals |
| SCM = | Supplementary cementitious material |
| SEM = | Scanning electron microscopy |
| TGA = | Thermo-gravimetric analysis |
| XRD = | X-ray diffraction |

EXAMPLES

Example 1

Precipitation

To 1 L tap water was added 5.08 g $MgCl_2.6H_2O$ and 14.71 g $CaCl_2.2H_2O$. The pH was maintained at ~9 using 2M NaOH solution. Carbon dioxide was passed through the solution. Cloudy white precipitate appeared that settled quickly. The precipitate was washed with acetone. The product on filter paper weighed 1.58 g.

For another sample, to 1 L of tap water, 30 g of NaCl, 2.03 g $MgCl_2.6H_2O$ and 7.35 g $CaCl_2.2H_2O$ was added. The pH of the solution was maintained between 8-9 using 2M NaOH solution and carbon dioxide. Cloudy white precipitate appeared that settled quickly. The precipitate was washed with acetone. The product on filter paper weighed 1.60 g.

The products were mixed with water which after setting, hardening and curing gave cemented material.

Example 2

Preparation of Precursors of Vaterite and Vaterite

In this study, precursors of vaterite were synthesized along with vaterite by freezing and immediate dewatering. Carbon dioxide was reacted with NaOH to create sodium carbonate and sodium bicarbonate. To the sodium carbonate and bicarbonate mixture, was added seawater to introduce calcium and magnesium ions and to precipitate calcium and magnesium carbonates. The calcium carbonate was precipitated at pH of 8.5-8.8. The precipitated calcium carbonate was a mixture of vaterite and calcite. In addition to precipitating vaterite and calcite, the precipitate was dewatered fast enough to stabilize pre vaterite forms or the precursors of vaterite. These precursors of vaterite are different from ACC.

Figure 5A:
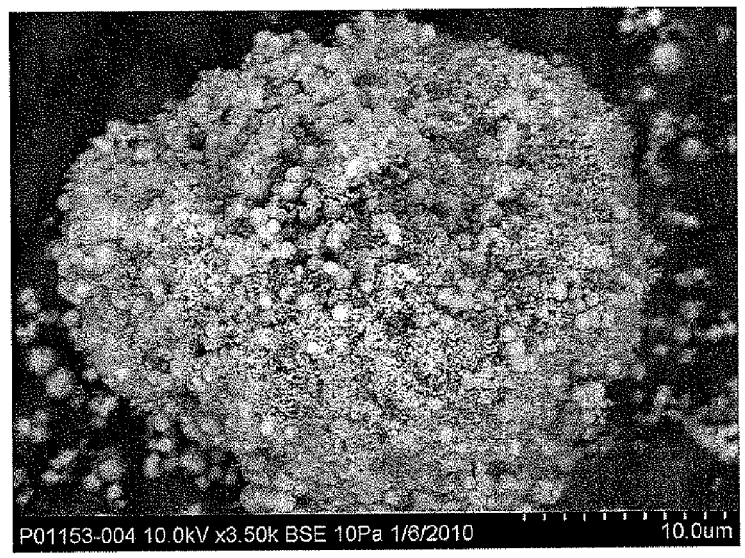
FIGS. 5A-F illustrate SEM images of nanoclusters of particles assembling into the vaterite spheres.
Figure 5B:
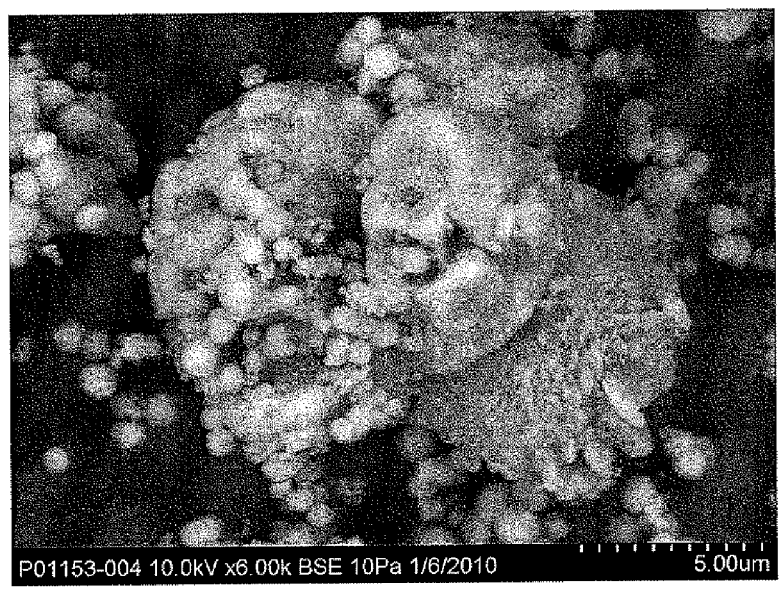
Figure 5C:
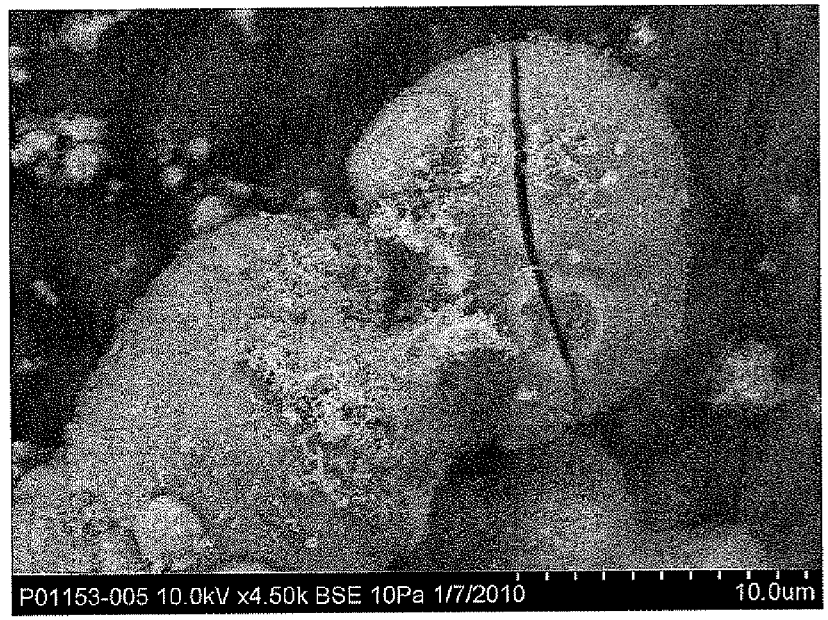
Figure 5D:
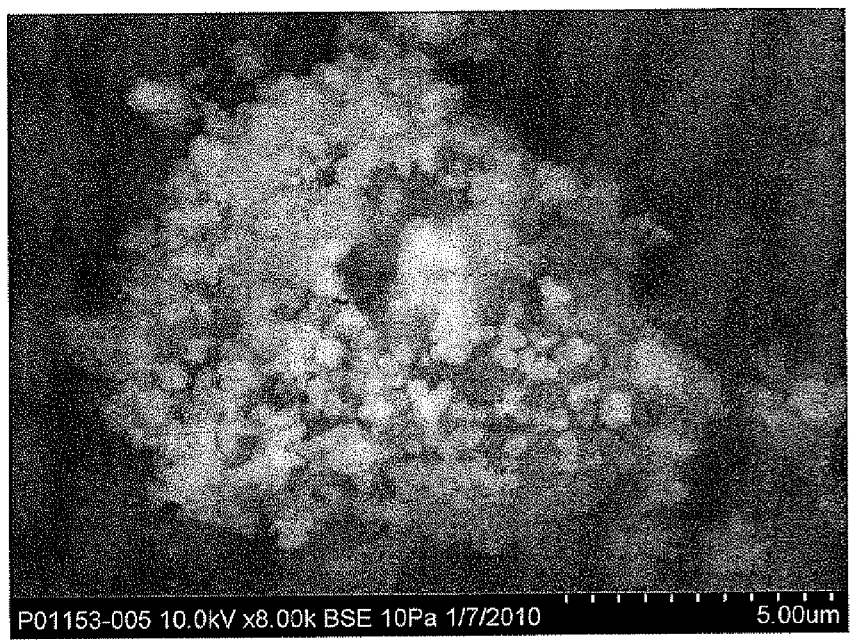
Figure 5E:
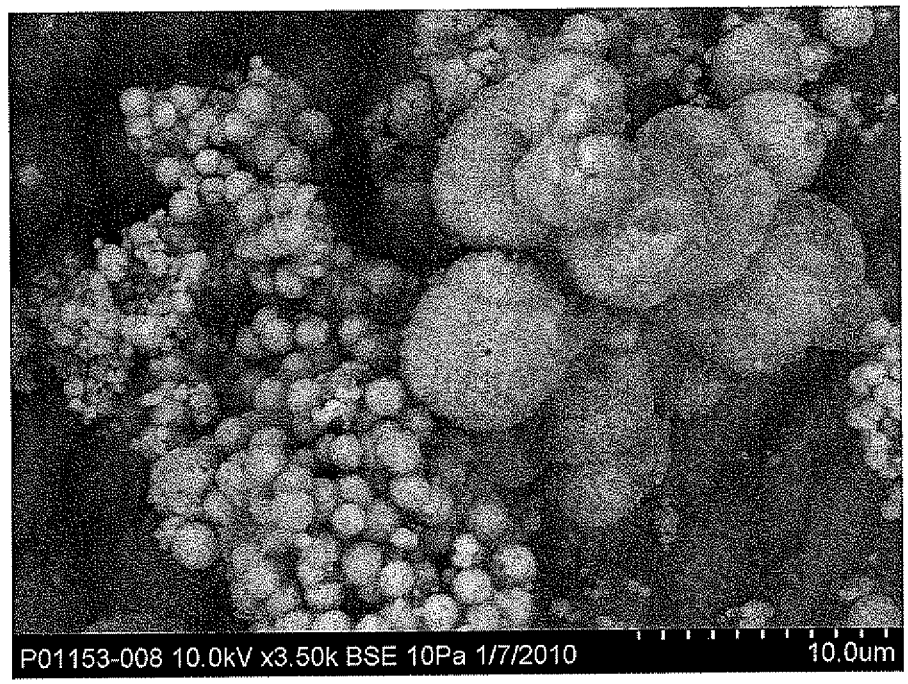
Figure 5F:
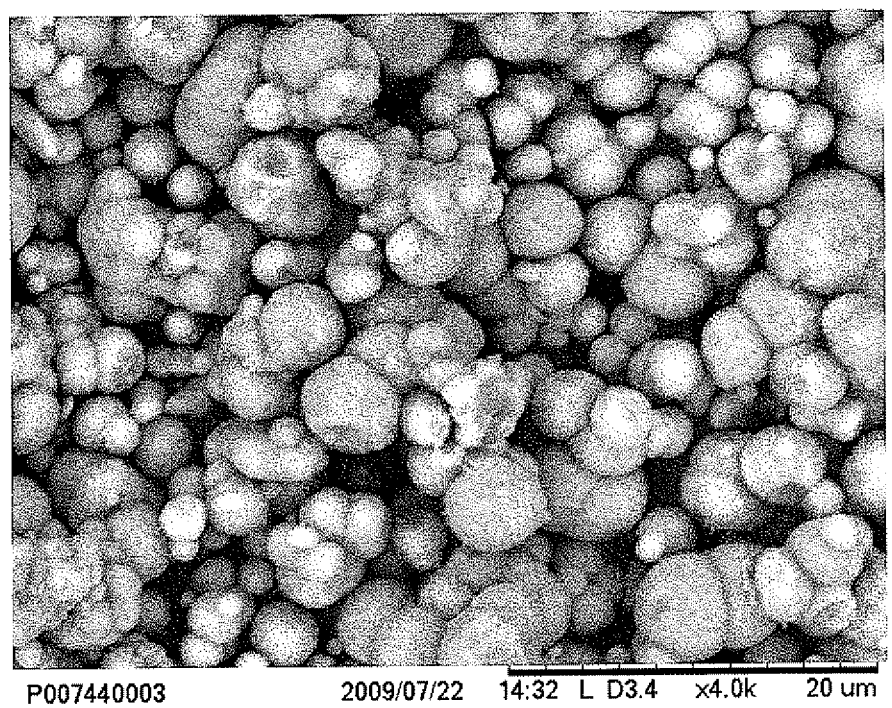

FIGS. 5A-E illustrate SEM images of nanoclusters of particles assembling into the vaterite spheres. These nanoclusters are precursors to vaterite. In a typical vaterite precipitation process, stabilization of the vaterite may be challenging (owing to high reactivity of vaterite) let alone stabilization of the precursors of vaterite. FIG. 5F illustrates the formation of vaterite where all the precursor phase has assembled into well defined framboidal spheres by the time the precipitate is dewatered and dried. The precursor to vaterite and the vaterite can be utilized as a reactive metastable calcium carbonate for reaction purposes and stabilization reactions, such as cementing.

Similar to the precursor and the vaterite formation, precursor of aragonite and aragonite itself were also prepared. These crystals were sub-micron to nanoclusters of aragonite needles. Upon activation, these needles continued to grow to full size aragonite needles and then continued to transform to calcite. The precursor to aragonite and the aragonite itself were prepared using the same protocol as in Example 1 except that the ratio of Ca:Mg in the mixture was around 1:4.

Example 3

Precipitation and Transformation of Synthetic Vaterite

Vaterite was synthetically prepared by laboratory precipitation. Synthetic brine was produced by dissolving 110 grams NaCl, 24 grams $CaCl_2$, and 5 grams $MgCl_2$ per liter of Milli-Q deionized (DI) water. Vaterite was precipitated using 75 mL of 2M NaOH per liter of solution, sparging $CO_2$, stirring with a magnetic stir bar, and monitoring pH to maintain between 7.5 and 8.5 during the precipitation and end at 9.5. The sample was then filtered and rinsed with deionized water on a Buchner funnel and dried in a 40° C. oven for 24 hours.

Effect of Salt Solution on Transformation:

To induce a polymorphic transformation of vaterite to aragonite, and/or calcite during cement formation, synthetically precipitated vaterite was added to separate sample solutions of Milli-Q deionized water and each sodium chloride, NaCl; calcium chloride, $CaCl_2$; magnesium chloride, $MgCl_2$; and synthetic brine (containing NaCl, $CaCl_2$, and $MgCl_2$ as described above) in covered 50 milliliter beakers. A sample was also produced with only deionized water. Scanning electron microscopy (SEM) images of each sample were taken to observe the extent of the transformation.

Effect of Sodium Hydroxide on Transformation:

To see whether pH has an effect on calcium carbonate cementing, sodium hydroxide, NaOH, was included into the transformation solution. Two separately precipitated synthetic vaterites were placed in 10% solutions of NaOH with 1:1 solids to water ratios. SEM images of the samples were taken to observe the effect of NaOH on calcium carbonate cementing.

Effect of Temperature on Transformation:

In order to determine the effect of temperature on the solution-mediated transformation of calcium carbonate polymorphs, the deionized water and salt solutions experiments were repeated in a 110° C. oven. Forty milliliters of solution was initially present with each sample. The samples were covered with aluminum foil in order to maintain the water level for as long as possible. SEM images were taken at the end.

Effect of Water to Solids Ratio on Transformation:

In order to determine an effect of water to solids ratio in the setting of cement, an experiment was performed to determine the smallest quantity of water necessary to allow for the transformation of the synthetic vaterite. Solutions of synthetic vaterite and deionized water were prepared in the solids to water ratios (by weight) of 0.7:1, 1:1, 1:2, 1:4, and 1:10.

Effect of Strontium on Transformation:

In order to determine an effect of Sr on the transformation, the experiments were performed in two separate solutions with Sr at 10 ppm and at 25 ppm.

Precipitation of Synthetic Vaterite by Mixing of Solutions:

Synthetic vaterite was precipitated by the mixing of solutions. One liter of augmented seawater (synthetic seawater with 29.2 g $CaCl_2*2H_2O$) was mixed with 21 g sodium carbonate, $Na_2CO_3$, and filtered immediately with a Buchner funnel. It was then dried in an oven at 40° C. for 24 hours. SEM images were taken of vaterite at the end of this period.

Results and Discussion

Precipitation of Synthetic Vaterite:

Vaterite morphology was affected by temperature, pH, pressure, solution composition, precipitation methods, and conditions, such as, rate of sparging and addition of NaOH. Due to many factors involved in the precipitation of vaterite, vaterites created by the same methods may exhibit subtle differences in appearance and reactivity. This minor difference in size and smoothness may be due to a difference in the rate of precipitation or pH. The rate of precipitation may also affect the enthalpy of vaterite transformation. Longer precipitations may result in lower transition enthalpies (Turnbull, A. *Geochimica et Cosmochimica Acta* (1973) 37, 1593-1601).

Although the size of the vaterites created in synthetic precipitations in this experiment may vary slightly in size, the mean size ranged between 12 and 18 micrometers.

Figure 6:
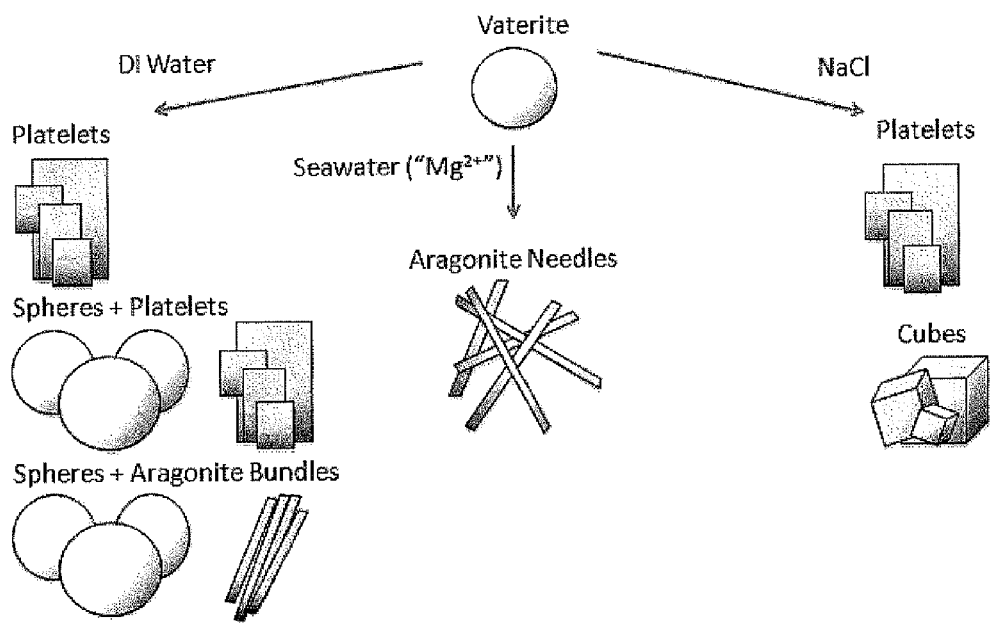
FIG. 6 illustrates transformation of vaterite into various morphologies including aragonite bundles, aragonite needles, platelets and cubes.

Transformation with Salt Solutions:

Interaction of spherical vaterite with deionized water or salt solutions resulted in various morphologies of calcium carbonate, as illustrated in FIG. 6. Vaterite with deionized water resulted in platelets, rectangular box-like shapes composed of calcite; spheres and platelets; and spheres and aragonite bundles. Aragonite bundles are groups of rods with a consistent grain direction.

Upon interaction with synthetic seawater (containing NaCl, $CaCl_2$, and $MgCl_2$), vaterite formed aragonite needles, aragonite rods that lacked grouping or a consistent grain direction. The formation of only aragonite needles may be attributed to $MgCl_2$ acting as an inhibitor to the transition from vaterite to calcite (Ogino et al. *Geochimica et Cosmochimica Acta* (1987) 51, 2757-2767). For this reason, the transition may instead progress almost entirely to aragonite. Given enough time, however, the aragonite can progress to calcite in the form of platelets or cubes.

When vaterite is placed in NaCl solution, calcite platelet and cubes were produced. Thermodynamically all reactions may eventually lead to calcite. Platelets have been observed with deionized water alone. Given more time, cubes are expected with vaterite and deionized water. For thermodynamic reasons, sodium chloride may accelerate the transformation of vaterite into polymorphs of higher stability.

Figure 7A:
FIGS. 7A-B illustrate precipitation of the polymorphs on vaterite.
Figure 7B:
Figure 8:
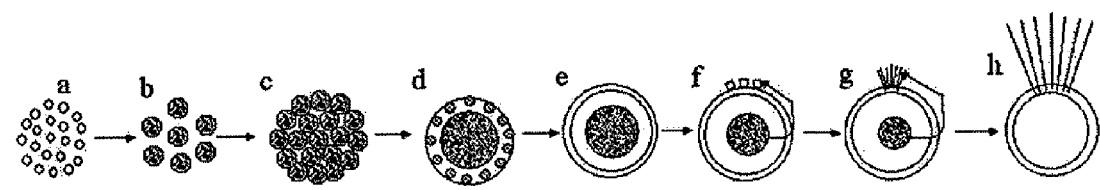
FIG. 8 illustrates a schematic of the creation of hollow calcite microspheres and aragonite bundles.

In the case of vaterite with deionized water, spheres were observed in combination with aragonite bundles. Generally, these spheres were hollow and the aragonite bundles were protruding from the surface of the spheres, as depicted below in FIG. 7. The process of precipitation of the polymorphs of the invention, is illustrated in FIG. 8. In order for the center of a sphere to dissolve before the outer shell, the central material may be desired to be less stable than the shell. A mechanism that may result in these morphologies is the gradual precipitation of calcite nanocrystals onto the surface of vaterite spheres. Because calcite is more stable than vaterite, the inner vaterite material begins to dissolve while the calcite shell remains (Tang et al. *Crystal Research and Technology* (2008) 43, 473-478 2008). Aragonite nucleates and grows in bundles on the surface of these hollowing spheres at the expense of the dissolving vaterite core due to the process of Ostwald ripening. This process is depicted in steps d-f of FIG. 8. The steps a-d depict the formation of the nanoclusters of the precursor of the vaterite and their conversion to the vaterite spheres.

Figure 9:
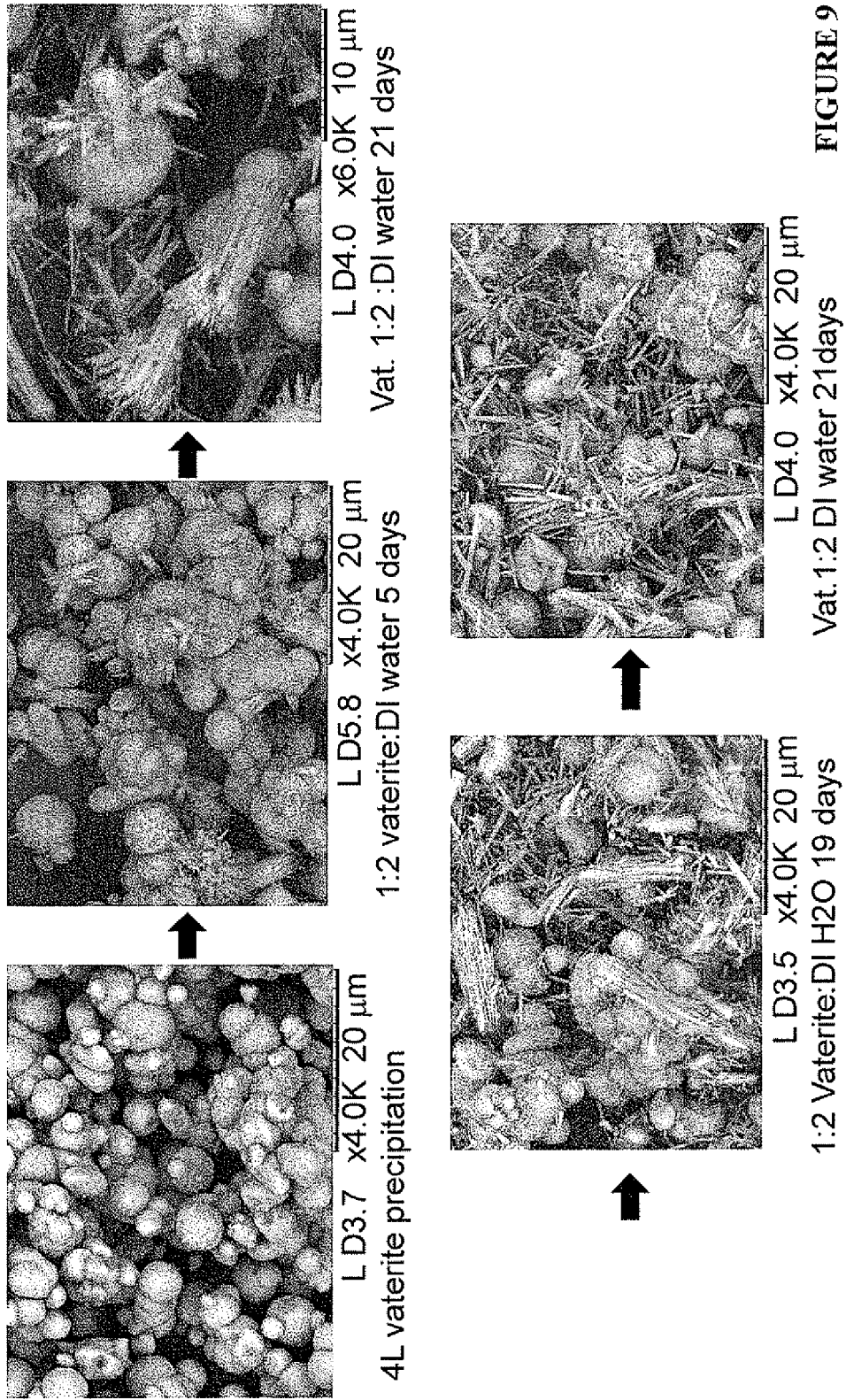
FIG. 9 illustrates SEM images of the transformation of vaterite in deionized water at 4,000 times magnification.

In the deionized water experiment, the steps d-f were observed. Additionally, the SEM images revealed that the aragonite bundles broke off of the calcite microspheres and detached from each other to form aragonite needles. FIG. 9 outlines the steps involved in this transformation. Calcite precipitated on the surface of vaterite microspheres, vaterite dissolved from within the spheres, aragonite bundles precipitated on the surface of the spheres, aragonite bundles matured and broke off, aragonite bundles finally broke up into aragonite needles, leaving aragonite needles and hollow calcite microspheres.

Transformation with Sodium Hydroxide:

The addition of sodium hydroxide to solution with vaterite inhibited vaterite transition to calcite such that aragonite needles were preferentially formed. In addition to the aragonite needles, much matrix material was present that allowed for additional adhesion in the sample. The samples produced with sodium hydroxide were significantly denser than transformation samples with deionized water or salt solutions. The material was also harder. The addition of sodium hydroxide produced comparatively a more thoroughly cementing material.

Figures 10A, 10B:
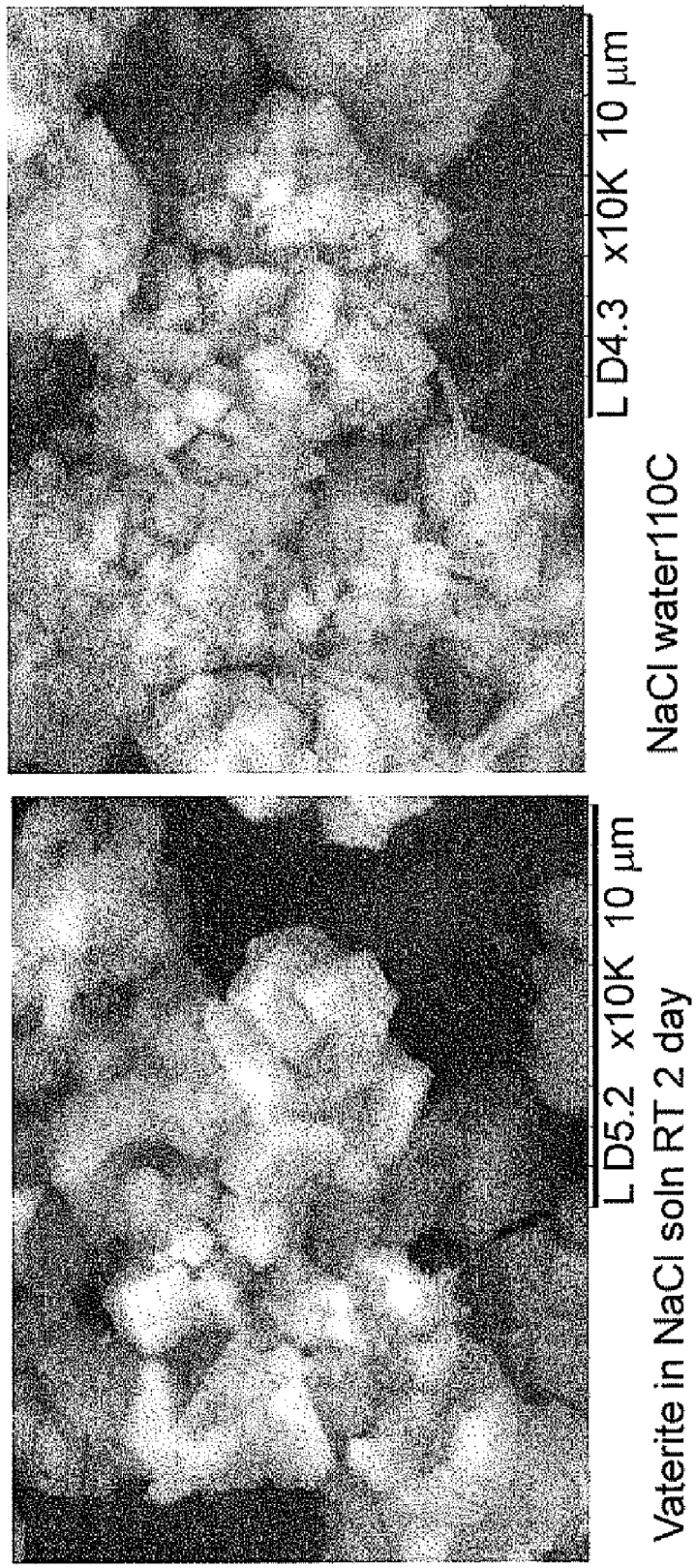
FIGS. 10A-B illustrate an effect of temperature on the size of the crystals. Heating can result in smaller calcite crystals.

Effect of Temperature on Transformation:

According to thermodynamics, an increase in temperature allows for a decrease in the minimum critical crystal size for growth. Therefore, at higher temperature, smaller crystals are allowed to grow which would have ordinarily been dissolved into solution for the benefit of even larger crystals. As illustrated in FIG. 10, higher heating solutions containing vaterite during its transition to calcite resulted in smaller crystal growth. The sample that was heated to 110° C. during transition exhibited significantly smaller crystal sizes than the sample that was held at room temperature during the transition. The rate at which the water evaporated from the sample at 110° C. may have had an effect on the crystal development in addition to temperature alone.

Water to Solids Ratio and Transformation:

Vaterite was not observed to transition to calcite below a 1:1 solids:water ratio. The rate of transformation decreased as the amount of water decreased below a 2:1 ratio. The dissolution of vaterite controls the transformation of vaterite into calcite (Yamaguchi & Murakawa, Zairyo (1981) 30, 856). Rate of transformation may be equal to the rate of dissolution. Rate of vaterite transformation may increase with decreasing supersaturation (Spanos & Koutsoukos, *J. of Crystal Growth* (1998) 191, 783-790).

Effect of Strontium on Transformation:

Vaterite precipitated with 10 parts per million strontium, exhibited more dimples and irregularities whereas vaterite precipitated with 25 part per million strontium exhibited a smoother and more uniform surface.

Figure 11:
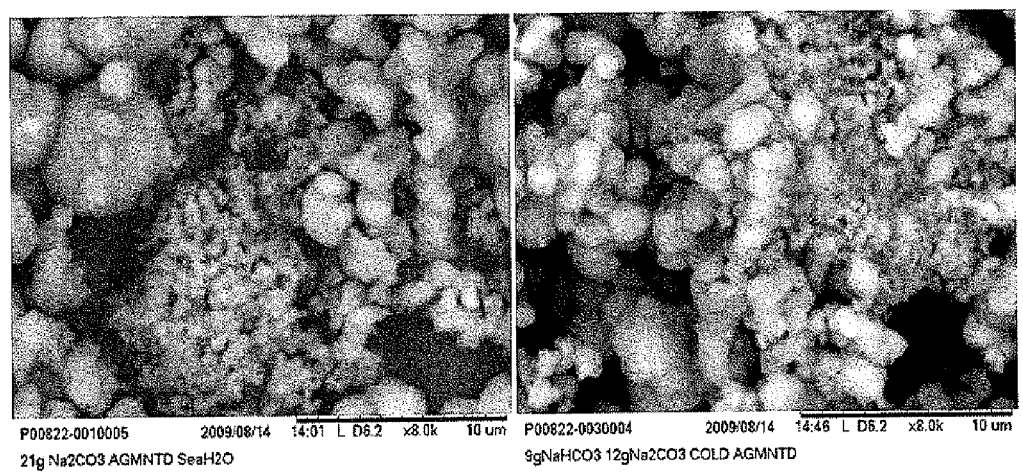
FIG. 11 illustrates framboidal vaterite formed by aggregation of vaterite micro crystallites.
Figure 12A:
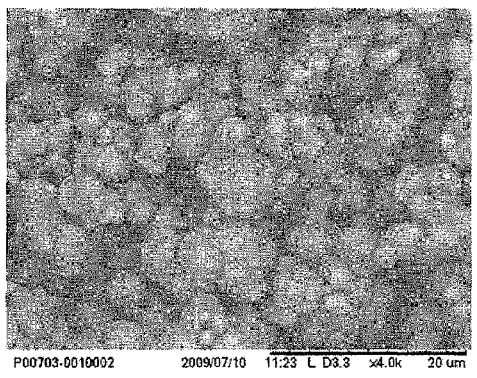
FIGS. 12A-B illustrate effect of sodium chloride on the transformation of vaterite into calcite.
Figure 12A:
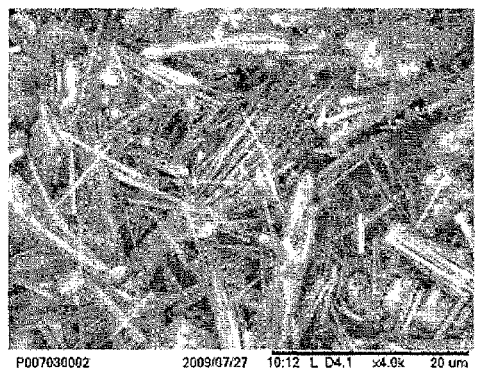
Figure 12B:
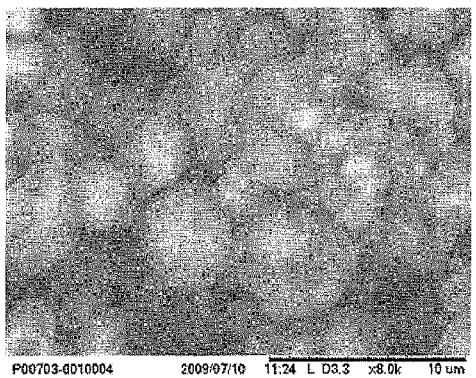
Figure 12B:
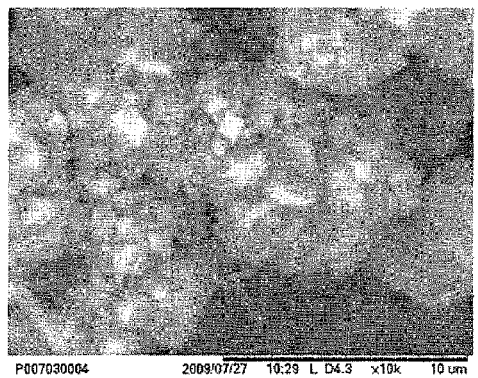
Figure 13:
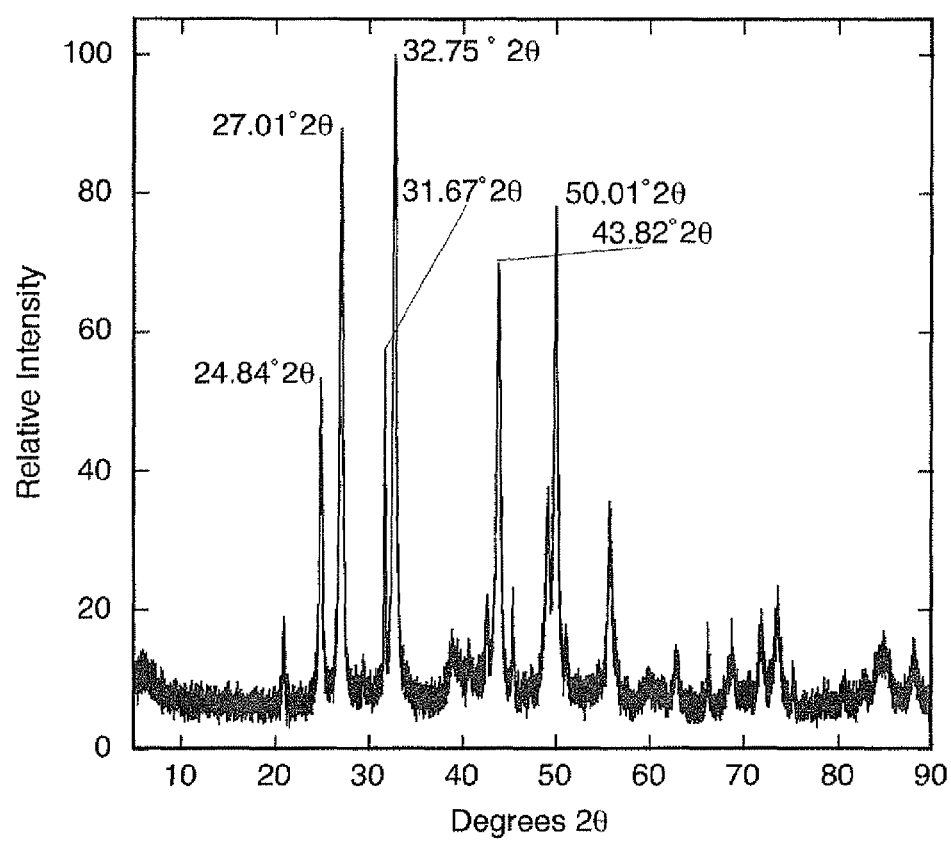
FIGS. 13-18 illustrate the diffraction pattern of the crystals of vaterite (FIGS. 13-15), mixed carbonate phases (FIG. 16), and calcite (FIGS. 17-18).
Figure 14:
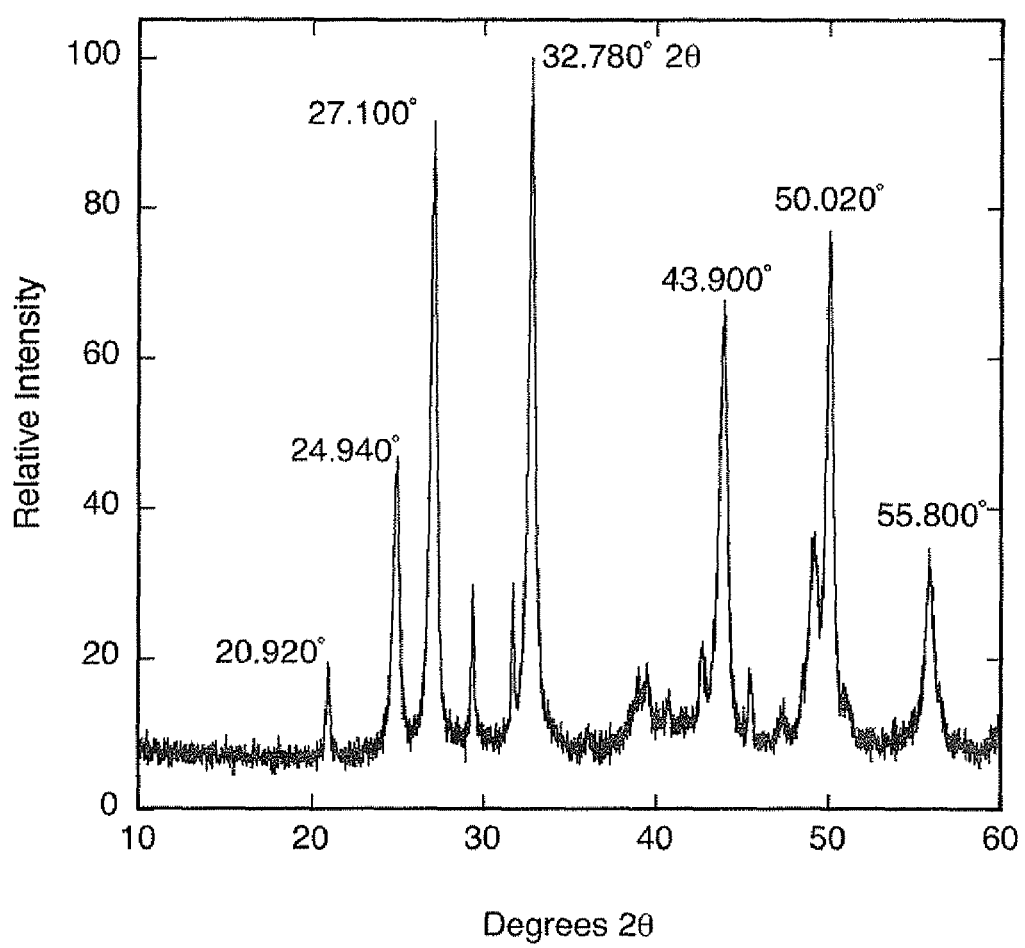
Figure 15:
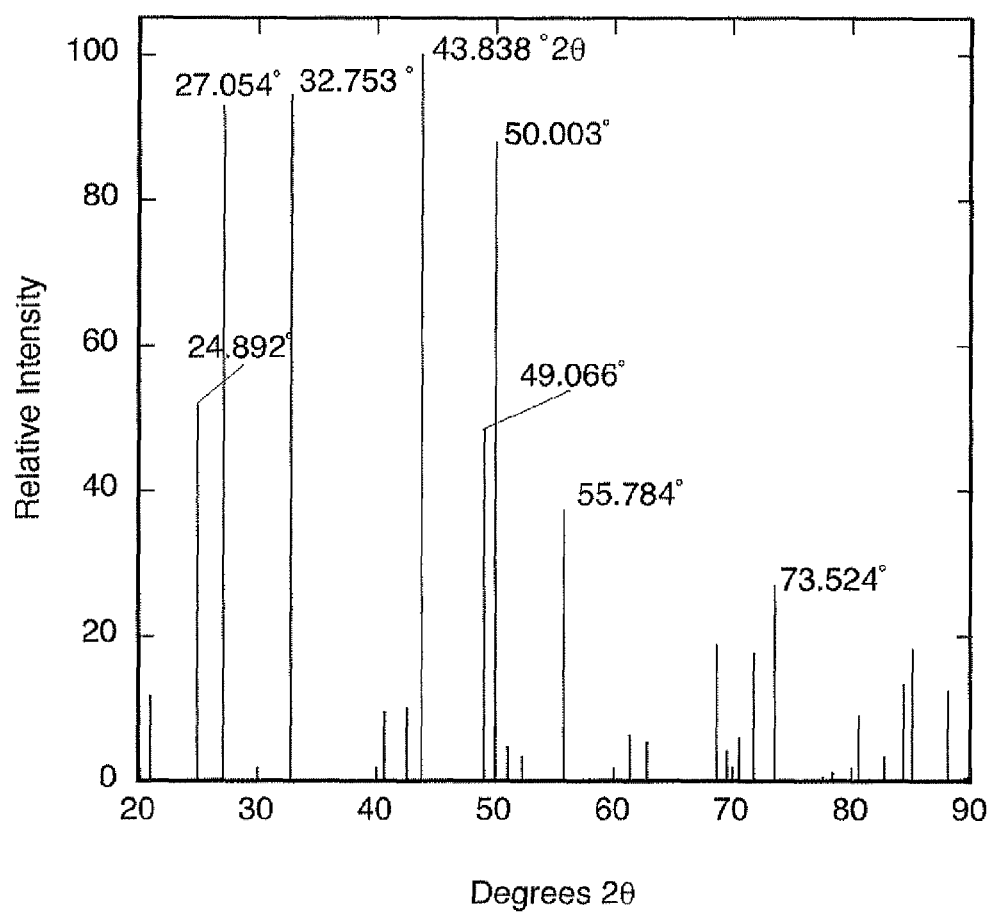
Figure 16:
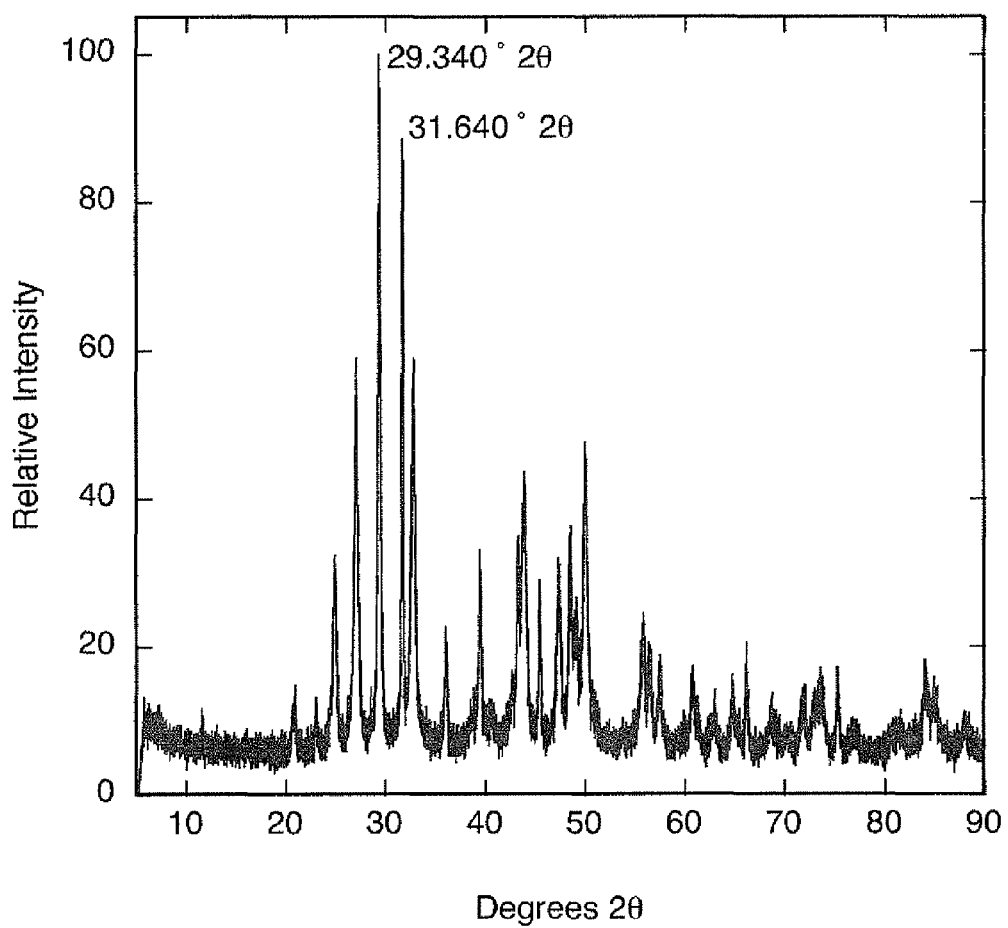

Precipiation of Synthetic Vaterite by Mixing of Solutions:

Synthetic vaterite precipitated by the mixing of solutions exhibited many vaterite microcrystallites that had an aggregation tendency. As shown in FIG. 11, the microcrystallites aggregated into vaterite spheres known as framboidal vaterite.

Effects of Sodium Chloride on Transformation:

Sodium chloride caused the transformation of vaterite into calcite as compared to solution with no sodium chloride (FIG. 12). FIG. 12A illustrates the transformation of vaterite in DI water at 110° C. for 65 hrs and FIG. 12B illustrates the transformation of vaterite in DI water with NaCl at 110° C. for 65 hrs.

Results

Vaterite possesses potential for use as a cementitious material or aggregate. As the rate of precipitation of vaterite later affects the rate of transformation of vaterite to a more stable phase, vaterites precipitated from a range of rates could be combined to create a blend. The vaterites in this mixture would begin to transition at different points in time, resulting in a dense matrix of a variety of calcium carbonate polymorphs.

ACC may be stabilized during precipitation. If ACC is adequately stabilized to a degree where it could also be packaged and later initiated to transform to a polymorph of greater stability, it would be effective as cement. The additional energy present in ACC will allow for better cementing in the polymorphic transition.

More advances may be done in the area of decreasing the amount of water necessary to initiate a phase transformation. The water to solids ratio may be reduced to about 0.5 before calcium carbonate alone can be useful as a cementing material.

Example 4

Preparation of Blended Compositions

This example illustrates various combinations of the vaterite and/or ACC with other components to prepare the blended compositions of the invention. Table 1 shows various different types of vaterite and optionally other polymorph containing compositions that may be mixed with other components to prepare the blended compositions of the invention. sCaCO$_3$ is stabilized calcium carbonate such as calcite and mCaCO$_3$ is metastable calcium carbonate such as vaterite or ACC. For example, mCaCO$_3$-1 may be mixed with other metastable calcium carbonates (2, 3, and/or 4) and may be mixed with any one or more of the other components such as, NaCl, CaO, CaSO$_4$, Na$_2$SiO$_4$, NaP, and/or NaF.

TABLE 1

| Components | Amount (%) | Proposed properties |
|---|---|---|
| mCaCO$_3$-1 | 0-80 | metastable CaCO$_3$ |
| mCaCO$_3$-2 | 0-80 | metastable CaCO$_3$ |
| mCaCO$_3$-3 | 0-80 | metastable CaCO$_3$ |
| mCaCO$_3$-4 | 0-80 | metastable CaCO$_3$ |
| NaCl | 0.01-5 | To increase the ionic activity of the solution |
| CaO | 0.01-5 | pH and Ca$^{2+}$ ion modifier |
| CaSO$_4$•0.5H$_2$O | 0.01-5 | initial setter |
| CaSO$_4$•2H$_2$O | 0.001-0.5 | seed for CaSO$_4$•0.5H$_2$O |
| Na$_2$SiO$_4$ | 0.01-5 | initial setter |
| NaP | 0.01-2 | initial setter |
| NaF | 0.01-2 | initial setter |

The compositions prepared by blending the components of Table 1 were mixed with water which after setting, hardening and curing gave cemented material (transformed from 80.9% vaterite and 13.2% calcite to 12.4% vaterite and 83% calcite after 7 days). Some of the examples of the compositions that were prepared and were subjected to cementing are as follows:

1 g sub-micron vaterite with 0.25 g pre-reacted for seed; 1 g of vaterite with 0.25 g pre-reacted for seed; 0.5 g of vatreite; and 2.3 g 40% Na$_2$SiO$_3$ with a dispersant to reduce water demand.

1 g sub-micron vaterite; 1 g vaterite; 0.9 g of another blend of vaterite; 0.1 g CaO; 0.1 g NaF; 0.1 g NaP; 0.35 g plaster of Paris; 0.05 g Gypsum; 0.1 g CaCO$_3$; and 0.5 g NaOH, Adva (plasticizer), and NaCl.

The two compositions, when mixed with water, set and hardened into cement.

Example 5

Transformation of Vaterite Compositions into Cement Material

This study shows preparation of various compositions of the invention and their transformation into cement.

Composition 1: 1.3 g vaterite; 1.3 g another blend of vaterite; 0.5 g ball milled version of the vaterite; 0.5 g Na$_2$CO$_3$; 0.15 g Ca(OH)$_2$; 0.35 g CaCl$_2$; and 1.15 g CaCO$_3$.

Composition 2: 1 g vaterite; 1 g another blend of vaterite; 0.5 g still another blend of vaterite (calcite for seeding); Na$_2$SiO$_3$; and 5 drops of Adva until paste formation took place.

Composition 3: 1 g vaterite; 1 g another blend of vaterite; 0.2 g Na$_2$CO$_3$; 0.6 g Ca(OH)$_2$; and 10% NaCl in water until paste was formed.

These compositions were blended to make a paste which was transformed into a cube. SEM's of the dried paste showed transformation of vaterite to calcite and the result was a hard cemented material.

Example 6

Compressive Strength of the Cement Material Formed from Vaterite Compositions

Various composition of vaterite with other components were prepared and tested:

Composition 1: 10 g vaterite; 6 g sodium silicate; and 6 g water.

Composition 2: 10 g vaterite; 1 g sodium silicate; and 6 g water.

Composition 3: 10 g vaterite; 2 g sodium silicate; and 5 g water.

Composition 4: 10 g vaterite; 4 g sodium carbonate solution; and 2 g water.

Composition 5: 10 g vaterite; 3 g sodium carbonate; 2 g sodium silicate; and 2 g water.

Composition 6: 10 g vaterite; 5 g water; and 1 g 2 M sodium hydroxide.

Composition 7: 10 g vaterite; 4 g water; 2 g sodium silicate; and 2 g 2 M sodium hydroxide.

Composition 8: 10 g vaterite; 2 g sodium carbonate; and 6 g water.

Composition 9: 30 g vaterite and 12 g tap water.

All the compositions were stored at 40° C. overnight in cube molds which then resulted in cubes after curing.

The cubes prepared from these compositions were subjected to compressive strength test. Table 2 shows the compressive strength of 10 cubes prepared from composition 9.

TABLE 2

| Cubes | Compressive strength (psi) |
|---|---|
| 1 | 498.6 |
| 2 | 434.7 |
| 3 | 434.7 |
| 4 | 626.4 |
| 5 | 639.45 |
| 6 | 460.35 |
| 7 | 611.1 |
| 8 | 508.95 |
| 9 | 575.1 |
| 10 | 720 |

Example 7

XRD Pattern of the Compositions

Figure 17:
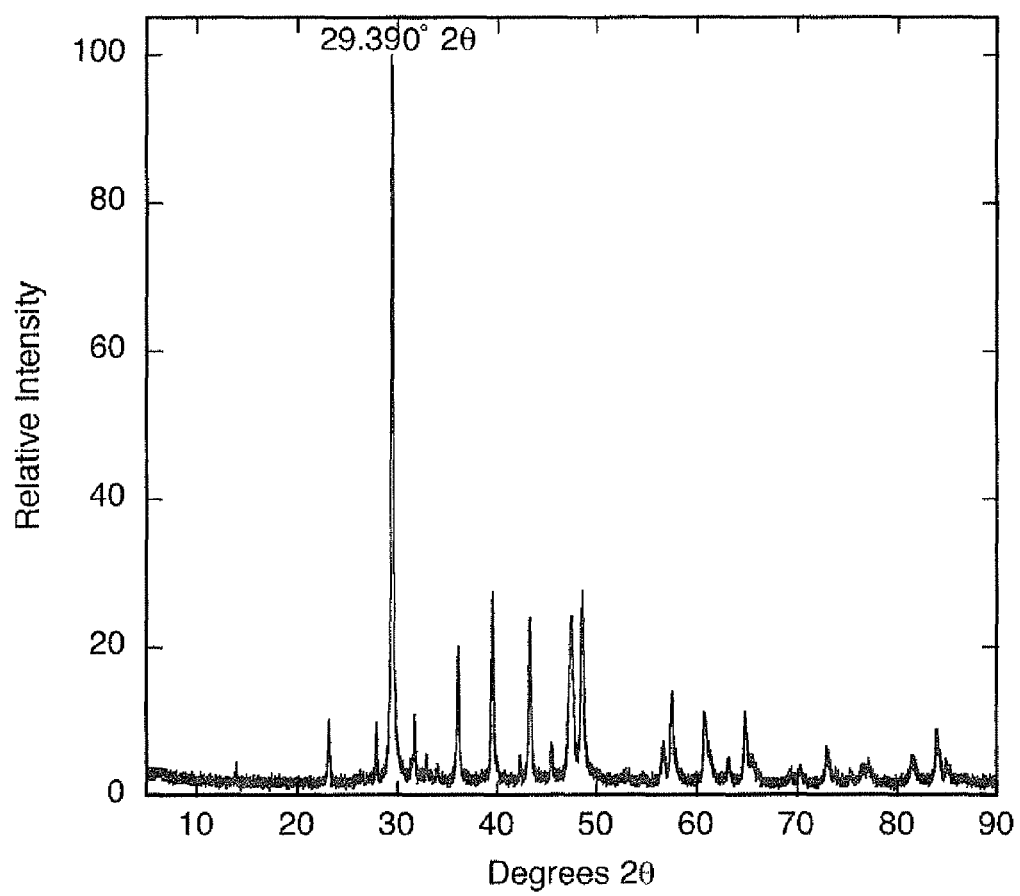
Figure 18:
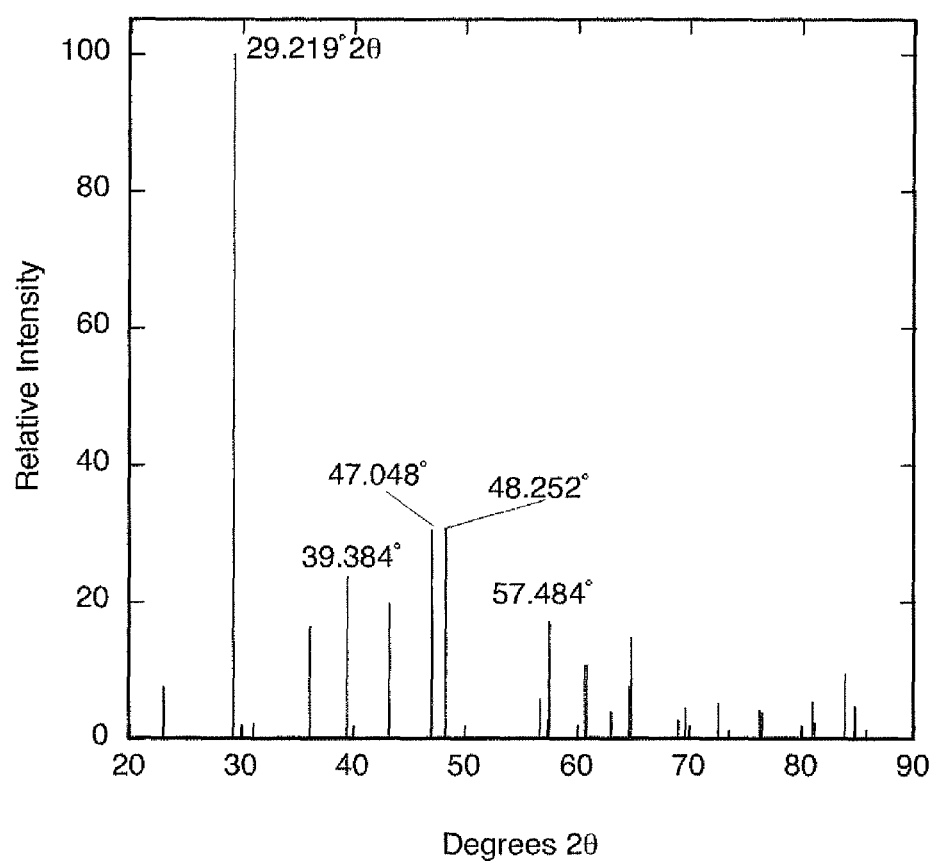

This example demonstrates analysis of vaterite or other polymorphs in the crystal of the compositions, using XRD pattern. FIGS. 13-18 illustrate the diffraction pattern of the crystals that are predominantly vaterite (FIGS. 13-15), predominantly mixed carbonate phases (FIG. 16), and predominantly calcite (FIGS. 17-18).

Example 8

Compressive Strength of the Compositions Combined with Portland Cement

In this study, the SCM composed of calcium carbonate phases of the invention was tested as a 20% replacement for Portland cement in mortars. The results indicated that the compressive strength and the flow of SCM combined with Portland cement were comparable to that of Portland cement mortars. In this study, in addition to mortar testing, compositional and physical characteristics of the materials in paste were also explored. Finally the $CO_2$ sequestration method and the origin of the $CO_2$ were confirmed using carbon isotope measurements.

The process described in this study captured and converted, without costly gas separation, the carbon dioxide from large point sources such as coal- or gas-fired power plants to generate carbonate minerals. As an added benefit, these minerals were used in the built environment as cement, SCM, or aggregates, thereby enabling safe, permanent and economical storage of $CO_2$ and reduction in the global $CO_2$ footprint of concrete.

This study focused on the use of reactive carbonate minerals (referred to as RCM in the rest of the study) as an SCM. As defined above, it is understood to the skilled artisan that SCM may be reactive or non-reactive with the Portland cement. Described below are characteristics of RCM as well as the performance of this material as a replacement for Portland cement in mortar. Additional information relative to the reactivity of the material in the cement paste is provided.

Process

Figure 19:
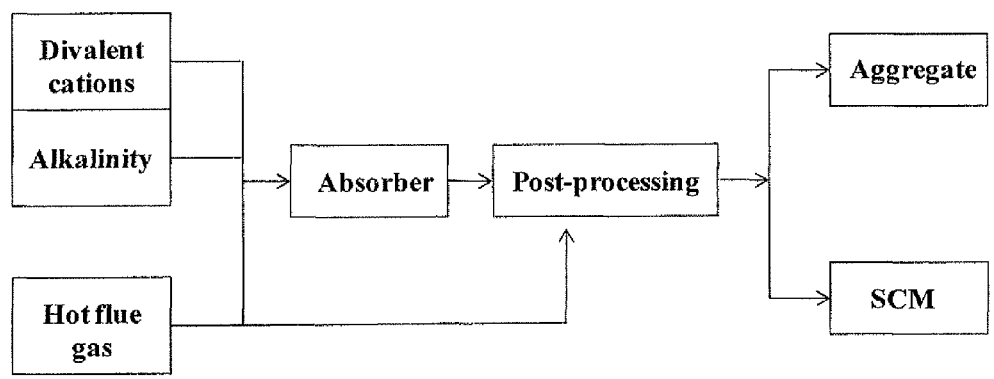
FIG. 19 illustrates a flow diagram for preparing the composition according to some embodiments of the invention.

The process used flue gas, a source of divalent cations (e.g., $Ca^{2+}$ or $Mg^{2+}$) and a source of alkalinity (FIG. 19). The flue gas originated from a gas or coal-fired power plant and could be used raw (i.e., before the removal of other pollutants such as SOx and NOx). This flue gas was directed into a gas-liquid contacting system ("absorber"), where the $CO_2$ dissolved into the water and formed a combination of carbonic acid, bicarbonate, and carbonate anions. The relative ratio of these $CO_2$ species in solution can be controlled by addition of an alkaline source to promote a high carbonate ion level. These carbonate ions combined with divalent cations to precipitate carbonate minerals in the form of slurry.

After dewatering and further processing of this slurry, the carbonate minerals can be used in various applications in the built environment, e.g. as SCM in concrete or multi-purpose aggregate for concrete, asphalt, road base, and structural fill applications. This beneficial reuse aspect is a quality that makes the process economically viable amongst carbon capture and sequestration methods. Further evaluations indicated that this process is less energy intensive than other forms of carbon treatment.

Material Characteristics

The RCM is composed of dry powder of calcium carbonate polymorphs, such as, vaterite, calcite, and amorphous calcium carbonate.

The extent of $CO_2$ mineralization was determined by inorganic carbon Coulometry and the determination of $CO_2$ origin was carried out through $\delta^{13}C$ isotope analysis. The carbonate mineral phases were identified by X-ray diffraction (XRD), and Fourier transform infrared spectroscopy (FT-IR). Chemical composition of the material was determined using X-Ray fluorescence (XRF) on pressed pellets and total loss on ignition was obtained by thermo-gravimetric analysis (TGA).

The RCM contained up to 40% $CO_2$ (91% $CaCO_3$) and a mixture of vaterite to calcite in the crystalline portion of the material. The origin of this $CO_2$ could be traced back to its source by following the carbon isotope fractionation between $^{12}C$ ("light carbon") and $^{13}C$ ("heavy carbon") (Mook, W. G. *Netherlands Journal of Sea Research*, Vol. 20 (2/3), 1986, pp. 211-223).

$$\delta^{13}C = (R_{SAMPLE}/R_{STANDARD} - 1) * 1000‰ \text{ with } R = {}^{13}C/{}^{12}C \text{ and } R_{standard} \text{ set as the value of the Vienna-PeeDee Belemnite standard (V-PDB).}$$

Marine carbonates contain more of the heavy carbon whereas coal and natural gas are composed of predominantly light carbon. Thus, power plant $CO_2$ emissions have relatively low $\delta^{13}C$ values. This isotopically light carbon signature is transferred to the produced carbonate minerals with a $\delta^{13}C$ value of <−25‰ (Constantz, B., "Sequestering $CO_2$ in the Built Environment," 2009, Trans. American Geophysical Union Fall Meeting, Poster session 90(52), Fall Meet. Suppl., Abstract U11A-0013 San Francisco). Typical limestones have $\delta^{13}C$ values ranging from −4.0 to +3.0 depending on their origin. These differences in fractionation ratio though helpful to track the origin of our carbon dioxide, are small and do not affect the properties of the concrete.

In addition to the total chloride content provided by XRF, analyses were carried out to provide the soluble chloride content. Water soluble chloride-ion content showed that the total chloride content was lower than 0.1% by weight which satisfies the prestressed concrete requirements of ACI 318 for corrosion robustness (ACI 318-08: Building Code Requirements for Structural Concrete and Commentary). XRF also showed that the equivalent alkali content ($Na_2O_{eq}$) was lower than 0.6% thus minimizing risks of alkali-silica reaction.

Figure 20:
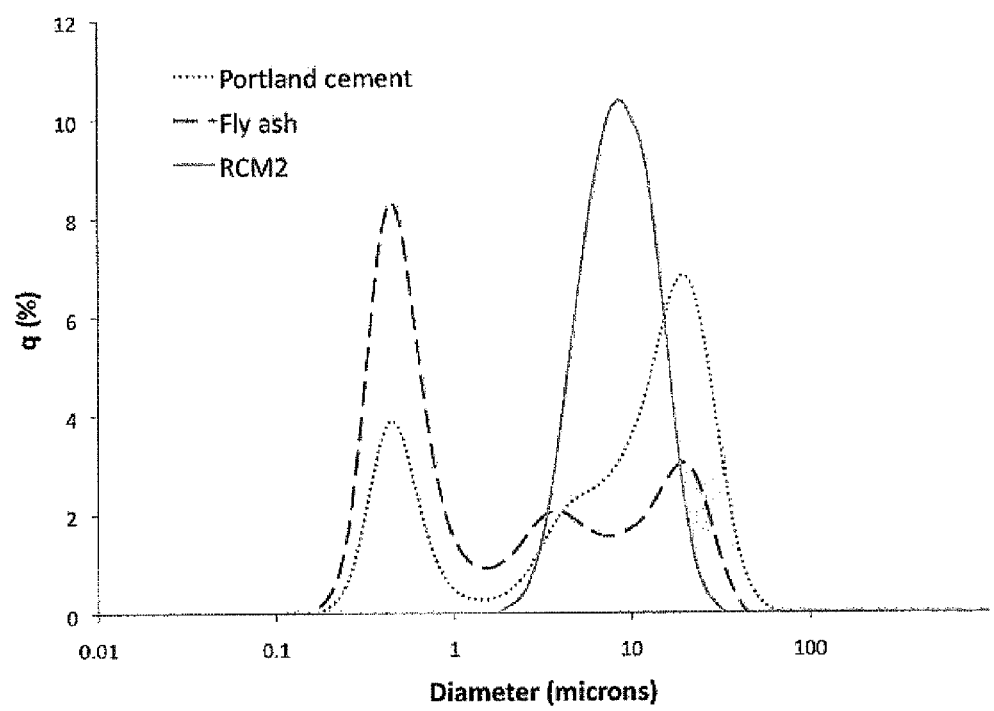
FIG. 20 illustrates a particle size distribution comparison for OPC (Ordinary Portland Cement) (small dots), fly ash (long dot) and RCM (reactive carbonate minerals) (solid).

Finally physical characteristics such as particle size distribution and surface area were determined using a laser diffraction analyzer and a BET gas adsorption analyzer respectively. The specific surface area was in the order of a few $m^2/g$ and the particle size distribution was unimodal with particles ranging in diameter from 1 to 30 μm (FIG. 20).

Experimental

Further evaluated was the impact on mortar performance (compressive strength) of a partial replacement of Portland cement by RCM and the reactivity of RCM with the cement paste. Two RCM materials of equivalent compositions were tested: RCM1 and RCM2. The RCM1 composition had 49.7% vaterite, 48.5% calcite, and 1.8% halite and RCM2 composition had 72.6% vaterite, 24.7% calcite, and 2.8% halite. The stability of $CO_2$ sequestration in the mortar samples was also investigated.

Reference samples were prepared using either: 100% Portland cement, a blend of 80% Portland cement and 20% fly ash, or a blend of 80% Portland cement and 20% commercial grade ground calcium carbonate (GCC). The cement used was a type II/V cement. The type of fly ash used was commercially available as class C (FAC) or class F (FAF). The ground calcium carbonate was obtained from a commercial source and was mostly composed of calcite with traces of dolomite, based on its origin (limestone). The elemental composition of these materials is given in Table 3 along with that of the RCM.

TABLE 3

Elemental composition of the mix components as determined by XRF

| | $Na_2O$ | MgO | $Al_2O_3$ | $SiO_2$ | $SO_3$ | Cl | $K_2O$ | CaO | $Fe_2O_3$ |
|---|---|---|---|---|---|---|---|---|---|
| OPC4-3 | 0.00 | 0.88 | 4.00 | 18.20 | 2.38 | 0.07 | 0.20 | 61.78 | 3.99 |
| Fly ash C | 3.24 | 8.38 | 17.32 | 27.69 | 2.32 | 0.05 | 0.35 | 30.28 | 5.62 |

TABLE 3-continued

Elemental composition of the mix components as determined by XRF

|  | $Na_2O$ | MgO | $Al_2O_3$ | $SiO_2$ | $SO_3$ | Cl | $K_2O$ | CaO | $Fe_2O_3$ |
|---|---|---|---|---|---|---|---|---|---|
| Fly ash F | 1.79 | 2.967 | 18.97 | 49.59 | 0.33 | 0.02 | 1.18 | 11.08 | 4.94 |
| GCC | 1.24 | 3.16 | 0.95 | 2.84 | 0.05 | 0.32 | 0.24 | 56.70 | 0.29 |
| RCM1 or RCM2 |  |  |  |  |  | Less than 0.1% |  | Up to 56% |  |

(unit: weight % of oxide equivalent)

Paste Samples for Setting Time Determination

Pastes of normal consistency were prepared following ASTM C305 (ASTM Standard C305-06, 2006, "Standard Practice for Mechanical Mixing of Hydraulic Cement Pastes and Mortars of Plastic Consistency," ASTM International, West Conshohocken, Pa., 2003, DOI: 10.1520/C0305-06, www.astm.org.) and start of setting was determined using the Vicat needle (ASTM C191 (ASTM Standard C191-08, 2008, "Standard Test Methods for Time of Setting of Hydraulic Cement by Vicat Needle," ASTM International, West Conshohocken, Pa., 2008, DOI: 10.1520/C0191-08, www.astm.org.)) as well as isothermal calorimetry.

Mortar Samples for Flow and Compressive Strength Measurements

Mortar specimens prepared at w/c=0.49 with a blend of 80% Portland cement and either 20% RCM (mix B) or 15% RCM/5% fly ash (mixes F and G) were compared to reference mixes A, C, D, and E as shown in Table 4. These mortars were prepared following ASTM C305 mixing procedure using ASTM C778 graded sand. The flow of fresh mortar (w/c=0.49) was determined by the flow table method as described in ASTM test C1437 (ASTM C1437-07, 2007, "Standard Test Method for Flow of Hydraulic Cement Mortar," ASTM International, West Conshohocken, Pa., 2003, DOI: 10.1520/C1437-07, www.astm.org).

TABLE 4

Mix formulations studied

|  | OPC II/V | RCM1 | FAC | FAF | GCC |
|---|---|---|---|---|---|
| Mix A | 100% |  |  |  |  |
| Mix B | 80% | 20% |  |  |  |
| Mix C | 80% |  | 20% |  |  |
| Mix D | 80% |  |  | 20% |  |
| Mix E | 80% |  |  |  | 20% |
| Mix F | 80% | 15% | 5% |  |  |
| Mix G | 80% | 15% |  | 5% |  |

All specimens were cured in a 98% relative humidity chamber at 23° C. After 24 h, they were removed from their mold and then cured in a lime bath in a water chamber at 23° C. until their testing date (1, 7, and 28 days).

Pastes Samples for Reactivity Study

The impact on hydration product chemistry of partially replacing Portland cement with the RCM was also investigated during this study. Paste samples were prepared at w/c=0.80 with 20% of the Portland cement replaced by RCM. Reference samples were prepared using 100% Portland cement or a blend of 80% Portland cement and 20% ground calcium carbonate replacement. During the first 4 hours, the hydration was interrupted using an acetone rinse and vacuum filtering to study the nature and morphology of hydration products. Additional samples were covered to avoid excessive carbonation and cured at room temperature for up to 28 days.

After 1, 7 and 28 days, a sample was crushed finely and rinsed with acetone over vacuum to remove free water.

Results and Discussion

Product Performance

Setting Time

The setting time measurements, at normal consistency as well as the isothermal calorimetry tests carried out at w:cm=0.50, indicated that the partial replacement of Portland cement by RCM had no impact on the start of the setting.

Water Demand and Compressive Strengths

Typical flow measurements obtained for the different mix formulations studied are reported in Table 5. These results indicated that the partial replacement of Portland cement by the RCM lead to comparable rheological behavior in mortar as the reference Portland cement or fly ash/Portland cement mortars.

Table 5 shows the compressive strength developed from 1 to 28 days. Presence of RCM was beneficial for compressive strength at early age (1 and 7 days) as it showed higher strength than mixes that did not contain RCM. By 28 days, the compressive strengths obtained for all mixes but mix E (obtained from GCC) were comparable. The 20% RCM of the invention when mixed with Portland cement gives superior compressive strength at 28 days, as compared to 20% of ground calcium carbonate mixed with Portland cement.

TABLE 5

Water demand and compressive strength development for various SCM replacements

| Mix | Formulation | Flow (%) | Compressive strength (psi) | | |
|---|---|---|---|---|---|
|  |  |  | 1 day | 7 days | 28 days |
| A | 100% OPC | 108% | 1900 | 4350 | 5510 |
| C | 20% FAC | 113% | 1750 | 4080 | 5260 |
| D | 20% FAF | 110% | 1390 | 3490 | 5020 |
| B | 20% RCM1 | 103% | 2220 | 4460 | 5460 |
| F | 15% RCM1-5% FAC | 94% | 1970 | 4010 | 5170 |
| G | 15% RCM1-5% FAF | 119% | 1950 | 3670 | 5060 |
| E | 20% GCC | 106% | 1260 | 3135 | 4010 |

Figure 21:
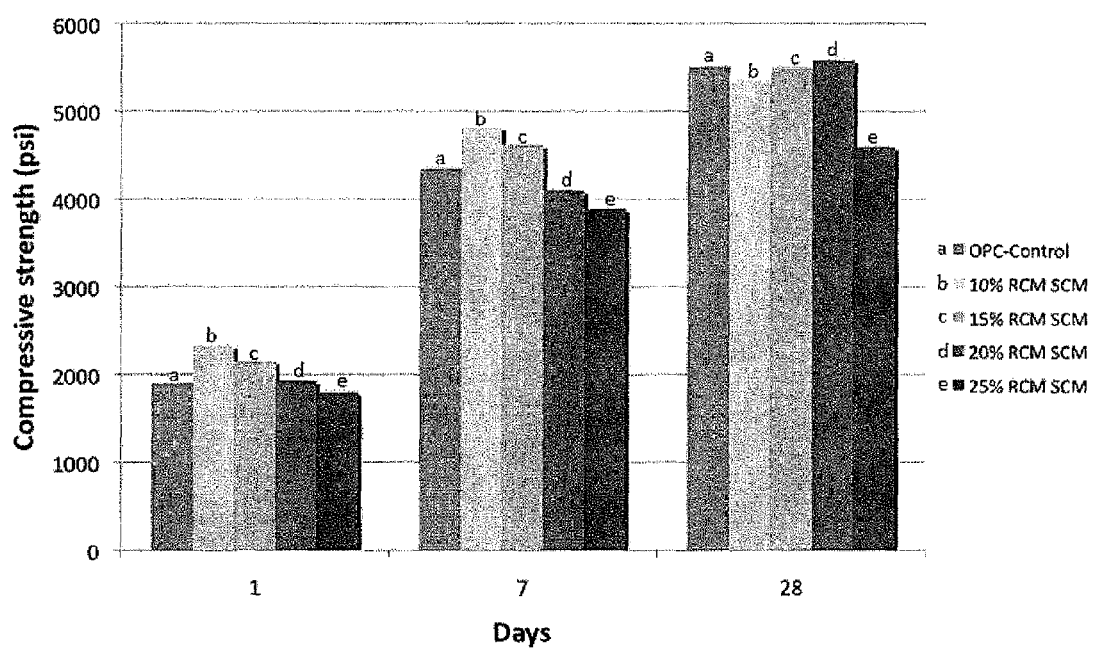
FIG. 21 illustrates a dose response compressive strength graph for RCM when mixed with Portland cement.

Table 6 and FIG. 21 show the dose effect of another RCM of similar composition on water demand and compressive strength development until 28 days. The beneficial effect of RCM substitution was maintained up to a replacement level of 20%.

TABLE 6

Water demand and compressive strength development for
various replacement rates of Portland cement by RCM

| Formulation | Flow (%) | Compressive strength (psi) | | |
|---|---|---|---|---|
| | | 1 day | 7 days | 28 days |
| 100% OPC | 108% | 1900 | 4350 | 5510 |
| 10% RCM2 | 95% | 2330 | 4820 | 5360 |
| 15% RCM2 | 119% | 2150 | 4620 | 5500 |
| 20% RCM2 | 112% | 1930 | 4100 | 5090 |
| 25% RCM2 | 117% | 1800 | 3890 | 4600 |

Product Interaction with Portland Cement

The RCM of the invention is composed of calcium carbonate polymorphs. Calcite in ground limestone is typically considered as a filler in Portland cement hydration, participating to a limited extent (1-5%) in the hydration reactions by forming analogs of calcium alumino-sulfate hydrates in which the sulfates are replaced by carbonates (Voglis et al. *Cement & Concrete Composites*, Vol. 27, 2005, pp. 191-196; Matschei et al. *Cement and Concrete Research*, Vol. 37, 2007, pp. 551-558; Lothenbach et al. *Cement and Concrete Research*, Vol. 38, 2008, pp. 848-860; Hawkins et al. EB227, Portland Cement Association, Skokie, Ill., USA, 2003, 44 pages; and Feldman et al. *Journal of the American Ceramic Society*, Vol. 48, No. 1, 1965, pp. 25-30). Carbonates are shown to enter in the composition of calcium silicate hydrates and lower the Portlandite content.

XRD, FT-IR and TGA results of this study obtained for paste specimen, on which the hydration was halted at different ages ranging from a few minutes to 28 days, indicated that the presence of the RCM may not alter or slow the hydration reactions of the Portland cement. The sequence of formation of hydrates (portlandite, ettringite, etc.) is similar, whether the RCM is present or not. SEM observations illustrate that the presence of the RCM in the paste does not modify the morphology of the Portland cement hydrates.

Stability of $CO_2$ Sequestration

Carbon isotopic measurements were carried out on mortar samples in which the cementitious materials comprised 80% OPC and 20% RCM and which were cured for 90 days in normal laboratory air atmosphere. The goal was to determine if the $CO_2$ sequestered in the RCM through the mineralization process was still present in the mortar and whether it had been replaced by $CO_2$ issued from sample carbonation. As shown in Table 7, the low $\delta^{13}C$ values confirm that the $CO_2$ present in the mortar samples originated from the flue gas and not from air carbonation.

TABLE 7

Tracing of $^{13}C/^{12}C$ isotopic ratios in RCM formation and use as
supplementary cementitious material

| Material | Coal | Flue gas | RCM | OPC/RCM mortar | Control OPC mortar | OPC |
|---|---|---|---|---|---|---|
| $\delta^{13}C$ (‰ vs. PDB) | −25.7 | −24.4 | −30.5 | −26.2 | −17.5 | −4.5 |

Furthermore, the hydrated phases, containing $CO_2$ formed in mortars made with the RCM of the invention, were similar to those formed in mortars made with ground limestone. Similar durability properties should therefore be expected. These results confirm that the production of RCM from flue gas will be a means to sequester $CO_2$ in the built environment for extended periods of time and will result in durable cement.

It is anticipated that RCM will be introduced in regional markets, local to production, at a price point on parity with fly ash. The economics of transportation as well as supply and demand control the price of quality bulk fly ash and slag. However, it is expected that true RCM pricing may be much more complex. It is foreseeable that Carbon Cap-and-trade legislation or tighter Mercury emission standards may reduce the pricing of the RCM product.

Example 9

Synthesis and Stability of ACC

In this study, the synthesis and stability of amorphous calcium carbonate (ACC) synthesized with different solutions having different Ca:Mg ratios was investigated. Understanding the synthesis conditions for ACC may help to define the amorphous/calcium carbonate polymorph precipitation regions and generate standard material for analytical method development. Investigating the stability of this material can indicate conditions, e.g., shelf-life, reactivity, etc. of ACC that may be a component of the composition of the invention.

It was found that a Ca:Mg ratio of 0.1 yielded ACC of long-term stability (with halite due to rinsing step). Having no $Mg^{2+}$ in solution led to a transformation to either: a mixture of calcite, vaterite, and aragonite or calcite and vaterite. At a Ca:Mg ratio of 0.3, the ACC transitioned to primarily calcite with some trace of aragonite. At the Ca:Mg ratio of 0.2, a stable ACC material was formed. This material was found to be stable in low humidity conditions for over a year.

Without being limited by any theory, it is proposed that concentrations of other ions in solution may contribute to some of the observed differences in crystalline polymorphs and the stability of the ACC synthesized.

Materials and Equipment

Vacuum filtration setup (Whatman No. 1 filter); Chilled water bath; and $Na_2CO_3$, $MgCl_2$, $CaCl_2$.

Experimental

An initial recipe of using 5 mM $CaCl_2$ and 5 mM $Na_2CO_3$ was used for a double decomposition method of forming ACC. A sample using this procedure was centrifuged to a thick slurry and was measured by Raman in the glass vial sample port on the Raman to compare the standard ACC spectra with reported literature values (Ajikumar et al., *Crystal Growth and Design*, (2005) Vol 5, No, 3, pages 1129-1134; Kontoyannis et al, *The Analyst*, 2000; Raz, et al, *Biol. Bull.* (2002) 203, pages 269-274; and Weiner et al, *Connective Tissue Research*, (2003) 44 (Supl 1), pages 214-218).

A second matrix was chosen to investigate the effect of the ratio of Ca:Mg in solution on ACC formation and stability (Table 8). ACC7-9 conditions were the same ratio as ACC2, however rinsing and mixing steps were varied slightly to optimize the rinsing procedure.

TABLE 8

Amounts of reactants used to investigate Ca:Mg ratio in ACC synthesis

| | $Na_2CO_3$ | | | $MgCl_2$ | | | $CaCl_2$ | | | Ca:Mg |
|---|---|---|---|---|---|---|---|---|---|---|
| Sample | g | mL $H_2O$ | M | g | mL $H_2O$ | M | g | mL $H_2O$ | M | (750 mL) |
| ACC1 | 14.39 | 250 | 0.54 | 27.42 | 250 | 0.54 | 2.21 | 250 | 0.06 | 0.111 |
| ACC2 | 14.39 | 250 | 0.54 | 13.71 | 250 | 0.27 | 2.21 | 250 | 0.06 | 0.222 |
| ACC3 | 14.39 | 250 | 0.54 | 0.00 | 0.00 | 0.00 | 2.21 | 250 | 0.06 | N/A |
| ACC4 | 14.39 | 250 | 0.54 | 0.00 | 0.00 | 0.00 | 19.85 | 250 | 0.54 | N/A |
| ACC5 | 14.39 | 250 | 0.54 | 81.5 | 250 | 1.61 | 19.85 | 250 | 0.54 | 0.34 |
| ACC6 | 14.46 | 250 | 0.54 | 27.42 | 250 | 0.54 | 6.63 | 250 | 0.18 | 0.333 |
| ACC7 | 14.39 | 250 | 0.54 | 13.71 | 250 | 0.27 | 2.21 | 250 | 0.06 | 0.222 |
| ACC8 | 14.39 | 250 | 0.54 | 13.71 | 250 | 0.27 | 2.21 | 250 | 0.06 | 0.222 |
| ACC9 | 14.39 | 250 | 0.54 | 13.71 | 250 | 0.27 | 2.21 | 250 | 0.06 | 0.222 |

Every chemical was dissolved thoroughly in DI water and diluted to 250 mL volume in a Pyrex volumetric flask, and placed in ice water (~5° C.) for 20-30 minutes. The solutions were then mixed and stirred vigorously on a magnetic stir plate for 60 seconds and immediately filtered through Whatman No. 1 filter paper using vacuum a filtration setup. The precipitate was rinsed in some cases with just alcohol (isopropyl alcohol (IPA) and ethanol were investigated) and in some cases first with chilled DI water and then with alcohol. The precipitate was immediately transferred into a 15 mL tube and placed first in liquid nitrogen for a few hours to rapidly freeze the sample and then transferred to the lyophilizer for overnight drying. The samples were then prepared for characterization by XRD. All samples were kept in a desiccator in between analyses (~0-25% RH (relative humidity)).

Results and Discussion

XRD analysis was performed on the precipitates and the products from experiments 2, 5, 8 and 9 showed the characteristics expected for ACC (Dandeu et al., *Chem. Eng. Technol.*, (2006) 29, No. 2, Pages 221-225; Lam et al, *Cryst. Eng. Comm.*, 2007; Ajikumar et al., *Crystal Growth and Design*, (2005) Vol 5, No. 3, pages 1129-1134; and Kontoyannis et al, *The Analyst*, 2000).

Figure 22:
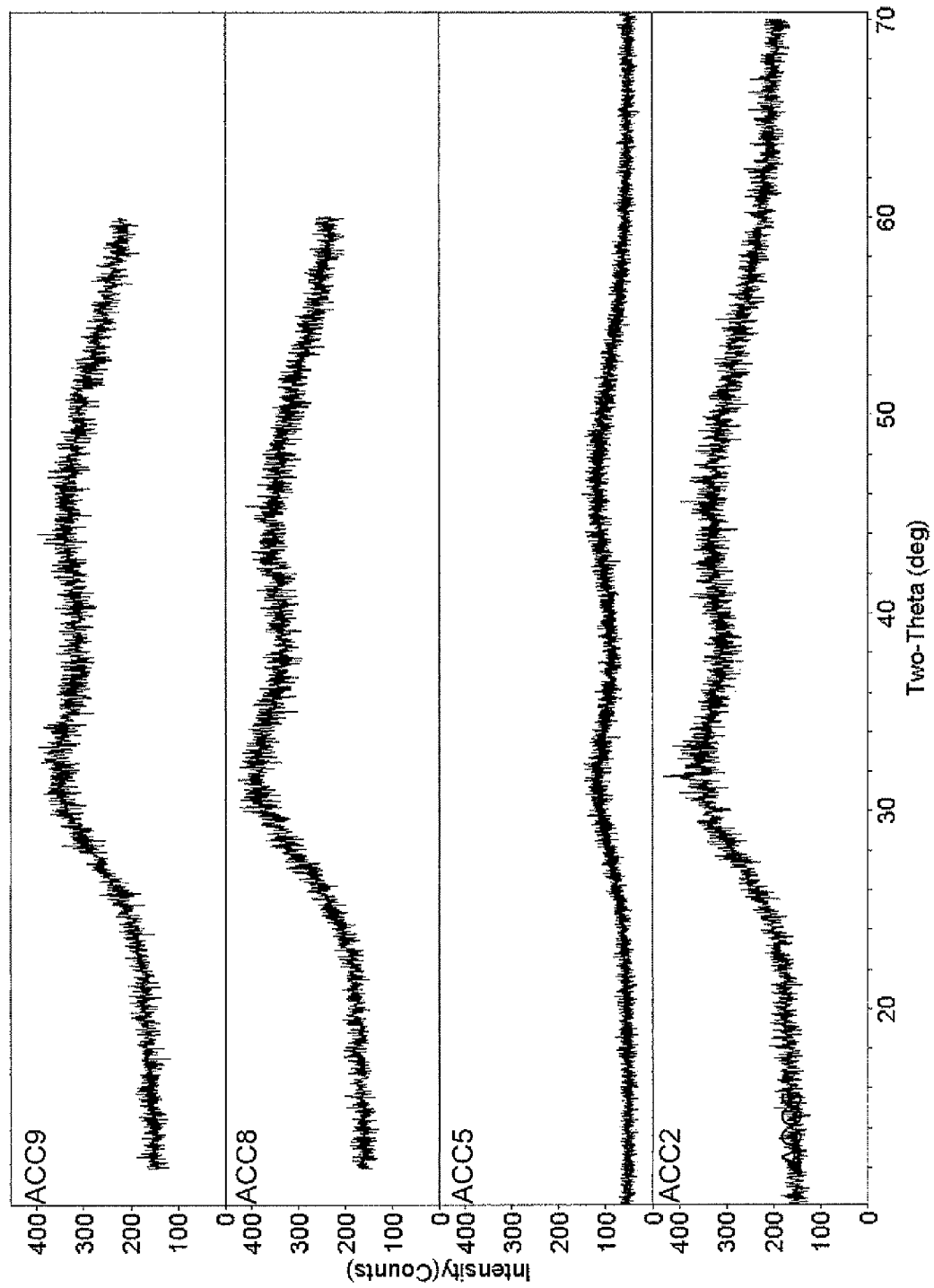
FIG. 22 illustrates XRD results of several ACC samples, with scan results similar to that seen in literature. The intensity of ACC5 is reflective of a different scan condition.

The precipitates from these experiments were thoroughly rinsed first with chilled DI water and then with chilled ethanol. The main difference between experiment 8 and 9 was that in exp. 8, a well-mixed solution of $CaCl_2/MgCl_2$ was added to the solution of $CaCO_3$, and in experiment 9 the reverse was done. The experiment 8 may be preferred because the precipitate yield was better and it was 40 g versus 30 g from that of experiment 9. It was also found that rinsing with chilled DI water followed by chilled ethanol was the desired rinse step of the methods investigated. Additional investigation of the mixing and rinsing steps may be done to determine whether chilling is necessary and to optimize the mixing. The initial XRD characterization of 2, 5, 8, and 9 is shown in FIG. 22.

In the case of protocols 1, 6 and 7, halite was the only crystalline phase detected. In 7, upon rinsing the dried precipitate with chilled DI water, the detectable halite content was removed. This may indicate that if the conditions are appropriate (time and temperature), some stability of a dried sample in contact with fresh water is observed.

Figure 23:
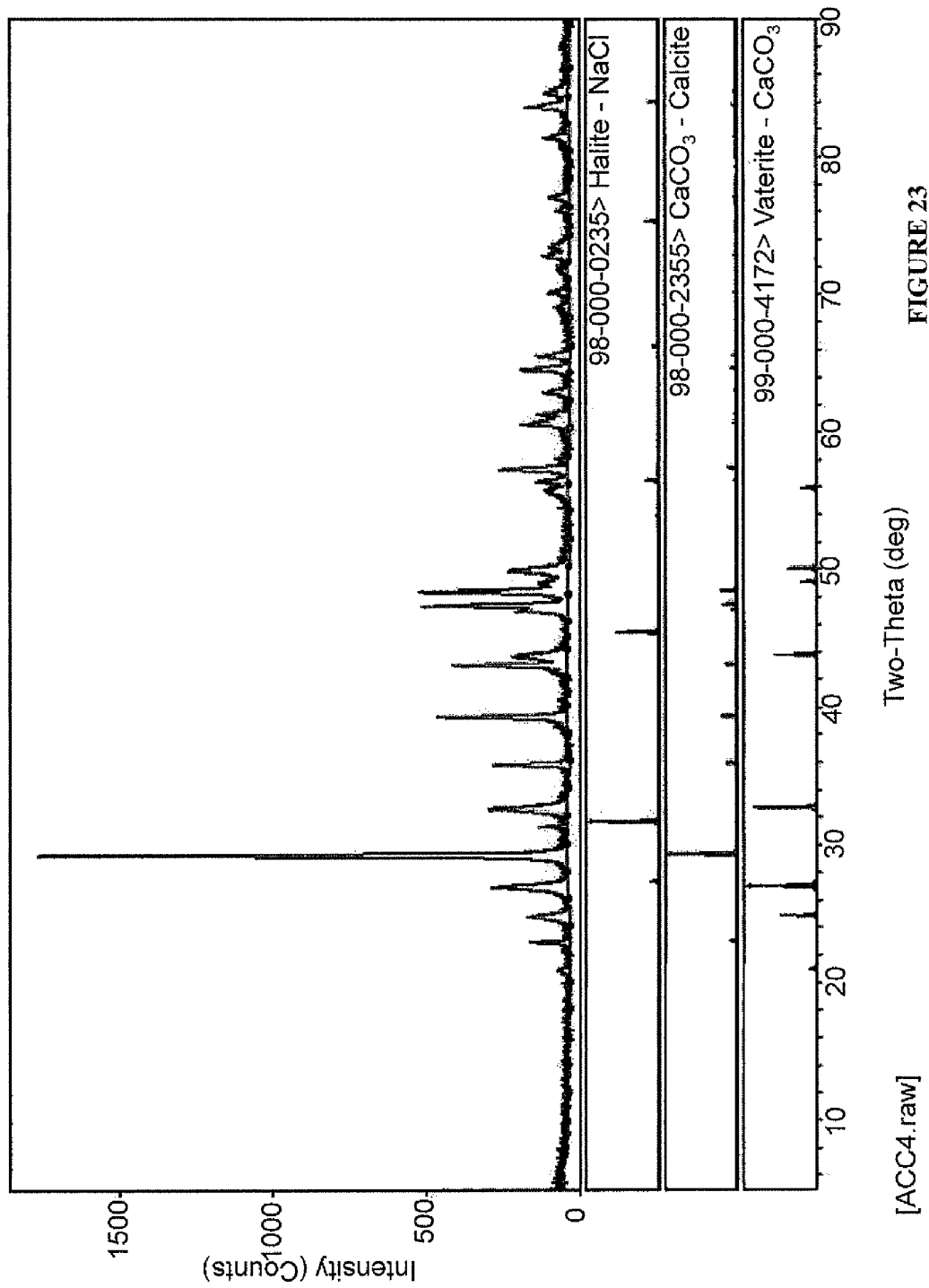
FIG. 23 illustrates XRD of sample created using protocol ACC4. Halite, calcite, and vaterite were present.

Samples from protocols 3 and 4 showed the formation of crystalline calcium carbonates upon analysis. The results of 3 will be discussed in the stability section below. In the sample from 4, calcite, vaterite and halite were present in the sample (FIG. 23). Raman of the double decomposition sample (3, 5) yielded spectra that matched expected literature spectra for ACC.

Stability

The stability of protocols 3, 5, and a mixture of samples produced from protocols 2, 7 (rinsed), 8, and 9 was investigated. As noted above, in protocol 3, the primary calcite peak was visible upon initial analysis. After 4 days, aragonite, calcite, and vaterite, were present.

Figure 24:
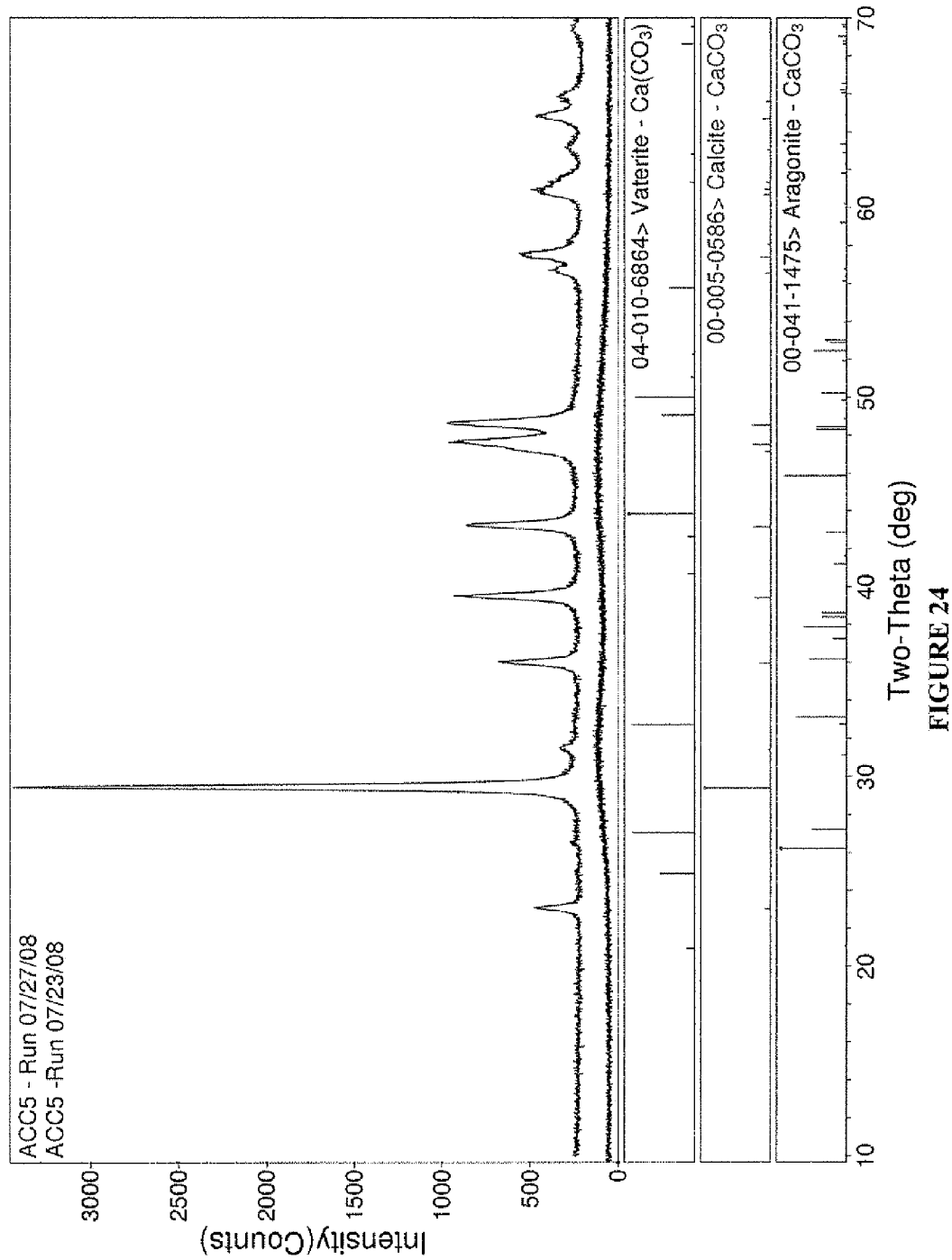
FIG. 24 illustrates ACC5, showing amorphous material when initially analyzed. Subsequent analysis (4 days later) showed crystalline calcite with small amounts of aragonite.

In protocol 5, the initial analysis showed no signs of crystalline material, and after 4 days well formed calcite, with possibly small amounts of aragonite was observed (FIG. 24).

Figure 25:
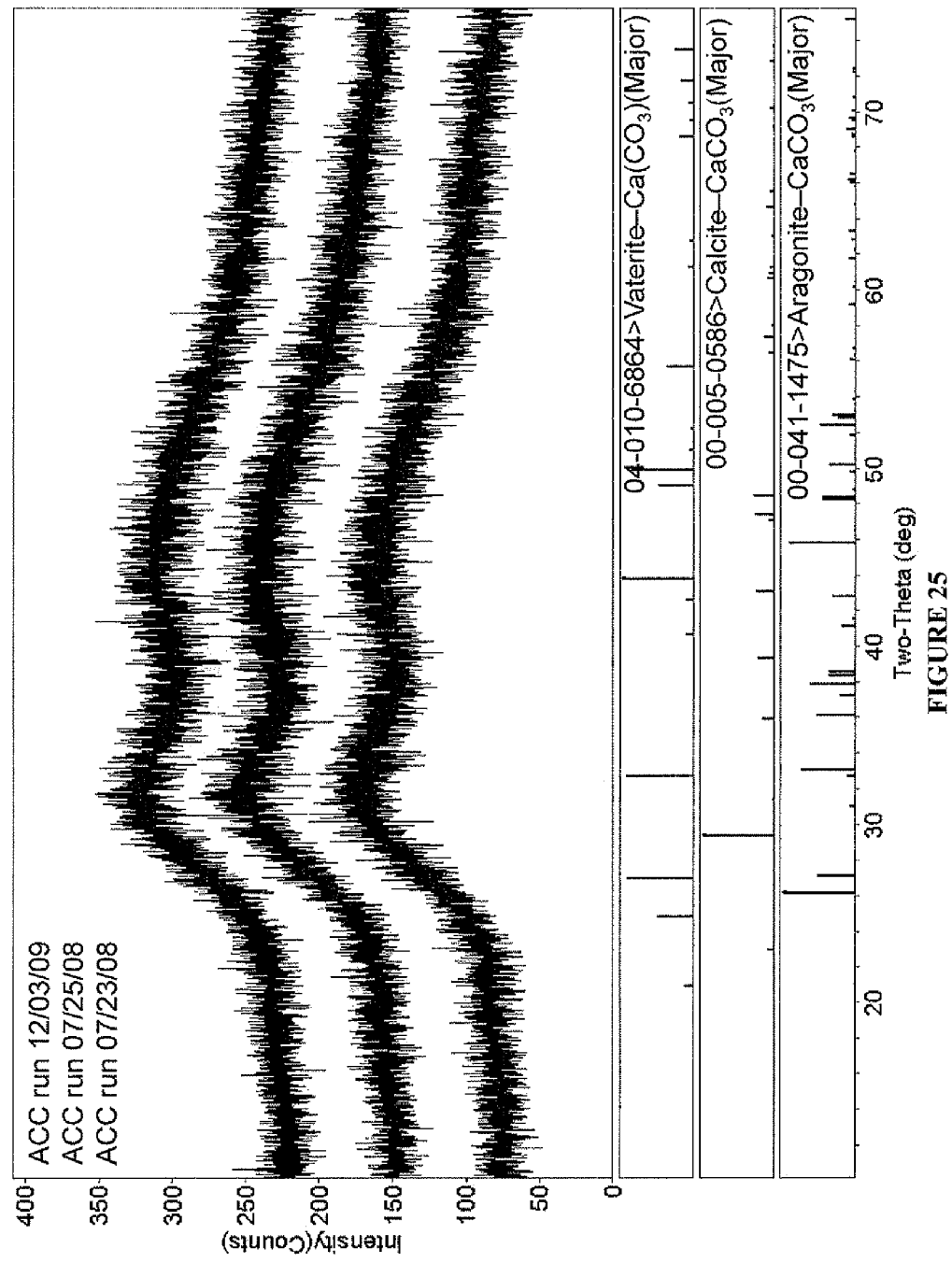
FIG. 25 illustrates blended ACC material analyzed over time. This sample showed long-term stability (~1 and 1/2 years).

Samples 2, 7 (rinsed), 8, and 9 were all synthesized with the same Ca:Mg (with some processing differences) and were blended to create a larger sample. This sample was analyzed over time. The ACC remained stable for over a year in the low humidity conditions (FIG. 25).

Raman of this sample was being run as a comparison to the Raman spectra acquired from the original double decomposition method.

Equal volume of solutions of 0.27 M $MgCl_2.6H_2O$/0.06 M $CaCl_2.2H_2O$/0.54 M $CaCO_3$ seems to be one of the suitable mixture for synthesizing ACC in this study (in terms of yield and stability). It may also be desirable to rinse the precipitates well with first DI water and then with alcohol to wash out any sodium chloride from the precipitate. The stability of the ACC created by this method was greater than that of the other solution ratios tested, being stable for over a year in low humidity conditions. Different synthesis conditions also indicated different crystallization pathways.

Example 10

Vaterite Precipitation Matrices

In this study, an effect of a ratio of Ca:Mg in the precipitation of the cement material from synthetic hard brine was investigated. A 4 L reactor was filled with brine containing a higher concentration of calcium than magnesium (as compared to seawater). A stream of carbon dioxide and compressed air was passed through the solution along with an addition of the base when it resulted in the precipitation of the powdered material. The powdered material was found to contain vaterite and the amount of vaterite obtained was found to be dependent on the ratio of calcium with magnesium. Table 9 demonstrates that the amount of vaterite in the precipitated material increased with increase in the calcium concentration. Therefore, the amount of vaterite in the composition may be modulated by the ratio of Ca:Mg in the solution.

TABLE 9

| XRD | Ca:Mg 4:1 | Ca:Mg 3:1 | Ca:Mg 2:1 |
|---|---|---|---|
| Vaterite | 91% | 20% | — |
| calcite | 8% | 79% | — |
| (MgCa)CO$_3$ | | | 99% |

Example 11

Vaterite Vs. Calcite Precipitation Across a Range of Precipitation Conditions In this study, an effect of precipitation conditions in the precipitation of the cement material from synthetic hard brine was investigated. Solutions containing various concentrations of $Ca^{2+}$ ions (0.01 mol/L, 0.05 mol/L; and 0.10 mol/L) were prepared by adding anhydrous $Na_2CO_3$ or 50% NaOH and $CO_2$ to 0.2 mol/L $Ca^{2+}$ solution. Table 10 shows a summary of the concentrations.

TABLE 10

| Na$_2$CO$_3$ | 50% NaOH | Target [Ca$^{2+}$]$_f$ | [Ca$^{2+}$]$_f$ | pH$_f$ | % C | Yield (g/L) | Total CO$_2$ mineralized (g/L) |
|---|---|---|---|---|---|---|---|
| 42.40 g | — | 0.10 | 0.10 | 7.76 | 9.6 | 14.15 | 4.98 |
| 63.60 g | — | 0.05 | 0.05 | 7.98 | 9.7 | 17.83 | 6.34 |
| 80.56 g | — | 0.01 | 0.014 | 8.35 | 10.4 | 22.47 | 8.57 |
| — | 64 g | 0.10 | 0.11 | 6.66 | 9.9 | 12.53 | 4.55 |
| — | 96 g | 0.05 | 0.04 | 8.35 | 9.9 | 17.40 | 6.32 |
| — | 108.80 g | 0.01 | 0.015 | 7.94 | 10.4 | 19.36 | 7.38 |

Initial Ca$^{2+}$ concentration = 0.2 mol/L for all experiments
Initial and final Mg$^{2+}$ concentrations = 0.04-0.05 mol/L for all experiments
Final alkalinity = 3-9 mmol/kg for all experiments
pH = 8.0-8.5 during base addition The addition of anhydrous $Na_2CO_3$ vs. 50% NaOH and $CO_2$ to the calcium solution resulted in the formation of precipitates with varying vaterite content. Table 11 shows the amount of vaterite formed in the precipitation conditions for three sets of experiments. Higher vaterite content was observed in the precipitate when the solution of 50% NaOH and $CO_2$ was added to the calcium solution.

TABLE 11

| XRD | Experiment 1 Na$_2$CO$_3$ | Experiment 1 50% NaOH and CO$_2$ | Experiment 2 Na$_2$CO$_3$ | Experiment 2 50% NaOH and CO$_2$ | Experiment 3 Na$_2$CO$_3$ | Experiment 3 50% NaOH and CO$_2$ |
|---|---|---|---|---|---|---|
| vaterite | 43% | 85% | 31% | 80% | 32% | 83% |
| calcite | 46% | 8% | 61% | 5% | 65% | 4% |
| aragonite | — | — | — | 12% | — | 9% |
| [Ca$^{2+}$]$_i$ | 0.2 M | 0.2 M | 0.2 M | 0.2 M | 0.2 M | 0.2 M |
| [Ca$^{2+}$]$_f$ | 0.1 M | 0.1 M | 0.05 M | 0.04 M | 0.01 M | 0.01 M |

Example 12

Vaterite Vs. Calcite Precipitation in Old Brine and Fresh Brine

A batch of old brine and fresh brine with varying concentration of $Na_2CO_3$ solution was added to the calcium ion containing solution in a varying duration of times. Old brine was made 6 days before the experiment and was filtered two days before the experiment to remove any precipitated gypsum from the solution. Fresh brine was made one day before the experiments and was filtered on the same day as the experiments. Table 12 shows a summary of the concentrations.

TABLE 12

| Brine type | Na$_2$CO$_3$ | Base duration | pH$_f$ | [Ca$^{2+}$]$_f$ (mol/L) | % C | Yield (g/L) | Total CO$_2$ mineralized (g/L) |
|---|---|---|---|---|---|---|---|
| Old | 50%* | 10 min. | 7.78 | 0.1 | 10.26 | 11.43 | 4.30 |
| fresh | 50%* | 10 min. | 8.03 | 0.1 | 9.69 | 11.05 | 3.93 |
| Old | 25% | 10 min. | 7.67 | 0.1 | 10.50 | 11.23 | 4.32 |
| fresh | 25% | 10 min. | 7.54 | 0.1 | 9.55 | 11.10 | 3.89 |
| Old | 25% | 4 min. | 7.88 | 0.1 | 10.41 | 11.43 | 4.36 |
| fresh | 25% | 4 min. | 7.70 | 0.1 | 10.29 | 11.09 | 4.18 |

Initial Ca$^{2+}$ concentration = 0.2 mol/L for all experiments
Initial and final Mg$^{2+}$ concentrations = 0.04-0.05 mol/L for all experiments
Final alkalinity = 2-5 mmol/kg for all experiments
pH = 8.0-8.5 during base addition
*Na$_2$CO$_3$ is not soluble in solution at 50%

Table 13 shows the amount of vaterite formed in the precipitation conditions for three sets of experiments. Highest vaterite content was observed in the precipitate with 25% $Na_2CO_3$ in old brine with 10 min. base addition. Vaterite content was comparable in Experiment 4.

TABLE 13

| XRD | Experiment 1 50% Na$_2$CO$_3$ in old brine + 10 min addition | Experiment 1 50% Na$_2$CO$_3$ in fresh brine + 10 min addition | Experiment 2 25% Na$_2$CO$_3$ in old brine + 10 min addition | Experiment 2 25% Na$_2$CO$_3$ in fresh brine + 10 min addition | Experiment 3 25% Na$_2$CO$_3$ in old brine + 4 min addition | Experiment 3 25% Na$_2$CO$_3$ in fresh brine + 4 min addition | Experiment 4 50% NaOH + CO$_2$ in fresh brine + 30 min addition | Experiment 4 25% Na$_2$CO$_3$ in old brine + 10 min addition |
|---|---|---|---|---|---|---|---|---|
| vaterite | 86% | 80% | 94% | 86% | 90% | 81% | 94% | 94% |
| calcite | 5% | 16% | 4% | 7% | 6% | 15% | 4% | 4% |
| [Ca$^{2+}$]$_i$ | 0.2 M | 0.2 M | 0.2 M | 0.2 M | 0.2 M | 0.2 M | 0.2 M | 0.2 M |
| [Ca$^{2+}$]$_f$ | 0.1 M | 0.1 M | 0.1 M | 0.1 M | 0.1 M | 0.1 M | 0.1 M | 0.1 M |

Example 13

Zeta Potential Measurement 1.5 g of the vaterite containing compositions were dissolved in 150 g of DI (1% solid slurry). The mixture was stirred and the probes for zeta potential, pH, and temperature were inserted into the mixture. Table 14 shows the particle size (PS), the vaterite and the calcite content, and the zeta potential of the three samples that were tested.

TABLE 14

| Sample | Vaterite | Calcite | Mean PS | pH | Zeta potential |
|---|---|---|---|---|---|
| MC048-09-006 | 83% | 17% | 5.9 μm | 10.3 | 42.7 mV |
| MLPP0023-06-110 | 76% | 24% | 14.2 μm | 10.5 | 12.9 mV |
| MLPP0023-24-032 | 84% | 16% | 7.7 μm | 10.2 | 25.6 mV |

Figure 26A:
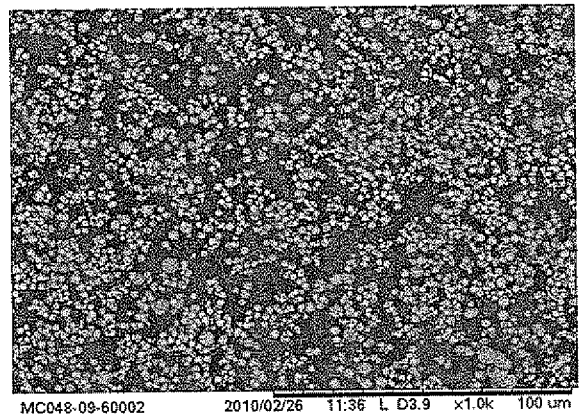
FIGS. 26A-C illustrate the SEM images of three compositions with different dispersions and zeta potentials.
Figure 26B:
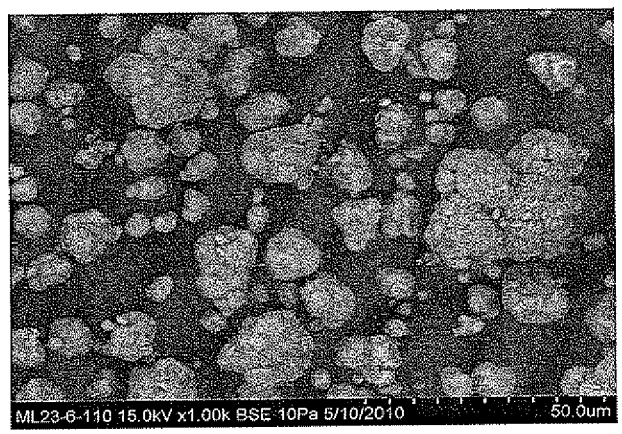
Figure 26C:
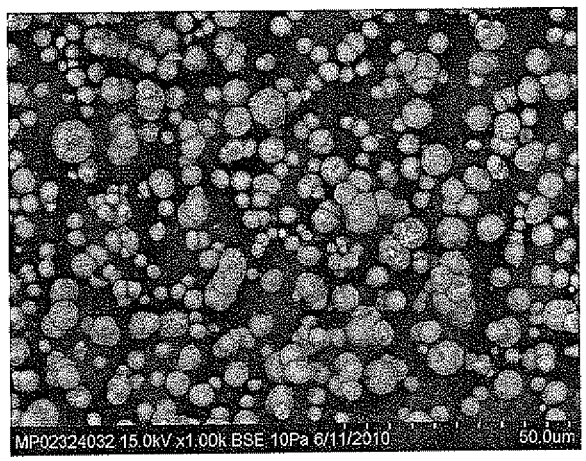
Figure 27:
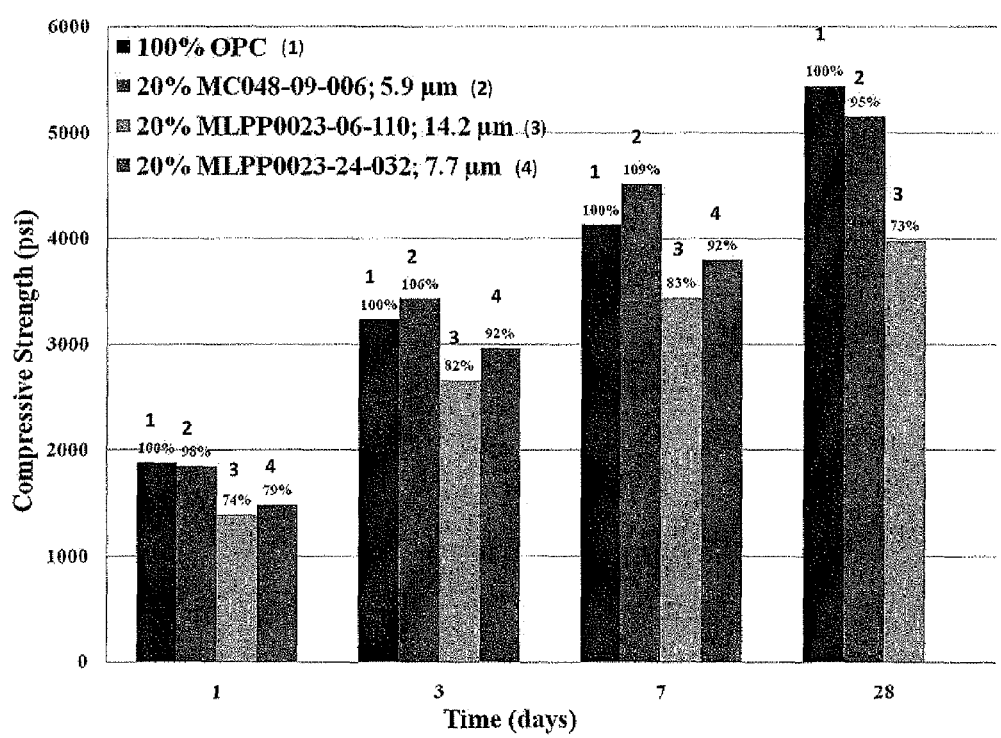
FIG. 27 illustrates the compressive strength of three compositions with different zeta potentials.

FIG. 26 demonstrates that the composition with highest zeta potential had finely dispersed particles (FIG. 26A); the composition with lowest zeta potential had most agglomeration of the particles (FIG. 26B); and the composition with intermediate zeta potential had agglomeration but to a lesser extent (FIG. 26C). The compressive strength of the hardened material also showed a difference in the compressive strength when 20% of the composition was mixed with 80% OPC. FIG. 27 illustrates that the composition with highest zeta potential showed highest compressive strength as compared to the composition with lower zeta potential.

Figure 28:
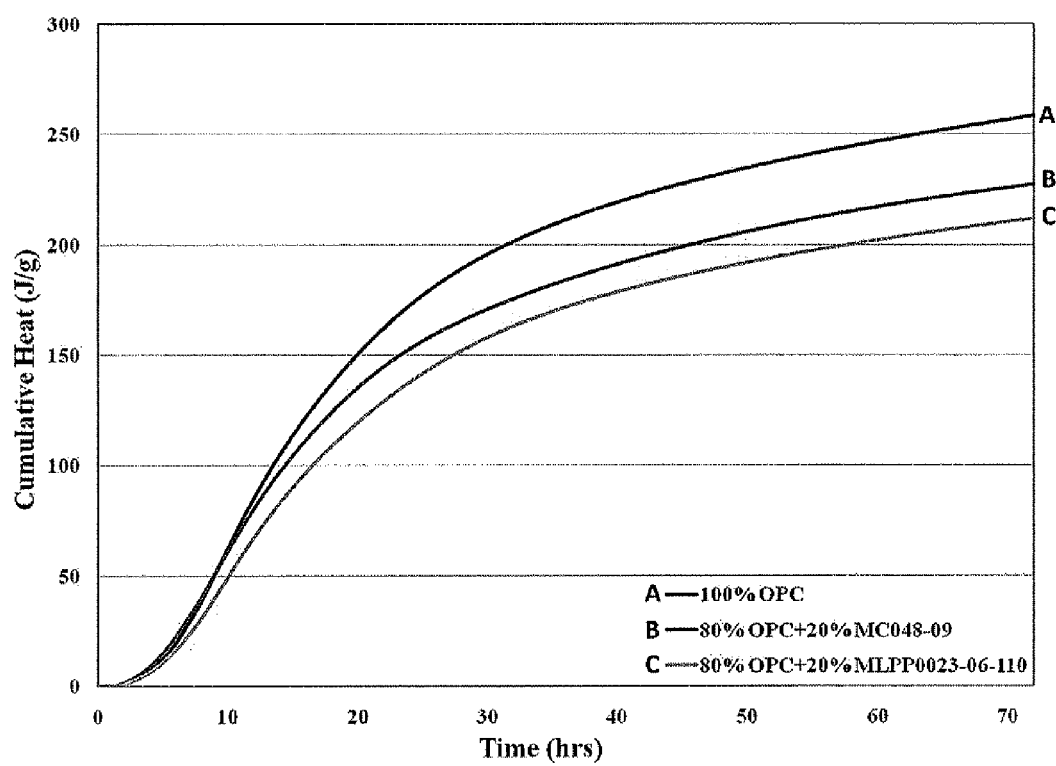
FIG. 28 illustrates the cumulative heat of three compositions with different zeta potentials.

The composition with highest zeta potential and small particle size was also found to have a high cumulative heat indicating higher reactivity (see B in FIG. 28).

Example 14

Brines with Carbonates

In this study, various brines were subjected to different precipitation conditions and the precipitated material was analyzed. The brines included Onondaga brine, seawater based synthetic brine with NaCl (seawater+27.9 g/L CaCl$_2$+99.13 g/L NaCl), seawater based synthetic brine without NaCl (seawater+27.9 g/L CaCl$_2$), and deionized water based synthetic brine (deionized water+29.4 g/L CaCl$_2$). Onandaga brine is a halite brine, with saturation ranging from 45 to 80%, that lies within glacial sediments that fill the Onondaga Trough, a bedrock valley deepened by Pleistocene glaciation near Syracuse, N.Y. State, USA. These brines were treated with 15% CO$_2$+50% wt NaOH, Na$_2$CO$_3$ anhydrous, 50% wt Na$_2$CO$_3$ solution, and 25% wt Na$_2$CO$_3$ solution.

Onondaga brine on treatment with 15% CO$_2$ and 2M NaOH resulted in 91% vaterite in the precipitated material. The initial ratio of Ca:Mg ($[Ca^{2+}]_i:[Mg^{2+}]_i$) was about 4:1. Table 15 shows the concentrations of the initial and final ions in the solution.

TABLE 15

| Onondaga Brine (High Na$^+$) | |
|---|---|
| $[Ca^{2+}]_i$ | 48.63 mM |
| $[Mg^{2+}]_i$ | 10.63 mM |
| $[Ca^{2+}]_f$ | 3.54 mM |
| $[Mg^{2+}]_f$ | 9.37 mM |
| Alk$_f$ | 102.1 mM eq |
| vaterite | 91% |
| calcite | 8% |
| halite | 1% |

Seawater based synthetic brine with NaCl (seawater+27.9 g/L CaCl$_2$+99.13 g/L NaCl) when treated with 15% CO$_2$ and 50% wt NaOH resulted in 96% vaterite content in the precipitated material. The initial ratio of Ca:Mg ($[Ca^{2+}]_i$:$[Mg_{2+}]_i$) was about 4:1. Table 16 shows the concentrations of the initial and final ions in the solution.

TABLE 16

| Synthetic brine (seawater) | |
|---|---|
| $[Ca^{2+}]_i$ | 0.20M |
| $[Mg^{2+}]_i$ | 0.05M |
| $[NaCl]_i$ | 2.1M |
| $[Ca^{2+}]_f$ | 0.10M |
| $[Mg^{2+}]_f$ | 0.05M |
| vaterite | 96% |
| calcite | 3% |
| halite | 1% |

Seawater based synthetic brine with NaCl (seawater+27.9 g/L CaCl$_2$+99.13 g/L NaCl) when treated with Na$_2$CO$_3$ anhydrous resulted in only 43% vaterite content in the precipitated material. The initial ratio of Ca:Mg ($[Ca^{2+}]_i$:$[Mg^{2+}]_i$) was about 4:1. Table 17 shows the concentrations of the initial and final ions in the solution.

TABLE 17

| Synthetic brine (seawater) | |
|---|---|
| $[Ca^{2+}]_i$ | 0.20M |
| $[Mg^{2+}]$i | 0.05M |
| $[NaCl]_i$ | 2.1M |
| $[Ca^{2+}]_f$ | 0.10M |
| $[Mg^{2+}]_f$ | 0.05M |
| Alk$_f$ | 3.4 mM eq |
| vaterite | 43% |
| calcite | 46% |
| halite | 11% |

When seawater based synthetic brine (seawater+27.9 g/L CaCl$_2$+99.13 g/L NaCl) was treated with 50% wt Na$_2$CO$_3$, it resulted in 90% vaterite content in the precipitated material. The vaterite content seemed to increase when the sodium carbonate was not anhydrous. The initial ratio of Ca:Mg ($[Ca^{2+}]_i$:$[Mg^{2+}]_i$) was about 4:1. Table 18 shows the concentrations of the initial and final ions in the solution.

TABLE 18

| Synthetic brine (seawater) | |
|---|---|
| $[Ca^{2+}]_i$ | 0.20M |
| $[Mg^{2+}]_i$ | 0.05M |
| $[NaCl]_i$ | 2.1M |
| $[Ca^{2+}]_f$ | 0.10M |
| $[Mg^{2+}]_f$ | 0.05M |
| Alk$_f$ | 3.3 mM eq |
| vaterite | 90% |
| calcite | 6% |
| halite | 4% |

When seawater based synthetic brine (seawater+27.9 g/L CaCl$_2$+99.13 g/L NaCl) was treated with 25% wt Na$_2$CO$_3$, it resulted in 94% vaterite content in the precipitated material. The vaterite content increased with 25% wt Na$_2$CO$_3$ as compared to 50% wt Na$_2$CO$_3$. This could be due to higher solubility of Na$_2$CO$_3$ in the solution when it is 25% wt Na$_2$CO$_3$. The 50% wt Na$_2$CO$_3$ is sparingly soluble in water. The initial ratio of Ca:Mg ($[Ca^{2+}]_i$:$[Mg^{2+}]_i$) was about 4:1. Table 19 shows the concentrations of the initial and final ions in the solution.

TABLE 19

| Synthetic brine (seawater) | |
|---|---|
| $[Ca^{2+}]_i$ | 0.20M |
| $[Mg^{2+}]_i$ | 0.05M |
| $[NaCl]_i$ | 2.1M |
| $[Ca^{2+}]_f$ | 0.10M |
| $[Mg^{2+}]_f$ | 0.05M |
| $Alk_f$ | 2.3 mM eq |
| vaterite | 94% |
| calcite | 4% |
| halite | 2% |

Seawater based synthetic brine without NaCl (seawater+ 27.9 g/L $CaCl_2$) was treated with 25% wt $Na_2CO_3$, which resulted in 92% vaterite content in the precipitated material. The initial ratio of Ca:Mg ($[Ca^{2+}]_i$:$[Mg^{2+}]_i$) was about 4:1. Table 20 shows the concentrations of the initial and final ions in the solution.

TABLE 20

| Synthetic brine (seawater) | |
|---|---|
| $[Ca^{2+}]_i$ | 0.20M |
| $[Mg^{2+}]_i$ | 0.05M |
| $[NaCl]_i$ | 0.47M |
| $[Ca^{2+}]_f$ | 0.10M |
| $[Mg^{2+}]_f$ | 0.05M |
| $Alk_f$ | — |
| vaterite | 92% |
| calcite | 5% |
| halite | 3% |

Deionized water based synthetic brine (Deionized water+ 29.4 g/L $CaCl_2$) was treated with 25% wt $Na_2CO_3$, which resulted in 90% vaterite content in the precipitated material. The absence of magnesium did not seem to have an effect on the precipitation of vaterite. Table 21 shows the concentrations of the initial and final ions in the solution.

TABLE 21

| Synthetic brine (deionized water) | |
|---|---|
| $[Ca^{2+}]_i$ | 0.20M |
| $[Mg^{2+}]_i$ | — |
| $[NaCl]_i$ | — |
| $[Ca^{2+}]_f$ | 0.10M |
| $[Mg^{2+}]_f$ | — |
| vaterite | 90% |
| calcite | 5% |
| amorphous | 5% |

Example 15

Brines with Carbonates

In this study, an effect of a ratio of calcium with the base in the formation of the carbonate precipitate is studied. Various concentrations of brine containing 0.2 M $Ca^{2+}$ were treated with different concentrations of sodium carbonate.

Table 22 illustrates the formation of vaterite compositions from synthetic brine (tap water+29.4 g/L $CaCl_2$) (0M NaCl+ 0.2M $Ca^{2+}$) with calcium:base stiochiometric ratio of 1:1.

TABLE 22

| | $[Na_2CO_3]$ | Liquid residence time | $Na_2CO_3$ flow rate (mL/min) | $CaCl_2$ flow rate (mL/min) | Yield (g/L) | $Ca^{2+}_f$ (mM) | $Alk_f$ (mM eq) | PSA (μm) | XRD |
|---|---|---|---|---|---|---|---|---|---|
| Sample 1 | 0.25 M | 10 min | 44.4 | 55.6 | — | 0.10 | 25.63 | Median 26.81 Mean 27.25 | 94.6% vaterite 5.4% calcite |
| Sample 2 | 0.25 M | 10 min | 44.4 | 55.6 | ~10.28 | 1.36 | 11.40 | Median 27.39 Mean 28.01 | 90% vaterite 10% calcite |
| Sample 3 | 0.25 M | 10 min | 44.4 | 55.6 | ~10.14 | | 7.45 | Median 31.28 Mean 32.17 | 95.2% vaterite 3.5% calcite |
| Sample 4 | 0.25 M | 10 min | 28.6 | 71.4 | ~13.52 | | 14.89 | Median 24.35 Mean 23.52 | 96.9% vaterite 3.1% calcite |

Table 23 illustrates the formation of vaterite compositions from synthetic brine (tap water+29.4 g/L $CaCl_2$) (0M NaCl+ 0.2M $Ca^{2+}$) with calcium:base stiochiometric ratio of 1.5:1.

TABLE 23

| | $[Na_2CO_3]$ | Liquid residence time | $Na_2CO_3$ flow rate (mL/min) | $CaCl_2$ flow rate (mL/min) | Yield (g/L) | $Ca^{2+}_f$ (mM) | $Alk_f$ (mM eq) | PSA (μm) | XRD |
|---|---|---|---|---|---|---|---|---|---|
| Sample 1 | 0.5 M | 20 min | 10.5 | 39.5 | — | 19.96 | 4.40 | Median 21.49 Mean 22.36 | 85.9% vaterite 14.1% calcite |
| Sample 2 | 0.25 M | 5 min | 69.6 | 130.4 | ~8.84 | | 4.40 | Median 17.71 Mean 18.50 | 93.1% vaterite 6.9% calcite |

TABLE 23-continued

| | [Na$_2$CO$_3$] | Liquid residence time | Na$_2$CO$_3$ flow rate (mL/min) | CaCl$_2$ flow rate (mL/min) | Yield (g/L) | Ca$^{2+}_f$ (mM) | Alk$_f$ (mM eq) | PSA (μm) | XRD |
|---|---|---|---|---|---|---|---|---|---|
| Sample 3 | 0.25 M | 5 min | 69.6 | 130.4 | ~8.92 | 33.92 | 4.03 | Median 18.00 Mean 18.84 | 85.9% vaterite 14.1% calcite |
| Sample 4 | 0.25 M | 5 min | 69.6 | 130.4 | ~9.07 | 32.92 | 4.67 | Median 17.65 Mean 18.44 | 91.9% vaterite 8.1% calcite |

Table 24 illustrates the formation of vaterite compositions from synthetic brine (tap water+29.4 g/L CaCl$_2$) (0M NaCl+ 0.2M Ca$^{2+}$) with calcium:base stiochiometric ratio of 2:1.

TABLE 24

| | [Na$_2$CO$_3$] | Liquid residence time | Na$_2$CO$_3$ flow rate (mL/min) | CaCl$_2$ flow rate (mL/min) | Yield (g/L) | Ca$^{2+}_f$ (mM) | Alk$_f$ (mM eq) | PSA (μm) | XRD |
|---|---|---|---|---|---|---|---|---|---|
| Sample 1 | 0.25 M | 5 min | 57.1 | 142.9 | — | 78.22 | 3.70 | Median 11.06 Mean 11.53 | 96.8% vaterite 3.2% calcite |
| Sample 2 | 0.25 M | 5 min | 57.1 | 142.9 | ~7.21 | 61.72 | 1.51 | Median 14.03 Mean 14.60 | 94.6% vaterite 5.4% calcite |
| Sample 3 | 0.25 M | 5 min | 57.1 | 142.9 | ~7.29 | 63.40 | 4.01 | Median 12.07 Mean 12.55 | 91.6% vaterite 8.4% calcite |

Table 25 illustrates the formation of vaterite composition from synthetic brine (tap water+29.4 g/L CaCl$_2$) (0.6M NaCl+0.2M Ca$^{2+}$) with calcium:base stiochiometric ratio of 1:1.

TABLE 25

| [Na$_2$CO$_3$] | Liquid residence time | Na$_2$CO$_3$ flow rate (mL/min) | CaCl$_2$ flow rate (mL/min) | Yield (g/L) | Ca$^{2+}_f$ (mmol/L) | Alk$_f$ (mmol/Kg) | XRD |
|---|---|---|---|---|---|---|---|
| 0.25 M | 20 min | 22.2 | 27.8 | ~9.78 | 0.14 | 19.51 | 95.5% vaterite 4.5% calcite |

Table 26 illustrates the formation of vaterite composition from synthetic brine (tap water+29.4 g/L CaCl$_2$+35.06 g/L NaCl) (0.6M NaCl+0.2M Ca$^{2+}$) with calcium:base stiochiometric ratio of 1.5:1.

TABLE 26

| | [Na$_2$CO$_3$] | Liquid residence time | Na$_2$CO$_3$ flow rate (mL/min) | CaCl$_2$ flow rate (mL/min) | Yield (g/L) | Ca$^{2+}_f$ (mmol/L) | Alk$_f$ (mmol/Kg) | XRD |
|---|---|---|---|---|---|---|---|---|
| Sample 1 | 0.25 M | 10 min | 34.8 | 65.2 | ~6.89 | 52.26 | 3.84 | 93.7% vaterite 6.2% calcite |
| Sample 2 | 0.5 M | 20 min | 10.5 | 39.5 | ~11.24 | | 3.66 | 95.2% vaterite 4.8% calcite |

Table 27 illustrates the formation of vaterite composition from synthetic brine (tap water+29.4 g/L CaCl$_2$+35.06 g/L NaCl) (0.6M NaCl+0.2M Ca$^{2+}$) with calcium:base stiochiometric ratio of 2:1.

TABLE 27

| [Na$_2$CO$_3$] | Liquid residence time | Na$_2$CO$_3$ flow rate (mL/min) | CaCl$_2$ flow rate (mL/min) | Yield (g/L) | Ca$^{2+}_f$ (mmol/L) | Alk$_f$ (mmol/Kg) | XRD |
|---|---|---|---|---|---|---|---|
| 0.5 M | 5 min | 33.3 | 166.7 | ~8.80 | 68.02 | 4.44 | 95.5% vaterite 4.5% calcite |

Table 28 illustrates the formation of vaterite composition from synthetic brine (2.1M NaCl+0.2M Ca$^{2+}$) with calcium: base stiochiometric ratio of 1:1.

TABLE 28

| [Na$_2$CO$_3$] | Liquid residence time | Na$_2$CO$_3$ flow rate (mL/min) | CaCl$_2$ flow rate (mL/min) | Yield (g/L) | Ca$^{2+}{}_f$ (mmol/L) | Alk$_f$ (mmol/Kg) | XRD |
|---|---|---|---|---|---|---|---|
| 0.5 M | 5 min | 57.1 | 142.9 | ~13.45 | 0.20 | 24.09 | 81.9% vaterite 14.8% calcite 3.3% halite |

Table 29 illustrates the formation of vaterite composition from synthetic brine (2.1M NaCl+0.2M Ca$^{2+}$) with calcium:base stiochiometric ratio of 1.5:1.

TABLE 29

| [Na$_2$CO$_3$] | Liquid residence time | Na$_2$CO$_3$ flow rate (mL/min) | CaCl$_2$ flow rate (mL/min) | Yield (g/L) | Ca$^{2+}{}_f$ (mmol/L) | Alk$_f$ (mmol/Kg) | XRD |
|---|---|---|---|---|---|---|---|
| 0.25 M | 5 min | 69.6 | 130.4 | ~9.63 | 24.58 | 4 | 95.5% vaterite 4.5% calcite |

Table 30 illustrates the formation of vaterite composition from synthetic brine (tap water+29.4 g/L CaCl$_2$+122.72 g/L NaCl) (2.1M NaCl+0.2M Ca$^{2+}$) with calcium:base stiochiometric ratio of 2:1.

TABLE 30

| | [Na$_2$CO$_3$] | Liquid residence time | Na$_2$CO$_3$ flow rate (mL/min) | CaCl$_2$ flow rate (mL/min) | Yield (g/L) | Ca$^{2+}{}_f$ (mmol/L) | Alk$_f$ (mmol/Kg) | XRD |
|---|---|---|---|---|---|---|---|---|
| Sample 1 | 0.25 M | 20 min | 14.3 | 35.7 | ~8.03 | 48.02 | 4.12 | 76.3% vaterite 22.7% calcite 1% halite |
| Sample 2 | 0.5 M | 10 min | 16.7 | 83.3 | ~8.95 | 60.06 | 3.60 | 92.8% vaterite 5% calcite 2.2% halite |

Example 16

Stability of Vaterite Compositions

Figure 29:
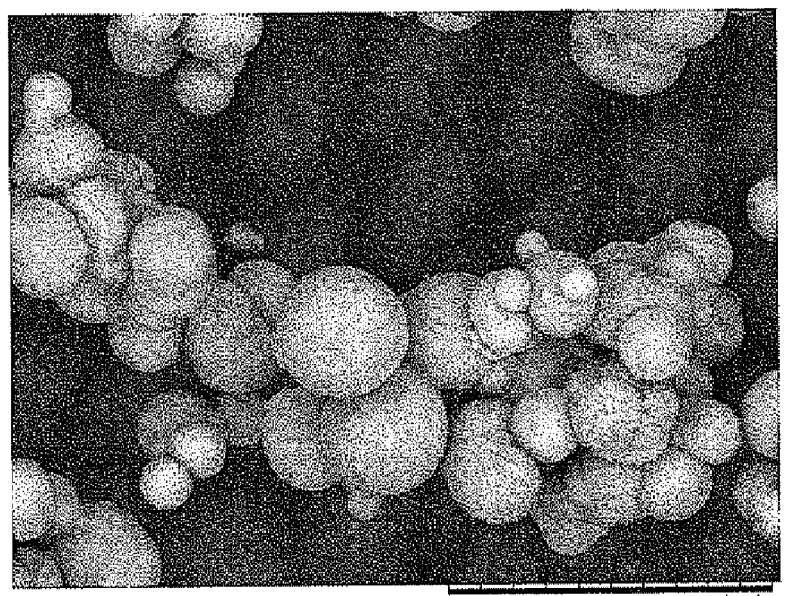
FIG. 29 illustrates the stability of vaterite composition in the mother supernate when made from seawater+$CaCl_2$ dihydrate+NaCl+25% wt $Na_2CO_3$.

Vaterite composition made from seawater+CaCl$_2$ dihydrate+NaCl+25% wt Na$_2$CO$_3$ was found to be stable over a period of 4 days (as shown in Table 31 and FIG. 29) in the mother supernate.

TABLE 31

| Day 1 | Day 3 | Day 4 |
|---|---|---|
| Vaterite 69% | Vaterite 65% | Vaterite 65% |
| Calcite 29% | Calcite 30% | Calcite 31% |
| Halite 2% | Halite 4% | Halite 4% |

Example 17

Stability of Vaterite Compositions

Figure 30A:
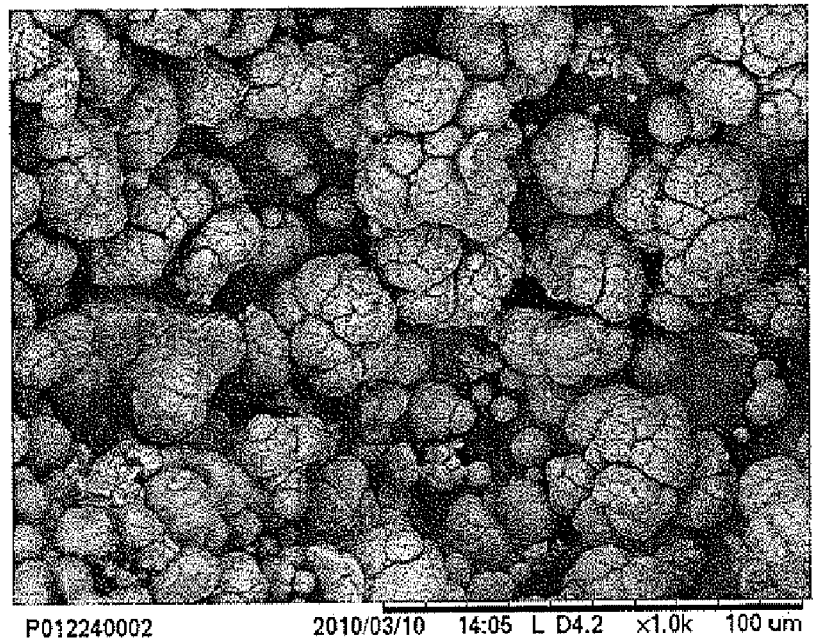
FIGS. 30A-D illustrate the stability of vaterite composition when made from tap water+$CaCl_2$ dihydrate+0.25 M $Na_2CO_3$ (Ca:base stiochiometric ratio of 1:1).
Figure 30B:
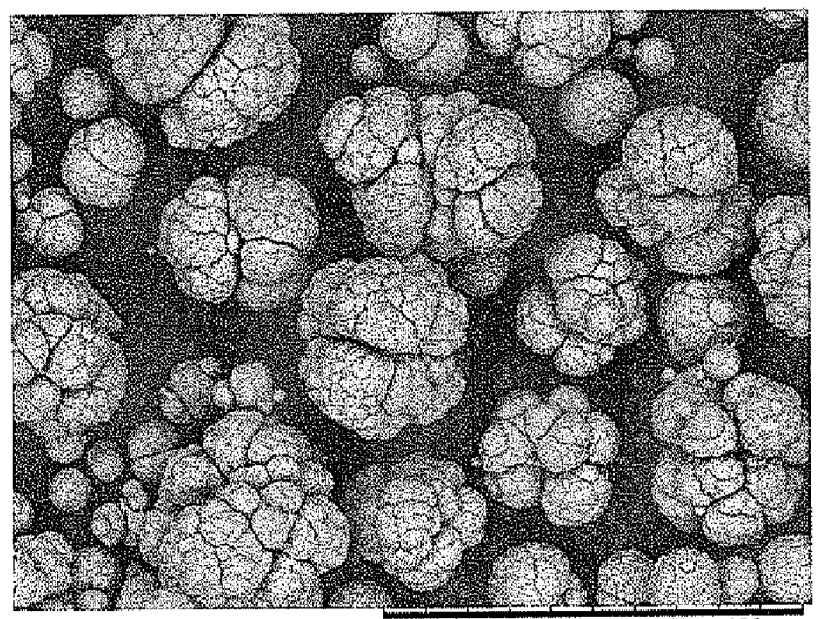
Figure 30C:
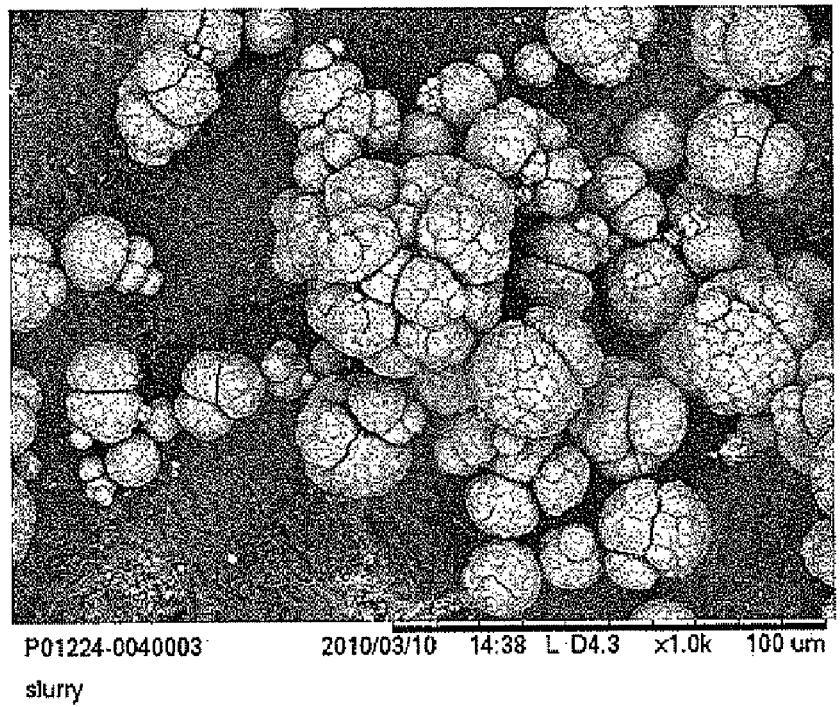
Figure 30D:
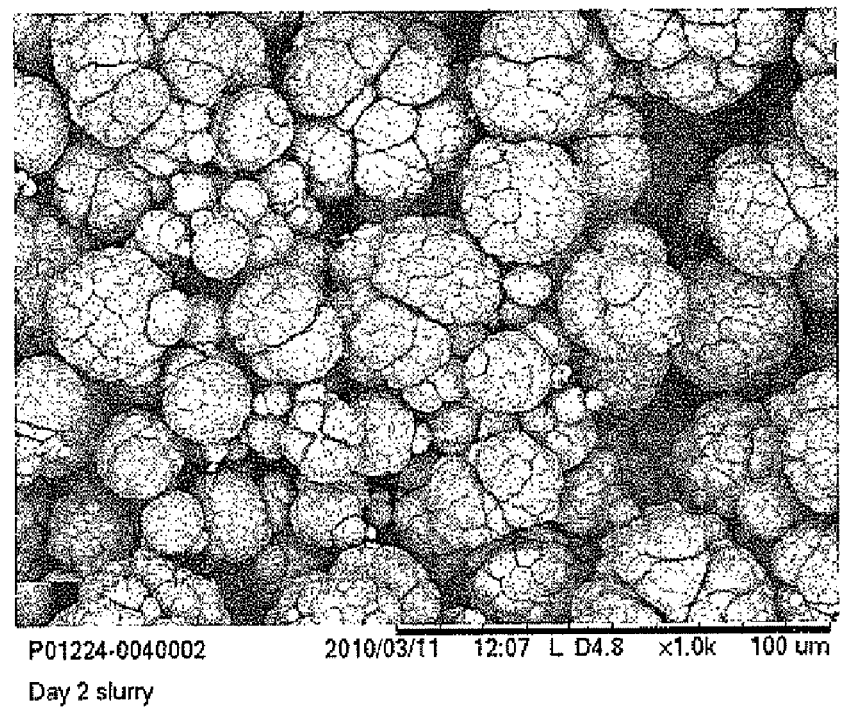

In this study, an effect of a ratio of calcium with the base on the stability of the vaterite composition was studied. Vaterite composition made from tap water+CaCl$_2$ dihydrate+0.25M Na$_2$CO$_3$ (Ca:base stiochiometric ratio of 1:1) was found to be stable over a period of 2 days (as shown in FIG. 30 (FIG. 30A for solid obtained after dewatering but before oven drying; FIG. 30B for solid obtained after dewatering and after oven drying; FIG. 30C for slurry as is from precipitation of the composition after day 1; and FIG. 30D for slurry as is from precipitation of the composition after day 2)) in the mother supernate.

Figure 31A:
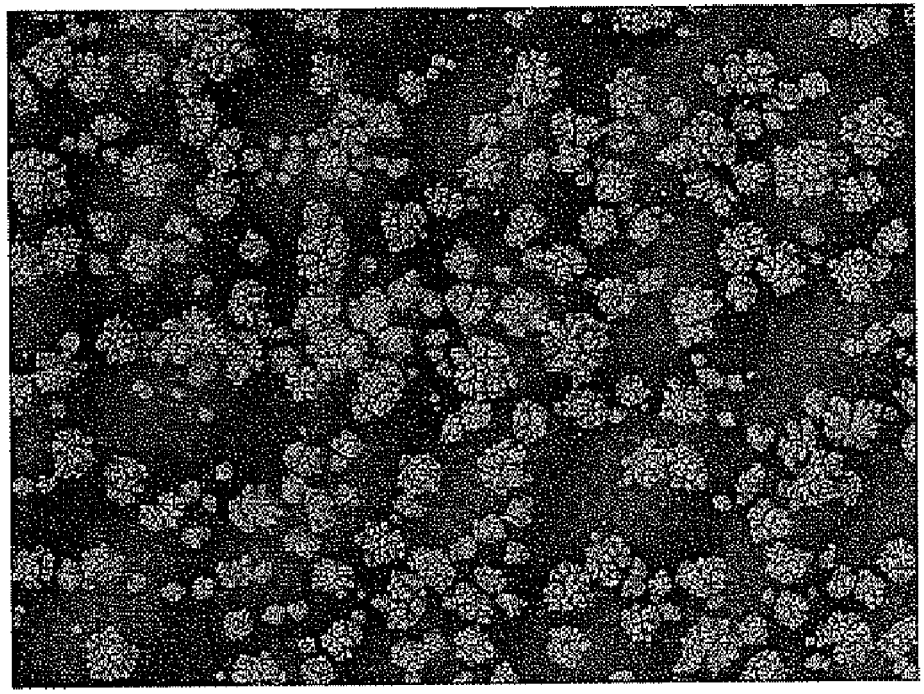
FIGS. 31A-D illustrate the stability of vaterite composition when made from tap water+$CaCl_2$ dihydrate+0.25 M $Na_2CO_3$ (Ca:base stiochiometric ratio of 1.5:1).
Figure 31B:
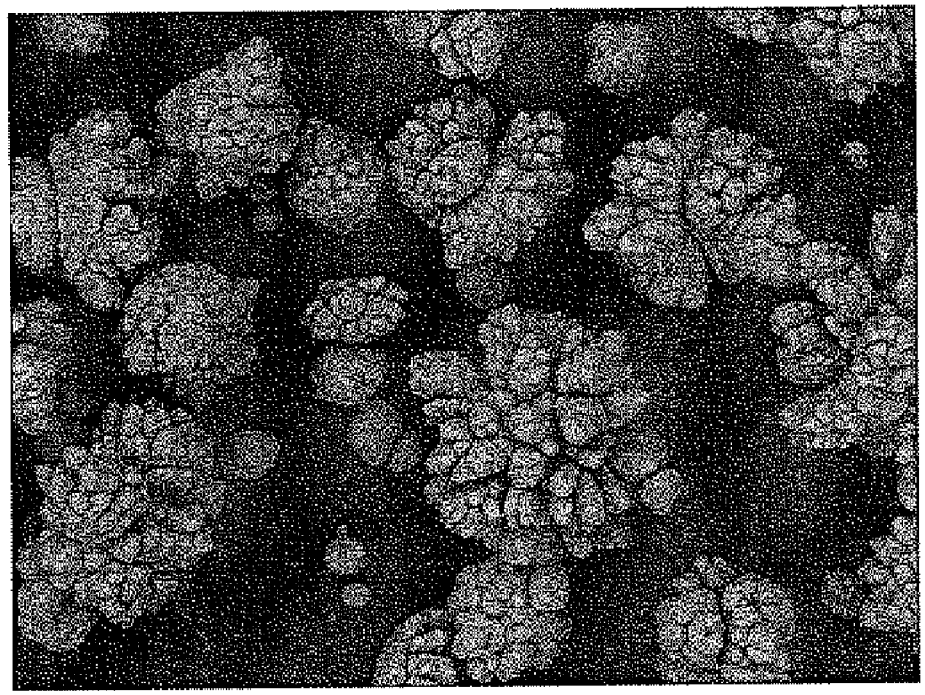
Figure 31C:
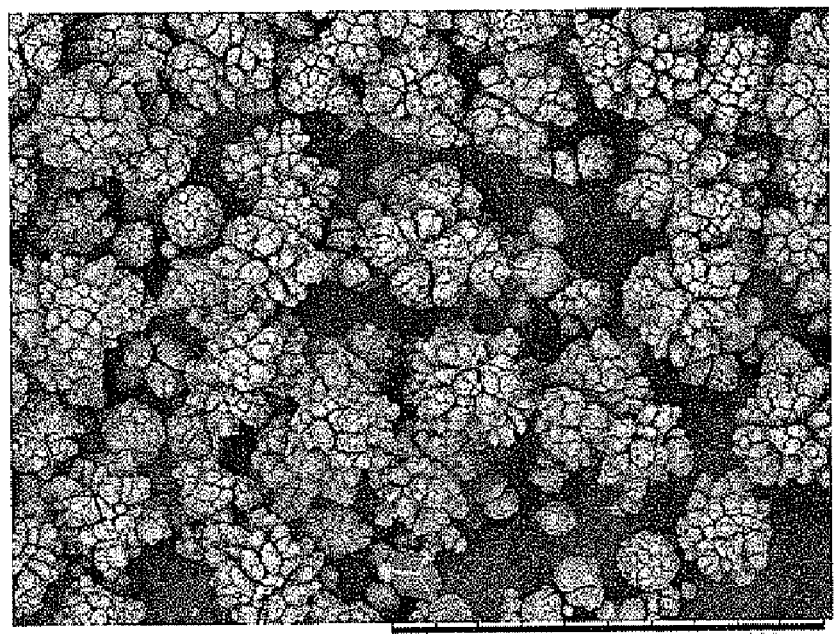
Figure 31D:
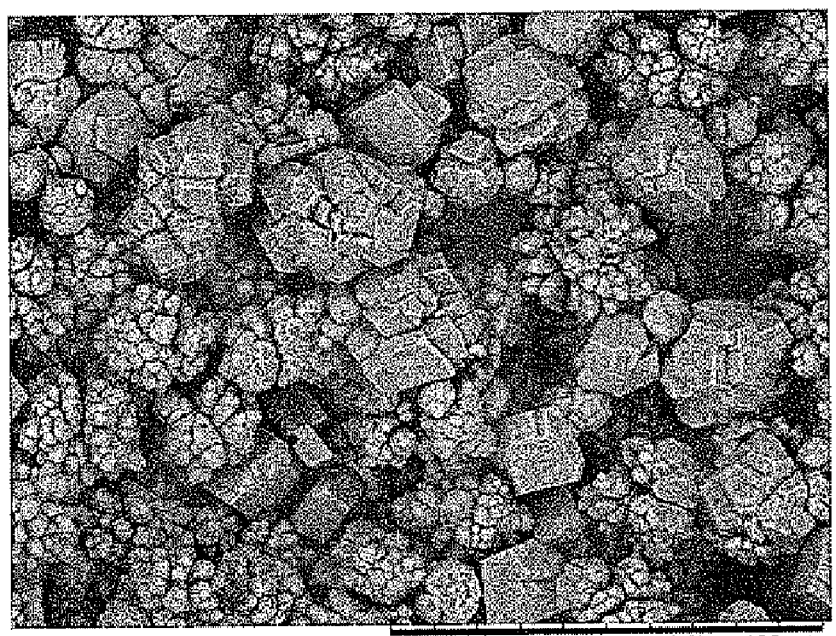

Vaterite composition made from tap water+CaCl$_2$ dihydrate+0.25M Na$_2$CO$_3$ (Ca:base stiochiometric ratio of 1.5:1) was found to show some transformation to calcite over a period of 2 days (as shown in FIG. 31 (FIG. 31A for solid obtained after dewatering but before oven drying; FIG. 31B for solid obtained after dewatering and after oven drying; FIG. 31C for slurry as is from precipitation of the composition after day 1; and FIG. 31D for slurry as is from precipitation of the composition after day 2)) in the mother supernate.

Figure 32A:
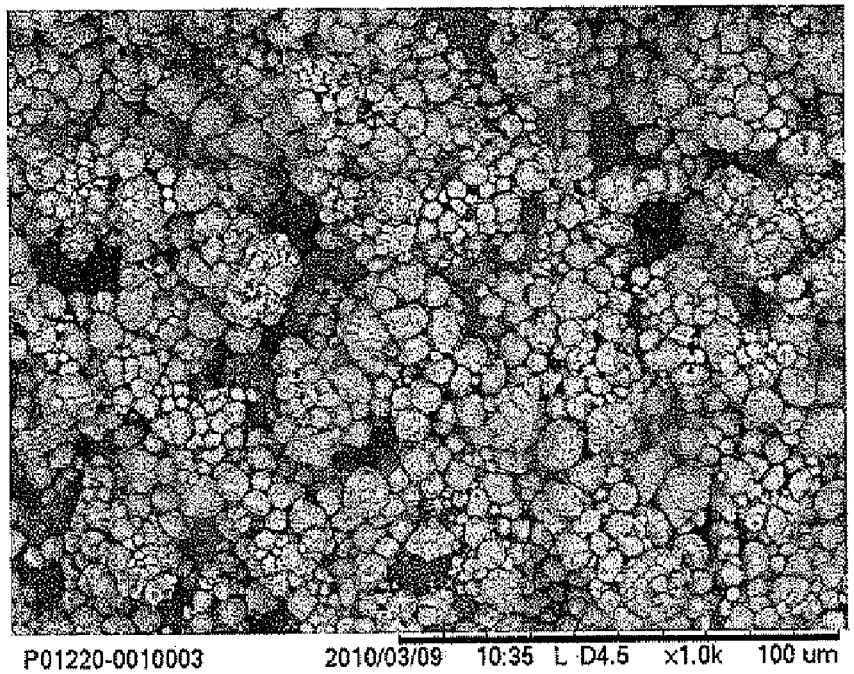
FIGS. 32A-D illustrate the stability of vaterite composition when made from tap water+$CaCl_2$ dihydrate+0.25 M $Na_2CO_3$ (Ca:base stiochiometric ratio of 2:1).
Figure 32B:
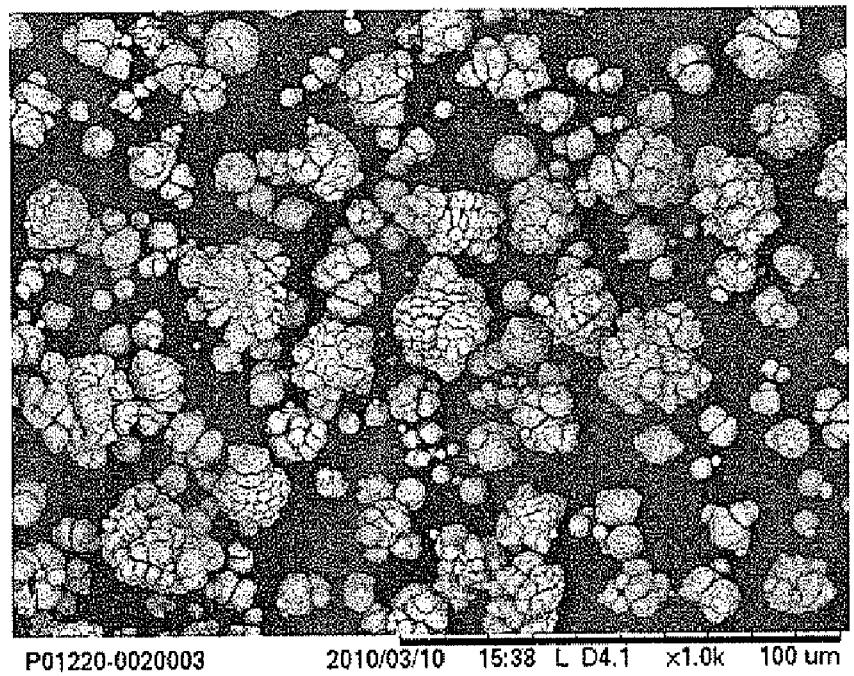
Figure 32C:
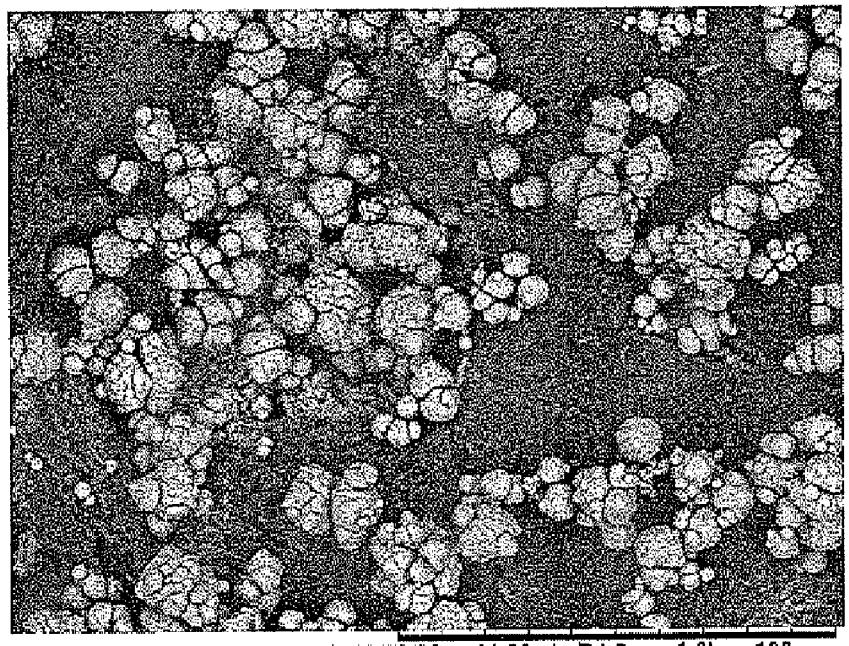
Figure 32D:
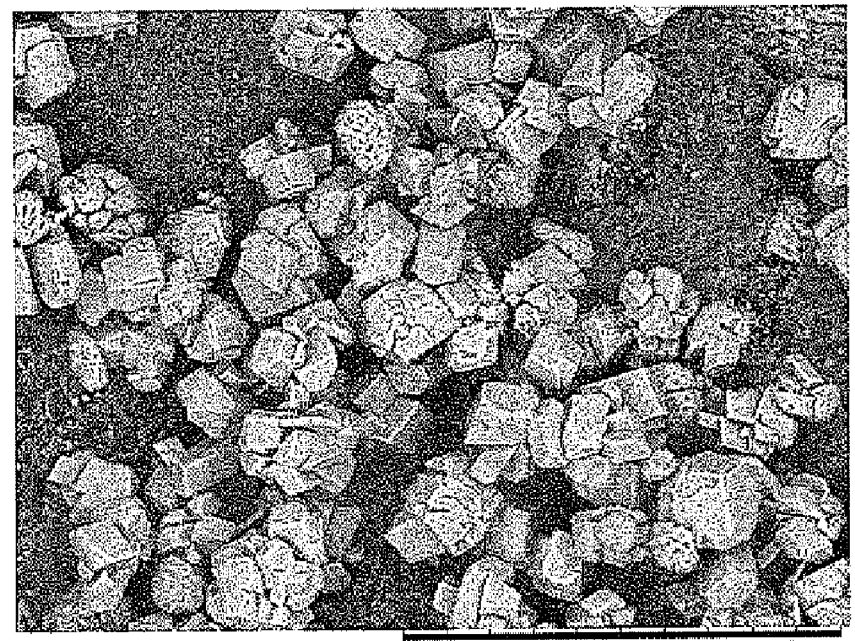

Vaterite composition made from tap water+CaCl$_2$ dihydrate+0.25M Na$_2$CO$_3$ (Ca:base stiochiometric ratio of 2:1) was found to show almost complete transformation to calcite over a period of 2 days (as shown in FIG. 32 (FIG. 32A for solid obtained after dewatering but before oven drying; FIG. 32B for solid obtained after dewatering and after oven drying; FIG. 32C for slurry as is from precipitation of the composition after day 1; and FIG. 32D for slurry as is from precipitation of the composition after day 2)) in the mother supernate.

Example 18

Stability of Vaterite Compositions

Vaterite composition made from deionized water+CaCl$_2$ dihydrate+25% wt Na$_2$CO$_3$ was found to show some transformation to calcite overnight. The precipitate filtered and oven dried on day 1 contained 87% vaterite, 6% calcite, and 8% ACC. Vaterite showed no agglomeration on day 1. The precipitate that settled overnight was filtered and oven dried the next day. The composition contained 52% vaterite and 48% calcite.

Example 19

Stability of Vaterite Compositions

Vaterite composition made from seawater based brine was left in the mother supernate for 7 days. After 7 days, the precipitate showed 87.4% vaterite, 7% calcite, and 5.6% aragonite. Vaterite composition made from seawater based brine was dewatered and was left into process water for 7 days. The precipitate transformed into calcite over 7 days.

Example 20

Synthesis of Self-Cementing Precipitate

Figure 33:
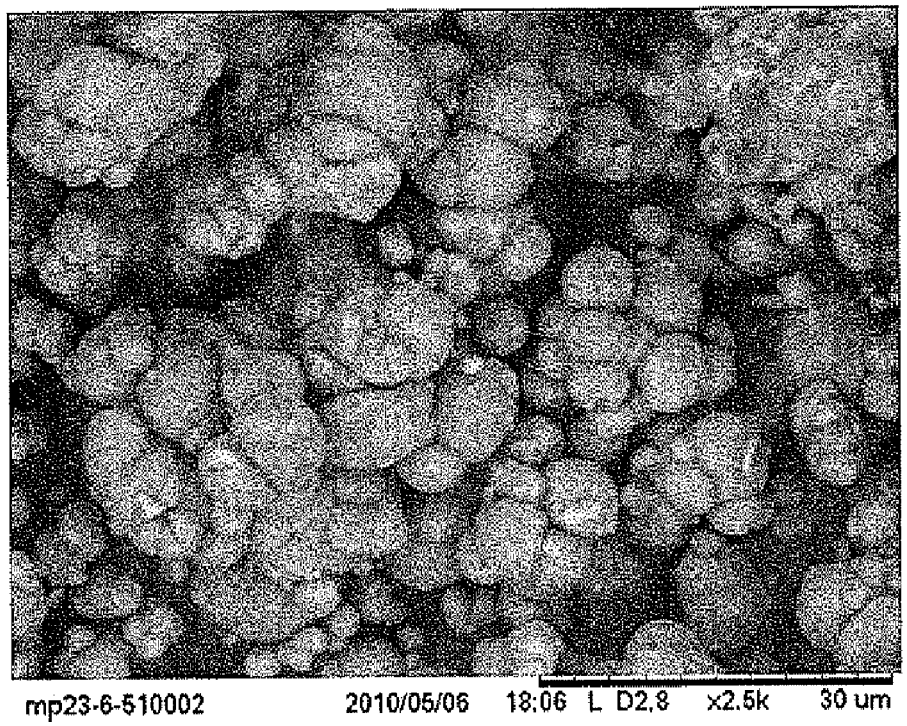
FIG. 33 illustrates the SEM image of the precipitated slurry of Example 20.

This experiment is related to the synthesis and analysis of the self-cementing calcium carbonate precipitate. The self-cementing calcium carbonate precipitate was prepared by the following conditions:
Alkalinity: 0.5 M NaOH (520 mmol/Kg titrated)
Flue Gas: Average of 145 acfm at 9.0-9.3% $CO_2$ (from propane)
Brine: 0.18M Ca; 0.048 M Mg; pH 7.6 (Seawater based brine)
Flowrates: 4.6 GPM Base, 9.0 GPM Brine
Precipitation Tank Residence Time: ~5 minutes
The measured values from the run were as follows:
Base Utilization: 1.2 (CEMS/Venturi calculated)
Absorber Outlet BiC/Carb: 1.03 (titrated as >100% $Na_2CO_3$)
Average % $CO_2$ absorbed: 36% (5.8 moles/min)
pH absorber: 11.1-11.5
pH precipitation tank: 7.6-8.5
Supernate Ca, Mg=0.034, 0.027 M The reactants after mixing under above specified conditions resulted in the formation of a precipitate. The precipitated slurry was analyzed for the particle size and for polymorph content. The particle size of the precipitate was analyzed using laser scattering particle size distribution analyzer and was found to be 24 microns. FIG. 33 illustrates the SEM image of the precipitate showing the clusters of vaterite. The XRD pattern of the precipitate showed 82% vaterite and 18% calcite. The coulometry showed carbon to be 11.1% and $CO_3$ to be 40.8%. The chloride was found to be 0%. Following was the elemental analysis of the precipitated slurry.

| Element | Concentration |
| --- | --- |
| $Na_2O$ | 0.2105% |
| MgO | 0.2793% |
| $Al_2O_3$ | 0.0381% |
| $SiO_2$ | 0.1489% |
| $P_2O_5$ | 39.9 ppm |
| $SO_3$ | 0.16724% |
| Cl | 0.5246% |
| $K_2O$ | 0.01% |
| CaO | 54.46% |
| $TiO_2$ | 0.00% |
| Cr | 0.00 ppm |
| MnO | [0.00029]% |
| $Fe_2O_3$ | 0.00494% |
| Zn | 0.8 ppm |
| As | 0.00 ppm |
| Se | 0.00 ppm |
| Br | [0.000124]% |
| Rb | [0.30] ppm |
| Sr | 1099.8 ppm |
| Y | [0.30] ppm |
| Zr | 5.8 ppm |

The precipitated slurry after dewatering and washing with fresh water resulted in a material that set over a few days. This material was oven dried at 40° C. which after drying showed 63% vaterite, 11% calcite, and 26% aragonite.

The material was then placed in a moist 60° C. curing chamber with 50% humidity which resulted in the cemented material with 73% aragonite, 15% calcite, 10% vaterite, and 2% halite. It is contemplated that the heat and the moisture transformed the vaterite to aragonite to result in cementation.

Example 21

Synthesis of Cement Material

The vaterite compositions were precipitated, dewatered and dried based on the protocols described above. The composition obtained was dried to form a flowable and dry powder (<5% RH (relative humidity)). The composition was mixed at 0.3 liquid to powder ratio with water. It is contemplated that lower water inclusion provides higher strength of the material formed. The composition could be reconstituted to form paste, which were then molded and poured to cure and form a hardened cementitious mass.

The compositions were blended with deionized water (sample 1), tap water (sample 2), as well as a mix of ionic water composed of 5 ppm iron and 0.1M $NaHCO_3$ (sample 3). The sample 1 showed 89.8% vaterite, 3.4% aragonite and 6.8% calcite before blending with DI water. The sample 1 showed 4% vaterite, 72.8% aragonite and 3.5% calcite after blending with DI water and 28 days of curing. The sample 2 showed 89.8% vaterite, 3.4% aragonite and 6.8% calcite before blending with tap mix. The sample 2 showed 2.7% vaterite, 91.3% aragonite, 5.3% calcite, and 0.7% halite after blending with tap mix and 28 days of curing. The sample 3 showed 89.8% vaterite, 3.4% aragonite and 6.8% calcite before blending with ionic mix. The sample 3 showed 3.4% vaterite, 76.6% aragonite, and 3.8% calcite after blending with ionic mix and 28 days of curing. Strength results at 7, 14, 28 and 56 days are corresponding to Table 32 below.

TABLE 32

| | | 7 day (psi) | 14 day (psi) | 28 day (psi) | 56 day (psi) |
| --- | --- | --- | --- | --- | --- |
| Sample 1 | DI Mix, DI Bath | 3200 | 3590 | 3870 | 4200 |
| Sample 2 | Tap Mix, Tap Bath | 2860 | 4090 | 4420 | 3860 |
| Sample 3 | Ionic Mix, Tap Bath | 3330 | 4160 | 4530 | 4340 |

Example 22

Performance Tests

The composition containing 20% SCM composition of the invention (prepared in accordance with example 8 described above and containing 83% vaterite and 17% calcite) and 80% OPC was subjected to various performance tests based on ASTM C 1157. Table 33 summarizes the tests and the results. The performance test results, of 20% SCM of the invention mixed with 80% OPC, were found to be comparable to 100% OPC.

TABLE 33

| Test | 20% SCM of the invention + 80% OPC | 100% OPC |
|---|---|---|
| Blaine fineness (ASTM C 204) | 599 m²/Kg | 456 m²/Kg |
| Air content of hydraulic cement mortar (ASTM C 185) | 21.7% | 23.1% |
| Heat of hydration (isothermal calorimetry) at 3-day | 88% of OPC | |
| Consistency (ASTM C 187) and setting time (ASTM C 191) | 84 min | 146 min |
| Autoclave expansion (ASTM C 151) | 0.209% | 0.003% |
| Compression strength (ASTM C 109) | 98% of OPC at 7-day | |
| Expansion (ASTM C 1038) | 0.004% at 2-week | 0.006% |
| Drying shrinkage (ASTM C 596) | 0.076% at 2-week | 0.066% |
| Sulfate expansion (ASTM C 1012) | 0.014% at 2-week | 0.011% |

The comparison of the performance test results of 20% SCM of the invention and 80% OPC with the GU specifications were also found to be comparable as illustrated in Table 34.

TABLE 34

| Property | Method | GU Specification | 20% SCM of the invention + 80% OPC |
|---|---|---|---|
| Flow[a] | ASTM C1437 | 110 +/− 5% | N/A |
| Vicat set time, min | ASTM C191 | 45-240 | 84 |
| 1 day compression, psi | ASTM C109 | N/A | 1800[a] |
| 3 days compression, psi | ASTM C109 | 1890 | 3330[a] |
| 7 days compression, psi | ASTM C109 | 2900 | 4160[a] |
| Mortar bar expansion, % max | ASTM C1038 | 0.02 @ 14 days | 0.004% |
| Air content of mortar, % | ASTM C185 | Report Value | 21.7% |
| Fineness: Blaine, m²/kg | ASTM C204 | Report Value | 599.8 |
| Autoclave expansion, max % | ASTM C151 | 0.80 | 0.21% |

[a]20% SCM of the invention and reference OPC material mixes at constant water/cement ratio of 0.49 for direct comparison Example 23

Blended Compositions

Various compositions of the invention were blended with Portland cement and other materials to form aggregates and mortar cubes with calcium carbonate and magnesium carbonate aggregates. Table 35 shows some of the blended compositions.

TABLE 35

| composition | Portland Cement | CTS Cement | Fly ash C | Fly ash F | Potassium Silicate | Sodium Silicate | White Cement |
|---|---|---|---|---|---|---|---|
| 50 | 50 | | | | | | |
| 50 | | 50 | | | | | |
| 50 | | | 50 | | | | |
| 50 | | | | 50 | | | |
| 50 | | | | | 50 | | |
| 50 | | | | | | 50 | |
| 70 | | | | | 30 | | |
| 60 | | | | | 40 | | |
| 40 | | | | | 60 | | |
| 30 | | | | | 70 | | |
| 50 | 25 | | | | 25 | | |
| 50 | 25 | | | | 25 | | |
| 60 | | | | | 20 | 20 | |
| 60 | | | | | | 40 | |
| 50 | 40 | | | | 10 | | |
| 60 | | 40 | | | | | |
| 80 | | | | | 10 | | 10 |
| 80 | | | | | | 10 | 10 |
| 60 | | | | | 20 | | 20 |
| 60 | | | | | | 20 | 20 |

The compositions illustrated in Table 35 were a blended mix of individual compositions containing different amounts of vaterite. Some of the individual compositions are illustrated in Table 36.

TABLE 36

| Composition | Process to prepare the composition | Vaterite | Calcite | Halite | Vaterite:Calcite | Aragonite |
|---|---|---|---|---|---|---|
| 1 | 0.2 M CaCl₂ 0.5 M NaOH 2.2 GPM NaOH, 6.2 GPM Brine Edited conditions to achieve 11.3 pH in absorber and <7.7 in ppt stage | | 100 | | 0.0 | |
| 2 | 0.5 M NaOH 0.195 Ca, 0.048 Mg (seawater brine) 9.4 GPM brine, 5.0 GPM base Startup conditions = brine filled tank | 6.7 | 5.1 | | 1.3 | 88.2 |
| 3 | | 93.4 | 6.6 | | 14.2 | |
| 4 | Testing of Ca/Mg = 4:1 with Ca/CO₃ = 1.5, 2.5, 3.5 and 4.5 Brine made with HD98 Low Mg CaCl₂ liquid Stock Absorber flow = 4.7 GPM; Brine Flow = 8.6, 14.4, 20, 29 GPM Ca = 0.19 M; Mg = 0.045 M | 83.8 | 16.2 | | 5.2 | |

TABLE 36-continued

| Composition | Process to prepare the composition | Vaterite | Calcite | Halite | Vaterite:Calcite | Aragonite |
|---|---|---|---|---|---|---|
| 5 | | 14.3 | 85.7 | | 0.2 | |
| 6 | | 50 | 50 | | 1.0 | |
| 7 | | 35 | 65 | | 0.5 | |
| 8 | Production run for repeat (standard vaterite conditions) Ca/CO$_3$ = 1.5 Ca/Mg = 4 | 95.3 | | 4.7 | | |
| 9 | | 92.6 | 2.8 | | 33.1 | |
| 10 | | 96 | 4 | | 24.0 | |
| 11 | | 96 | 4 | | 24.0 | |
| 12 | Inline/Static Mixer (small unit) | 61.3 | 5.9 | | 10.4 | 31.8 |
| 13 | 275 gal of synbrine [27.9 g/L CaCl$_2$ + Seawater], 16.5 kg of 50% NaOH, ~2 scfm CO$_2$ (no air), maintained pH between 7.8-8.5, final pH = 8.1. Material was spray dried directly after settling. | 21.1 | 63.9 | 4.4 | 0.3 | 10.6 |
| 14 | 275 gal of synbrine [27.9 g/L CaCl$_2$ + Seawater], 16.5 kg of 50% NaOH, ~2 scfm CO$_2$ (no air), maintained pH between 7.8-8.5, final pH = 7.98. Material was spray dried directly after settling. | 22.2 | 71.2 | 6.5 | 0.3 | |
| 15 | 300 gal Vaterite Precipitation 300 gal of synbrine [27.9 g/L CaCl$_2$ + Seawater], 18.0 kg of 50% NaOH, ~3 scfm CO$_2$ (no air), maintained pH between 7.8-8.5, final pH = 7.98. Material was spray dried directly after vacuum filtering. | 4.8 | 94.7 | 0.5 | 0.1 | |
| 16 | 300 gal of synbrine [27.9 g/L CaCl$_2$ + Seawater], 18.0 kg of 50% NaOH, ~3 scfm CO$_2$ (no air), maintained pH between 7.8-8.5, final pH = 7.98. Material was spray dried directly after vacuum filtering. | 2.8 | 92.8 | 4.4 | 0.0 | |
| 17 | 300 gal of synbrine [27.9 g/L CaCl$_2$ + Seawater], 18.0 kg of 50% NaOH, ~3.5 scfm CO$_2$ (no air), maintained pH between 7.8-8.5, final pH = 7.49. Material was spray dried directly after vacuum filtering with a rinse of fresh water. | 19.8 | 76.5 | 3.7 | 0.3 | |
| 18 | 300 gal of 1 day old synbrine [27.9 g/L CaCl$_2$ + Seawater], 18.0 kg of 50% NaOH, ~3.5 scfm CO$_2$ (no air), maintained pH between 7.8-8.5, final pH = 8.04. Material was spray | 70 | 30 | | 2.3 | |

TABLE 36-continued

| Composition | Process to prepare the composition | Vaterite | Calcite | Halite | Vaterite:Calcite | Aragonite |
|---|---|---|---|---|---|---|
| 19 | dried after being re-slurried and vacuum filtered twice. | 70 | 30 | | 2.3 | |
| 20 | 300 gal of synbrine [27.9 g/L CaCl$_2$ + Seawater], 18.0 kg of 50% NaOH, ~3.5 scfm CO$_2$ (no air), maintained pH between 7.8-8.5, final pH = 7.8. Material was spray dried after being re-slurried and vacuum filtered twice. | 75.2 | 24.8 | | 3.0 | |
| 21 | | 75.2 | 24.8 | | 3.0 | |
| 22 | 300 gal of synbrine [27.9 g/L CaCl$_2$ + Seawater], 18.0 kg of 50% NaOH, ~3.5 scfm CO$_2$ (no air), maintained pH between 7.8-8.5, final pH = 7.8. Material was spray dried after being re-slurried and vacuum filtered twice. | 70.2 | 29.8 | | 2.4 | |
| 23 | | 90.4 | 4.3 | 5.3 | 21.0 | |
| 24 | | 89 | 3 | 8.1 | 29.7 | |
| 25 | | 79.7 | 18 | 2.3 | 4.4 | |
| 26 | | 78.1 | 19.7 | 2.3 | 4.0 | |
| 27 | | 58.8 | 40.5 | 0.7 | 1.5 | |
| 28 | | 76.1 | 19.9 | 4 | 3.8 | |
| 29 | | 36.9 | 60.3 | 2.9 | 0.6 | |
| 30 | | 11.5 | 87 | 1.5 | 0.1 | |
| 31 | | 49.3 | 47.4 | 3.3 | 1.0 | |
| 32 | | 65.5 | 31.8 | 2.7 | 2.1 | |
| 33 | | 82.4 | 14.4 | 3.1 | 5.7 | |
| 34 | | 6.6 | 91.6 | 1.8 | 0.1 | |
| 35 | | 50.2 | 47.7 | 2.2 | 1.1 | |
| 36 | | 26.1 | 70.9 | 3 | 0.4 | |
| 37 | | 16.7 | 81 | 2.3 | 0.2 | |

The compositions 1-12 of Table 36 were also used to prepare 100% self cement aggregate cube samples. The compositions after precipitation were dewatered and the dewatered material was placed in baby ice cube molds.

Example 24

Synthesis of Vaterite Compositions

Materials and Instruments:

X-ray diffraction: Rigaku miniflex, 30 KV, 15 mA, 2-90° 2θ, 2° 2θ per min, 0.01° 2θ per step, Rietveld refinement with Jade 9. SEM: Hitachi TM-1000 used to image minerals dried at less than 50° C., Au coating. Compression tested on ELE load frame (ELE International) with MTS (MTS Systems Corp.) compression cell. Laser particle size distribution: Horiba particle size unit. Nitrogen gas surface analysis: micromiritics model.

The XRD pattern of the vaterite composition showed 83.3% vaterite, 9.2% calcite, 4.7% gypsum, and 2.8% halite before mixing with water and the particle size before mixing with water was about 6 microns.

The vaterite composition of the invention was mixed with DI water at a liquid:powder ratio of 0.3. The slurry was poured into molds and was cured for 3 days at 85% RH (relative humidity). After removing from molds, the product was allowed to cure in DI water for another 4 days, 11 days, and 25 days. Resulting samples were tested for compressive strength, x-ray diffraction, and FTIR.

Figure 34:
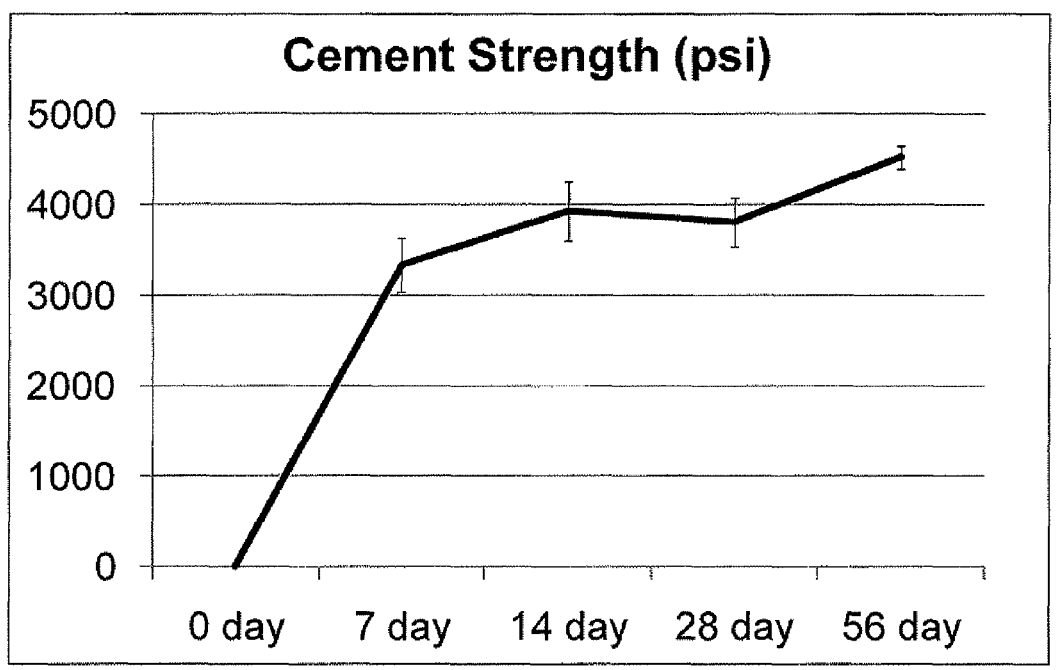
FIG. 34 illustrates the compressive strength of the composition after curing for 7 days, 14 days, and 28 days.

The XRD pattern after 28 days, showed 91.4% aragonite, 2.8% vaterite, 2.5% calcite, and 3.3% gypsum. The compressive strength of the composition after curing for 7 days, 14 days, and 28 days, is illustrated in FIG. 34.

What is claimed is:

1. A method for making a composition, comprising:
   (a) contacting a solution comprising a proton removing agent with a CO$_2$ gaseous stream to produce a CO$_2$ charged solution;
   (b) contacting the CO$_2$ charged solution with an alkaline earth-metal containing water; and
   (c) subjecting the alkaline earth-metal containing water of step (b) to one or more conditions to make a self-cementing composition wherein the self-cementing composition comprises at least 1% w/w vaterite having a carbon isotopic fractionation value ($\delta^{13}C$) of between −12‰ to −25‰, wherein the composition is in saltwater, and wherein the composition upon setting and hardening has a compressive strength of at least 14 MPa.

2. The method of claim 1, wherein the CO$_2$ gaseous stream is an industrial waste stream comprising flue gas from combustion; a flue gas from a chemical processing plant; a flue gas from a plant that produces CO$_2$ as a byproduct; or combination thereof.

3. The method of claim 1, wherein the alkaline earth-metal containing water is sea water, brine, or combination thereof.

4. The method of claim 1, wherein the one or more conditions are selected from the group consisting of temperature, pH, precipitation, residence time of the precipitate, dewatering of the precipitate, washing the precipitate with water, drying, milling, and storage.

5. The method of claim 1, wherein the composition comprises between 20% w/w to 99% w/w vaterite.

6. The method of claim 1, wherein the proton removing agent is selected from the group consisting of oxide, hydroxide, carbonate, coal ash, naturally occurring mineral, and combination thereof.

7. The method of claim 6, wherein the proton removing agent is hydroxide made by an electrochemical process.

8. The method of claim 1, wherein the self-cementing composition comprises less than 90% by wt solid material.

9. The method of claim 1, wherein the method does not require dewatering the composition.

10. The method of claim 1, wherein the method does not require drying the composition.

11. The method of claim 1, wherein the method further comprises pouring the composition into molds to form formed building materials.

12. The method of claim 1, wherein the method comprises rinsing the composition with water.

13. The method of claim 1, wherein the self-cementing composition comprises between 50% w/w to 100% w/w vaterite.

14. The method of claim 1, wherein the alkaline earth-metal containing water comprises calcium chloride.

15. The method of claim 1, wherein the method further comprises adding Portland cement, aggregate, supplementary cementitious material (SCM), or combination thereof, to the composition.

* * * * *